US012592140B2

(12) United States Patent
Carrigan et al.

(10) Patent No.: US 12,592,140 B2
(45) Date of Patent: Mar. 31, 2026

(54) USER INTERFACES FOR FACILITATING OPERATIONS

(71) Applicant: Apple Inc., Cupertino, CA (US)

(72) Inventors: Taylor G. Carrigan, San Francisco, CA (US); Kevin M. Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/928,895

(22) Filed: Oct. 28, 2024

(65) Prior Publication Data

US 2025/0054379 A1 Feb. 13, 2025

Related U.S. Application Data

(63) Continuation of application No. 18/383,281, filed on Oct. 24, 2023, now Pat. No. 12,131,616, which is a
(Continued)

(51) Int. Cl.
*G08B 21/04* (2006.01)
*G06F 1/3218* (2019.01)
(Continued)

(52) U.S. Cl.
CPC ......... *G08B 21/043* (2013.01); *G06F 1/3218* (2013.01); *G06F 3/011* (2013.01);
(Continued)

(58) Field of Classification Search
CPC ...... G08B 21/043; G08B 25/016; G08B 3/10; G08B 21/0446; G06F 1/3218;
(Continued)

(56) References Cited

U.S. PATENT DOCUMENTS

| | | | |
|---|---|---|---|
| 5,825,353 | A | 10/1998 | Will |
| 8,659,555 | B2 | 2/2014 | Pihlaja |
| | | (Continued) | |

FOREIGN PATENT DOCUMENTS

| | | |
|---|---|---|
| CN | 104035648 A | 9/2014 |
| CN | 106936992 A | 7/2017 |
| | (Continued) | |

OTHER PUBLICATIONS

Advisory Action received for U.S. Appl. No. 17/951,016, mailed on Jul. 14, 2023, 7 pages.
(Continued)

*Primary Examiner* — Bryan Earles
(74) *Attorney, Agent, or Firm* — YHE Law LLP

(57) ABSTRACT

The present disclosure generally relates to user interfaces for facilitating operations. In some examples, computer systems provide indications that educate and/or guide users for performing an operation. In some examples, computer systems perform a first operation based on a first type of user input corresponding to a first hardware input device and perform a second operation based on a second type of user input corresponding to the first hardware input devices. In some examples, computer systems adjust audio output of an emergency siren based on detecting a particular type of event. In some examples, computer systems display different types and/or sizes of notifications based on an operating mode of a respective computer system. In some examples, computer systems forgo performing one or more operations when a respective computer system operates in a low power mode.

40 Claims, 37 Drawing Sheets

Related U.S. Application Data continuation of application No. 17/951,034, filed on Sep. 22, 2022, now Pat. No. 11,809,615.

(60) Provisional application No. 63/334,514, filed on Apr. 25, 2022.

(51) Int. Cl.

| | |
|---|---|
| *G06F 3/01* | (2006.01) |
| *G06F 3/0482* | (2013.01) |
| *G06F 3/04847* | (2022.01) |
| *G06F 3/0487* | (2013.01) |
| *G06T 13/80* | (2011.01) |
| *G08B 25/01* | (2006.01) |

(52) U.S. Cl.
CPC ............ *G06F 3/017* (2013.01); *G06F 3/0482* (2013.01); *G06F 3/04847* (2013.01); *G06F 3/0487* (2013.01); *G06T 13/80* (2013.01); *G08B 25/016* (2013.01)

(58) Field of Classification Search
CPC ........ G06F 3/011; G06F 3/017; G06F 3/0482; G06F 3/04847; G06F 3/0487; G06F 1/163; G06F 1/1694; G06F 1/3265; G06F 1/3287; G06F 3/04817; G06F 3/04883; G06F 1/3231; G06T 13/80
See application file for complete search history.

(56) References Cited

U.S. PATENT DOCUMENTS

| | | | |
|---|---|---|---|
| 9,122,376 | B1 | 9/2015 | Brotherston et al. |
| 9,538,069 | B2 | 1/2017 | Nagao |
| 10,025,380 | B2 | 7/2018 | Hodge et al. |
| 10,264,647 | B1 | 4/2019 | Penberthy et al. |
| 10,452,116 | B1 | 10/2019 | Devries et al. |
| 10,474,194 | B1 | 11/2019 | Ell et al. |
| 10,914,834 | B2 | 2/2021 | Amihood et al. |
| 10,962,935 | B1 | 3/2021 | Ely et al. |
| 11,099,650 | B1 | 8/2021 | Haynold |
| 11,397,239 | B2 | 7/2022 | Jungmaier et al. |
| 11,982,563 | B1 | 5/2024 | Staats et al. |
| 2004/0111164 | A1 | 6/2004 | Stohrer et al. |
| 2004/0201699 | A1 | 10/2004 | Parulski et al. |
| 2007/0040810 | A1 | 2/2007 | Dowe et al. |
| 2009/0262088 | A1 | 10/2009 | Moll-Carrillo et al. |
| 2010/0210248 | A1 | 8/2010 | Morrissey et al. |
| 2010/0265183 | A1 | 10/2010 | Mail et al. |
| 2010/0271315 | A1 | 10/2010 | Bathiche |
| 2011/0019069 | A1 | 1/2011 | Kojima et al. |
| 2012/0084662 | A1 | 4/2012 | Navarro et al. |
| 2012/0274508 | A1 | 11/2012 | Brown et al. |
| 2012/0293558 | A1 | 11/2012 | Dilts |
| 2013/0050129 | A1 | 2/2013 | Liu |
| 2014/0028885 | A1 | 1/2014 | Ma et al. |
| 2014/0033059 | A1 | 1/2014 | Schubert et al. |
| 2014/0253470 | A1 | 9/2014 | Havilio |
| 2014/0362257 | A1 | 12/2014 | Viljamaa et al. |
| 2015/0163442 | A1 | 6/2015 | Han et al. |
| 2015/0248213 | A1 | 9/2015 | Postal |
| 2015/0370425 | A1* | 12/2015 | Chen .................. G06F 3/04817 |
| | | | 715/830 |
| 2016/0328023 | A1 | 11/2016 | Mistry et al. |
| 2016/0357354 | A1 | 12/2016 | Chen et al. |
| 2017/0357411 | A1 | 12/2017 | Williams et al. |
| 2017/0371538 | A1 | 12/2017 | Zhang et al. |
| 2018/0108224 | A1 | 4/2018 | Longo |
| 2018/0364815 | A1 | 12/2018 | Moussette et al. |
| 2019/0043613 | A1* | 2/2019 | Gallagher .............. G16H 10/60 |
| 2019/0050115 | A1* | 2/2019 | Krishna ................ G06F 3/0482 |
| 2019/0080189 | A1 | 3/2019 | Van Os et al. |
| 2019/0082044 | A1 | 3/2019 | Melendez et al. |
| 2019/0163288 | A1 | 5/2019 | You et al. |
| 2019/0346885 | A1 | 11/2019 | Sepulveda et al. |
| 2020/0077250 | A1 | 3/2020 | Gideon, III |
| 2020/0082599 | A1 | 3/2020 | Manzari |
| 2020/0104021 | A1 | 4/2020 | Bylenok et al. |
| 2020/0122802 | A1 | 4/2020 | Bradlow et al. |
| 2021/0073007 | A1 | 3/2021 | Guzman et al. |
| 2021/0149736 | A1 | 5/2021 | Kondapuram et al. |
| 2021/0311553 | A1 | 10/2021 | Keller et al. |
| 2021/0314496 | A1* | 10/2021 | Sadhu ................ G06F 3/04883 |
| 2021/0318758 | A1 | 10/2021 | Lazaridis et al. |
| 2021/0390765 | A1 | 12/2021 | Laaksonen et al. |
| 2022/0155909 | A1 | 5/2022 | Kawashima et al. |
| 2022/0171471 | A1 | 6/2022 | Fu |
| 2022/0382440 | A1 | 12/2022 | Manzari et al. |
| 2023/0125403 | A1 | 4/2023 | Simmons et al. |
| 2023/0341925 | A1 | 10/2023 | Carrigan et al. |
| 2023/0342019 | A1 | 10/2023 | Carrigan et al. |
| 2023/0343200 | A1 | 10/2023 | Carrigan et al. |
| 2024/0062640 | A1 | 2/2024 | Carrigan et al. |
| 2025/0110574 | A1 | 4/2025 | Alonso et al. |
| 2025/0113094 | A1 | 4/2025 | Alonso et al. |
| 2025/0113095 | A1 | 4/2025 | Alonso et al. |
| 2025/0370597 | A1 | 12/2025 | Carrigan et al. |

FOREIGN PATENT DOCUMENTS

| | | |
|---|---|---|
| CN | 109314735 A | 2/2019 |
| CN | 105338244 B | 4/2019 |
| CN | 113163052 A | 7/2021 |
| CN | 113228074 A | 8/2021 |
| JP | 2000-286958 A | 10/2000 |
| JP | 2008-103903 A | 5/2008 |
| JP | 2012-27646 A | 2/2012 |
| JP | 2012-239638 A | 12/2012 |
| JP | 2013-149245 A | 8/2013 |
| JP | 2015-49728 A | 3/2015 |
| JP | 2015-115042 A | 6/2015 |
| JP | 2017-194783 A | 10/2017 |
| JP | 2017-204834 A | 11/2017 |
| WO | 2011/094854 A1 | 8/2011 |
| WO | 2017/187573 A1 | 11/2017 |
| WO | 2017/213924 A1 | 12/2017 |
| WO | 2020/123180 A1 | 6/2020 |
| WO | 2021/031816 A1 | 2/2021 |

OTHER PUBLICATIONS

Advisory Action received for U.S. Appl. No. 17/951,016, mailed on Mar. 11, 2024, 5 pages.

Apple Support, "Multitask with Picture in Picture on iPad", Online available at: <https://web.archive.org/web/20210207010119/https://support.apple.com/en-gb/guide/ipad/ipad7858c392/ipados>, Retrieved from the Internet: URL: https://support.apple.com/en-gb/guide/ipad/ipad7858c392/ipados, Feb. 7, 2021, 2 pages.

Applicant-Initiated Interview Summary received for U.S. Appl. No. 17/951,016, mailed on Feb. 1, 2024, 4 pages.

Applicant-Initiated Interview Summary received for U.S. Appl. No. 17/951,016, mailed on Nov. 24, 2023, 5 pages.

Chfondue, "Siemens Gigaset SL785 and SL78h demo", Online Available at:https://www.youtube.com/watch?v=9HRL-8hkJ4s, Feb. 20, 2009, 2 pages.

Corrected Notice of Allowance received for U.S. Appl. No. 17/951,034, mailed on Jul. 14, 2023, 6 pages.

Corrected Notice of Allowance received for U.S. Appl. No. 18/383,281, mailed on Aug. 29, 2024, 2 pages.

European Search Report received for European Patent Application No. 22197490.0, mailed on Aug. 18, 2023, 10 pages.

Extended European Search Report received for European Patent Application No. 22197513.9, mailed on Aug. 25, 2023, 10 pages.

Final Office Action received for U.S. Appl. No. 17/951,016, mailed on Jan. 2, 2024, 48 pages.

Final Office Action received for U.S. Appl. No. 17/951,016, mailed on May 4, 2023, 37 pages.

International Search Report and Written Opinion received for PCT Patent Application No. PCT/US2023/019476, mailed on Oct. 10, 2023, 25 pages.

(56) References Cited

OTHER PUBLICATIONS

Invitation to Pay Additional Fees and Partial International Search Report received for PCT Patent Application No. PCT/US2023/019476, mailed on Aug. 17, 2023, 16 pages.

Non-Final Office Action received for U.S. Appl. No. 17/951,016, mailed on Feb. 14, 2023, 29 pages.

Non-Final Office Action received for U.S. Appl. No. 17/951,016, mailed on May 9, 2024, 51 pages.

Non-Final Office Action received for U.S. Appl. No. 17/951,016, mailed on Oct. 10, 2023, 51 pages.

Notice of Allowance received for Japanese Patent Application No. 2022-152017, mailed on Jun. 3, 2024, 4 pages.

Notice of Allowance received for U.S. Appl. No. 17/951,034, mailed on Jun. 26, 2023, 9 pages.

Notice of Allowance received for U.S. Appl. No. 17/951,035, mailed on Jul. 12, 2023, 7 pages.

Notice of Allowance received for U.S. Appl. No. 17/951,035, mailed on Mar. 22, 2023, 9 pages.

Notice of Allowance received for U.S. Appl. No. 18/383,281, mailed on Jun. 17, 2024, 9 pages.

Office Action received for Japanese Patent Application No. 2022-152017, mailed on Dec. 18, 2023, 8 pages.

Office Action received for Japanese Patent Application No. 2022-152018, mailed on Dec. 22, 2023, 7 pages.

Office Action received for Japanese Patent Application No. 2022-152018, mailed on Jun. 3, 2024, 8 pages.

Siemens, "Gigaset SL78H", Online Available at: https://www.manualslib.com/manual/1636505/Siemens-Gigaset-SI78h.html?page=3#manual, Sep. 16, 2005, 57 pages.

Supplemental Notice of Allowance received for U.S. Appl. No. 17/951,034, mailed on Sep. 25, 2023, 3 pages.

Supplemental Notice of Allowance received for U.S. Appl. No. 18/383,281, mailed on Jul. 1, 2024, 2 pages.

Symmoto, "Android Key Programmer/Remapping for Zebra Devices", Retrieved from: https://www.youtube.com/watch?v=7nyS4UP9u4o, Jan. 26, 2021, 2 pages.

Wikipedia, "IPad (9th generation): Difference between revisions", Online Available at: <https://en.wikipedia.org/w/index.php?title=IPad_(9th_generation)&diff=prev&oldid=1080211852> Retrieved from the Internet: URL: https://en.wikipedia.org/wiki/IPad_(9th_generation), Mar. 30, 2022, pp. 1-4.

Zebra, "KeyMapping Manager", Available Online at: https://web.archive.org/web/20211206014611/https://techdocs.zebra.com/mx/keymappingmgr/, Dec. 6, 2021, 51 pages Corrected Notice of Allowance received for U.S. Appl. No. 17/951,016, mailed on Aug. 15, 2024, 3 pages.

International Preliminary Report on Patentability received for PCT Patent Application No. PCT/US2023/019476, mailed on Nov. 7, 2024, 18 pages.

Notice of Allowance received for Chinese Patent Application No. 2022-152018, mailed on Nov. 5, 2024, 4 pages (1 page of English Translation and 3 pages of Official Copy).

Notice of Allowance received for U.S. Appl. No. 17/951,016, mailed on Jul. 31, 2024, 7 pages.

Office Action received for Korean Patent Application No. 10-2022-0120786, mailed on Oct. 8, 2024, 10 pages (4 pages of English Translation and 6 pages of Official Copy).

Notice of Allowance received for Korean Patent Application No. 10-2022-0120786, mailed on Mar. 7, 2025, 7 pages (2 pages of English Translation and 5 pages of Official Copy).

International Search Report and Written Opinion received for PCT Patent Application No. PCT/US2024/044796, mailed on Nov. 28, 2024, 17 pages.

Non-Final Office Action received for U.S. Appl. No. 18/781,667, mailed on Jul. 1, 2025, 18 pages.

Office Action received for Chinese Patent Application No. 202411853119.3, mailed on Jun. 16, 2025, 19 pages (10 pages of English Translation and 9 pages of Official Copy).

Applicant-Initiated Interview Summary received for U.S. Appl. No. 18/781,667, mailed on Sep. 15, 2025, 3 pages.

Office Action received for European Patent Application No. 221974900, mailed on Oct. 17, 2025, 7 pages.

Office Action received for Japanese Patent Application No. 2024-201009, mailed on Oct. 24, 2025, 8 pages (4 pages of English Translation and 4 pages of Official Copy).

Office Action received for Chinese Patent Application No. 2024118531193, mailed on Nov. 20, 2025, 15 pages (9 pages of English Translation and 6 pages of Official Copy).

\* cited by examiner

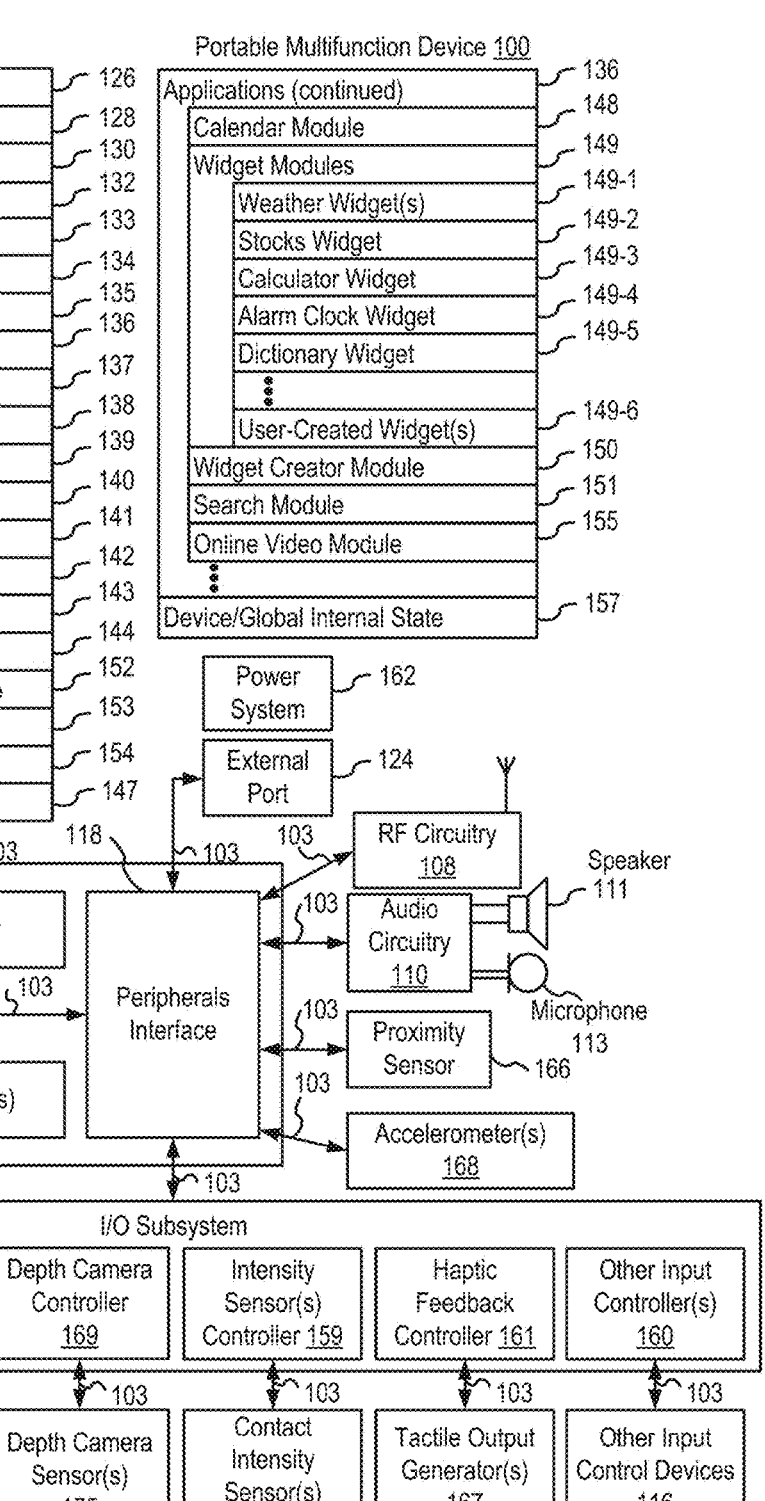

Memory 102

| Operating System | 126 |
| Communication Module | 128 |
| Contact/Motion Module | 130 |
| Graphics Module | 132 |
| Haptic Feedback Module | 133 |
| Text Input Module | 134 |
| GPS Module | 135 |
| Applications | 136 |

| Contacts Module | 137 |
| Telephone Module | 138 |
| Video Conference Module | 139 |
| E-mail Client Module | 140 |
| Instant Messaging Module | 141 |
| Workout Support Module | 142 |
| Camera Module | 143 |
| Image Management Module | 144 |
| Video & Music Player Module | 152 |
| Notes Module | 153 |
| Map Module | 154 |
| Browser Module | 147 |

Portable Multifunction Device 100

| Applications (continued) | 136 |
| Calendar Module | 148 |
| Widget Modules | 149 |

| Weather Widget(s) | 149-1 |
| Stocks Widget | 149-2 |
| Calculator Widget | 149-3 |
| Alarm Clock Widget | 149-4 |
| Dictionary Widget | 149-5 |
| User-Created Widget(s) | 149-6 |

| Widget Creator Module | 150 |
| Search Module | 151 |
| Online Video Module | 155 |

| Device/Global Internal State | 157 |

Power System — 162

External Port — 124

RF Circuitry 108

Speaker 111

Audio Circuitry 110

Microphone 113

Proximity Sensor 166

Accelerometer(s) 168

118

103   103   103   103   103   103   103

104
122

Controller

120

Processor(s)

Peripherals Interface

106

I/O Subsystem

| Display Controller 156 | Optical Sensor(s) Controller 158 | Depth Camera Controller 169 | Intensity Sensor(s) Controller 159 | Haptic Feedback Controller 161 | Other Input Controller(s) 160 |

103   103   103   103   103   103

| Touch-Sensitive Display System 112 | Optical Sensor(s) 164 | Depth Camera Sensor(s) 175 | Contact Intensity Sensor(s) 165 | Tactile Output Generator(s) 167 | Other Input Control Devices 116 |

*FIG. 1A*

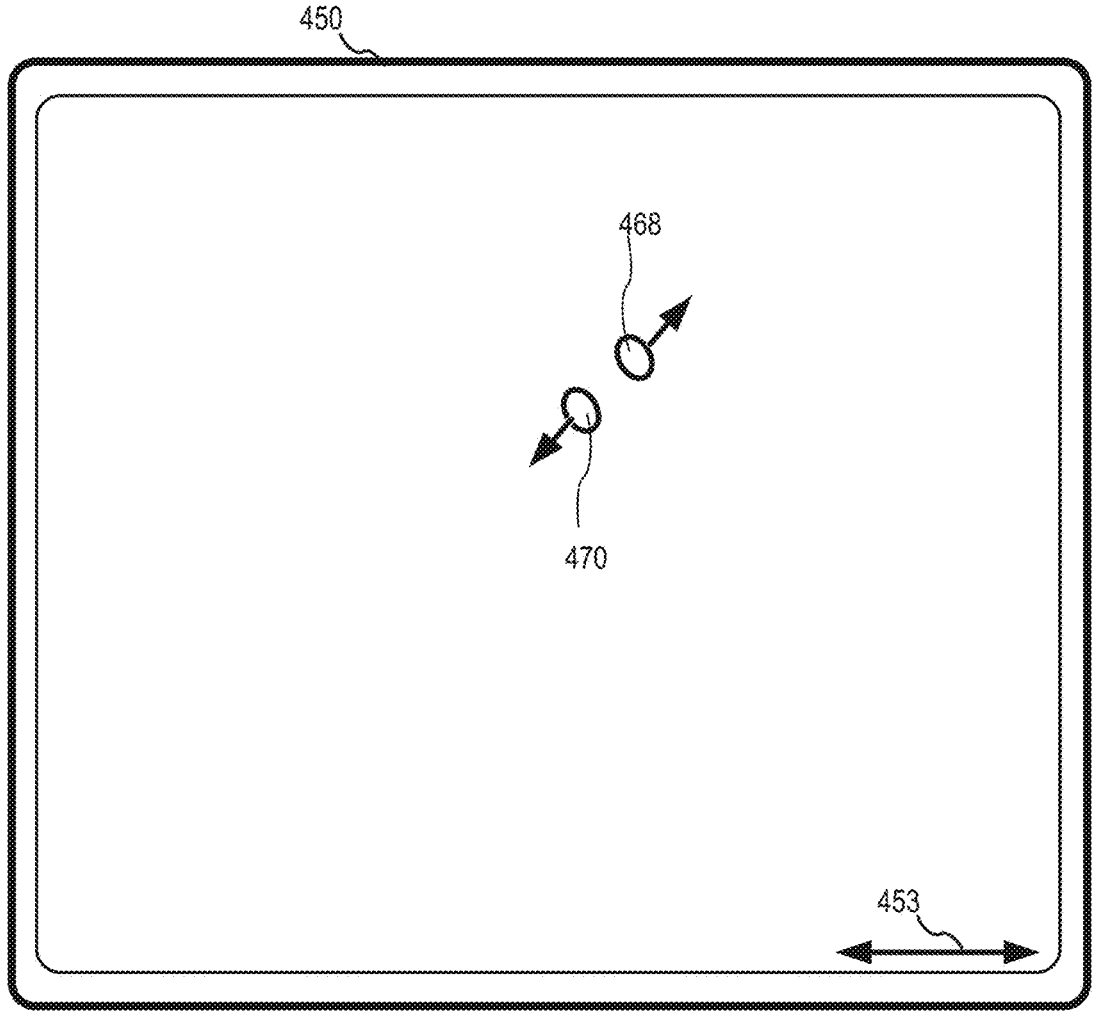
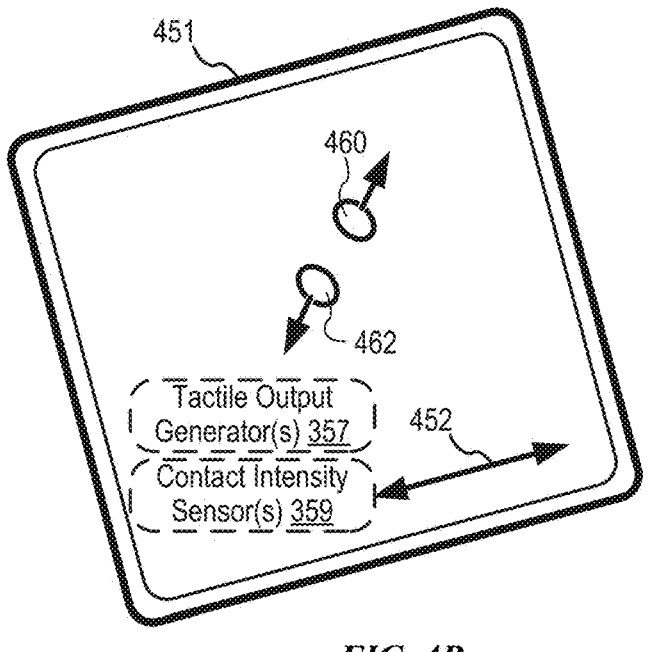
*FIG. 4B*

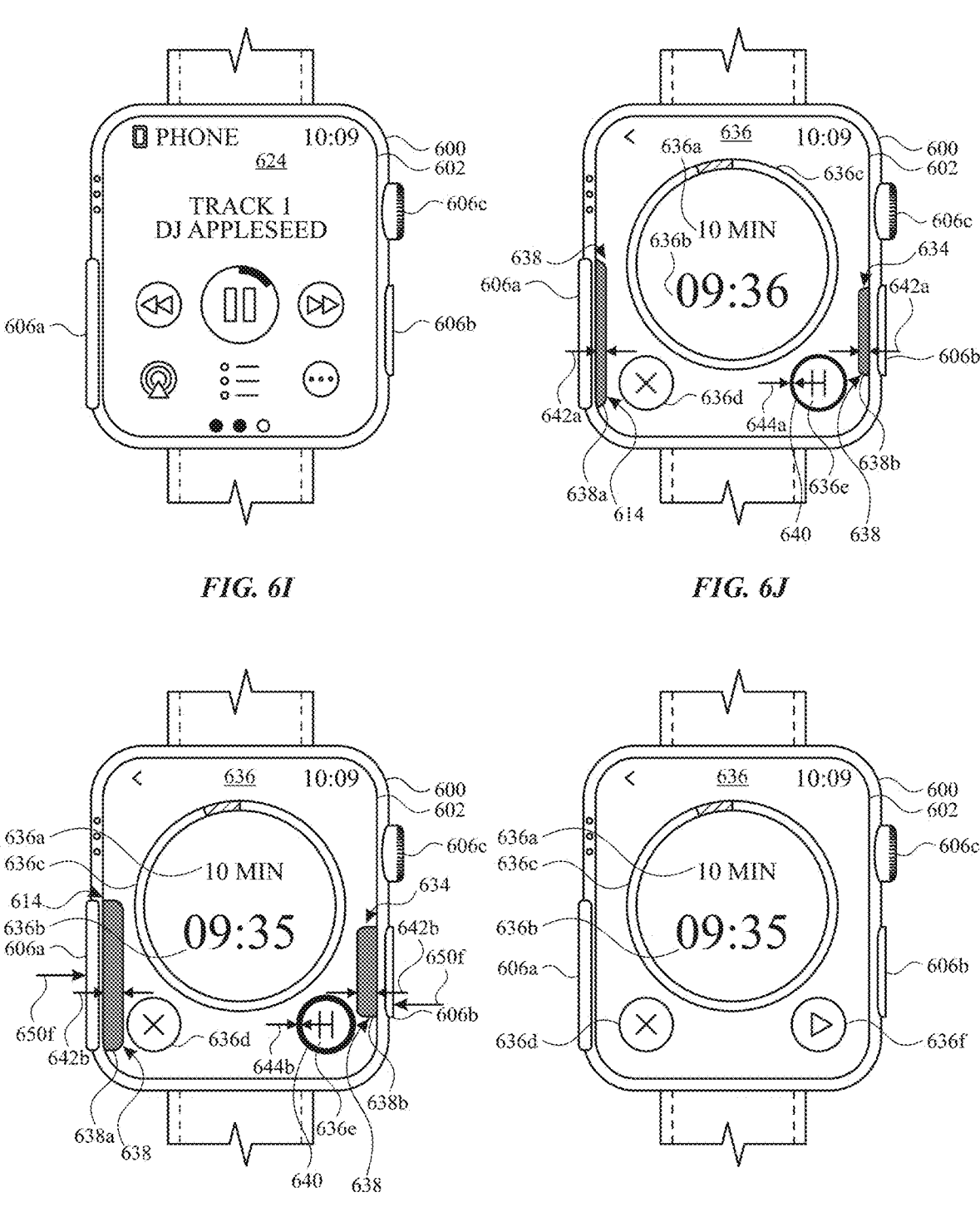
FIG. 6I                  FIG. 6J
FIG. 6K                  FIG. 6L

700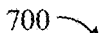

---

702
Detect an occurrence of a condition associated with displaying a first user interface associated with a first operation.

---

704
In response to detecting the occurrence of the condition, display the first user interface, including, while displaying the first user interface:

---

706
In accordance with a determination that a first hardware input device of the one or more hardware input devices is configured with a first configuration that enables the first hardware input device to perform the first operation, display, via the display generation component, a graphical user interface object indicating that the first hardware input device can perform the first operation.

---

708
In accordance with a determination that the first hardware input device of the one or more hardware input devices is not configured with the first configuration that enables the first hardware input device to perform the first operation, forgo displaying the graphical user interface object indicating that the first hardware input device can perform the first operation.

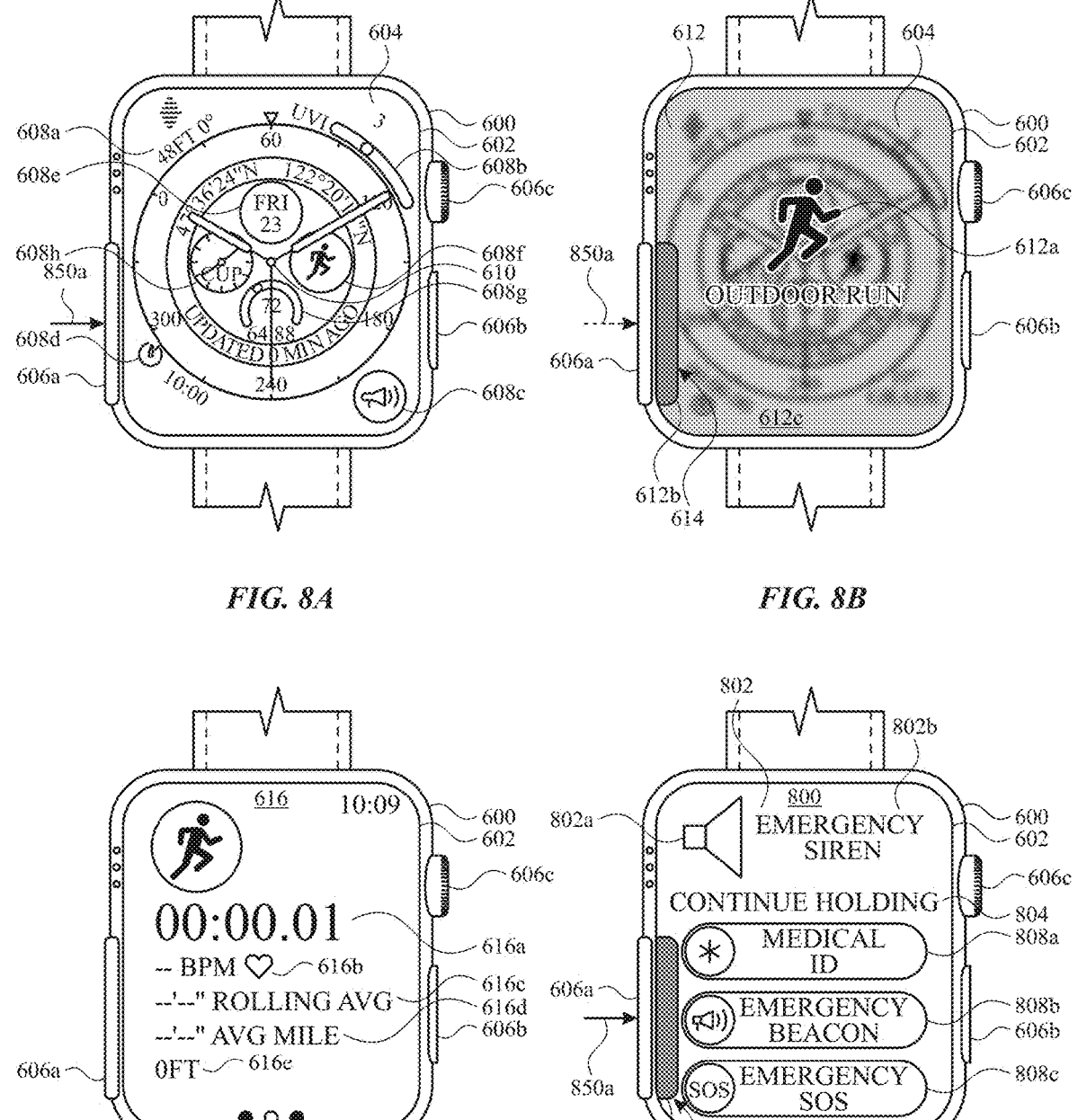
FIG. 8A                 FIG. 8B
FIG. 8C                 FIG. 8D

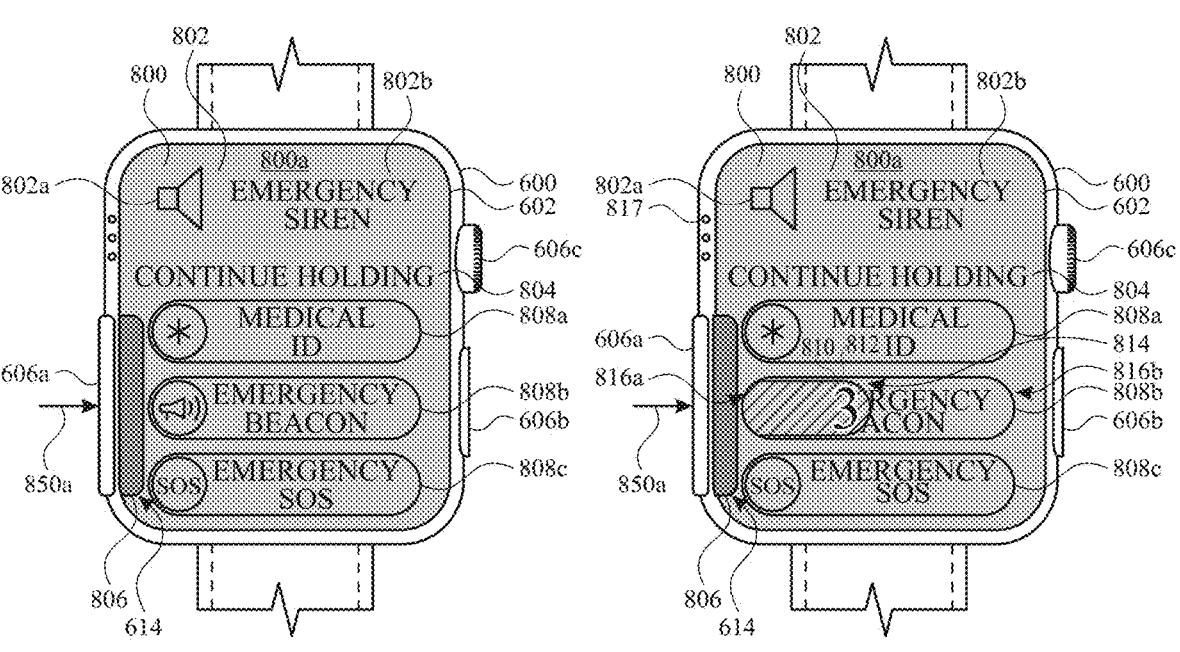
FIG. 8E                    FIG. 8F
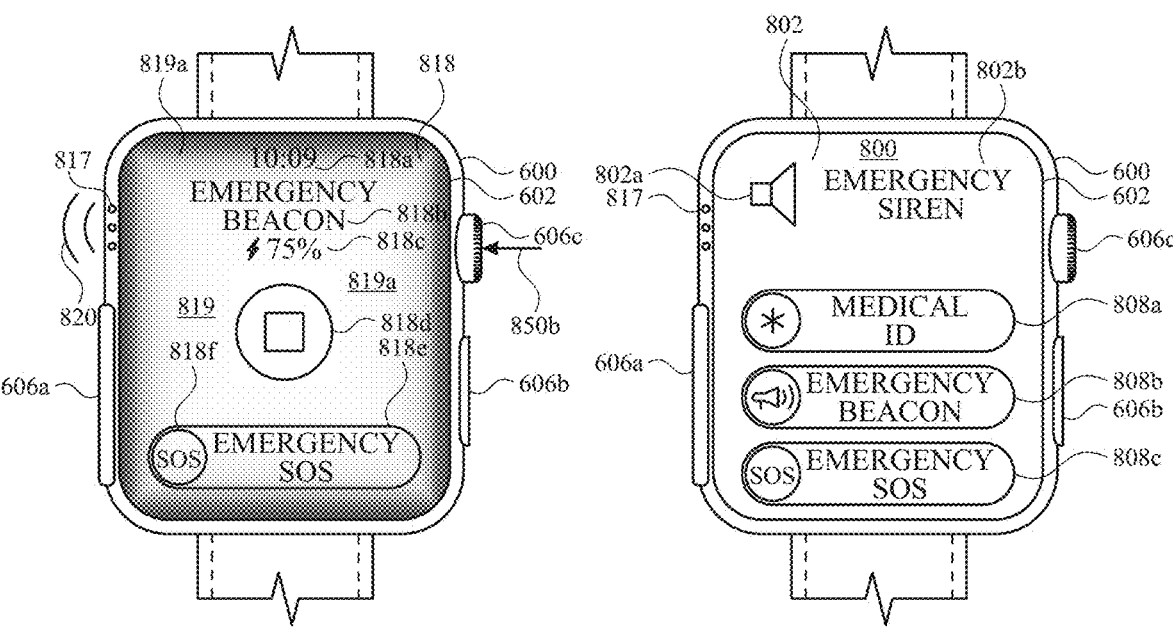
FIG. 8G                    FIG. 8H

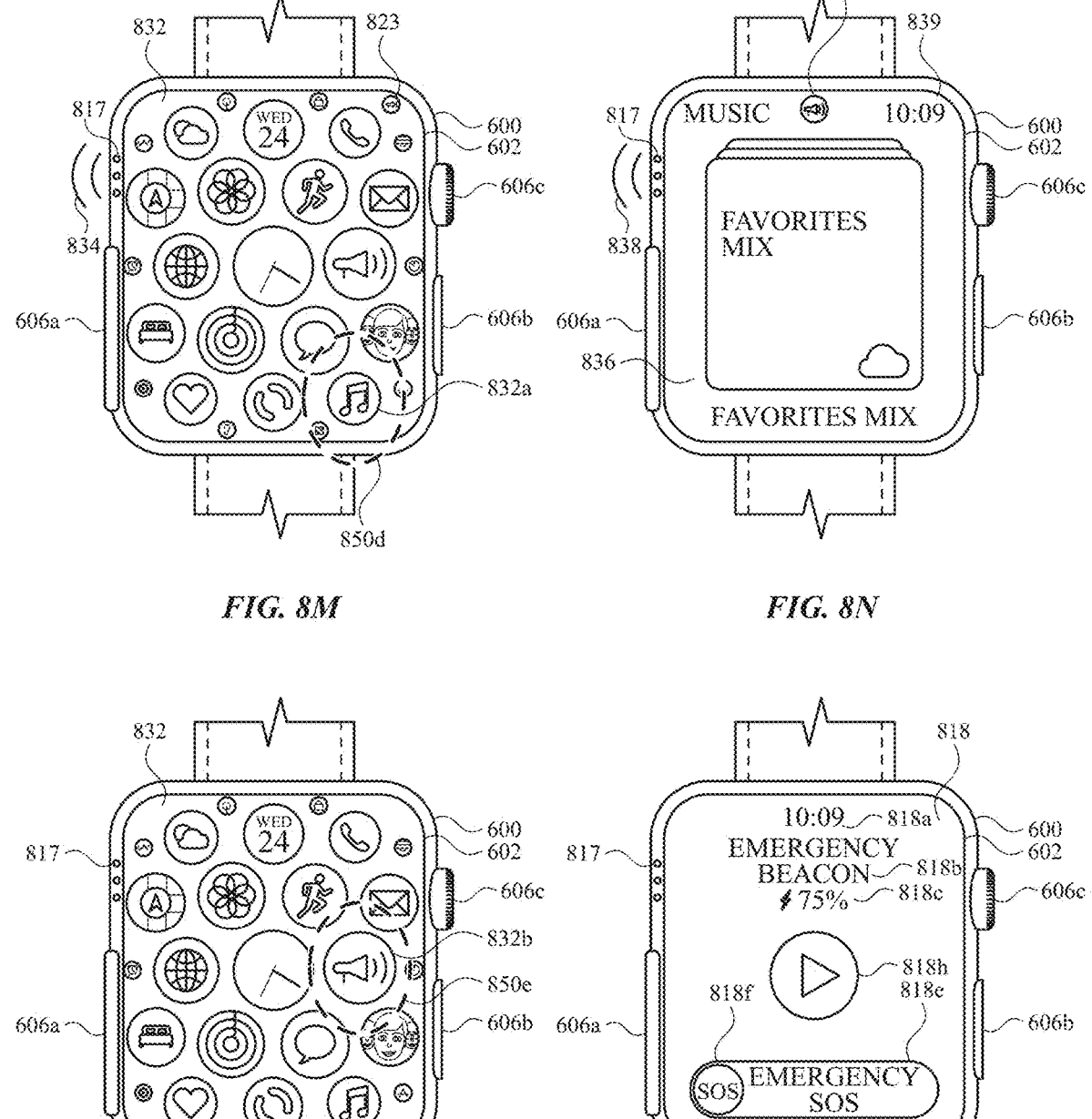
*FIG. 8M*          *FIG. 8N*
*FIG. 8O*          *FIG. 8P*

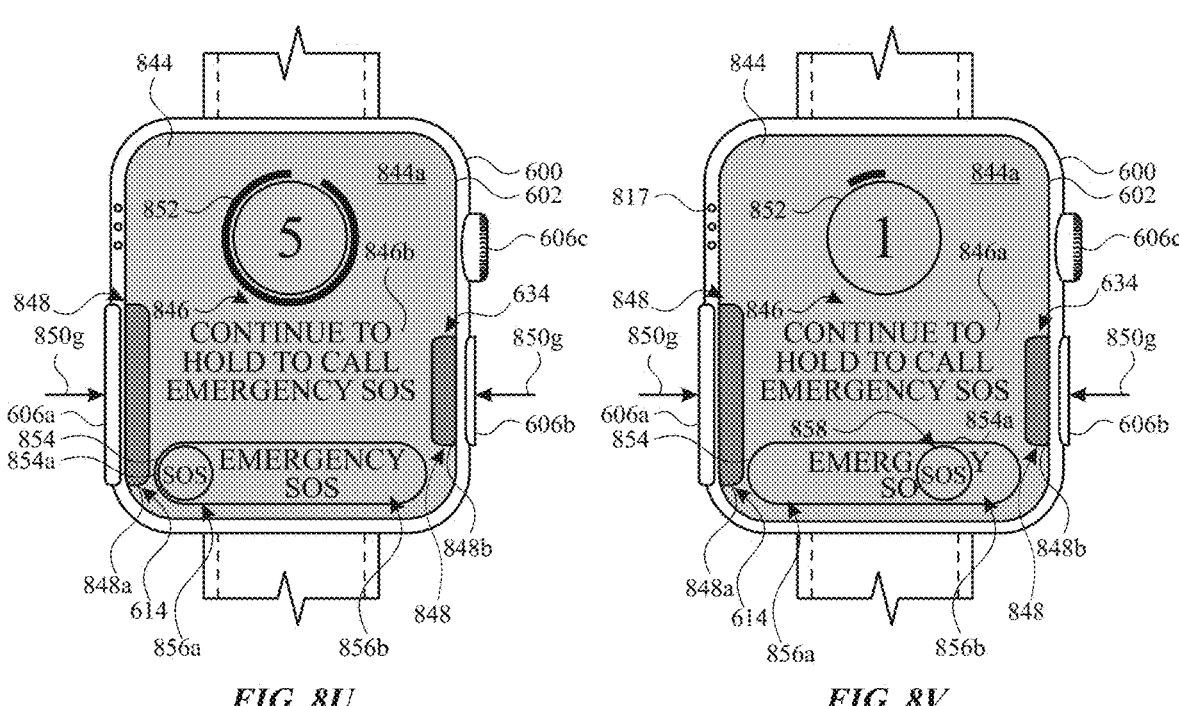
FIG. 8U                                    FIG. 8V
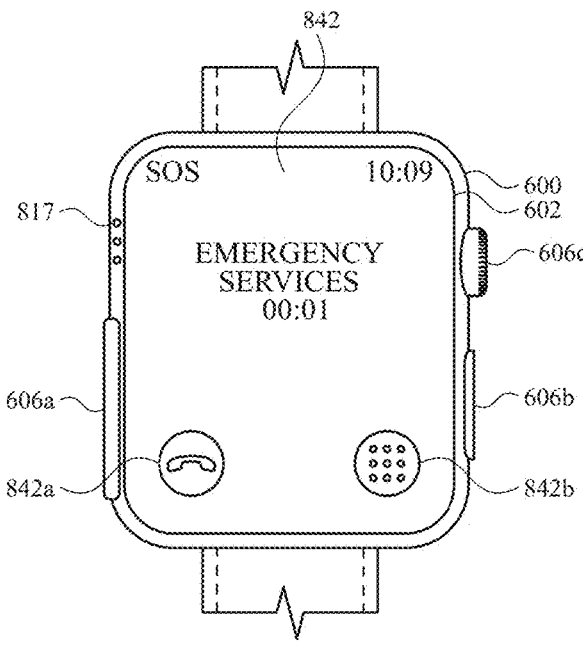
FIG. 8W 900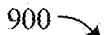

902
Detect user input corresponding to a first hardware input device of the one or more hardware input devices.

904
In response to detecting the user input, display, via the display generation component, a first indication of a first operation which the first hardware input device is configured to perform.

906
After displaying the first indication of the first operation, detect an end of the user input.

908
In response to detecting the end of the user input:

910
In accordance with a determination that the end of the user input was detected while displaying the first indication, perform the first operation.

912
In accordance with a determination that the end of the user input was detected after displaying the first indication and then ceasing to display the first indication, forgo performing the first operation.

*FIG. 9*

1000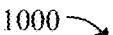

---

1002
While outputting, via the audio output device, audio corresponding to an emergency siren, detect an event.

---

1004
In response to detecting the event:

---

1006
In accordance with a determination that the event is of a first type, adjust output of the audio corresponding to the emergency siren while performing, at the computer system, a first operation associated with the event.

---

1008
In accordance with a determination that the event is of a second type, different from the first type, maintain output of the audio corresponding to the emergency siren while performing, at the computer system, a second operation associated with the event.

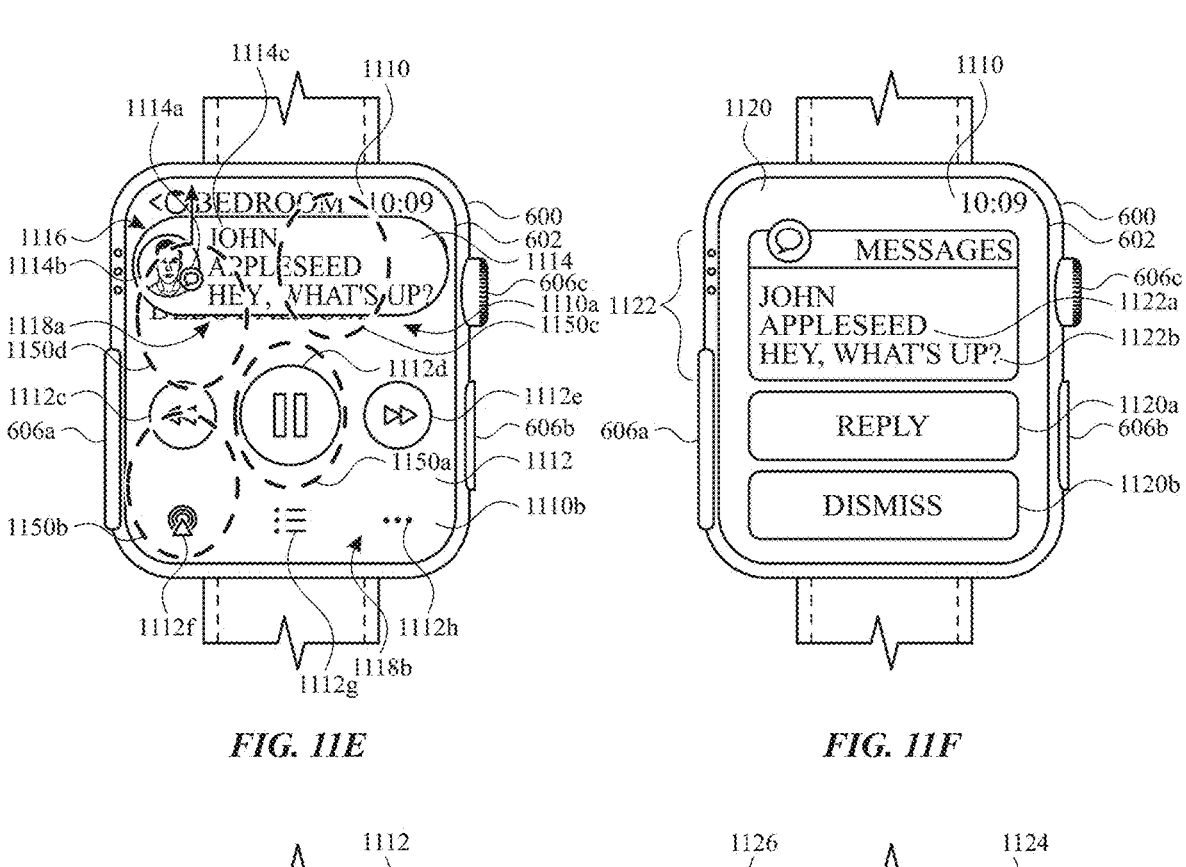
*FIG. 11E*          *FIG. 11F*
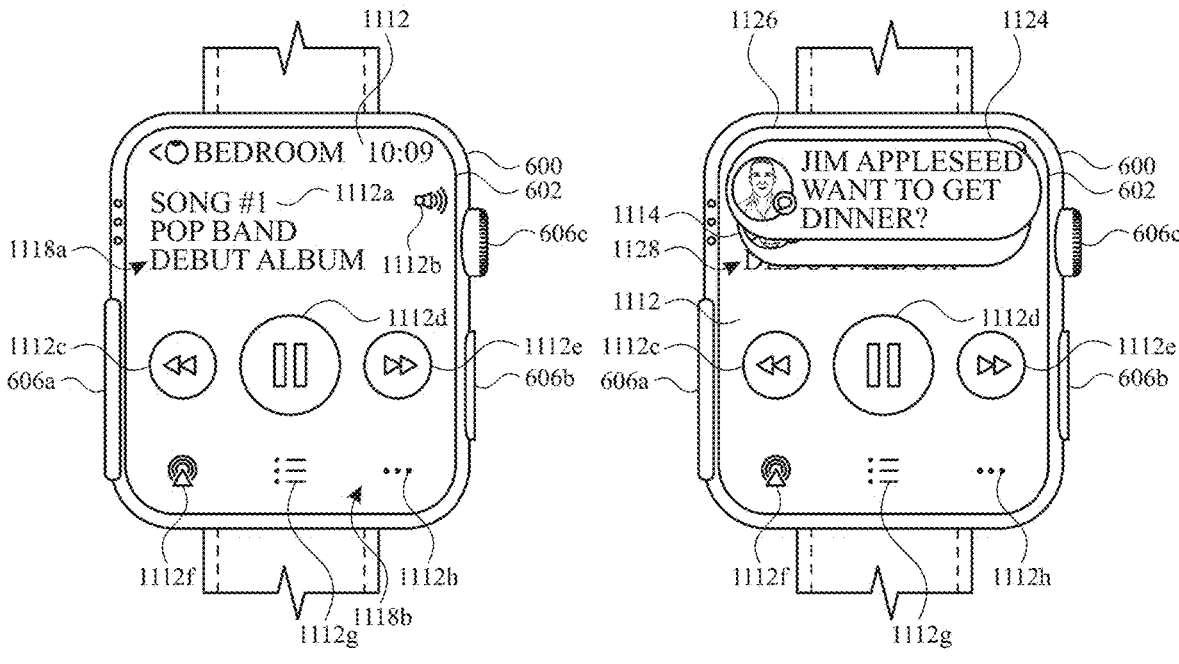
*FIG. 11G*          *FIG. 11H*

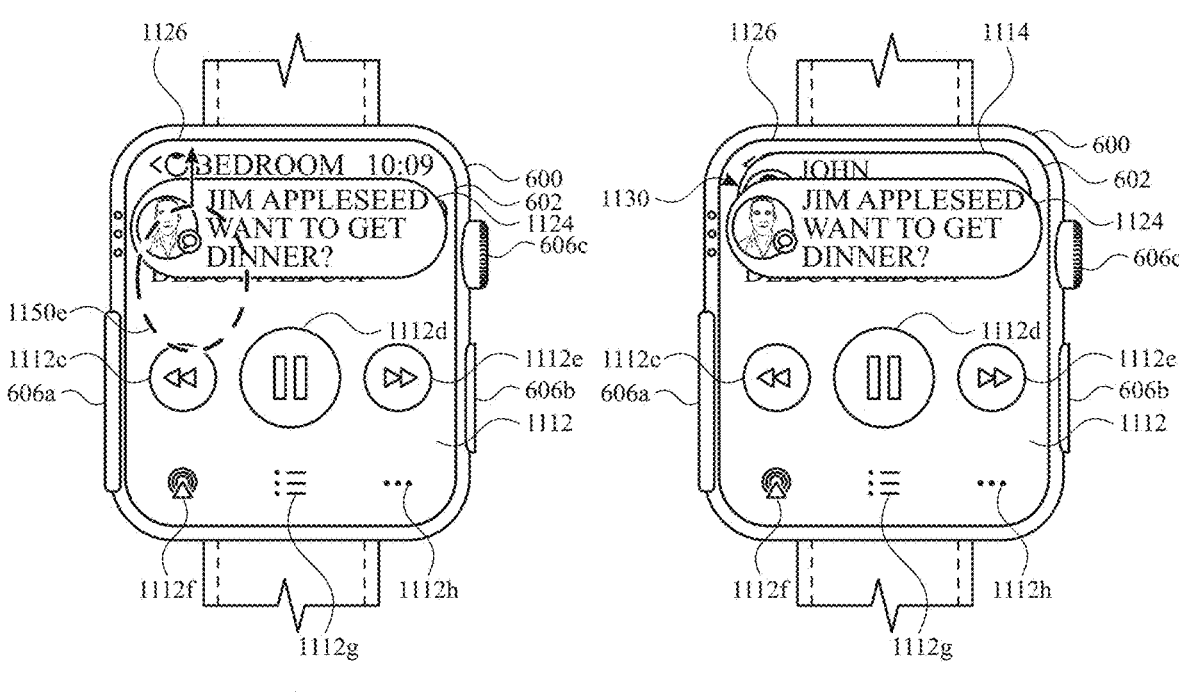
*FIG. 11I*                   *FIG. 11J*
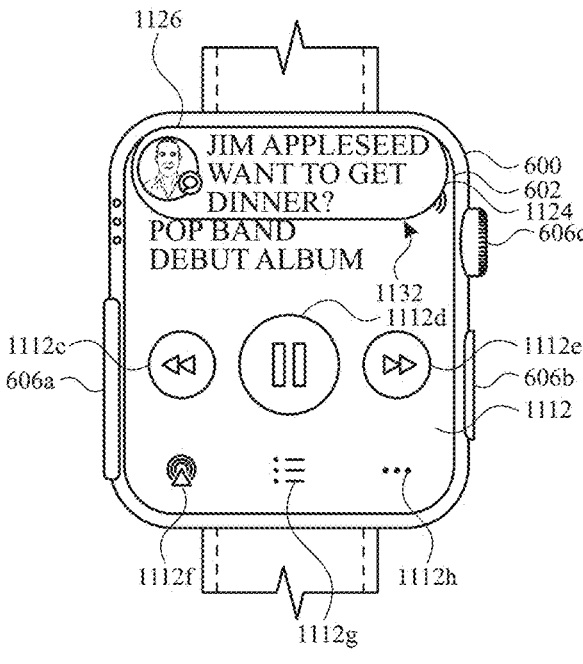
*FIG. 11K*

1200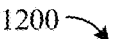

---

1202
Detect an occurrence of an event.

---

1204
In response to detecting the occurrence of the event, display a notification corresponding to the event, including:

---

1206
In accordance with a determination that the computer system satisfies a respective set of one or more criteria that indicate that the computer system is in a state in which user input is occurring or is likely to occur, display, via the display generation component, a first notification corresponding to the event, where the first notification obscures a first amount of a display region that was used to display a user interface prior to displaying the first notification.

---

1208
In accordance with a determination that the computer system does not satisfy the respective set of one or more criteria that indicate that the computer system is in a state in which user input is occurring or is likely to occur, display, via the display generation component, a second notification corresponding to the event, where the second notification obscures a second amount of a display region that was used to display a user interface prior to displaying the second notification, where the second amount is larger than the first amount.

NORMAL MODE

LOW POWER MODE

USER HAD A
HARD FALL

CLOSE    10:09

IT LOOKS LIKE
YOU'VE TAKEN
A HARD FALL.

EMERGENCY
BEACON

I'M OK

CLOSE    10:09

IT LOOKS LIKE
YOU'VE TAKEN
A HARD FALL.

EMERGENCY
BEACON

I'M OK

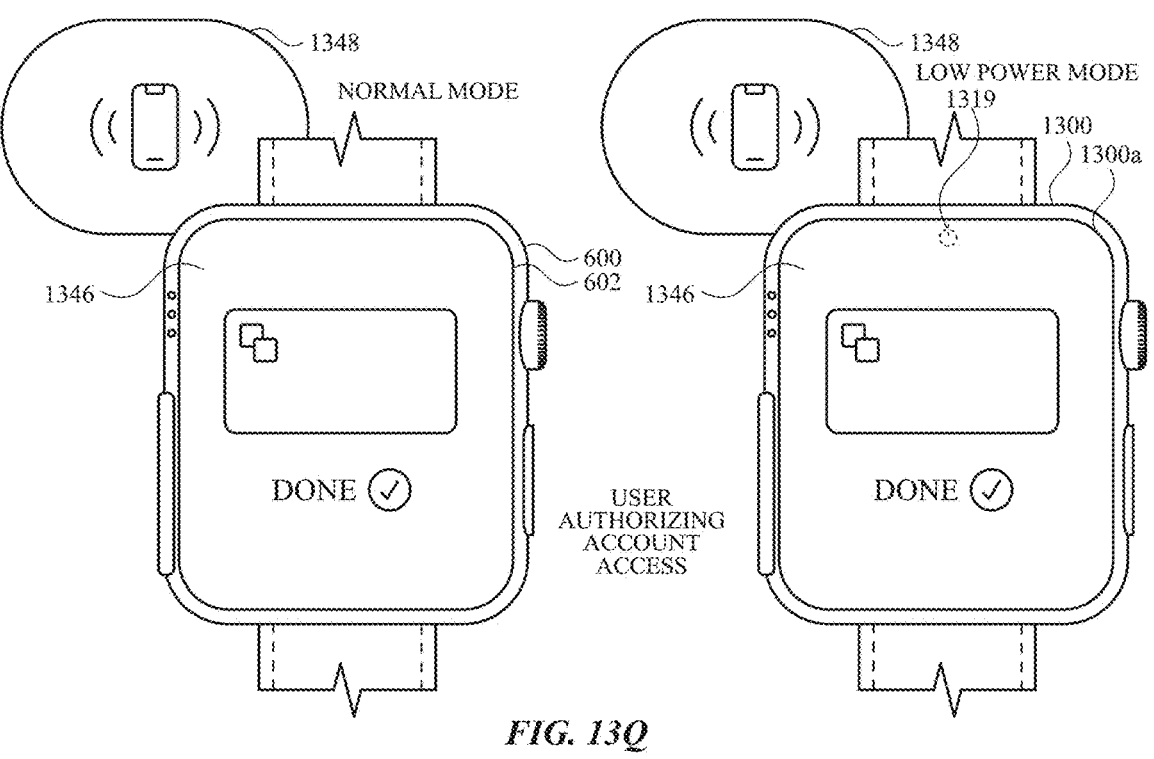
FIG. 13Q
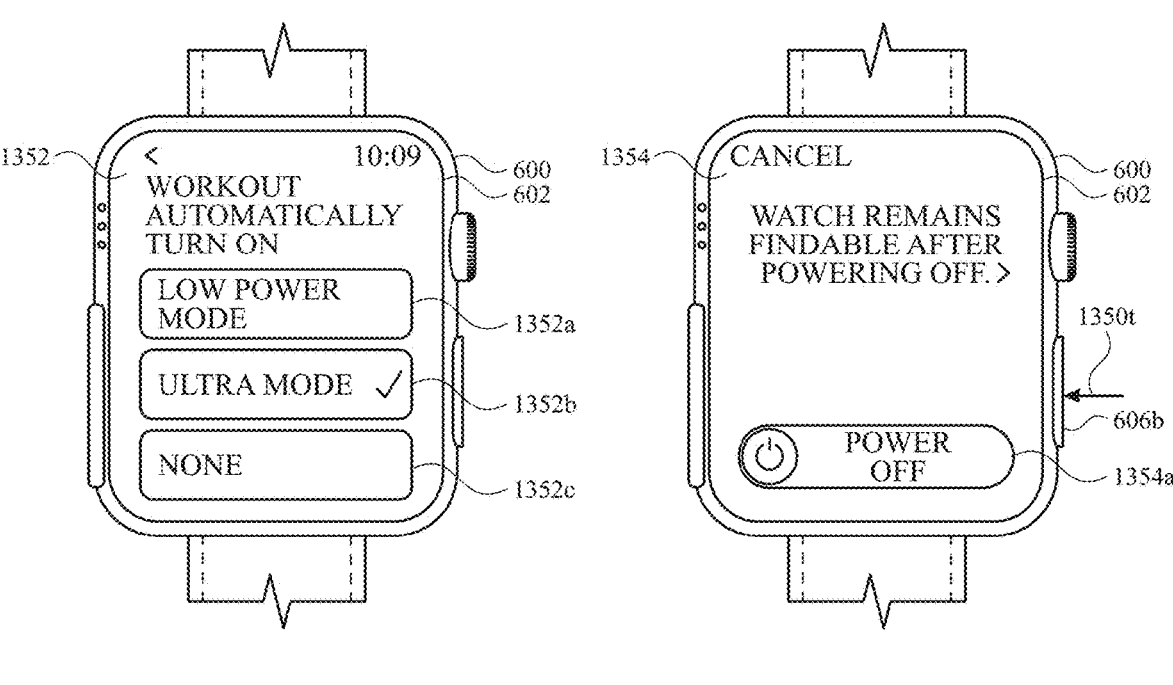
FIG. 13R                    FIG. 13S

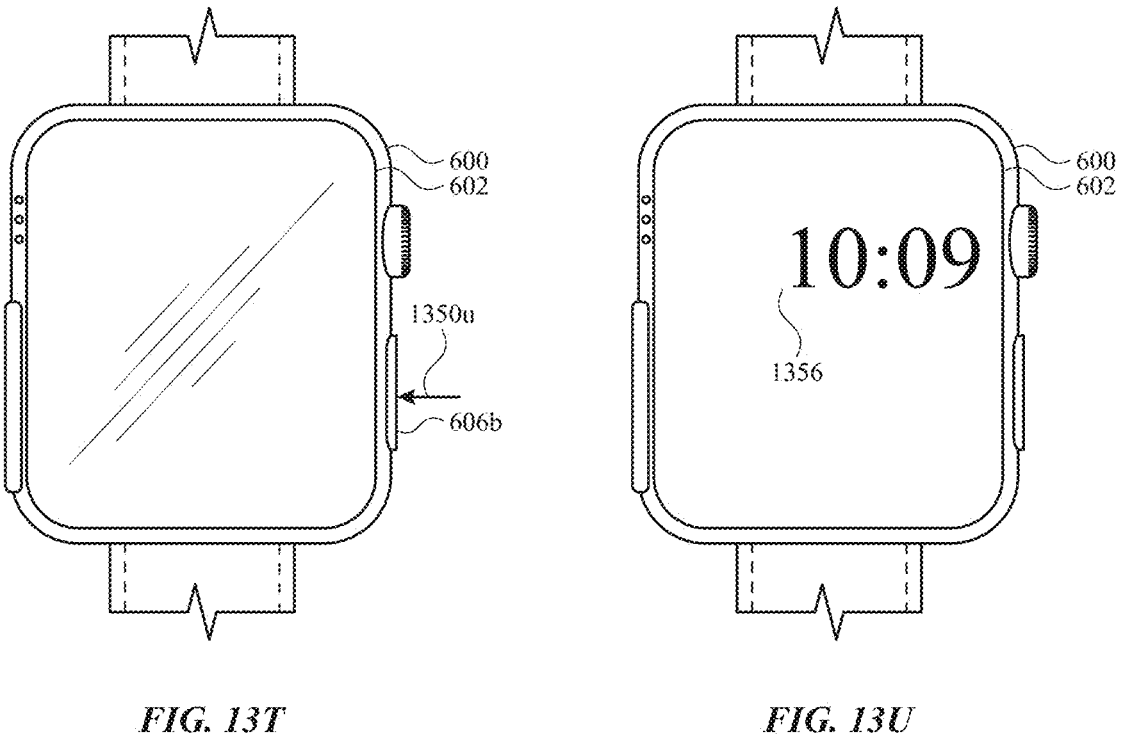
FIG. 13T                    FIG. 13U

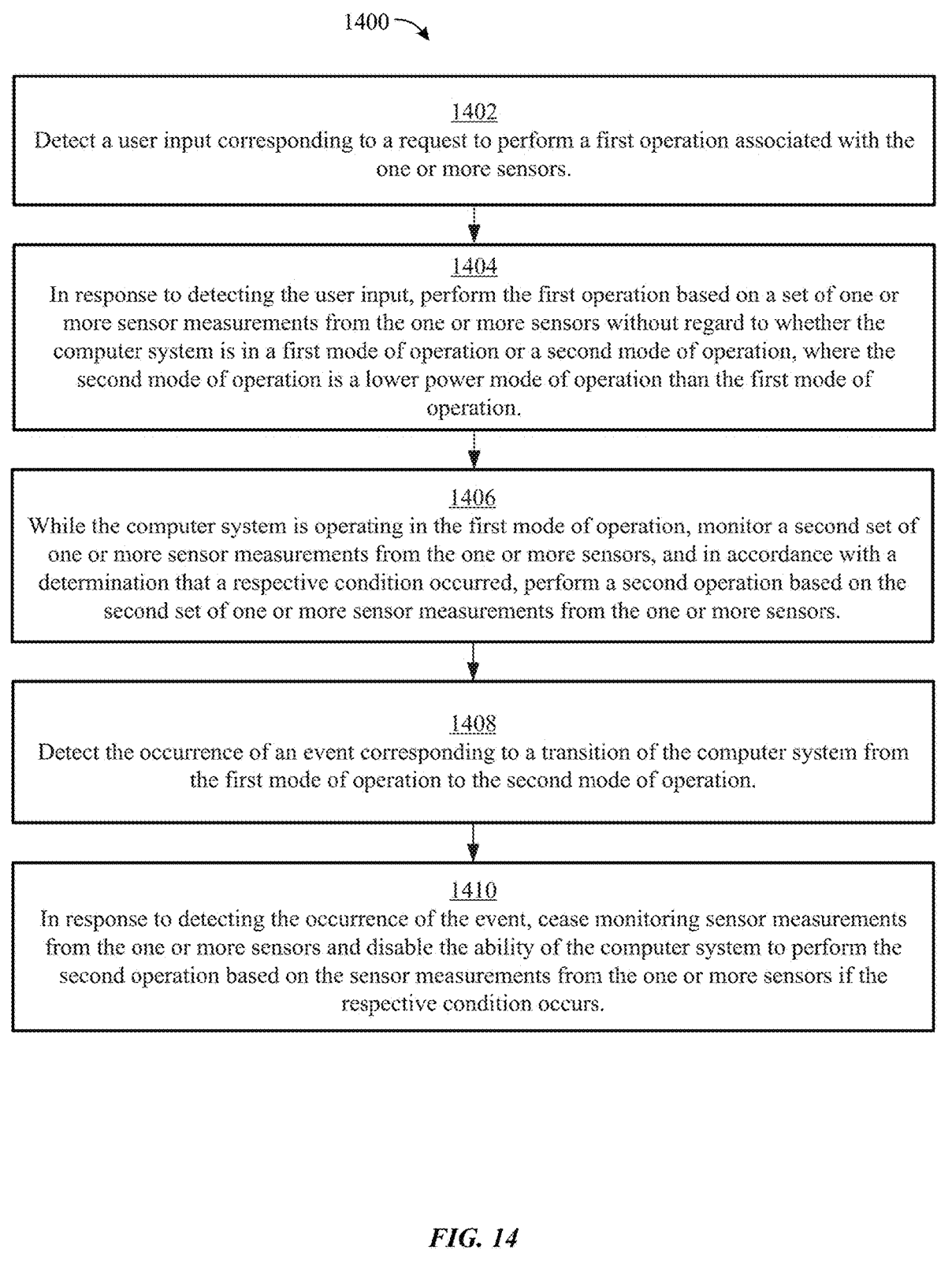

1400 ⟍

┌─────────────────────────────────────────────────────────────────────┐
│ 1402                                                                  │
│ Detect a user input corresponding to a request to perform a first operation associated with the │
│ one or more sensors.                                                  │
└─────────────────────────────────────────────────────────────────────┘
                                    ↓

┌─────────────────────────────────────────────────────────────────────┐
│ 1404                                                                  │
│ In response to detecting the user input, perform the first operation based on a set of one or │
│ more sensor measurements from the one or more sensors without regard to whether the │
│ computer system is in a first mode of operation or a second mode of operation, where the │
│ second mode of operation is a lower power mode of operation than the first mode of │
│ operation.                                                            │
└─────────────────────────────────────────────────────────────────────┘
                                    ↓

┌─────────────────────────────────────────────────────────────────────┐
│ 1406                                                                  │
│ While the computer system is operating in the first mode of operation, monitor a second set of │
│ one or more sensor measurements from the one or more sensors, and in accordance with a │
│ determination that a respective condition occurred, perform a second operation based on the │
│ second set of one or more sensor measurements from the one or more sensors.         │
└─────────────────────────────────────────────────────────────────────┘
                                    ↓

┌─────────────────────────────────────────────────────────────────────┐
│ 1408                                                                  │
│ Detect the occurrence of an event corresponding to a transition of the computer system from │
│ the first mode of operation to the second mode of operation.          │
└─────────────────────────────────────────────────────────────────────┘
                                    ↓

┌─────────────────────────────────────────────────────────────────────┐
│ 1410                                                                  │
│ In response to detecting the occurrence of the event, cease monitoring sensor measurements │
│ from the one or more sensors and disable the ability of the computer system to perform the │
│ second operation based on the sensor measurements from the one or more sensors if the │
│ respective condition occurs.                                          │
└─────────────────────────────────────────────────────────────────────┘

*FIG. 14*

USER INTERFACES FOR FACILITATING OPERATIONS

CROSS-REFERENCE TO RELATED APPLICATIONS

This application is a continuation of U.S. patent application Ser. No. 18/383,281, entitled "USER INTERFACES FOR FACILITATING OPERATIONS," filed on Oct. 24, 2023, which is a continuation of U.S. patent application Ser. No. 17/951,034, entitled "USER INTERFACES FOR FACILITATING OPERATIONS," filed on Sep. 22, 2022, which claims priority to U.S. Provisional Patent Application Ser. No. 63/334,514, entitled "USER INTERFACES FOR FACILITATING OPERATIONS," filed on Apr. 25, 2022, the contents of each of which are hereby incorporated by reference in their entirety.

FIELD

The present disclosure relates generally to computer user interfaces, and more specifically to techniques for facilitating operations.

BACKGROUND

Electronic devices include input controls that enable the electronic devices to perform operations in response to detecting user input. For example, electronic devices can display visual elements and/or include hardware devices that, when selected and/or interacted with, cause the electronic devices to perform a respective operation. Electronic devices can also display notifications to users. Electronic devices also include different modes of operation that enable the electronic devices to conserve battery power.

BRIEF SUMMARY

Some techniques for facilitating operations with electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for facilitating operations. Such methods and interfaces optionally complement or replace other methods for facilitating operations. Such methods and interfaces reduce the cognitive burden on a user and produce a more efficient human-machine interface. In addition, such methods and interfaces can also improve safety features of the electronic devices. For battery-operated computing devices, such methods and interfaces conserve power and increase the time between battery charges.

In accordance with some embodiments, a method is described. The method is performed at a computer system that is in communication with a display generation component and one or more hardware input devices. The method comprises: detecting an occurrence of a condition associated with displaying a first user interface associated with a first operation; and in response to detecting the occurrence of the condition, displaying the first user interface, including, while displaying the first user interface: in accordance with a determination that a first hardware input device of the one or more hardware input devices is configured with a first configuration that enables the first hardware input device to perform the first operation, displaying, via the display generation component, a graphical user interface object indicating that the first hardware input device can perform the first operation; and in accordance with a determination that the first hardware input device of the one or more hardware input devices is not configured with the first configuration that enables the first hardware input device to perform the first operation, forgoing displaying the graphical user interface object indicating that the first hardware input device can perform the first operation.

In accordance with some embodiments, a non-transitory computer-readable storage medium is described. The non-transitory computer-readable storage medium stores one or more programs configured to be executed by one or more processors of a computer system that is in communication with a display generation component and one or more hardware input devices, the one or more programs including instructions for: detecting an occurrence of a condition associated with displaying a first user interface associated with a first operation; and in response to detecting the occurrence of the condition, displaying the first user interface, including, while displaying the first user interface: in accordance with a determination that a first hardware input device of the one or more hardware input devices is configured with a first configuration that enables the first hardware input device to perform the first operation, displaying, via the display generation component, a graphical user interface object indicating that the first hardware input device can perform the first operation; and in accordance with a determination that the first hardware input device of the one or more hardware input devices is not configured with the first configuration that enables the first hardware input device to perform the first operation, forgoing displaying the graphical user interface object indicating that the first hardware input device can perform the first operation.

In accordance with some embodiments, a transitory computer-readable storage medium is described. The transitory computer-readable storage medium stores one or more programs configured to be executed by one or more processors of a computer system that is in communication with a display generation component and one or more hardware input devices, the one or more programs including instructions for: detecting an occurrence of a condition associated with displaying a first user interface associated with a first operation; and in response to detecting the occurrence of the condition, displaying the first user interface, including, while displaying the first user interface: in accordance with a determination that a first hardware input device of the one or more hardware input devices is configured with a first configuration that enables the first hardware input device to perform the first operation, displaying, via the display generation component, a graphical user interface object indicating that the first hardware input device can perform the first operation; and in accordance with a determination that the first hardware input device of the one or more hardware input devices is not configured with the first configuration that enables the first hardware input device to perform the first operation, forgoing displaying the graphical user interface object indicating that the first hardware input device can perform the first operation.

In accordance with some embodiments, a computer system is described. The computer system is in communication with a display generation component and one or more hardware input devices. The computer system comprises: one or more processors; and memory storing one or more programs configured to be executed by the one or more processors, the one or more programs including instructions for: detecting an occurrence of a condition associated with displaying a first user interface associated with a first operation; and in response to detecting the occurrence of the condition, displaying the first user interface, including, while displaying the first user interface: in accordance with a determination that a first hardware input device of the one or more hardware input devices is configured with a first configuration that enables the first hardware input device to perform the first operation, displaying, via the display generation component, a graphical user interface object indicating that the first hardware input device can perform the first operation; and in accordance with a determination that the first hardware input device of the one or more hardware input devices is not configured with the first configuration that enables the first hardware input device to perform the first operation, forgoing displaying the graphical user interface object indicating that the first hardware input device can perform the first operation.

In accordance with some embodiments, a computer system is described. The computer system is in communication with a display generation component and one or more hardware input devices. The computer system comprises: means for detecting an occurrence of a condition associated with displaying a first user interface associated with a first operation; and means for, in response to detecting the occurrence of the condition, displaying the first user interface, including, while displaying the first user interface: in accordance with a determination that a first hardware input device of the one or more hardware input devices is configured with a first configuration that enables the first hardware input device to perform the first operation, displaying, via the display generation component, a graphical user interface object indicating that the first hardware input device can perform the first operation; and in accordance with a determination that the first hardware input device of the one or more hardware input devices is not configured with the first configuration that enables the first hardware input device to perform the first operation, forgoing displaying the graphical user interface object indicating that the first hardware input device can perform the first operation.

In accordance with some embodiments, a computer program product is described. The computer program product comprises one or more programs configured to be executed by one or more processors of a computer system that is in communication with a display generation component and one or more hardware input devices, the one or more programs including instructions for: detecting an occurrence of a condition associated with displaying a first user interface associated with a first operation; and in response to detecting the occurrence of the condition, displaying the first user interface, including, while displaying the first user interface: in accordance with a determination that a first hardware input device of the one or more hardware input devices is configured with a first configuration that enables the first hardware input device to perform the first operation, displaying, via the display generation component, a graphical user interface object indicating that the first hardware input device can perform the first operation; and in accordance with a determination that the first hardware input device of the one or more hardware input devices is not configured with the first configuration that enables the first hardware input device to perform the first operation, forgoing displaying the graphical user interface object indicating that the first hardware input device can perform the first operation.

In accordance with some embodiments, a method is described. The method is performed at a computer system that is in communication with a display generation component and one or more hardware input devices. The method comprises: detecting user input corresponding to a first hardware input device of the one or more hardware input devices; in response to detecting the user input, displaying, via the display generation component, a first indication of a first operation which the first hardware input device is configured to perform; after displaying the first indication of the first operation, detecting an end of the user input; and in response to detecting the end of the user input: in accordance with a determination that the end of the user input was detected while displaying the first indication, performing the first operation; and in accordance with a determination that the end of the user input was detected after displaying the first indication and then ceasing display of the first indication, forgoing performing the first operation.

In accordance with some embodiments, a non-transitory computer-readable storage medium is described. The non-transitory computer-readable storage medium stores one or more programs configured to be executed by one or more processors of a computer system that is in communication with a display generation component and one or more hardware input devices, the one or more programs including instructions for: detecting user input corresponding to a first hardware input device of the one or more hardware input devices; in response to detecting the user input, displaying, via the display generation component, a first indication of a first operation which the first hardware input device is configured to perform; after displaying the first indication of the first operation, detecting an end of the user input; and in response to detecting the end of the user input: in accordance with a determination that the end of the user input was detected while displaying the first indication, performing the first operation; and in accordance with a determination that the end of the user input was detected after displaying the first indication and then ceasing display of the first indication, forgoing performing the first operation.

In accordance with some embodiments, a transitory computer-readable storage medium is described. The transitory computer-readable storage medium stores one or more programs configured to be executed by one or more processors of a computer system that is in communication with a display generation component and one or more hardware input devices, the one or more programs including instructions for: detecting user input corresponding to a first hardware input device of the one or more hardware input devices; in response to detecting the user input, displaying, via the display generation component, a first indication of a first operation which the first hardware input device is configured to perform; after displaying the first indication of the first operation, detecting an end of the user input; and in response to detecting the end of the user input: in accordance with a determination that the end of the user input was detected while displaying the first indication, performing the first operation; and in accordance with a determination that the end of the user input was detected after displaying the first indication and then ceasing display of the first indication, forgoing performing the first operation.

In accordance with some embodiments, a computer system is described. The computer system is in communication with a display generation component and one or more hardware input devices. The computer system comprises: one or more processors; and memory storing one or more programs configured to be executed by the one or more processors, the one or more programs including instructions for: detecting user input corresponding to a first hardware input device of the one or more hardware input devices; in response to detecting the user input, displaying, via the display generation component, a first indication of a first operation which the first hardware input device is configured to perform; after displaying the first indication of the first operation, detecting an end of the user input; and in response to detecting the end of the user input: in accordance with a determination that the end of the user input was detected while displaying the first indication, performing the first operation; and in accordance with a determination that the end of the user input was detected after displaying the first indication and then ceasing display of the first indication, forgoing performing the first operation.

In accordance with some embodiments, a computer system is described. The computer system is in communication with a display generation component and one or more hardware input devices. The computer system comprises: means for detecting user input corresponding to a first hardware input device of the one or more hardware input devices; means for, in response to detecting the user input, displaying, via the display generation component, a first indication of a first operation which the first hardware input device is configured to perform; means for, after displaying the first indication of the first operation, detecting an end of the user input; and means for, in response to detecting the end of the user input: in accordance with a determination that the end of the user input was detected while displaying the first indication, performing the first operation; and in accordance with a determination that the end of the user input was detected after displaying the first indication and then ceasing display of the first indication, forgoing performing the first operation.

In accordance with some embodiments, a computer program product is described. The computer program product comprises one or more programs configured to be executed by one or more processors of a computer system that is in communication with a display generation component and one or more hardware input devices, the one or more programs including instructions for: detecting user input corresponding to a first hardware input device of the one or more hardware input devices; in response to detecting the user input, displaying, via the display generation component, a first indication of a first operation which the first hardware input device is configured to perform; after displaying the first indication of the first operation, detecting an end of the user input; and in response to detecting the end of the user input: in accordance with a determination that the end of the user input was detected while displaying the first indication, performing the first operation; and in accordance with a determination that the end of the user input was detected after displaying the first indication and then ceasing display of the first indication, forgoing performing the first operation.

In accordance with some embodiments, a method is described. The method is performed at a computer system that is in communication with a display generation component. The method comprises: detecting an occurrence of an event; and in response to detecting the occurrence of the event, displaying a notification corresponding to the event, including: in accordance with a determination that the computer system satisfies a respective set of one or more criteria that indicate that the computer system is in a state in which user input is occurring or is likely to occur, displaying, via the display generation component, a first notification corresponding to the event, wherein the first notification obscures a first amount of a display region that was used to display a user interface prior to displaying the first notification; and in accordance with a determination that the computer system does not satisfy the respective set of one or more criteria that indicate that the computer system is in a state in which user input is occurring or is likely to occur, displaying, via the display generation component, a second notification corresponding to the event, wherein the second notification obscures a second amount of a display region that was used to display a user interface prior to displaying the second notification, wherein the second amount is larger than the first amount.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: detecting an occurrence of an event; and in response to detecting the occurrence of the event, displaying a notification corresponding to the event, including: in accordance with a determination that the computer system satisfies a respective set of one or more criteria that indicate that the computer system is in a state in which user input is occurring or is likely to occur, displaying, via the display generation component, a first notification corresponding to the event, wherein the first notification obscures a first amount of a display region that was used to display a user interface prior to displaying the first notification; and in accordance with a determination that the computer system does not satisfy the respective set of one or more criteria that indicate that the computer system is in a state in which user input is occurring or is likely to occur, displaying, via the display generation component, a second notification corresponding to the event, wherein the second notification obscures a second amount of a display region that was used to display a user interface prior to displaying the second notification, wherein the second amount is larger than the first amount.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: detecting an occurrence of an event; and in response to detecting the occurrence of the event, displaying a notification corresponding to the event, including: in accordance with a determination that the computer system satisfies a respective set of one or more criteria that indicate that the computer system is in a state in which user input is occurring or is likely to occur, displaying, via the display generation component, a first notification corresponding to the event, wherein the first notification obscures a first amount of a display region that was used to display a user interface prior to displaying the first notification; and in accordance with a determination that the computer system does not satisfy the respective set of one or more criteria that indicate that the computer system is in a state in which user input is occurring or is likely to occur, displaying, via the display generation component, a second notification corresponding to the event, wherein the second notification obscures a second amount of a display region that was used to display a user interface prior to displaying the second notification, wherein the second amount is larger than the first amount.

In accordance with some embodiments, a computer system is described. The computer system is in communication with a display generation component. The computer system comprises: one or more processors; and memory storing one or more programs configured to be executed by the one or more processors, the one or more programs including instructions for: detecting an occurrence of an event; and in response to detecting the occurrence of the event, displaying a notification corresponding to the event, including: in accordance with a determination that the computer system satisfies a respective set of one or more criteria that indicate that the computer system is in a state in which user input is occurring or is likely to occur, displaying, via the display generation component, a first notification corresponding to the event, wherein the first notification obscures a first amount of a display region that was used to display a user interface prior to displaying the first notification; and in accordance with a determination that the computer system does not satisfy the respective set of one or more criteria that indicate that the computer system is in a state in which user input is occurring or is likely to occur, displaying, via the display generation component, a second notification corresponding to the event, wherein the second notification obscures a second amount of a display region that was used to display a user interface prior to displaying the second notification, wherein the second amount is larger than the first amount.

In accordance with some embodiments, a computer system is described. The computer system is in communication with a display generation component. The computer system comprises: means for detecting an occurrence of an event; and means for, in response to detecting the occurrence of the event, displaying a notification corresponding to the event, including: in accordance with a determination that the computer system satisfies a respective set of one or more criteria that indicate that the computer system is in a state in which user input is occurring or is likely to occur, displaying, via the display generation component, a first notification corresponding to the event, wherein the first notification obscures a first amount of a display region that was used to display a user interface prior to displaying the first notification; and in accordance with a determination that the computer system does not satisfy the respective set of one or more criteria that indicate that the computer system is in a state in which user input is occurring or is likely to occur, displaying, via the display generation component, a second notification corresponding to the event, wherein the second notification obscures a second amount of a display region that was used to display a user interface prior to displaying the second notification, wherein the second amount is larger than the first amount.

In accordance with some embodiments, a computer program product is described. The computer program product comprises one or more programs configured to be executed by one or more processors of a computer system that is in communication with a display generation component, the one or more programs including instructions for: detecting an occurrence of an event; and in response to detecting the occurrence of the event, displaying a notification corresponding to the event, including: in accordance with a determination that the computer system satisfies a respective set of one or more criteria that indicate that the computer system is in a state in which user input is occurring or is likely to occur, displaying, via the display generation component, a first notification corresponding to the event, wherein the first notification obscures a first amount of a display region that was used to display a user interface prior to displaying the first notification; and in accordance with a determination that the computer system does not satisfy the respective set of one or more criteria that indicate that the computer system is in a state in which user input is occurring or is likely to occur, displaying, via the display generation component, a second notification corresponding to the event, wherein the second notification obscures a second amount of a display region that was used to display a user interface prior to displaying the second notification, wherein the second amount is larger than the first amount.

In accordance with some embodiments, a method is described. The method is performed at a computer system that is in communication with an audio output device. The method comprises: while outputting, via the audio output device, audio corresponding to an emergency siren, detecting an event; and in response to detecting the event: in accordance with a determination that the event is of a first type, adjusting output of the audio corresponding to the emergency siren while performing, at the computer system, a first operation associated with the event; and in accordance with a determination that the event is of a second type, different from the first type, maintaining output of the audio corresponding to the emergency siren while performing, at the computer system, a second operation associated with the event.

In accordance with some embodiments, a non-transitory computer-readable storage medium is described. The non-transitory computer-readable storage medium stores one or more programs configured to be executed by one or more processors of a computer system that is in communication with an audio output device, the one or more programs including instructions for: while outputting, via the audio output device, audio corresponding to an emergency siren, detecting an event; and in response to detecting the event: in accordance with a determination that the event is of a first type, adjusting output of the audio corresponding to the emergency siren while performing, at the computer system, a first operation associated with the event; and in accordance with a determination that the event is of a second type, different from the first type, maintaining output of the audio corresponding to the emergency siren while performing, at the computer system, a second operation associated with the event.

In accordance with some embodiments, a transitory computer-readable storage medium is described. The transitory computer-readable storage medium stores one or more programs configured to be executed by one or more processors of a computer system that is in communication with an audio output device, the one or more programs including instructions for: while outputting, via the audio output device, audio corresponding to an emergency siren, detecting an event; and in response to detecting the event: in accordance with a determination that the event is of a first type, adjusting output of the audio corresponding to the emergency siren while performing, at the computer system, a first operation associated with the event; and in accordance with a determination that the event is of a second type, different from the first type, maintaining output of the audio corresponding to the emergency siren while performing, at the computer system, a second operation associated with the event.

In accordance with some embodiments, a computer system is described. The computer system is in communication with an audio output device. The computer system comprises: one or more processors; and memory storing one or more programs configured to be executed by the one or more processors, the one or more programs including instructions for: while outputting, via the audio output device, audio corresponding to an emergency siren, detecting an event; and in response to detecting the event: in accordance with a determination that the event is of a first type, adjusting output of the audio corresponding to the emergency siren while performing, at the computer system, a first operation associated with the event; and in accordance with a determination that the event is of a second type, different from the first type, maintaining output of the audio corresponding to the emergency siren while performing, at the computer system, a second operation associated with the event.

In accordance with some embodiments, a computer system is described. The computer system is in communication with an audio output device. The computer system comprises: means for, while outputting, via the audio output device, audio corresponding to an emergency siren, detecting an event; and means for, in response to detecting the event: in accordance with a determination that the event is of a first type, adjusting output of the audio corresponding to the emergency siren while performing, at the computer system, a first operation associated with the event; and in accordance with a determination that the event is of a second type, different from the first type, maintaining output of the audio corresponding to the emergency siren while performing, at the computer system, a second operation associated with the event.

In accordance with some embodiments, a computer program product is described. The computer program product comprises one or more programs configured to be executed by one or more processors of a computer system that is in communication with an audio output device, the one or more programs including instructions for: while outputting, via the audio output device, audio corresponding to an emergency siren, detecting an event; and in response to detecting the event: in accordance with a determination that the event is of a first type, adjusting output of the audio corresponding to the emergency siren while performing, at the computer system, a first operation associated with the event; and in accordance with a determination that the event is of a second type, different from the first type, maintaining output of the audio corresponding to the emergency siren while performing, at the computer system, a second operation associated with the event.

In accordance with some embodiments, a method is described. The method is performed at a computer system that is in communication with a display generation component and one or more sensors. The method comprises: detecting a user input corresponding to a request to perform a first operation associated with the one or more sensors; in response to detecting the user input, performing the first operation based on a first set of one or more sensor measurements from the one or more sensors without regard to whether the computer system is in a first mode of operation or a second mode of operation, wherein the second mode of operation is a lower power mode of operation than the first mode of operation; while the computer system is operating in the first mode of operation, monitoring a second set of one or more sensor measurements from the one or more sensors, and in accordance with a determination that a respective condition occurred, performing a second operation based on the second set of one or more sensor measurements from the one or more sensors; detecting the occurrence of an event corresponding to a transition of the computer system from the first mode of operation to the second mode of operation; and in response to detecting the occurrence of the event, ceasing to monitor sensor measurements from the one or more sensors and disabling the ability of the computer system to perform the second operation based on the sensor measurements from the one or more sensors if the respective condition occurs.

In accordance with some embodiments, a non-transitory computer-readable storage medium is described. The non-transitory computer-readable storage medium stores one or more programs configured to be executed by one or more processors of a computer system that is in communication with a display generation component and one or more sensors, the one or more programs including instructions for: detecting a user input corresponding to a request to perform a first operation associated with the one or more sensors; in response to detecting the user input, performing the first operation based on a first set of one or more sensor measurements from the one or more sensors without regard to whether the computer system is in a first mode of operation or a second mode of operation, wherein the second mode of operation is a lower power mode of operation than the first mode of operation; while the computer system is operating in the first mode of operation, monitoring a second set of one or more sensor measurements from the one or more sensors, and in accordance with a determination that a respective condition occurred, performing a second operation based on the second set of one or more sensor measurements from the one or more sensors; detecting the occurrence of an event corresponding to a transition of the computer system from the first mode of operation to the second mode of operation; and in response to detecting the occurrence of the event, ceasing to monitor sensor measurements from the one or more sensors and disabling the ability of the computer system to perform the second operation based on the sensor measurements from the one or more sensors if the respective condition occurs.

In accordance with some embodiments, a transitory computer-readable storage medium is described. The transitory computer-readable storage medium stores one or more programs configured to be executed by one or more processors of a computer system that is in communication with a display generation component and one or more sensors, the one or more programs including instructions for: detecting a user input corresponding to a request to perform a first operation associated with the one or more sensors; in response to detecting the user input, performing the first operation based on a first set of one or more sensor measurements from the one or more sensors without regard to whether the computer system is in a first mode of operation or a second mode of operation, wherein the second mode of operation is a lower power mode of operation than the first mode of operation; while the computer system is operating in the first mode of operation, monitoring a second set of one or more sensor measurements from the one or more sensors, and in accordance with a determination that a respective condition occurred, performing a second operation based on the second set of one or more sensor measurements from the one or more sensors; detecting the occurrence of an event corresponding to a transition of the computer system from the first mode of operation to the second mode of operation; and in response to detecting the occurrence of the event, ceasing to monitor sensor measurements from the one or more sensors and disabling the ability of the computer system to perform the second operation based on the sensor measurements from the one or more sensors if the respective condition occurs.

In accordance with some embodiments, a computer system is described. The computer system is in communication with a display generation component and one or more sensors. The computer system comprises: one or more processors; and memory storing one or more programs configured to be executed by the one or more processors, the one or more programs including instructions for: detecting a user input corresponding to a request to perform a first operation associated with the one or more sensors; in response to detecting the user input, performing the first operation based on a first set of one or more sensor measurements from the one or more sensors without regard to whether the computer system is in a first mode of operation or a second mode of operation, wherein the second mode of operation is a lower power mode of operation than the first mode of operation; while the computer system is operating in the first mode of operation, monitoring a second set of one or more sensor measurements from the one or more sensors, and in accordance with a determination that a respective condition occurred, performing a second operation based on the second set of one or more sensor measurements from the one or more sensors; detecting the occurrence of an event corresponding to a transition of the computer system from the first mode of operation to the second mode of operation; and in response to detecting the occurrence of the event, ceasing to monitor sensor measurements from the one or more sensors and disabling the ability of the computer system to perform the second operation based on the sensor measurements from the one or more sensors if the respective condition occurs.

In accordance with some embodiments, a computer system is described. The computer system is in communication with a display generation component and one or more sensors. The computer system comprises: means for detecting a user input corresponding to a request to perform a first operation associated with the one or more sensors; means for, in response to detecting the user input, performing the first operation based on a first set of one or more sensor measurements from the one or more sensors without regard to whether the computer system is in a first mode of operation or a second mode of operation, wherein the second mode of operation is a lower power mode of operation than the first mode of operation; means for, while the computer system is operating in the first mode of operation, monitoring a second set of one or more sensor measurements from the one or more sensors, and in accordance with a determination that a respective condition occurred, performing a second operation based on the second set of one or more sensor measurements from the one or more sensors; means for detecting the occurrence of an event corresponding to a transition of the computer system from the first mode of operation to the second mode of operation; and means for, in response to detecting the occurrence of the event, ceasing to monitor sensor measurements from the one or more sensors and disabling the ability of the computer system to perform the second operation based on the sensor measurements from the one or more sensors if the respective condition occurs.

In accordance with some embodiments, a computer program product is described. The computer program product comprises one or more programs configured to be executed by one or more processors of a computer system that is in communication with a display generation component and one or more sensors, the one or more programs including instructions for: detecting a user input corresponding to a request to perform a first operation associated with the one or more sensors; in response to detecting the user input, performing the first operation based on a first set of one or more sensor measurements from the one or more sensors without regard to whether the computer system is in a first mode of operation or a second mode of operation, wherein the second mode of operation is a lower power mode of operation than the first mode of operation; while the computer system is operating in the first mode of operation, monitoring a second set of one or more sensor measurements from the one or more sensors, and in accordance with a determination that a respective condition occurred, performing a second operation based on the second set of one or more sensor measurements from the one or more sensors; detecting the occurrence of an event corresponding to a transition of the computer system from the first mode of operation to the second mode of operation; and in response to detecting the occurrence of the event, ceasing to monitor sensor measurements from the one or more sensors and disabling the ability of the computer system to perform the second operation based on the sensor measurements from the one or more sensors if the respective condition occurs.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for facilitating operations, thereby increasing the effectiveness, efficiency, and user satisfaction with such devices. Such methods and interfaces may complement or replace other methods for facilitating operations.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 1A is a block diagram illustrating a portable multifunction device with a touch-sensitive display in accordance with some embodiments.

FIG. 4B illustrates an exemplary user interface for a multifunction device with a touch-sensitive surface that is separate from the display in accordance with some embodiments.

FIG. 7 is a flow diagram illustrating methods of providing guidance about initiating an operation, in accordance with some embodiments.

FIG. 9 is a flow diagram illustrating methods of performing a first operation, in accordance with some embodiments.

FIG. 10 is a flow diagram illustrating methods of adjusting audio output of an emergency operation, in accordance with some embodiments.

FIGS. 11A-11K illustrate exemplary user interfaces for displaying notifications, in accordance with some embodiments.

FIG. 12 is a flow diagram illustrating methods of displaying notifications, in accordance with some embodiments.

FIG. 14 is a flow diagram illustrating methods of performing an operation when in a low power mode of operation, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for facilitating operations. For example, there is a need for electronic devices that provide a user with guidance and/or awareness of an ability of the electronic device to perform operations in response to a shortcut user input. There is also a need for electronic devices that perform different operations in response to user input corresponding to a hardware input device. In addition, there is a need for electronic devices that display notifications without interrupting user interaction with the electronic devices. Further, there is a need for electronic devices that can adjust the output of safety and/or emergency features to allow a user to interact with the electronic device while still requesting assistance via the safety and/or emergency features. Further still, there is a need for electronic devices that can disable operations, such as background operations, while in a low power mode, but still enable performance of one or more operations in response to user requests. Such techniques can reduce the cognitive burden on a user for performing operations, thereby enhancing productivity. Further, such techniques can reduce processor and battery power otherwise wasted on redundant user inputs.

Figure 13A:
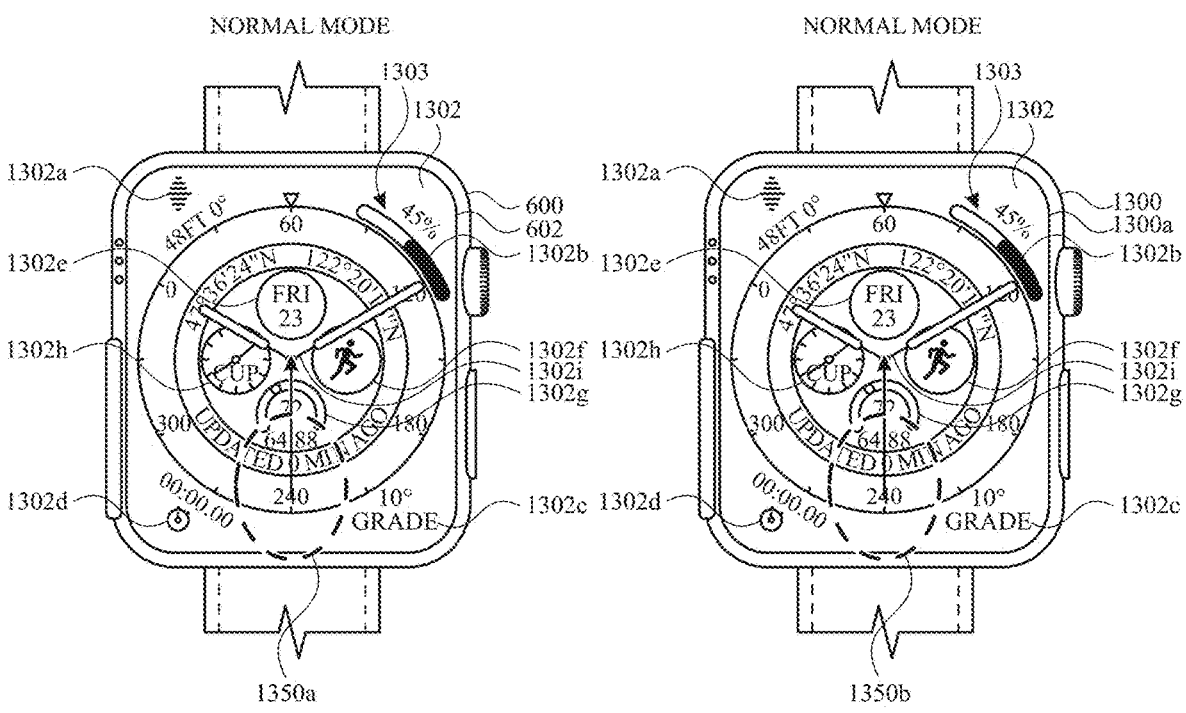
FIGS. 13A-13U illustrate exemplary user interfaces for a low power mode of operation, in accordance with some embodiments.

Below, FIGS. 1A-1B, 2, 3, 4A-4B, and 5A-5B provide a description of exemplary devices for performing the techniques for facilitating operations. FIGS. 6A-6O illustrate exemplary user interfaces for providing guidance about initiating an operation. FIG. 7 is a flow diagram illustrating methods of providing guidance about initiating an operation in accordance with some embodiments. The user interfaces in FIGS. 6A-6O are used to illustrate the processes described below, including the processes in FIG. 7. FIGS. 8A-8W illustrate exemplary user interfaces for initiating a first operation and/or an emergency operation. FIG. 9 is a flow diagram illustrating methods of performing a first operation in accordance with some embodiments. FIG. 10 is a flow diagram illustrating methods of adjusting audio output of an emergency operation in accordance with some embodiments. The user interfaces in FIGS. 8A-8W are used to illustrate the processes described below, including the processes in FIGS. 9 and 10. FIGS. 11A-11K illustrate exemplary user interfaces for displaying notifications. FIG. 12 is a flow diagram illustrating methods of displaying notifications in accordance with some embodiments. The user interfaces in FIGS. 11A-11K are used to illustrate the processes described below, including the processes in FIG. 12. FIGS. 13A-13U illustrate exemplary user interfaces for a low power mode of operation. FIG. 14 is a flow diagram illustrating methods of performing an operation when in a low power mode of operation in accordance with some embodiments. The user interfaces in FIGS. 13A-13U are used to illustrate the process described below, including the processes in FIG. 14.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving safety features of the computer system, improving battery life of the computer system, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S.

patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
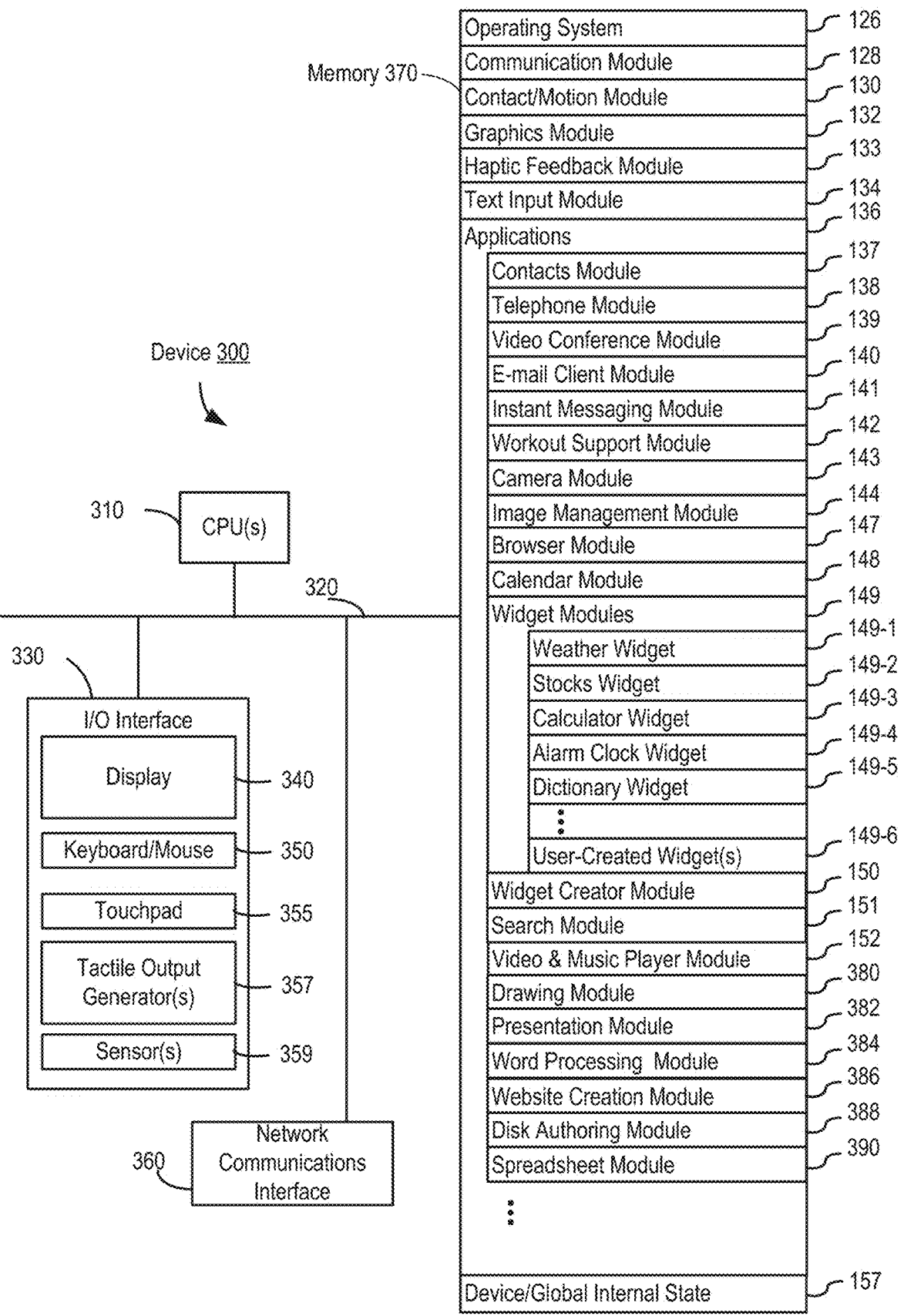
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
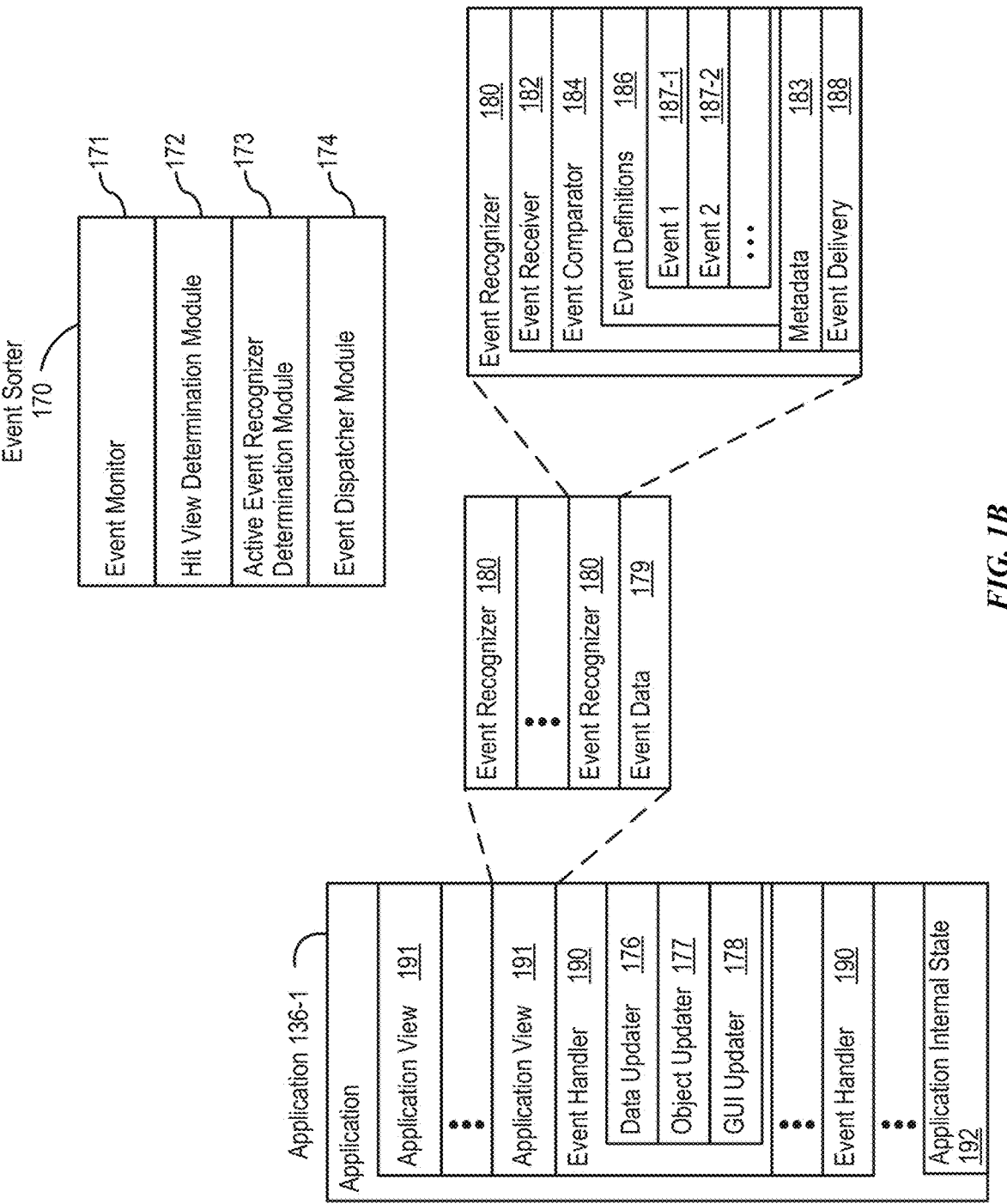
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
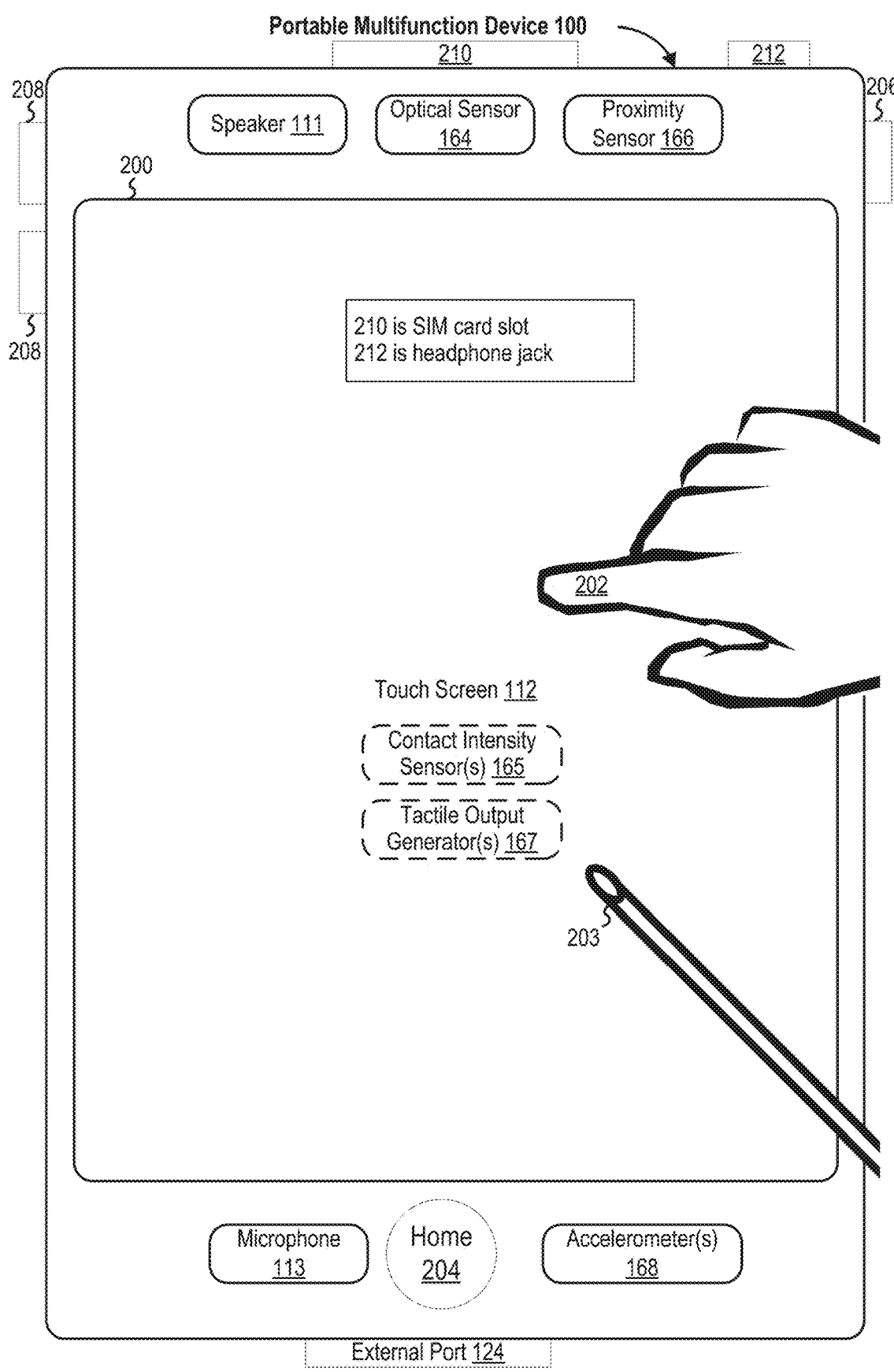
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
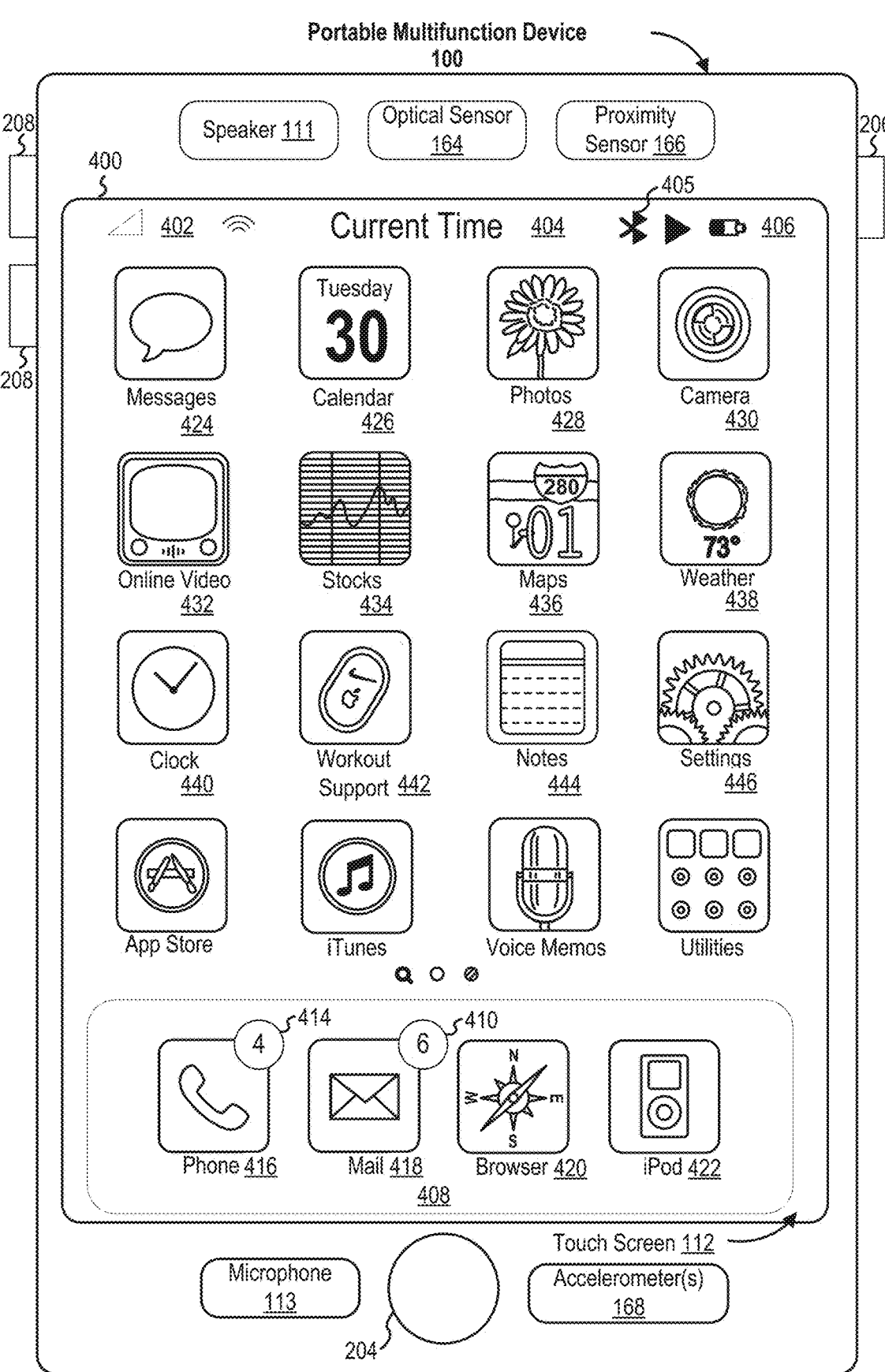
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., touch-sensitive surface 451 in FIG. 4B) are used by the device to manipulate the user interface on the display (e.g., display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
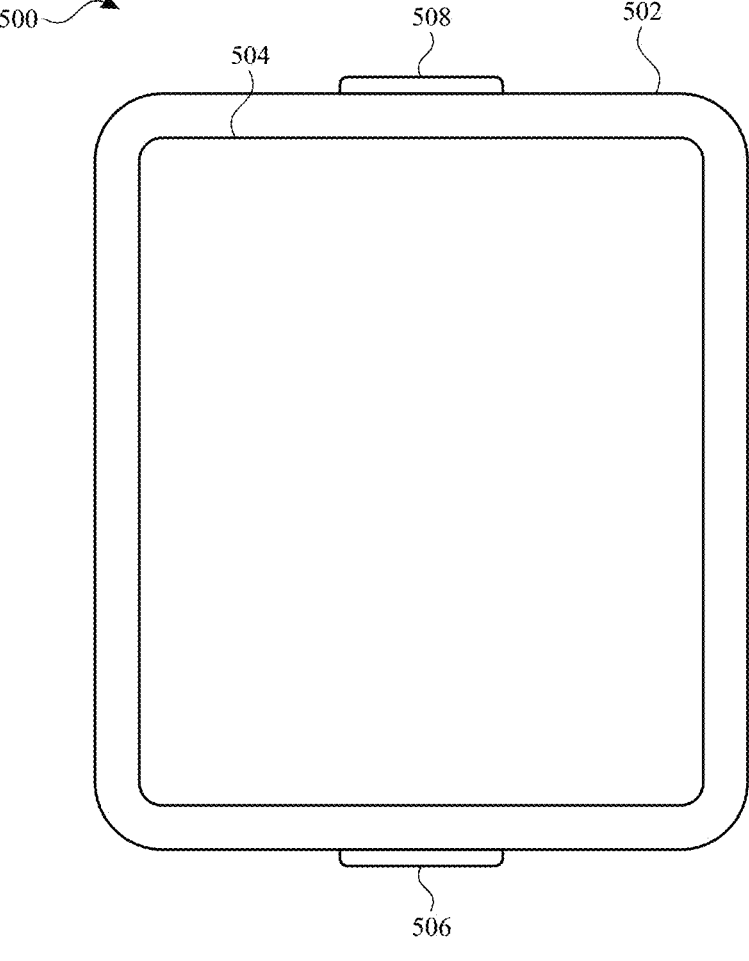
FIG. 5A illustrates a personal electronic device in accordance with some embodiments.
Figures 6A, 6B, 6C, 6D:
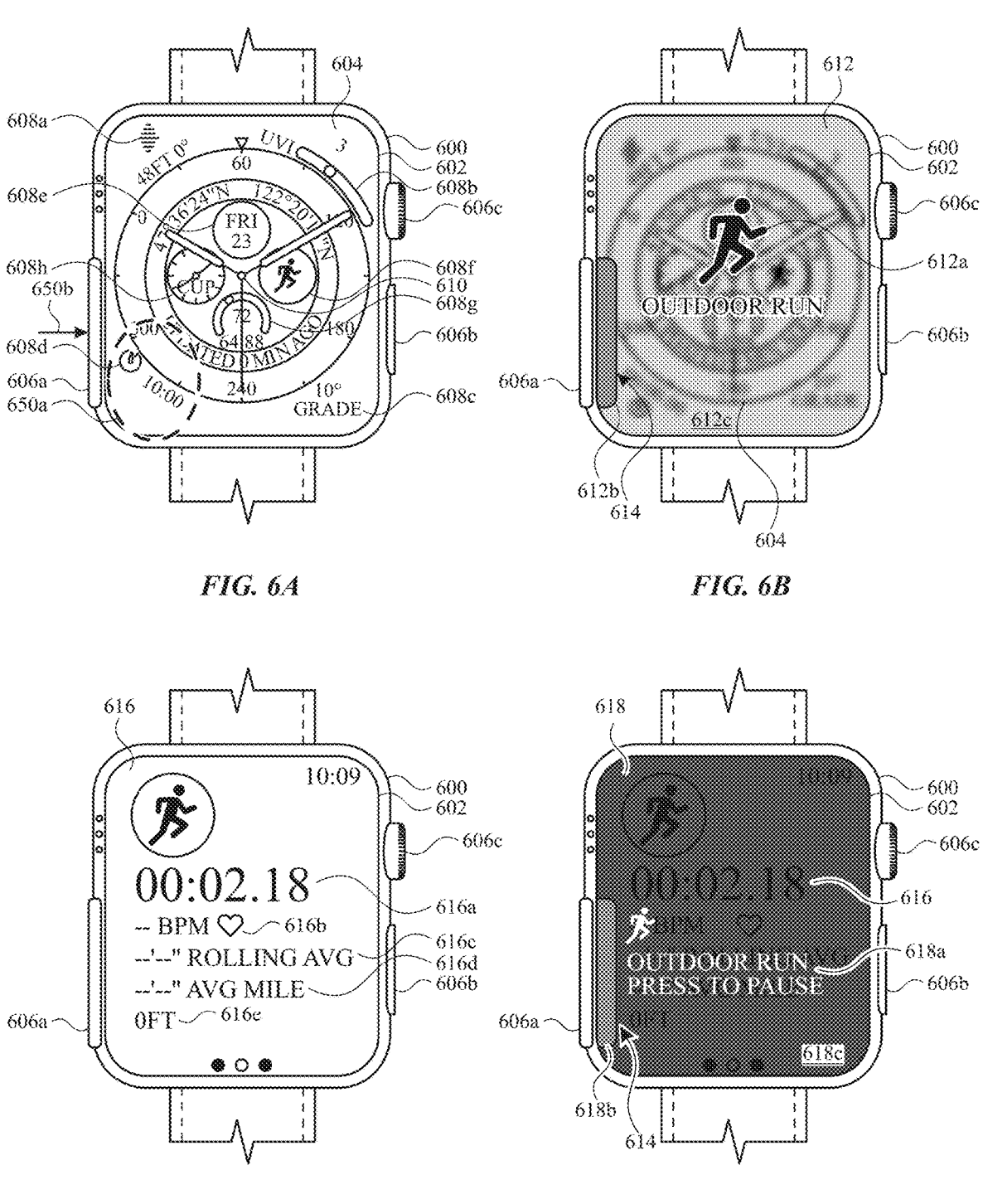
FIGS. 6A-6O illustrate exemplary user interfaces for providing guidance about initiating an operation, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
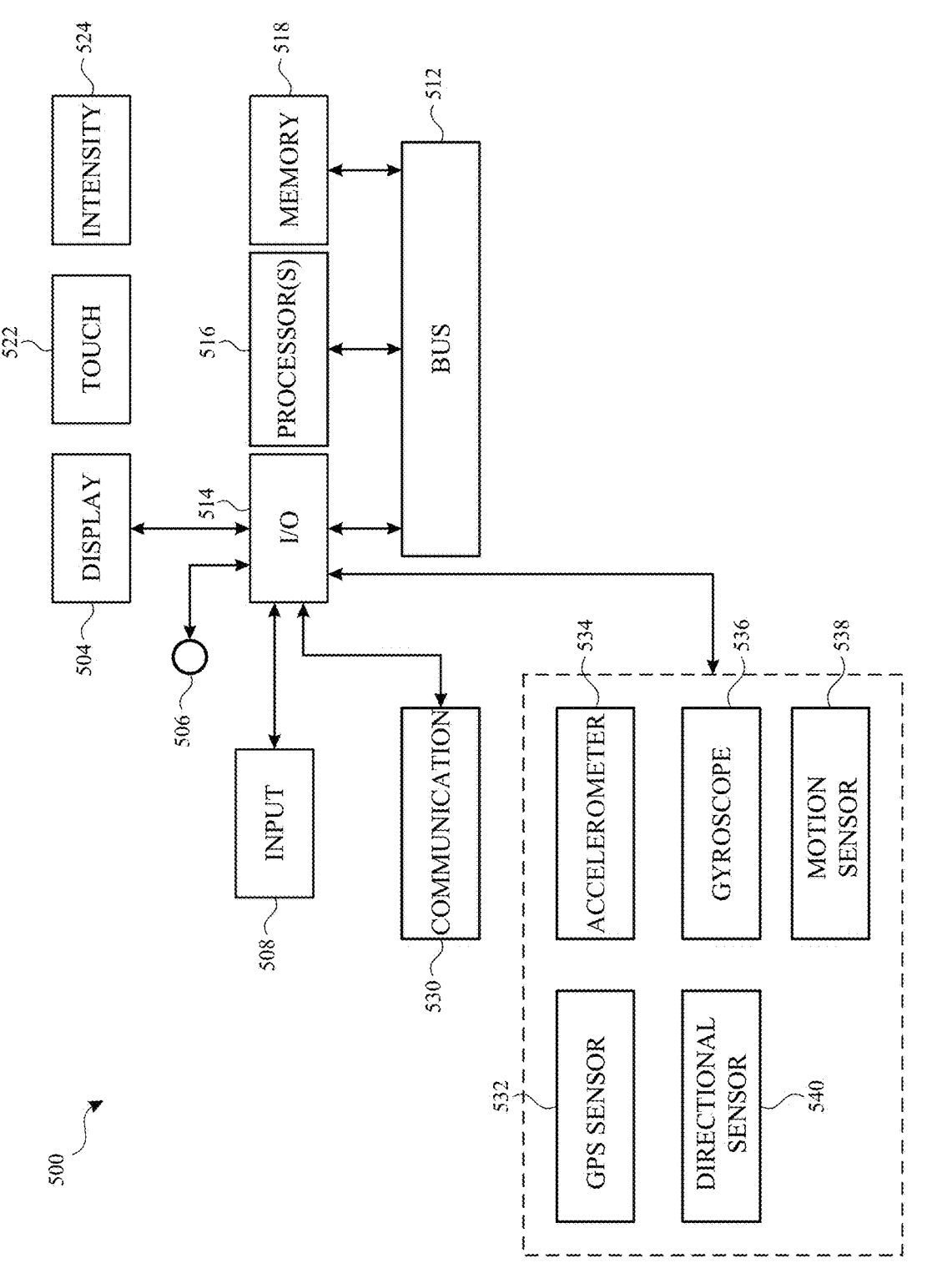
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1000, 1200, and 1400 (FIGS. 7, 9, 10, 12, and 14). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6O illustrate exemplary user interfaces for providing guidance about initiating an operation, in accordance with some embodiments. The user interfaces in these figures are used to illustrate the processes described below, including the processes in FIG. 7.

In some embodiments, any of the inputs described herein (e.g., input 650a, 650b, 650c, 650d, 650c, 650f, 650g, and/or 650h) is or includes a touch input (e.g., a tap gesture and/or a swipe gesture). In some embodiments, any of the inputs described herein (e.g., input 650a, 650b, 650c, 650d, 650c, 650f, 650g, and/or 650h) is or includes a voice input (e.g., a voice command to select a user interface element or to activate a feature or perform a function, such as a feature or function associated with a user interface element). In some embodiments, any of the inputs described herein (e.g., input 650a, 650b, 650c, 650d, 650c, 650f, 650g, and/or 650h) is or includes an air gesture (e.g., an air gesture to select a user interface element or to activate a feature or perform a function, such as a feature or function associated with a user interface element). In some embodiments, any of the inputs described herein (e.g., input 650a, 650b, 650c, 650d, 650c, 650f, 650g, and/or 650h) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

FIG. 6A illustrates computer system 600 displaying, via display device 602, watch face user interface 604. At FIG. 6A, computer system 600 includes first hardware input device 606a, second hardware input device 606b, and third hardware input device 606c in addition to display device 602. First hardware input device 606a includes a first button that, when selected via user input, is configured to cause computer system 600 to perform one or more first operations. In some embodiments, first hardware input device 606a is a physical button, a physical depressible button, and/or a solid state button having a pressure sensor. In some embodiments, first hardware input device 606a includes a tactile output generator that provides tactile feedback (e.g., haptic feedback) in response to detecting user input corresponding to first hardware input device 606a. As set forth below, in some embodiments, first hardware input device 606a is user-configurable, such that user input corresponding to first hardware input device 606a causes computer system 600 to perform a user-selected operation. Second hardware input device 606b includes a second button that, when selected, via user input, is configured to cause computer system 600 to perform one or more second operations. Third hardware input device 606c includes a rotatable input device that is configured to receive rotational user inputs and/or press user inputs that cause computer system 600 to perform one or more third operations.

At FIG. 6A, watch face user interface 604 includes user interface objects 608a-608h as well as time indicator 610 (e.g., an analog indication of time). In response to detecting user input corresponding to a respective user interface object of user interface objects 608a-608h, computer system 600 is configured to display a user interface associated with a respective application that corresponds to the selected user interface object. For instance, at FIG. 6A, computer system 600 detects user input 650a (e.g., a tap gesture or other selection/navigation input) corresponding to user interface object 608d, which is associated with a timer application of computer system 600. In response to detecting user input 650a, computer system 600 displays timer user interface 636, as shown at FIG. 6J. In some embodiments, watch face user interface 604 is a home and/or default user interface that is displayed by computer system 600 absent user input requesting to navigate to a particular application of computer system 600.

At FIG. 6A, computer system 600 detects user input 650b (e.g., a single press gesture or other selection/navigation input) corresponding to first hardware input device 606a. First hardware input device 606a is user-configurable, such that a user of computer system 600 can select and/or otherwise configure first hardware input device 606a to cause computer system 600 to perform a predetermined operation in response to user input. At FIG. 6A, the first hardware input device 606a is configured to cause computer system 600 to initiate a workout routine, such as an outdoor run. As set forth below with reference to FIGS. 6M-6O, a user of computer system 600 can select different operations and/or different types of workout routines that computer system 600 initiates in response to detecting user input 650b. In some embodiments, the user of computer system 600 can configure first hardware input device 606a via computer system 600 and/or via a companion computer system (e.g., computer system 646) that is separate from and/or different from computer system 600.

In response to detecting user input 650b, computer system 600 initiates a process for starting the workout routine, as shown at FIG. 6B. At FIG. 6B, computer system 600 displays, via display device 602, indication 612 overlaid on watch face user interface 604. For example, computer system 600 displays indication 612 to appear as if indication 612 is on top of watch face user interface 604 and at least a portion of watch user interface 604 is displayed and/or otherwise visible (e.g., indication 612 includes an amount of transparency enabling computer system 600 to display both indication 612 and at least a portion of watch face user interface 604). In addition, computer system 600 obscures, deemphasizes, blurs, and/or reduces a size of watch face user interface 604 to better focus an attention of a user of computer system 600 on indication 612 (e.g., instead of watch face user interface 604). In some embodiments, computer system 600 replaces display of watch face user interface 604 with display of indication 612, such that watch face user interface 604 is not displayed and/or visible when computer system 600 displays indication 612.

At FIG. 6B, indication 612 includes operation indicator 612a and input indicator 612b. Operation indicator 612a provides a visual indication of the predetermined operation that is configured to be initiated and/or performed by computer system 600 in response to detecting user input 650b. At FIG. 6B, indication 612 includes a symbol and/or icon associated with the predetermined operation (e.g., an outdoor run workout routine), as well as text indicating the predetermined operation (e.g., "OUTDOOR RUN"). Input indicator 612b provides visual confirmation that user input 650b was detected by computer system 600 and that indication 612 is displayed in response to detecting user input 650b. For instance, input indicator 612b is displayed at location 614 on display device 602 that is next to, near, close to, and/or proximate to a position of first hardware input device 606a (e.g., with respect to display device 602). Input indicator 612b also includes a size (e.g., a length and/or height) that is approximate to a size (e.g., a length and/or height) of first hardware input device 606a to further provide confirmation that indication 612 is displayed in response to detection of user input 650b.

At FIG. 6B, indication 612 includes background 612c that has a first color (e.g., as indicated by first shading at FIG. 6B) that is associated with the predetermined operation. For example, in some embodiments, the first color is based on an application that is associated with the predetermined operation and/or an application that enables computer system 600 to perform the predetermined operation. In some embodiments, the first color is based on a color of first hardware input device 606a (e.g., includes a first shade of a color of first hardware input device 606a). Input indicator 612b includes a second color (e.g., as indicated by second shading at FIG. 6B) that is associated with the predetermined operation and/or associated with first hardware input device 606a (e.g., a color of first hardware input device 606a). In some embodiments, background 612c includes a first shade of a color of first hardware input device 606a and input indicator 612b includes a second shade of the color of first hardware input device 606a.

At FIG. 6B, computer system 600 displays indication 612 in response to detecting user input 650b. In some embodiments, computer system 600 is configured to display indication 612 for a predetermined period of time (e.g., 2 seconds, 3 seconds, or 5 seconds) before transitioning to displaying a user interface associated with the predetermined operation (e.g., an outdoor run workout routine). For instance, after displaying indication 612 for the predetermined period of time (and, optionally, after detecting an end (e.g., release) of user input 650b), computer system 600 displays workout user interface 616, as shown at FIG. 6C.

At FIG. 6C, workout user interface 616 includes user interface objects 616a-616e that provide information and/or data about an ongoing workout routine (e.g., the outdoor run workout routine initiated in response to detecting user input 650b). Accordingly, computer system 600 initiates a workout routine and displays workout user interface 616 after (e.g., in response to) detecting user input 650b and/or after displaying indication 612 for the predetermined period of time. In some embodiments, while the workout routine is ongoing (e.g., the predetermined operation is being performed), computer system 600 detects user interaction with computer system 600, which causes computer system 600 to display first hint indication 618, as shown at FIG. 6D. In some embodiments, the user interaction causing computer system to display first hint indication 618 includes user input on display device 602, user input on one or more of hardware input devices 606a-606c, and/or a wrist raise gesture indicative of a user viewing display device 602 of computer system. In some embodiments, computer system 600 displays first hint indication 618 after performing the predetermined operation for a predefined amount of time without detecting user interaction.

At FIG. 6D, first hint indication 618 visually suggests, educates, and/or otherwise informs a user of computer system 600 that a second predetermined operation is configured to be performed by computer system 600 in response to user input corresponding to first hardware input device 606a. For example, first hardware input device 606a can be configured to cause computer system 600 to perform multiple, different operations based on different types of detected user inputs and/or based on context of computer system 600 (e.g., whether computer system is currently performing a respective operation and/or displaying a respective user interface). As set forth above, in some embodiments, computer system 600 displays first hint indication 618 in response to detecting user interaction with computer system 600 (e.g., one or more predetermined types of user interaction). For instance, in some embodiments, computer system 600 detects user interaction that is indicative of a user requesting to perform the second predetermined operation, such as a wrist raise gesture. In some embodiments, computer system 600 displays first hint indication 618 in response to detecting a reduction in movement of computer system 600 indicating that a user has stopped working out, exercising, and/or otherwise performing physical activity.

At FIG. 6D, first hint indication 618 is overlaid on workout user interface 616. For example, computer system 600 displays first hint indication 618 to appear as if first hint indication 618 is on top of workout user interface 616 and at least a portion of workout user interface 616 is displayed and/or otherwise visible (e.g., first hint indication 618 includes an amount of transparency enabling computer system 600 to display both first hint indication 618 and at least a portion of workout user interface 616). In some embodiments, computer system 600 obscures, deemphasizes, blurs, and/or reduces a size of workout user interface 616 to better focus an attention of a user of computer system 600 on first hint indication 618 (e.g., instead of workout user interface 616). In some embodiments, computer system 600 replaces display of workout user interface 616 with display of first hint indication 618, such that workout user interface 616 is not displayed and/or visible when computer system 600 displays first hint indication 618.

First hint indication 618 includes operation indicator 618a and input indicator 618b. Operation indicator 618a provides a visual indication of the second predetermined operation that is configured to be performed by computer system 600 in response to detecting user input corresponding to first hardware input device 606a. At FIG. 6D, operation indicator 618a includes a symbol and/or icon associated with the second predetermined operation (e.g., pausing an outdoor run workout routine), as well as text indicative of the second predetermined operation (e.g., "OUTDOOR RUN PRESS TO PAUSE"). Input indicator 618b provides visual confirmation and/or guidance that user input corresponding to first hardware input device 606a causes computer system 600 to perform the second predetermined operation. For instance, input indicator 618b is displayed at location 614 on display device 602 that is next to, near, close to, and/or proximate to a position of first hardware input device 606a (e.g., with respect to display device 602). Input indicator 618b also includes a size (e.g., a length and/or height) that is approximate to a size (e.g., a length and/or height) of first hardware input device 606a.

At FIG. 6D, first hint indication 618 includes background 618c that has a third color (e.g., as indicated by third shading at FIG. 6D) that is associated with the second predetermined operation. For example, in some embodiments, the third color is based on an application (e.g., a workout application) that is associated with the second predetermined operation and/or an application (e.g., a workout application) that enables computer system 600 to perform the second predetermined operation. In some embodiments, the third color is based on a color of first hardware input device 606a (e.g., background 618c includes a third shade of a color of first hardware input device 606a). Input indicator 618b includes a fourth color (e.g., as indicated by second shading at FIG. 6D) that is associated with the second predetermined operation and/or associated with first hardware input device 606a (e.g., corresponds to and/or is based on a color of first hardware input device 606a). In some embodiments, background 618c includes a third shade of a color of first hardware input device 606a and input indicator 618b includes a fourth shade of the color of first hardware input device 606a.

In some embodiments, first hint indication 618 is displayed as an introduction to the ability of computer system 600 to perform the second predetermined operation. For instance, first hint indication 618 is displayed (e.g., in response to detecting the user interaction) a predefined number of times (e.g., two times, five times, or ten times) after computer system 600 is first configured to perform the second predetermined operation via user input corresponding to first hardware input device 606a. In other words, computer system 600 displays first hint indication 618 the predefined number of times after configuring first hardware input device 606a to cause computer system 600 to perform the second predetermined operation. In some embodiments, after computer system 600 displays first hint indication 618 the predefined number of times, computer system displays second hint indication 620, as shown at FIG. 6E.

In some embodiments, computer system 600 displays second hint indication 620 in response to detecting the user interaction while displaying workout user interface 616 (e.g., after having already displayed first hint indication 618 the predefined number of times). The user interaction causing computer system to display second hint indication 620 includes user input on display device 602, user input on one or more of hardware input devices 606a-606c, and/or a wrist raise gesture indicating that a user is viewing display device 602 of computer system. In some embodiments, computer system 600 displays second hint indication 620 after performing the predetermined operation (e.g., performing a workout routine operation) for a predefined amount of time without detecting user interaction. In some embodiments, computer system 600 displays second hint indication 620 in response to detecting a reduction in movement of computer system 600 indicating that a user has stopped working out, exercising, and/or otherwise performing physical activity (e.g., after having already displayed first hint indication 618 the predefined number of times).

Figures 6E, 6F, 6G, 6H:
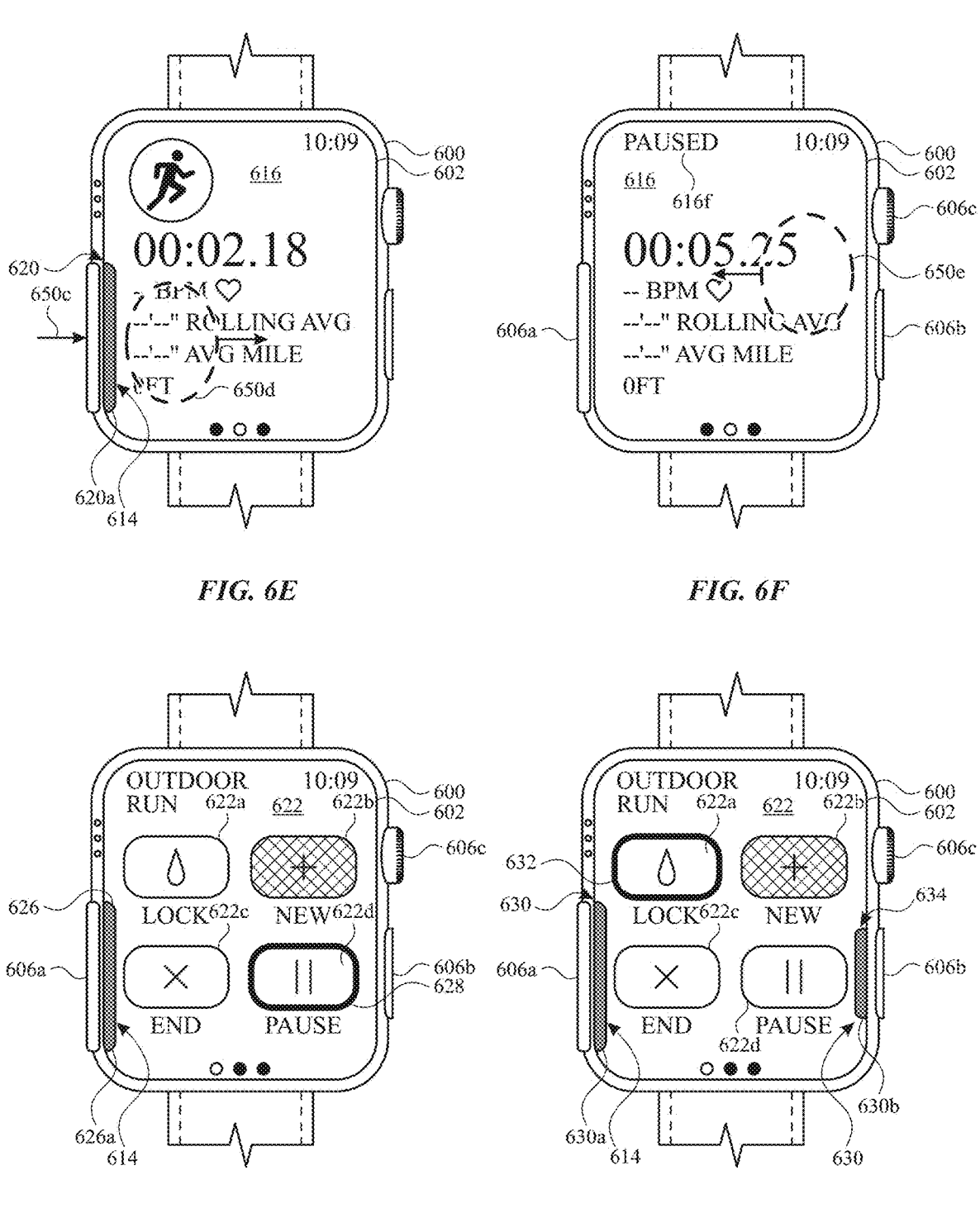

At FIG. 6E, second hint indication 620 includes input indicator 620a and does not include operation indicator 618a and/or background 618c of first hint indication 618. Second hint indication 620 does not include operation indicator 618a and/or background 618c because computer system 600 has displayed first hint indication 618 the predefined number of times, and thus, a user of computer system 600 is presumably aware of the ability to perform the second predetermined operation via user input on first hardware input device 606a. Input indicator 620a provides visual confirmation and/or guidance that user input corresponding to first hardware input device 606a causes computer system 600 to perform the second predetermined operation. For instance, input indicator 620a is displayed at location 614 on display device 602 that is next to, near, close to, and/or proximate to a position of first hardware input device 606a (e.g., with respect to display device 602). Input indicator 620a also includes a size (e.g., a length and/or height) that is approximate to a size (e.g., a length and/or height) of first hardware input device 606a.

At FIG. 6E, computer system 600 detects user input 650c (e.g., a press input or other selection/navigation input) corresponding to first hardware input device 606a. In response to detecting user input 650c, computer system 600 initiates the second predetermined operation and pauses the ongoing workout routine operation, as shown at FIG. 6F. While user input 650c is illustrated at FIG. 6E, computer system 600 is also configured to initiate performance of the second predetermined operation in response to detecting user input corresponding to first hardware input device 606a while displaying first hint indicator 618 at FIG. 6D. In some embodiments, computer system 600 is also configured to initiate the second predetermined operation in response to detecting user input corresponding to first hardware input device 606a even when first hint indication 618 and/or second hint indication 620 are not displayed. In some embodiments, in addition to and/or in lieu of computer system 600 detecting user input 650c, computer system 600 detects user input 650d (e.g., a right swipe gesture or other selection/navigation input) on workout user interface 616. In response to detecting user input 650d (e.g., instead of user input 650c), computer system displays workout control user interface 622, as shown at FIG. 6G.

At FIG. 6F, computer system 600 displays workout user interface 616 including status indicator 616f that indicates that the workout routine operation is paused (e.g., status indicator 616f includes the text "PAUSED"). Therefore, computer system 600 is configured to display first hint indication 618 and/or second hint indication 620 so that a user of computer system 600 is aware that user input corresponding to first hardware input device 606a causes computer system 600 to pause the ongoing workout routine operation. In some embodiments, computer system 600 is configured to pause the ongoing workout routine operation in response to detecting user input corresponding to first hardware input device 606a even when first hint indication 618 and/or second hint indication 620 are not displayed. At FIG. 6F, computer system 600 detects user input 650e (e.g., a left swipe gesture or other selection/navigation input) on workout user interface 616. In response to detecting user input 640e, computer system 600 displays music user interface 624, as shown at FIG. 6I.

At FIG. 6G, computer system 600 displays workout control user interface 622, which includes user interface objects 622a-622d that, when selected, control an aspect and/or context associated with the ongoing workout routine (e.g., control the aspect and/or context associated with the ongoing workout routine before the ongoing workout routine is paused in response to user input 650c). In some embodiments, first hardware control device 606a is configured to perform the same predetermined operation when computer system 600 displays different user interfaces (e.g., different user interfaces of the same and/or different applications of computer system 600). In some embodiments, first hardware control device 606a is configured to perform different operations in response to different types of user input while computer system 600 displays workout control user interface 622 (and, optionally, workout user interface 616). In some embodiments, first hardware control device 606a is configured to perform operations that are associated with user interface objects 622a-622d.

For example, at FIG. 6G, computer system 600 displays third hint indication 626 and border 628 at least partially around user interface object 622d. In some embodiments, computer system 600 displays third hint indication 626 and border 628 after displaying workout control user interface 622 for a predetermined amount of time. In some embodiments, computer system 600 displays third hint indication 626 and border 628 in response to displaying workout control user interface 622. In some embodiments, computer system 600 displays third hint indication 626 and border 628 based on detection of user interaction with computer system 600 and/or based on information provided via one or more sensors of computer system 600. At FIG. 6G, third hint indication 626 includes input indicator 626a. Input indicator 626a provides visual confirmation and/or guidance that user input corresponding to first hardware input device 606a causes computer system 600 to perform a third predetermined operation (e.g., the second predetermined operation and/or pausing an ongoing workout routine operation). For instance, input indicator 626a is displayed at location 614 on display device 602 that is next to, near, close to, and/or proximate to a position of first hardware input device 606a (e.g., with respect to display device 602). Input indicator 626a also includes a size (e.g., a length and/or height) that is approximate to a size (e.g., a length and/or height) of first hardware input device 606a.

Border 628 provides guidance and/or information to a user of computer system 600 that user input corresponding to first hardware input device 606a performs an operation associated with user interface object 622d, such as pausing the ongoing workout routine operation. Therefore, when first hardware input device 606a is configured to cause computer system 600 to perform an operation that is the same as an operation associated with a displayed user interface object, computer system displays border 628 at least partially around the displayed user interface object. At FIG. 6G, third hint indication 626 and/or border 628 enable a user to understand that computer system 600 can perform the operation via user input (e.g., a press gesture or other selection/navigation input) on first hardware input 606a and/or user input (e.g., a tap gesture or other selection/navigation input) on the displayed user interface object (e.g., user interface object 622d).

As set forth above, computer system 600 is configured to perform different operations in response to different types of user inputs corresponding to first hardware input device 606a. For instance, at FIG. 6H, computer system 600 displays workout control user interface 622, which includes fourth hint indication 630 and border 632 at least partially around user interface object 622a. In some embodiments, computer system 600 (e.g., when computer system 600 does not detect user input) alternates between display of third hint indication 626 and fourth hint indication 630 while displaying workout control user interface 622. For instance, in some embodiments, computer system 600 displays an animation that causes third hint indication 626, border 628, fourth hint indication 630, and/or border 632 to move, change in size, change in shape, change in color, change in brightness, and/or alternate between being displayed and not being displayed over time. Accordingly, computer system 600 provides guidance and/or information to a user about different types user inputs that can be provided to cause computer system 600 to perform different operations.

At FIG. 6H, fourth hint indication 630 includes first input indicator 630a and second input indicator 630b, which are displayed concurrently on workout control user interface 622. First input indicator 630a and second input indicator 630b provide visual guidance to a user of computer system 600 that user input directed to both first hardware input device 606a and second hardware input 606b (e.g., concurrent and/or sequential press gestures) cause computer system 600 to perform a fourth predetermined operation (e.g., enable a water lock operation during a workout routine). For instance, first input indicator 630a is displayed at location 614 on display device 602 that is next to, near, close to, and/or proximate to a position of first hardware input device 606a (e.g., with respect to display device 602). First input indicator 630a also includes a size (e.g., a length and/or height) that is approximate to a size (e.g., a length and/or height) of first hardware input device 606a. Second input indicator 630b is displayed at location 634 on display device 602 that is next to, near, close to, and/or proximate to a position of second hardware input device 606b (e.g., with respect to display device 602). Second input indicator 630b also includes a size (e.g., a length and/or height) that is approximate to a size (e.g., a length and/or height) of second hardware input device 606b. In addition, border 632 provides a visual indication of the fourth predetermined operation by emphasizing user interface object 622a, which is associated with the fourth predetermined operation.

At FIGS. 6G and 6H, in response to detecting user input corresponding to first hardware input device 606a (and not corresponding to second hardware input device 606b), computer system 600 is configured to perform the third predetermined operation and pause the ongoing workout routine operation. In addition, in response to detecting user input corresponding to first hardware input device 606a and second hardware input device 606b (e.g., concurrent input on both first hardware input device 606a and second hardware input device 606b and/or sequential input on first hardware input device 606a and second hardware input device 606b), computer system 600 is configured to perform the fourth predetermined operation and initiate a water lock operation. In some embodiments, computer system 600 is also configured to perform the third predetermined operation and the fourth predetermined operation in response to user input on first hardware input device 606a and user input on first hardware input device 606a and second hardware input device 606b, respectively, while displaying workout user interface 616 (e.g., while displaying or while not displaying first hint indication 618 and/or second hint indication 620).

As set forth above, in response to detecting user input 650e at FIG. 6F, computer system 600 displays music user interface 624, as shown at FIG. 6I. At FIG. 6I, computer system 600 has not been configured to perform an operation associated with music user interface 624 in response to user input corresponding to first hardware input device 606a. Accordingly, while computer system 600 displays music user interface 624, computer system 600 does not display (e.g., forgoes displaying) a hint indication (e.g., first hint indication 618, second hint indication 620, third hint indication 626, and/or fourth hint indication 630) because computer system 600 is not displaying a user interface associated with an operation in which first hardware input device 606a is configured to perform. While computer system 600 does not display a hint indication while displaying music user interface 624, in some embodiments, computer system 600 is still configured to perform a predetermined operation in response to detecting user input corresponding to first hardware input device 606a.

As set forth above, in response to detecting user input 650a corresponding to user interface object 608a at FIG. 6A, computer system displays timer user interface 636, as shown at FIG. 6J. At FIG. 6J, computer system 600 is configured to perform one or more operations associated with a timer application in response to detecting user input corresponding to first hardware input device 606a (e.g., in addition to or in lieu of the first predetermined operation, the second predetermined operation, the third predetermined operation, and/or the fourth predetermined operation associated with the workout application discussed above with reference to FIGS. 6B-6H). For instance, at FIG. 6J, computer system 600 displays timer user interface 636 including timer duration indicator 636a, time remaining indicator 636b, timer user interface object 636c, cancel user interface object 636d, and pause user interface object 636e. Pause user interface object 636e indicates that a timer operation (e.g., a ten minute timer) is currently being performed by computer system 600 because computer system 600 is configured to pause the ongoing timer operation instead of resume, start, and/or restart the timer operation. In other words, computer system 600 is configured to alert a user at an end of a predetermined duration (e.g., ten minutes) from a time at which the timer operation was initiated (e.g., via user input).

At FIG. 6J, computer system 600 displays hint indication 638 and border 640 at least partially around pause user interface object 636e. Hint indication 638 includes first input indicator 638a and second hint indicator 638b, which are displayed concurrently on timer control user interface 636. First input indicator 638a and second input indicator 638b provide visual guidance to a user of computer system 600 that user input directed to both first hardware input device 606a and second hardware input 606b (e.g., concurrent and/or sequential user input) cause computer system 600 to perform a fifth predetermined operation (e.g., pause a timer). For instance, first input indicator 638a is displayed at location 614 on display device 602 that is next to, near, close to, and/or proximate to a position of first hardware input device 606a (e.g., with respect to display device 602). First input indicator 638a also includes a size (e.g., a length and/or height) that is approximate to a size (e.g., a length and/or height) of first hardware input device 606a. Second input indicator 638b is displayed at location 634 on display device 602 that is next to, near, close to, and/or proximate to a position of second hardware input device 606b (e.g., with respect to display device 602). Second input indicator 638b also includes a size (e.g., a length and/or height) that is approximate to a size (e.g., a length and/or height) of second hardware input device 606b. In addition, border 640 provides a visual indication of the fifth predetermined operation by emphasizing pause user interface object 636e, which is associated with the fifth predetermined operation.

Computer system 600 is configured to animate hint indication 638 and/or border 640 to further provide visual guidance to a user that selection of first hardware input 606a and second hardware input 606b is configured to perform the fifth predetermined operation. For instance, at FIG. 6J, computer system 600 displays first input indicator 638a and second hint indicator 638b with a first thickness 642a (e.g., width) and border 640 with first thickness 644a. In some embodiments, computer system 600 is configured to animate first input indicator 638a, second input indicator 638b, and border 640 so that first input indicator 638a, second input indicator 638b, and border 640 appear to pulse, change in size, change in color, change in thickness, change in brightness, and/or otherwise move over time. For example, after displaying first input indicator 638a and second input indicator 638b with first thickness 642a and border 640 with first thickness 644a, computer system 600 displays first input indicator 638a and second input indicator 638b with second thickness 642b and border 640 with second thickness 644b, where second thickness 642b is larger than first thickness 642a and second thickness 644b is larger than first thickness 644a, as shown at FIG. 6K. In some embodiments, computer system 600 alternates between displaying first input indicator 638a and second input indicator 638b with first thickness 642a and border 640 with first thickness 644a and displaying first input indicator 638a and second input indicator 638b with second thickness 642b and border 640 with second thickness 644b to generate the pulsing animation. Thus, computer system 600 further draws the attention of a user to the ability of computer system 600 to perform the fifth predetermined operation by guiding and/or indicating to the user that user input corresponding to first hardware input device 606a and second hardware input device 606b causes the fifth predetermined operation to be performed.

While the pulsing animation of hint indication 638 and border 640 is illustrated in FIGS. 6J and 6K with respect to the fifth predetermined operation, in some embodiments, computer system 600 animates display of first hint indication 618, second hint indication 620, third hint indication

626, and/or fourth hint indication 630 so that first hint indicator 618, second hint indicator 620, third indicator 626, and/or fourth hint indicator 630 appear to, change in size, change in color, change in thickness, change in brightness, and/or otherwise move over time.

At FIG. 6K, computer system 600 detects user input 650f (e.g., concurrent press gestures, sequential press gestures, or other selection/navigation input) corresponding to first hardware input device 606a and second hardware input device 606b. In response to detecting user input 650f, computer system performs the fifth predetermined operation and pauses the timer, as shown at FIG. 6L.

At FIG. 6L, computer system 600 displays timer user interface 636 with play user interface object 636f instead of pause user interface object 636e. Accordingly, computer system 600 pauses the timer operation at a time (e.g., "9:35") associated with detection of user input 650f. In some embodiments, computer system 600 is configured to resume the timer operation (e.g., continue counting down from "9:35") in response to detecting user input corresponding to first hardware input device 606a, second hardware input device 606b, and/or play user interface object 636f.

Figures 6M, 6N:
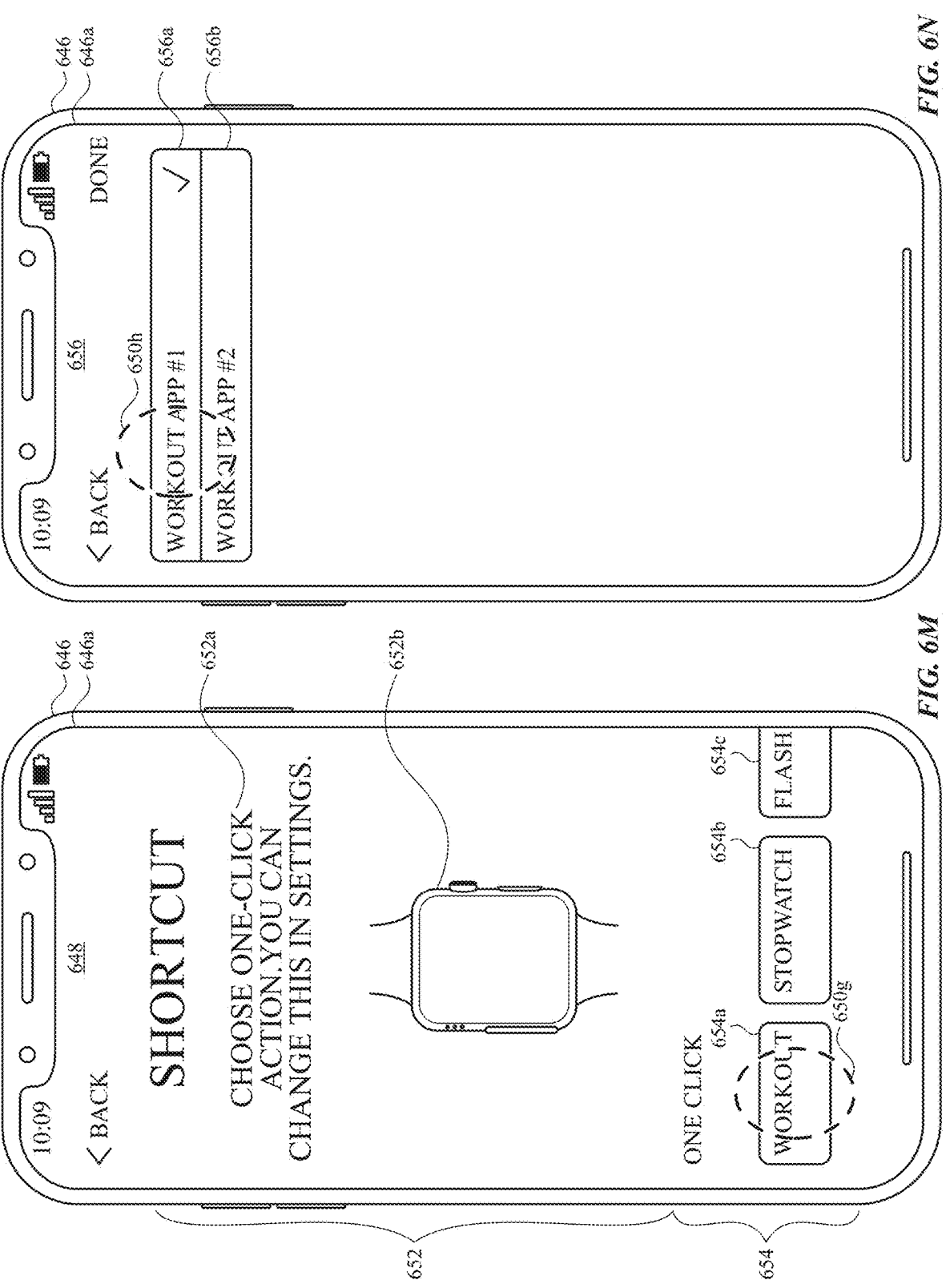
Figure 6O:
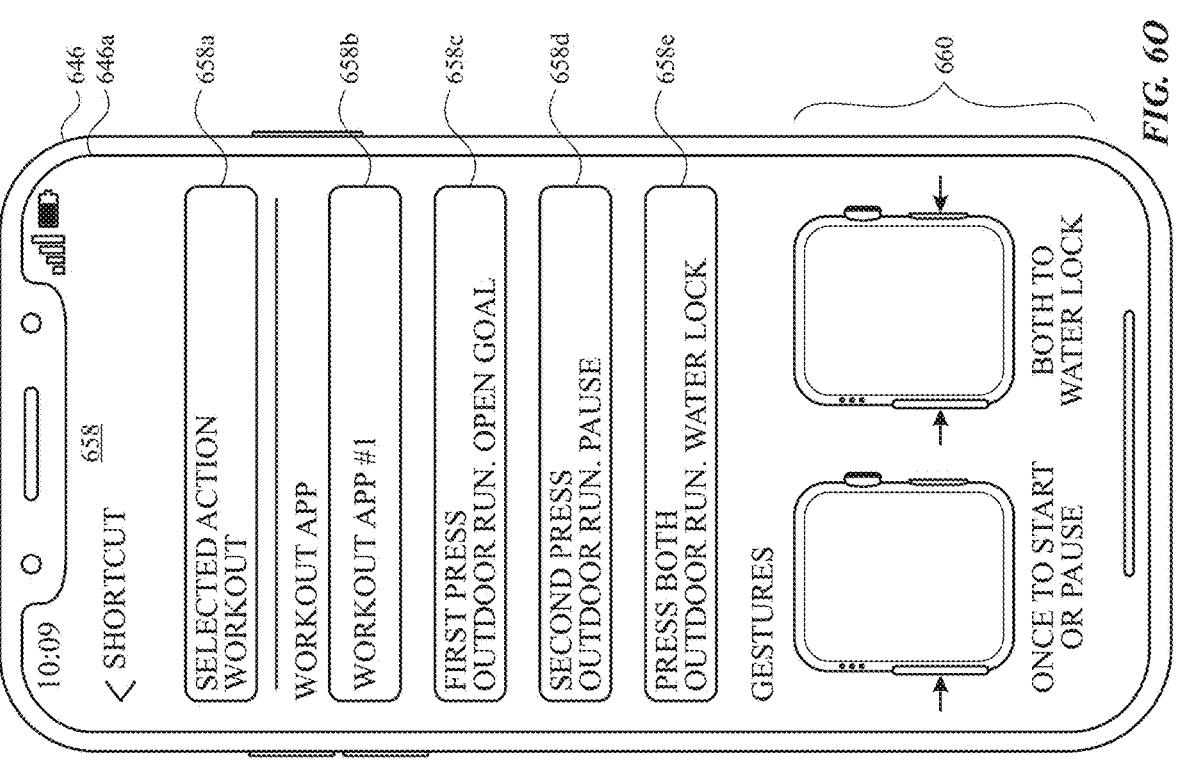

As set forth above, first hardware input device 606a is user configurable, such that the user of computer system 600 can select one or more predetermined operations in which computer system 600 performs in response to one or more types of user input corresponding to first hardware input device 606a. In some embodiments, computer system 600 is a wearable device, such as a smart watch, and computer system 600 is in communication with external computer system 646 (e.g., a companion computer system). External computer system 646 is in communication with (e.g., paired to) computer system 600 and is configured to provide information to computer system 600, such as settings information for computer system 600, notifications information, and/or configuration information. FIGS. 6M-6O illustrate external computer system 646 detecting user input corresponding to configuring and/or selecting operations in which first hardware input device 606a causes computer system 600 to perform. For instance, external computer system 646 detects and/or receives user input selecting one or more operations in which first hardware input device 606a is configured to cause computer system 600 to perform and communicates information about the selected operations and configuration of first hardware input device 606a to computer system 600. While FIGS. 6M-6O illustrate external device 646 displaying user interfaces for configuring first hardware input device 606a of computer system 600, in some embodiments, computer system 600 displays similar user interfaces that enable first hardware input device 606a to be configured via user inputs detected by computer system 600 (e.g., without computer system 600 receiving information from external computer system 646).

At FIG. 6M, external computer system 646 displays, via display device 646a, configuration user interface 648 enabling a user to select one or more operations to associate with first hardware input device 606a. Configuration user interface 648 includes information region 652 providing information and/or guidance to a user that configuration user interface 648 is associated with configuring first hardware input device 606a. For instance, information region 652 includes text 652a (e.g., "SHORTCUT CHOOSE ONE-CLICK ACTION. YOU CAN CHANGE THIS IN SETTINGS.") and/or image 652b (e.g., an image representing computer system 600) providing information associated with configuring first hardware input device 606a. Configuration user interface 648 also includes category region 654 having user interface objects 654a-654c corresponding to different categories of operations in which first hardware input device 606a can be configured to perform. At FIG. 6M, first user interface object 654a is associated with a workout category, second user interface object 654b is associated with a stopwatch category, and third user interface object 654c is associated with a flashlight category. In some embodiments, category region 654 includes fewer than three user interface objects. In some embodiments, category region 654 includes more than three user interface objects and external computer system 646 is configured to display additional user interface objects in response to detecting a swipe gesture (or other selection/navigation input) on category region 654.

At FIG. 6M, external computer system 646 detects user input 650g (e.g., a tap gesture or other selection/navigation input) corresponding to selection of first user interface object 654a of category region 654. In response to detecting user input 650g, external computer system 646 displays application user interface 656, as shown in FIG. 6N. In some embodiments, external computer system 646 forgoes displaying application user interface 656 when a selected category user interface object is not associated with multiple applications on external computer system 646 and/or computer system 600. For instance, when external computer system 646 and/or computer system 600 include only a single workout application corresponding to the workout category, external computer system 646 forgoes displaying application user interface 656 because there are not multiple applications available from which a user can select. In some embodiments, when external computer system 646 forgoes displaying application user interface 656, external computer system 646 displays settings user interface 658 in response to detecting user input 650g.

At FIG. 6N, external computer system 646 displays application user interface 656 (e.g., based on a determination that external computer system 646 and/or computer system 600 include multiple applications associated with the workout category). Application user interface 656 includes first application user interface object 656a corresponding to a first workout application (e.g., "WORKOUT APP #1") and second application user interface object 656b corresponding to a second workout application (e.g., "WORKOUT APP #2"). In some embodiments, in response to detecting user input selecting one of user interface objects 654a-654c, external computer system 646 displays application user interface objects corresponding to all applications on external computer system 646 and/or on computer system 646 that are associated with the selected category. Accordingly, in some embodiments, application user interface 656 includes more than two application user interface objects.

At FIG. 6N, external computer system 646 detects user input 650h (e.g., a tap gesture or other selection/navigation input) corresponding to selection of first application user interface object 656a. In response to detecting user input 650h, external computer system 646 displays settings user interface 658, as shown at FIG. 6O. At FIG. 6O, settings user interface 658 enables a user to configure different operations for computer system 600 to perform based on different types of user inputs corresponding to first hardware input device 606a.

At FIG. 6O, settings user interface 658 includes category user interface object 658a identifying the selected category (e.g., "WORKOUT"), application user interface object 658b identifying the selected application (e.g., "WORKOUT APP #1") and operation user interface objects 658c-658c. In some embodiments, external computer system 646 displays configuration user interface 648 in response to detecting user input selecting category user interface object 658a. In some embodiments, external computer system 646 displays application user interface 656 in response to detecting user input selecting application user interface object 658b (e.g., when computer system 600 and/or external computer system 646 include multiple applications corresponding to a category associated with a selected user interface object 654a-654c of category user interface 648).

At FIG. 6O, first operation user interface object 658c corresponds to a first operation in which first hardware input device 606a is configured to perform in response to a first type of user input (e.g., a first press). For example, first operation user interface object 658c indicates that first hardware input device 606a is configured to cause computer system 600 to open a goal for an outdoor run operation in response to a first press of first hardware input device 606a. In other words, computer system 600 displays a user interface that allows a user to enter and/or otherwise select a goal (e.g., a time, a distance, and/or an amount of calories) for an outdoor run operation in response to detecting a first press on first hardware input device 606a. In some embodiments, in response to detecting user input selecting first operation user interface object 658c, external computer system 646 is configured to display a list of selectable operations in which computer system 600 can perform in response to a first press of first hardware input device 606a. Accordingly, first operation user interface object 658c enables a user to configure first hardware input device 606a to cause computer system 600 to perform a user-selected and/or user configured operation in response to a first press of first hardware input device 606a.

Second operation user interface object 658d corresponds to a second operation in which first hardware input device 606a is configured to perform in response to a second type of user input (e.g., a second press). For example, second operation user interface object 658d indicates that first hardware input device 606a is configured to cause computer system 600 to pause an outdoor run operation in response to a second press (e.g., a press gesture or other selection/navigation input corresponding to first hardware input device 606a that is detected by computer system 600 after the first press). In some embodiments, in response to detecting user input selecting second operation user interface object 658d, external computer system 646 is configured to display a list of selectable operations in which computer system 600 can perform in response to a second press of first hardware input device 606a. Accordingly, second operation user interface object 658d enables a user to configure first hardware input device 606a to cause computer system 600 to perform a user-selected and/or user configured operation in response to a second press of first hardware input device 606a.

Third operation user interface object 658e corresponds to a third operation in which first hardware input device 606a is configured to perform in response to a third type of user input (e.g., a press on both first hardware input device 606a and second hardware input device 606b). For example, third operation user interface object 658e indicates that first hardware input device 606a is configured to cause computer system 600 to perform a water lock operation in response to a press of both first hardware input device 606a and second hardware input device 606b (e.g., a concurrent and/or sequential press of first hardware input device 606a and second hardware input device 606b). In some embodiments, in response to detecting user input selecting third operation user interface object 658c, external computer system 646 is configured to display a list of selectable operations in which computer system 600 can perform in response to a press of both first hardware input device 606a and second hardware input device 606b. Accordingly, third operation user interface object 658e enables a user to configure first hardware input device 606a to cause computer system 600 to perform a user-selected and/or user configured operation in response to a press of both first hardware input device 606a and second hardware input device 606b.

At FIG. 6O, settings user interface 658 includes gesture region 660, which provides a visual indication of the types of user inputs corresponding to first hardware input device 606a that can be provided in order to perform the different operations. Gesture region 660 enables a user to quickly learn and/or confirm that a particular type of user input corresponding to first hardware input device 606a (and/or second hardware input device 606b) can perform a selected operation.

While FIGS. 6M-6O illustrate first hardware input device 606a being configured to perform operations with respect to a workout application, in some embodiments, first hardware input device 606a is configured to perform operations for different applications. Table 1 below illustrates examples of operations configured to be performed by computer system 600 in response to detecting user input corresponding to first hardware input device 606a and/or second hardware input device 606b (e.g., based on respective user-selected configurations of first hardware input device 606a and/or second hardware input device 606b). In some embodiments, the rows of Table 1 are alternative configurations for first hardware input device 606a, such that first hardware input device 606a is configured to cause computer system 600 to perform one or more operations corresponding to a single application and/or category (e.g., a single row of Table 1). In some embodiments, first hardware input 606a is not configured to cause computer system 600 to perform operations corresponding to more than one application and/or category (e.g., first hardware input device 606a cannot be configured to cause computer system 600 to perform operations of more than one row in Table 1).

TABLE 1

Operations Configured to be Performed by Computer System in Response to User Input Corresponding to First Hardware Input Device

| Application/ Category | First Press | Second Press | Press Both | Long Press |
|---|---|---|---|---|
| Waypoint | New | — | — | Emergency Siren |
| Shortcut | Start | — | — | Emergency Siren |
| Backtrack | Start | — | Pause | Emergency Siren |
| Flashlight | On | — | — | Emergency Siren |
| Workout | Start | Next Lap | Pause | Emergency Siren |
| Stop Watch | Start | Next Lap | Pause | Emergency Siren |
| Dive | Start | Dynamic action | — | Emergency Siren |

FIG. 7 is a flow diagram illustrating a method for providing guidance about initiating an operation using a computer system in accordance with some embodiments. Method 700 is performed at a computer system (e.g., 100, 300, 500, 600, 646, and/or 1300) (e.g., an electronic device; a smart device, such as a smartphone or a smartwatch; a mobile device; a wearable device) that is in communication with a display generation component (e.g., 602, 646a, and/or 1300a) (e.g., a display controller, a touch-sensitive display system, a projector, a display screen, a display monitor, and/or a holographic display) and one or more hardware input devices (e.g., 606a, 606b, and/or 606c) (e.g., one or more physical buttons (e.g., buttons included in and/or on a housing of the computer system), rotatable input devices, depressible input devices, and/or solid state buttons having a pressure sensor that are configured to cause the computer system to perform a function in response to an activation event (e.g., a user input, a user-defined and/or user-selected user input, and/or a particular input)). In some embodiments, a hardware input device (e.g., 606a) of the one or more hardware input devices is configurable (e.g., user selected, user defined, and/or user customized) so that the computer system (e.g., 100, 300, 500, 600, and/or 646) performs a predefined function in response to a user input (e.g., a predefined input of a particular type). In some embodiments, the one or more hardware input devices (e.g., 606a, 606b, and/or 606c) include a tactile output generator that provides tactile feedback (e.g., haptic feedback) in response to detecting user input corresponding to a respective hardware input device of the one or more hardware input devices. Some operations in method 700 are, optionally, combined, the orders of some operations are, optionally, changed, and some operations are, optionally, omitted.

As described below, method 700 provides an intuitive way for providing guidance about initiating an operation. The method reduces the cognitive burden on a user for initiating an operation, thereby creating a more efficient human-machine interface. For battery-operated computing devices, enabling a user to initiate an operation faster and more efficiently conserves power and increases the time between battery charges.

Computer system (e.g., 100, 300, 500, 600, 646, and/or 1300) detects (702) an occurrence of a condition (e.g., 650a, 650b, and/or 650d) associated with displaying a first user interface (e.g., 616, 622, and/or 636) associated with a first operation (e.g., a request to navigate to the first user interface or the occurrence of an event that causes the device to navigate to the first user interface from another user interface, transition the first user interface from a low power state to an active state, or turn on the display device to display the first user interface).

In response to detecting the occurrence of the condition, computer system (e.g., 100, 300, 500, 600, 646, and/or 1300) displays (704) the first user interface (e.g., 612, 622, and/or 636).

While the computer system (e.g., 100, 300, 500, 600, 646, and/or 1300) displays (704) the first user interface (e.g., 612, 622, and/or 636) (e.g., a watch face user interface, a user interface associated with an application of the computer system, and/or a user interface including one or more application user interface objects corresponding to applications of the computer system) and in accordance with a determination that a first hardware input device (e.g., 606a) (e.g., a depressible button positioned on a side of a housing of the computer system) of the one or more hardware input devices (e.g., 606a, 606b, and/or 606c) is configured with a first configuration (e.g., the first hardware input device has been configured (e.g., via user input and/or user selection) to perform the first operation via a first type of user input (e.g., a press, a long press, a double press, and/or a multiple press user input)) that enables the first hardware input device (e.g., 606a) to perform the first operation (e.g., an operation (e.g., a user selected operation) associated with an application of the computer system (and, optionally, an application associated with the first user interface)), the computer system (e.g., 100, 300, 500, 600, 646, and/or 1300) displays (706), via the display generation component (e.g., 602, 646a, and/or 1300a) (e.g., overlaid on the first user interface), a graphical user interface object (e.g., 618, 618b, 620a, 626, 626a, 630, and/or 638) (e.g., text, a user interface object, a user interface object including a first color that is the same as the first color as the first hardware input device, and/or one or more user interface objects indicative of the first operation, indicative of the application, and/or indicative of the user input that causes the computer system to perform the first operation) indicating that the first hardware input device (e.g., 606a) can perform the first operation (e.g., the graphical user interface object provides visual guidance and/or an indication to a user of the computer system that a user input corresponding to the first hardware input device will perform the first operation). In some embodiments, the first hardware input device includes a first color that is different from a second color of the housing of the computer system.

While the computer system (e.g., 100, 300, 500, 600, 646, and/or 1300) displays (704) the first user interface (e.g., 612, 622, and/or 636) (e.g., a watch face user interface, a user interface associated with an application of the computer system, and/or a user interface including one or more application user interface objects corresponding to applications of the computer system) and in accordance with a determination that the first hardware input device (e.g., 606a) of the one or more hardware input devices (e.g., 606a, 606b, and/or 606c) is not configured with the first configuration (e.g., the first hardware input device has not been configured (e.g., via user input and/or user selection) to perform the first operation via a first type of user input) that enables the first hardware input device (e.g., 606a) to perform the first operation (e.g., an operation (e.g., a user selected operation) associated with an application of the computer system (and, optionally, an application that is associated with the first user interface)), the computer system (e.g., 100, 300, 500, 600, 646, and/or 1300) forgoes displaying (708) the graphical user interface object (e.g., 618, 618b, 620a, 626, 626a, 630, and/or 638) indicating that the first hardware input device (e.g., 606) can perform the first operation (e.g., maintaining display of the first user interface without displaying the graphical user interface object).

Displaying the graphical user interface object in accordance with a determination that the first hardware input device is configured with the first configuration and forgoing displaying the graphical user interface object in accordance with a determination that the first hardware input device is not configured with the first configuration provides a user of the computer system with an indication of whether or not the first operation can be performed at a particular time via user input selecting the first hardware input device, thereby providing improved visual feedback to the user.

In some embodiments, the computer system detects (e.g., 100, 300, 500, 600, 646, and/or 1300) an occurrence of a condition (e.g., 650a and/or 650d) associated with displaying a second user interface (e.g., 616, 622, and/or 636) associated with a second operation (e.g., a request to navigate to the second user interface or the occurrence of an event that causes the device to navigate to the second user interface from another user interface, transition the second user interface from a low power state to an active state, or turn on the display device to display the second user interface). In response to detecting the occurrence of the condition, the computer system (e.g., 100, 300, 500, 600, 646, and/or 1300) displays the second user interface (e.g., 612, 622, and/or 636). While the computer system (e.g., 100, 300, 500, 600, 646, and/or 1300) displays the second user interface (e.g., 612, 622, and/or 636) (e.g., a watch face user interface, a user interface associated with an application of the computer system, and/or a user interface including one or more application user interface objects corresponding to applications of the computer system) and in accordance with a determination that the first hardware input device (e.g., 606a) (e.g., a depressible button positioned on a side of a housing of the computer system) of the one or more hardware input devices (e.g., 606a, 606b, and/or 606c) is configured with a second configuration (e.g., the first hardware input device has been configured (e.g., via user input and/or user selection) to perform the second operation via a second type of user input (e.g., a press, a long press, a double press, and/or a multiple press user input)) that enables the first hardware input device (e.g., 606a) to perform the second operation (e.g., an operation (e.g., a user selected operation) associated with an application of the computer system (and, optionally, an application associated with the second user interface)), the computer system (e.g., 100, 300, 500, 600, 646, and/or 1300) displays, via the display generation component (e.g., overlaid on the second user interface), a second graphical user interface object (e.g., 618, 618b, 620a, 626, 626a, 630, and/or 638) (e.g., text, a user interface object, a user interface object including a first color that is the same as the first color as the first hardware input device, and/or one or more user interface objects indicative of the second operation, indicative of the application, and/or indicative of the user input that causes the computer system to perform the second operation) indicating that the first hardware input device (e.g., 606a) can perform the second operation (e.g., the graphical user interface object provides visual guidance and/or an indication to a user of the computer system that a user input corresponding to the first hardware input device will perform the second operation). While the computer system (e.g., 100, 300, 500, 600, 646, and/or 1300) displays the second user interface (e.g., 612, 622, and/or 636) (e.g., a watch face user interface, a user interface associated with an application of the computer system, and/or a user interface including one or more application user interface objects corresponding to applications of the computer system) and in accordance with a determination that the first hardware input device (e.g., 606a) of the one or more hardware input devices (e.g., 606a, 606b, and/or 606c) is not configured with the second configuration (e.g., the first hardware input device has not been configured (e.g., via user input and/or user selection) to perform the second operation via a second type of user input) that enables the first hardware input device (e.g., 606a) to perform the second operation (e.g., an operation (e.g., a user selected operation) associated with an application of the computer system (and, optionally, an application that is associated with the second user interface)), the computer system (e.g., 100, 300, 500, 600, 646, and/or 1300) forgoes displaying the second graphical user interface object (e.g., 618, 618b, 620a, 626, 626a, 630, and/or 638) indicating that the first hardware input device (e.g., 606a) can perform the second operation (e.g., maintaining display of the second user interface without displaying the second graphical user interface object). In some embodiments, the first hardware input device includes a first color that is different from a second color of the housing of the computer system.

Displaying the second graphical user interface object in accordance with a determination that the first hardware input device is configured with the second configuration and forgoing displaying the second graphical user interface object in accordance with a determination that the first hardware input device is not configured with the second configuration provides a user of the computer system with an indication of whether or not the second operation can be performed at a particular time via user input selecting the first hardware input device, thereby providing improved visual feedback to the user.

In some embodiments, the first user interface (e.g., 616, 622, and/or 636) and the second user interface (e.g., 616, 622, and/or 636) are the same user interface (e.g., the computer system is configured to perform different operations (e.g., both the first operation and the second operation) based on user input corresponding to the first hardware input device while displaying the same user interface interface). Enabling the first hardware input device to cause the computer system to perform different operations while the same user interface is displayed allows a user to quickly perform the different operations without requiring further user inputs directed to the user interface, thereby reducing the number of inputs needed to perform the operation.

In some embodiments, the first user interface (e.g., 616, 622, and/or 636) and the second user interface (e.g., 616, 622, and/or 636) are different user interfaces (e.g., the computer system is configured to perform different operations (e.g., the first operation and the second operation) based on user input corresponding to the first hardware input device while displaying different user interface interfaces). Enabling the first hardware input device to perform different operations while different user interfaces are displayed allows a user to quickly perform a particular operation without requiring further user inputs on the displayed user interface, thereby reducing the number of inputs needed to perform an operation.

In some embodiments, the first user interface (e.g., 616, 622, and/or 636) is associated with a first application (e.g., a first application of the computer system that enables the computer system to perform one or more first functions and/or operations) of the computer system (e.g., 100, 300, 500, 600, 646, and/or 1300) and the second user interface (e.g., 616, 622, and/or 636) is associated with a second application (e.g., a second application of the computer system that enables the computer system to perform one or more second functions and/or operations), different from the first application, of the computer system (e.g., 100, 300, 500, 600, 646, and/or 1300) (e.g., the first hardware input device, when selected via user input, is configured to cause the computer system to perform a first operation when a first user interface of the first application is displayed and the first hardware input device, when selected via user input, is configured to cause the computer system to perform a second operation, different from the first operation, when a second user interface of the second application is displayed).

Enabling the first hardware input device to perform different operations while different user interfaces of different applications are displayed allows a user to quickly perform a particular operation without requiring additional user inputs on the displayed user interface, thereby reducing the number of inputs needed to perform an operation.

In some embodiments, the computer system (e.g., 100, 300, 500, 600, 646, and/or 1300) displaying the graphical user interface object (e.g., 618, 618b, 620a, 626, 626a, 630, and/or 638) indicating that the first hardware input device (e.g., 606a, 606b, and/or 606c) can perform the first operation includes the computer system (e.g., 100, 300, 500, 600, 646, and/or 1300) adjusting an appearance (e.g., 644a and/or

644b) (e.g., a color, a darkness, an opacity, a transparency, a thickness, and/or a size) of a selectable user interface object (e.g., 622a, 622d, and/or 636e) (e.g., a user interface object and/or affordance that, when selected via user input, is configured to cause the computer system to perform a particular operation) of the first user interface (e.g., 616, 622, and/or 636). Adjusting an appearance of the selectable user interface object provides a user with an indication of the first operation that can be performed via selection of the first hardware input device, thereby providing improved visual feedback to the user.

In some embodiments, the computer system (e.g., 100, 300, 500, 600, 646, and/or 1300) adjusting the appearance of the selectable user interface object (e.g., 618, 618b, 620a, 626, 626a, 630, and/or 638) of the first user interface (e.g., 616, 622, and/or 636) includes the computer system (e.g., 100, 300, 500, 600, 646, and/or 1300) displaying an outline (e.g., 628, 632, and/or 640) (e.g., a border and/or edging around the selectable user interface object that includes a thickness and/or a color that is different from a thickness and/or color of the selectable user interface object prior to displaying the graphical user interface object) around at least a portion of (or, optionally all of) the selectable user interface object (e.g., 622a, 622d, and/or 636c). Displaying the outline around the selectable user interface object provides a user with an indication of the first operation that can be performed via selection of the first hardware input device, thereby providing improved visual feedback to the user.

In some embodiments, the graphical user interface object (e.g., 618, 618b, 620a, 626, 626a, 630, and/or 638) indicating that the first hardware input device (e.g., 606a, 606b, and/or 606c) can perform the first operation includes a first color (e.g., yellow, orange, green, and/or another color that is different from a color of a housing of the computer system) and the first hardware input device (e.g., 606a, 606b, and/or 606c) includes the first color (e.g., yellow, orange, green, and/or another color that is different from a color of a housing of the computer system). In some embodiments, the first hardware input device has a color or an accent color that is coordinated with the color of the graphical user interface object indicating the first operation to visually connect the graphical user interface object with the hardware input device. Displaying the graphical user interface object with the same color as the first hardware input device allows a user to associate selection of the first hardware input device with performance the first operation, thereby providing improved visual feedback to the user.

In some embodiments, the graphical user interface object (e.g., 618, 618b, 620a, 626, 626a, 630, and/or 638) indicating that the first hardware input device (e.g., 606a, 606b, and/or 606c) can perform the first operation includes a first color (e.g., yellow, orange, green, and/or another color that is different from a color of a housing of the computer system) that is based on a second color of the first hardware input device (e.g., 606a, 606b, and/or 606c) (e.g., the first color selected based on the second color of the first hardware input device so that the user can associate selection of the first hardware input device with performance of the first operation). Displaying the graphical user interface object with the first color that is based on the second color of the first hardware input device allows a user to associate selection of the first hardware input device with performance the first operation, thereby providing improved visual feedback to the user.

In some embodiments, the graphical user interface object (e.g., 618, 618b, 620a, 626, 626a, 630, and/or 638) indicating that the first hardware input device (e.g., 606a, 606b, and/or 606c) can perform the first operation is displayed at a location (e.g., 614 and/or 634) on the display generation component (e.g., 602, 646a, and/or 1300a) (e.g., a position visible to a user of the computer system) that is proximate to the first hardware input device (e.g., 606a, 606b, and/or 606c) (e.g., a location of the display generation component that is next to, nearby, and/or otherwise close to a physical position (e.g., a position of the first hardware input device with respect to the display generation component) of the first hardware input device, such that the user of the computer system associates selection of the first hardware input device with performance of the first operation). Displaying the graphical user interface object proximate to the first hardware input device allows a user to associate selection of the first hardware input device with performance the first operation, thereby providing improved visual feedback to the user.

In some embodiments, the displayed location (e.g., 614 and/or 634) of the graphical user interface object (e.g., 618, 618b, 620a, 626, 626a, 630, and/or 638) on the display generation component (e.g., 602, 646a, and/or 1300a) is based on an orientation configuration of the computer system (e.g., 100, 300, 500, 600, 646, and/or 1300) (e.g., the computer system is a wearable device (e.g., a smartwatch) and is configured to be worn in different orientations (e.g., left wrist or right wrist) and the location of the graphical user interface object on the displayed generation component is determined based on the orientation configuration (e.g., whether the first hardware input device is on a left side or a right side of the display generation component with respect to a user viewing the display generation component while wearing the computer system)). Displaying the graphical user interface object in a particular location based on the orientation configuration of the computer system allows a user to associate selection of the first hardware input device with performance the first operation regardless of whether the computer system is oriented in a first orientation configuration or a second orientation configuration, thereby providing improved visual feedback to the user.

In some embodiments, while the computer system (e.g., 100, 300, 500, 600, 646, and/or 1300) displays the graphical user interface object (e.g., 618, 618b, 620a, 626, 626a, 630, and/or 638) indicating that the first hardware input device (e.g., 606a, 606b, and/or 606c) can perform the first operation, the computer system (e.g., 100, 300, 500, 600, 646, and/or 1300) receives user input (e.g., 650c and/or 650f) (e.g., a press gesture selecting the first hardware input device) requesting to perform the first operation, where the user input (e.g., 650c and/or 650f) includes multiple presses (e.g., a first press gesture selecting the first hardware input device followed by one or more additional press gestures selecting the first hardware input device (e.g., the one or more additional press gestures selecting the first hardware input device are detected and/or received within a predetermined amount of time from the first press gesture)) of the first hardware input device (e.g., 606a, 606b, and/or 606c). In some embodiments, in response to detecting user input that includes a single press (e.g., one press), the computer system performs a second operation, different from the first operation. In some embodiments, in response to detecting user input that includes a single press (e.g., one press), the computer system forgoes performance of the first operation and/or another operation. In some embodiments, in response to detecting user input that includes a single press (e.g., one press), the computer system ignores the user input. A request to perform the first operation via multiple presses of the first hardware input device allows the first hardware input device to perform multiple, different operations via different user inputs without requiring the user to perform additional user inputs and/or to navigate to different user interfaces, thereby reducing the number of inputs needed to perform an operation.

In some embodiments, while the computer system (e.g., 100, 300, 500, 600, 646, and/or 1300) displays the graphical user interface object (e.g., 618, 618b, 620a, 626, 626a, 630, and/or 638) indicating that the first hardware input device (e.g., 606a, 606b, and/or 606c) can perform the first operation, the computer system (e.g., 100, 300, 500, 600, 646, and/or 1300) receives user input (e.g., 650c and/or 650f) (e.g., a press gesture selecting the first hardware input device) requesting to perform the first operation, where the user input (e.g., 650c and/or 650f) includes a first press input (e.g., a first press input and/or a first press and hold input) corresponding to a second hardware input device) corresponding to a second hardware input device (e.g., 606a, 606b, and/or 606c) that occurs in conjunction with a second press input corresponding to the first hardware input device (e.g., 606a, 606b, and/or 606c) (e.g., within a time threshold before, within a time threshold after, and/or concurrently with the second press input of the first hardware input device). A request to perform the operation via a press of the first hardware input device and a press of the second hardware input device allows the first hardware input device (e.g., alone or together with another hardware input device) to perform multiple, different operations via different user inputs without requiring the user to perform additional user inputs and/or to navigate to different user interfaces, thereby reducing the number of inputs needed to perform an operation.

In some embodiments, the graphical user interface object (e.g., 618, 618b, 620a, 626, 626a, 630, and/or 638) indicating that the first hardware input device (e.g., 606a, 606b, and/or 606c) can perform the first operation includes, in accordance with a determination that a set of one or more use criteria has been met (e.g., the computer system has been in operation since first being turned on and/or associated with a user of the computer system for less than a predetermined amount of time, the first hardware input device has been activated less than a predetermined number of times, and/or the first hardware input device has been configured with the first configuration for less than a predetermined amount of time), an introductory graphical user interface object (e.g., 618) (e.g., a graphical user interface object that includes a first amount of content (e.g., images, icons, symbols, animations, and/or text)) that obscures (e.g., covers, blocks, deemphasizes, and/or is overlaid on) a first amount of a display region (e.g., a portion of the display generation component) displaying the first user interface (e.g., 616). In some embodiments, the graphical user interface object (e.g., 618, 618b, 620a, 626, 626a, 630, and/or 638) indicating that the first hardware input device (e.g., 606a, 606b, and/or 606c) can perform the first operation includes, in accordance with a determination that the set of user criteria has not been met (e.g., the computer system has been in operation since first being turned on and/or associated with a user of the computer system for a time that is equal to or more than the predetermined amount of time, the first hardware input device has been activated a number of times that is equal to or more than the predetermined number of times, and/or the first hardware input device has been configured with the first configuration for a time that is equal to or more than the predetermined amount of time), a non-introductory graphical user interface object (e.g., 620 and/or 620a) (e.g., a graphical user interface object that includes a second amount of content (e.g., images, icons, symbols, animations, and/or text) that is less than the first amount of content) that obscures (e.g., covers, blocks, deemphasizes, and/or is overlaid on) a second amount of the display region (e.g., a portion of the display generation component) displaying the first user interface (e.g., 616), where the second amount is less than the first amount (e.g., the non-introductory graphical user interface object is smaller in size (and, optionally, includes less content) and/or otherwise occupies a smaller portion of the display generation component as compared to the introductory graphical user interface object).

Displaying the graphical user interface object as the introductory graphical user interface object when the set of one or more use criteria has been met and displaying the graphical user interface object as the non-introductory graphical user interface object when the set of one or more use criteria has not been met allows a user to quickly learn the ability of the first hardware input device to cause the first operation, thereby providing improved visual feedback to the user.

In some embodiments, the computer system (e.g., 100, 300, 500, 600, 646, and/or 1300) displaying the introductory graphical user interface object (e.g., 618) includes the computer system (e.g., 100, 300, 500, 600, 646, and/or 1300) deemphasizing an appearance of the first user interface (e.g., 616) (e.g., dimming, fading, hiding, obscuring, and/or blocking at least a portion of the first user interface) and the computer system (e.g., 100, 300, 500, 600, 646, and/or 1300) displaying the non-introductory graphical user interface object (e.g., 620 and/or 620a) does not include the computer system (e.g., 100, 300, 500, 600, 646, and/or 1300) deemphasizing the appearance of the first user interface (e.g., 616) (e.g., displaying the non-introductory graphical user interface object does not dim, fade, hide, obscure, and/or block at least the portion of the first user interface). Deemphasizing the appearance of the first user interface while displaying the introductory graphical user interface object enables a user to better view the introductory graphical user interface object and understand that the first hardware input device causes the computer system to perform the first operation, thereby providing improved visual feedback to the user.

In some embodiments, the introductory graphical user interface object (e.g., 618) includes a first amount of content (e.g., 618a, 618b, and/or 618c) (e.g., visual elements, icons, symbols, animations, and/or text) indicating that the first hardware input device (e.g., 606a, 606b, and/or 606c) can perform the first operation (e.g., providing guidance and/or hints to the user of the computer system that user input selecting the first hardware input device causes the computer system to perform the first operation) and the non-introductory graphical user interface object (e.g., 620) includes a second amount of content (e.g., 620a) (e.g., visual elements, icons, symbols, animations, and/or text), less than the first amount of content, indicating that the first hardware input device can perform the first operation (e.g., the non-introductory graphical user interface object provides less guidance and/or hints to the user of the computer system that user input selecting the first hardware input device causes the computer system to perform the first operation because the user of the computer system is presumed to be familiar with the ability of the first hardware input device to cause the first operation). The introductory graphical user interface object including the first amount of content enables a user to better understand that the first hardware input device causes the computer system to perform the first operation, thereby providing improved visual feedback to the user. The non-introductory graphical user interface object including the second amount of content enables the user to still understand that the first hardware input device causes the computer system to perform the first operation without requiring additional information to be displayed, thereby reducing an amount of battery usage of the computer system.

In some embodiments, the computer system (e.g., 100, 300, 500, 600, 646, and/or 1300) displaying the introductory graphical user interface object (e.g., 618) includes the computer system (e.g., 100, 300, 500, 600, 646, and/or 1300) displaying a time-varying animation of the introductory graphical user interface object (e.g., 618) (e.g., movement (e.g., back and forth movement), pulsing (e.g., enlarging and reducing a size of the introductory graphical user interface object), and/or displaying the introductory graphical user interface object as changing in size, shape, opacity, brightness, color, and/or position over time) and the computer system (e.g., 100, 300, 500, 600, 646, and/or 1300) displaying the non-introductory graphical user interface object (e.g., 620 and/or 620a) does not include the computer system (e.g., 100, 300, 500, 600, 646, and/or 1300) displaying a time-varying animation of the non-introductory graphical user interface object (e.g., 620 and/or 620a) (e.g., the non-introductory graphical user interface object is not displayed with movement, pulsing, and/or changes in size, shape, opacity, brightness, and/or position over time). The introductory graphical user interface object including the animation enables a user to better understand that the first hardware input device causes the computer system to perform the first operation, thereby providing improved visual feedback to the user. The non-introductory graphical user interface object not including the animation enables the user to still understand that the first hardware input device causes the computer system to perform the first operation without requiring additional processing power of the computer system, thereby reducing an amount of battery usage of the computer system.

In some embodiments, the computer system (e.g., 100, 300, 500, 600, 646, and/or 1300) detecting the occurrence of the condition associated with displaying the first user interface (e.g., 616, 622, and/or 636) includes the computer system (e.g., 100, 300, 500, 600, 646, and/or 1300) detecting a wrist raise gesture (e.g., the computer system is a wearable device (e.g., a smartwatch) that is configured to be worn on a wrist of a user and includes one or more sensors (e.g., one or more accelerometers, gyroscopes, and/or inertial measurement units) that enable the computer system to detect when an orientation of the computer system indicates that the wrist of the user is in a raised position (e.g., the user is positioning the computer system so that the user can view the display generation component and/or otherwise interact with the computer system)). Displaying the first user interface when the computer system detects a wrist raise gesture causes the computer system to display information, such as the graphical user interface object, to the user of the computer system without requiring the user to provide additional user inputs, thereby reducing the number of inputs needed to perform an operation.

In some embodiments, the computer system (e.g., 100, 300, 500, 600, 646, and/or 1300) detecting the occurrence of the condition associated with displaying the first user interface (e.g., 616, 622, and/or 636) includes the computer system (e.g., 100, 300, 500, 600, 646, and/or 1300) detecting that the display generation component (e.g., 602, 646a, and/or 1300a) is in an active state (e.g., the computer system has detected a wrist raise gesture and/or other user input requesting to cause the display generation component to actively display information (e.g., a user interface) and the display generation component is not disabled/off or displaying a low power and/or infrequently updated user interface, such as an always on user interface (e.g., a user interface that is displayed when the computer system operates in a lower power consumption mode and not in a higher power consumption mode, where the overall brightness of the display in the lower power consumption mode is less than an overall brightness of the display in the higher power consumption mode, one or more processors of the computer system are awake for a lower percentage of time in the lower power consumption mode as compared to the higher power consumption mode, the one or more processors wake up less frequently over a duration of time when the computer system is in the lower power consumption mode as compared to the higher power consumption mode, fewer portions of the processors are running when the computer system operates in the lower power consumption mode as compared to the higher power consumption mode, and/or the computer system employs processor power management techniques (e.g., slowing down or turning off a core clock, slowing down or turning off a bus clock, and/or reducing the main computer processing unit voltage) when in the lower power consumption that are not employed in the higher power consumption mode)).

Displaying the first user interface when the computer system detects that the display generation component is in the active state causes the computer system to display information, such as the graphical user interface object, to the user of the computer system without requiring the user to provide additional user inputs, thereby reducing the number of inputs needed to perform an operation.

In some embodiments, the computer system (e.g., 100, 300, 500, 600, 646, and/or 1300) detecting the occurrence of the condition associated with displaying the first user interface (e.g., 616, 622, and/or 636) includes the computer system (e.g., 100, 300, 500, 600, 646, and/or 1300) detecting a user input (e.g., 650*a*, 650*b*, and/or 650*d*) (e.g., one or more user inputs causing the computer system to navigate between user interfaces, such as a swipe gesture, one or more tap gestures, a long tap gesture, a voice command and/or gesture (e.g., a voice command and/or gesture requesting a virtual assistant to perform an operation) and/or a press gesture on one or more of the hardware input devices) requesting to transition from displaying a second user interface (e.g., 604 and/or 616) to displaying the first user interface (e.g., 616, 622, and/or 636) (e.g., requesting to replace display of a previously displayed user interface (e.g., the second user interface) with the first user interface). Displaying the first user interface when the computer system detects a request to transition from the second user interface to the first user interface enables the computer system to display the graphical user interface object without requiring the user to provide additional user inputs, thereby reducing the number of inputs needed to perform an operation.

In some embodiments, displaying, the graphical user interface object (e.g., 618, 618*b*, 620*a*, 626, 626*a*, 630, and/or 638) indicating that the first hardware input device (e.g., 606*a*, 606*b*, and/or 606*c*) can perform the first operation includes animating the graphical user interface object (e.g., 618, 618*b*, 620*a*, 626, 626*a*, 630, and/or 638) to pulse (e.g., repetitively increase and decrease in size, thickness, opacity, transparency, and/or brightness) a predetermined number of times before ceasing to pulse (e.g., the graphical user interface object pulses a predetermined number of times and then is subsequently displayed as a static on the display generation component). Displaying the graphical user interface object with a pulsing animation allows a user to associate selection of the first hardware input device with performance of the first operation, thereby providing improved visual feedback to the user.

In some embodiments, prior to the computer system (e.g., 100, 300, 500, 600, 646, and/or 1300) detecting the occurrence of the condition (e.g., before the displaying the first user interface), the computer system (e.g., 100, 300, 500, 600, 646, and/or 1300) displays (e.g., via the display generation component or a display generation component of a companion computer system that is being used to set up and/or configure the computer system), a second user interface (e.g., 648, 656, and/or 658) for configuring the first hardware input device (e.g., 606*a*, 606*b*, and/or 606*c*) with the first configuration (e.g., a settings user interface and/or a setup user interface for configuring the first hardware input device and/or other features and/or components of the computer system), where the second user interface (e.g., 648, 656, and/or 658) includes a plurality of selectable application types (e.g., 654*a*-654*c*) (e.g., user interface objects corresponding to categories of applications and/or functions that the computer system is configured to perform). In some embodiments, the companion computer system (e.g., 646) includes an external computer system that is separate from and/or different from computer system (e.g., 600), an external computer system that is in communication with (e.g., paired to) computer system (e.g., 600), and/or an external computer system that is able to receive one or more user inputs associated with a configuration and/or configuration settings of computer system and provide (e.g., transmit) information associated with the configuration and/or configuration settings of computer system to computer system (e.g., 600).

In some embodiments, while the computer system (e.g., 100, 300, 500, 600, 646, and/or 1300) displays the second user interface (e.g., 648, 656, and/or 658) for configuring the first hardware input device (e.g., 606*a*, 606*b*, and/or 606*c*) with the first configuration, the computer system (e.g., 100, 300, 500, 600, 646, and/or 1300) receives first information corresponding to selection of a first selectable application type (e.g., 654*a*-654*c*) of the plurality of selectable application types (e.g., 654*a*-654*c*) (e.g., first information that includes computer system and/or the companion computer system detecting first user input (e.g., a tap gesture) selecting the first selectable application type). In some embodiments, the first information corresponding to selection of the first selectable application type of the plurality of selectable application types is received via user inputs detected by computer system (e.g., 600) (e.g., the computer system displays the second user interface for configuring the first hardware input device with the first configuration and the computer system detects user input selecting the first selectable application type). In some embodiments, the companion computer system (e.g., 646) displays the second user interface for configuring the first hardware input device with the first configuration and the companion computer system (e.g., 646) detects user input selecting the first selectable application type and provides the information corresponding to selection of the first selectable application type to the computer system (e.g., 600).

In some embodiments, in response to the computer system (e.g., 100, 300, 500, 600, 646, and/or 1300) receiving the first information corresponding to selection of the first selectable application type (e.g., 654*a*-654*c*), the computer system (e.g., 100, 300, 500, 600, 646, and/or 1300) displays (e.g., via the display generation component or a display generation component of the companion computer system that is being used to set up and/or configure the computer system), one or more applications (e.g., 656a and/or 656b) corresponding to the first selectable application type (e.g., 654a-654c) (e.g., user interface objects corresponding to applications of the computer system that fall within the category of the first selectable application type and/or otherwise are configured to perform a function that is associated with the first selectable application type).

In some embodiments, the computer system (e.g., 100, 300, 500, 600, 646, and/or 1300) receives second information (e.g., second information that includes the computer system and/or the companion computer system detecting second user input (e.g., a tap gesture) selecting the first application) corresponding to selection of a first application (e.g., 656a and/or 656b) of the one or more applications (e.g., 656a and/or 656b) corresponding to the first selectable application type (e.g., 654a-654c) (e.g., user interface objects corresponding to applications of the computer system that fall within the category of the first selectable application type and/or otherwise are configured to perform a function that is associated with the first selectable application type). In some embodiments, the second information corresponding to selection of the first application of the one or more applications corresponding to the first selectable application type is received via user inputs detected by computer system (e.g., 600) (e.g., the computer system displays the one or applications corresponding to the first selectable application type and detects user input corresponding to the first application). In some embodiments, the second information corresponding to selection of the first application of the one or more applications corresponding to the first selectable application type is received by computer system (e.g., 600) from a companion computer system (e.g., 646) (e.g., the companion computer system displays the one or more applications corresponding to the first selectable application type and detects user input selecting the first application and provides the information corresponding to selection of the first application to the computer system).

In some embodiments, in response to the computer system (e.g., 100, 300, 500, 600, 646, and/or 1300) receiving the second information corresponding to selection of the first application (e.g., 656a and/or 656b) of the one or more applications (e.g., 656a and/or 656b) corresponding to the first selectable application type (e.g., 654a-654c), the computer system (e.g., 100, 300, 500, 600, 646, and/or 1300) displays (e.g., via the display generation component and/or a display generation component of the companion computer system that is being used to set up and/or configure the computer system) one or more selectable options (e.g., 658c-658e) (e.g., functions and/or actions that the first application is configured to (e.g., via one or more user inputs) cause the computer system to perform) for associating an operation with the first hardware input device (e.g., 606a, 606b, and/or 606c).

In some embodiments, the computer system (e.g., 100, 300, 500, 600, 646, and/or 1300) receives third information corresponding to selection of a first selectable option (e.g., 658c-658c) of the one or more selectable options (e.g., 658c-658c) that corresponds to the first operation (e.g., the first selectable option corresponds to the first operation and the computer system associates the first selectable option with the first hardware input device, such that activation of the first hardware input device is configured to cause the computer system to perform the first operation). In some embodiments, the third information corresponding to selection of the first selectable option of the one or more selectable options that corresponds to the first operation is received via user inputs detected by computer system (e.g., 600) (e.g., the computer system displays the one or more selectable options and detects user input selecting the first selectable option). In some embodiments, the third information corresponding to selection of the first selectable option of the one or more selectable options that corresponds to the first operation is received by computer system from a companion computer system (e.g., 646) (e.g., the companion computer system displays the one or more selectable options and detects user input selecting the first selectable option and provides the information corresponding to selection of the first selectable option to the computer system).

Enabling user selection of the first operation enables a user to customize an operation that is performed when the first hardware input device is activated, thereby providing additional control options without cluttering the user interface with additional displayed controls.

In some embodiments, in response to the computer system (e.g., 100, 300, 500, 600, 646, and/or 1300) receiving the first information corresponding to selection of the first selectable application type (e.g., 654a-654c) and in accordance with a determination that the first selectable application type (e.g., 654a-654c) does not include more than one application (e.g., 656a and/or 656b) (e.g., the computer system includes only one application that is associated with a category of the first selectable application type and/or the computer system includes only one application that is configured to perform a function that is associated with the first selectable application type), the computer system (e.g., 100, 300, 500, 600, 646, and/or 1300) forgoes displaying the one or more applications (e.g., 656a and/or 656b) corresponding to the first selectable application type (e.g., 654a-654c) (e.g., the computer system and/or the companion computer system does not display the one or more applications corresponding to the first selectable application type and instead displays the one or more selectable options for associating an operation with the first hardware input device). Forgoing receiving the second information corresponding to selection of the first application of the one or more applications corresponding to the first selectable application type when the first selectable application type does not include more than one application enables a user to quickly associate an operation with the first hardware input device without requiring additional user inputs, thereby reducing the number of user inputs needed to perform an operation.

In some embodiments, during a setup process for configuring the first hardware input device (e.g., 606a, 606b, and/or 606c) (e.g., a process for configuring one or more features, settings, and/or other configurations of the computer system, such as an initial setup process that is initiated when the computer system is first turned on and/or a setup process that is initiated in response to one or more user inputs (e.g., a user input selecting the first hardware input device and/or a user input requesting to navigate to a settings user interface associated with the first hardware input device)), the computer system (e.g., 100, 300, 500, 600 646, and/or 1300) displays (e.g., via the display generation component or a display generation component of a companion computer system that is being used to set up the computer system) a third user interface (e.g., 658) (e.g., a settings user interface associated with the first hardware input device that enables user selection of one or more features, functions, and/or actions to be associated with the first hardware input device) including a plurality of selectable options (e.g., 658a-658c) (e.g., user interface objects corresponding to respective application types, applications, operations, user input types, and/or other configuration options for the first hardware input device) for configuring the first hardware input device (e.g., 606a, 606b, and/or 606c) to perform respective operations (e.g., multiple operations that are performed by the computer system when different user inputs corresponding to the first hardware input device are detected) via different user inputs (e.g., a single press of the first hardware input device, a multi-press of the first hardware input device, a long press of the first hardware input device, and/or a press of the first hardware input device and a press of another hardware input device (e.g., concurrent presses and/or sequential presses)). In some embodiments, the third user interface (e.g., 658) is displayed via the first display generation component (e.g., 602) of the computer system (e.g., 600), such that the computer system (e.g., 600) is configured to receive and/or detect one or more user inputs that configure the first hardware input device (e.g., 606a, 606b, and/or 606c). In some embodiments, the third user interface (e.g., 658) is displayed via a display generation component (e.g., 646a) of a companion computer system (e.g., 646) (e.g., an external computer system that is separate from and/or different from computer system, an external computer system that is in communication with (e.g., paired to) computer system, and/or an external computer system that is able to receive one or more user inputs associated with a configuration and/or configuration settings of computer system), such that the companion computer system is configured to receive and/or detect one or more user inputs and provide (e.g., transmit) information about a configuration of the first hardware input device to the computer system.

Enabling the first hardware input device to cause the computer system to perform different operations based on different types of user input allows a user to cause the operations to be performed without having to navigate to different user interfaces and/or providing additional user inputs, thereby reducing the number of user inputs needed to perform an operation.

In some embodiments, the setup process occurs when the computer system (e.g., 100, 300, 500, 600, 646, and/or 1300) is first configured (e.g., when the device is first turned on or connected to a companion computer system) (e.g., the setup process is part of an initial setup process for the computer system that enables a user to select and/or configure settings, functions, and/or operations of the computer system (e.g., prior to the user being able to use the computer system in a normal mode of operation)). Displaying the third user interface when the computer system is first turned on allows the user to quickly associate one or more operations with the first hardware input device without having to navigate to additional settings user interfaces, thereby reducing the number of user inputs needed to perform an operation.

In some embodiments, the setup process occurs in response to the computer system (e.g., 100, 300, 500, 600, 646, and/or 1300) detecting user input (e.g., a press gesture) corresponding to the first hardware input device (e.g., 606a, 606b, and/or 606c) prior to the first hardware input device (e.g., 606a, 606b, and/or 606c) being configured with the first configuration (e.g., an operation of the computer system has not been associated with the first hardware input device, such that in response to detecting user input corresponding to the first hardware input device, the computer system displays the third user interface enabling the user to select an operation to associate with the first hardware input device). Displaying the third user interface in response to detecting user input corresponding to the first hardware input device prior to the first hardware input device being configured with the first configuration allows a user to associate an operation with the first hardware input device without having to navigate to another user interface, thereby reducing the number of user inputs needed to perform an operation.

In some embodiments, the computer system (e.g., 100, 300, 500, 600, 646, and/or 1300) detects fourth user input (e.g., 650c and/or 650f) (e.g., a single press of the first hardware input device, a multi-press of the first hardware input device, a long press of the first hardware input device, and/or a press of the first hardware input device and a press of another hardware input device (e.g., concurrent presses and/or sequential presses)) corresponding to the first hardware input device (e.g., 606a, 606b, and/or 606c), and, in response to the computer system (e.g., 100, 300, 500, 600, 646, and/or 1300) detecting the fourth user input (e.g., 650c and/or 650f), the computer system (e.g., 100, 300, 500, 600, 646, and/or 1300) performs the first operation (e.g., the computer system performs the operation associated with the first hardware input device and/or the fourth user input). Performing the first operation in response to the fourth user input allows a user to cause the computer system to perform the first operation without having to provide additional user inputs navigating to a particular application and/or user interface associated with the first operation, thereby reducing the number of user inputs needed to perform an operation.

In some embodiments, the fourth user input (e.g., 650c and/or 650f) is received while the computer system (e.g., 100, 300, 500, 600, 646, and/or 1300) is not displaying the first user interface (e.g., 616, 622, and/or 636) (e.g., the computer system is configured to perform the first operation in response to detecting the fourth user input even when the computer system is not displaying the first user interface). Performing the first operation in response to the fourth user input while the computer system is not displaying the first user interface allows a user to cause the computer system to perform the first operation without having to provide additional user inputs navigating to a particular application and/or user interface associated with the first operation, thereby reducing the number of user inputs needed to perform an operation.

In some embodiments, in response to the computer system (e.g., 100, 300, 500, 600, 646, and/or 1300) detecting the fourth user input (e.g., 650c and/or 650f) corresponding to the first hardware input device (e.g., 606a, 606b, and/or 606c), the computer system (e.g., 100, 300, 500, 600, 646, and/or 1300) displays, via the display generation component (e.g., 602, 646a, and/or 1300a), a visual indication (e.g., 612, 612b, 620a, 638a and/or 638b) (e.g., a visual element and/or graphical user interface object that is displayed (e.g., overlaid on a currently displayed user interface) at a location proximate to the first hardware input device to provide confirmation that the fourth user input has been detected and/or that the fourth user input is causing the computer system to perform the first operation) indicative of the computer system (e.g., 100, 300, 500, 600, 646, and/or 1300) performing the first operation. Displaying the visual indication in response to detecting the fourth user input provides a user of the computer system with confirmation that the fourth user input is causing the computer system to perform the first operation, thereby providing improved visual feedback to the user.

In some embodiments, the visual indication (e.g., 612, 612b, 620a, 638a, and/or 638b) includes a first color (e.g., yellow, orange, green, and/or another color that is different from a color of a housing of the computer system) and the first hardware input device (e.g., 606a, 606b, and/or 606c)

includes the first color (e.g., yellow, orange, green, and/or another color that is different from a color of a housing of the computer system). Displaying the visual indication with the same color as the first hardware input device allows a user to confirm that the fourth user input corresponding to the first hardware input device caused the computer system to perform the first operation, thereby providing improved visual feedback to the user.

In some embodiments, the visual indication (e.g., 612, 612*b*, 620*a*, 638*a*, and/or 638*b*) includes a first color (e.g., yellow, orange, green, and/or another color that is different from a color of a housing of the computer system) that is based on a second color of the first hardware input device (e.g., 606*a*, 606*b*, and/or 606*c*) (e.g., the first color selected based on the second color of the first hardware input device so that the user can associate selection of the first hardware input device with performance of the first operation). Displaying the visual indication with the first color that is based on the second color of the first hardware input device allows a user to confirm that the fourth user input corresponding to the first hardware input device caused the computer system to perform the first operation, thereby providing improved visual feedback to the user.

In some embodiments, the visual indication (e.g., 612, 612*b*, 620*a*, 638*a*, and/or 638*b*) includes text (e.g., 612*a*) and/or a second graphical user interface object indicative (e.g., 612*a*) of the first operation (e.g., the visual indication includes information that confirms that the fourth user input corresponding to the first hardware input device caused and/or is causing the computer system to perform the first operation). Displaying the visual indication with the text and/or the second graphical user interface object allows a user to confirm that the fourth user input corresponding to the first hardware input device caused the computer system to perform the first operation, thereby providing improved visual feedback to the user.

In some embodiments, in accordance with a determination that the fourth user input (e.g., 650*c* and/or 650*f*) corresponds to the first hardware input device (e.g., 606*a*, 606*b*, and/or 606*c*) (e.g., the fourth user input includes user input directed to only the first hardware input device), the visual indication (e.g., 612, 612*b* 620*a*, 638*a*, and/or 638*b*) includes a first appearance (e.g., 620*a*) (e.g., the visual indication is entirely displayed at a first location on the display generation component that is proximate to and/or associated with the first hardware input device). In accordance with a determination that the fourth user input (e.g., 650*c* and/or 650*f*) corresponds to the first hardware input device (e.g., 606*a*, 606*b*, and/or 606*c*) and a second hardware input device (e.g., 606*a*, 606*b*, and/or 606*c*) (e.g., the fourth user input includes a first portion (e.g., a first press) corresponding to the first hardware input device and a second portion (e.g., a second press) corresponding to the second hardware input device, where the first portion and the second portion are detected concurrently (e.g., at the same time) and/or sequentially (e.g., with a predefined amount of time from one another)), the visual indication (e.g., 612, 612*b*, 620*a*, 638*a*, and/or 638*b*) includes a second appearance (e.g., 638*a* and/or 638*b*) (e.g., the visual indication includes a first portion displayed at a first location on the display generation component that is proximate to and/or associated with the first hardware input device and a second portion displayed at a second location on the display generation component that is proximate to and/or associated with the second hardware input device), different from the first appearance.

Displaying the visual indication with the first appearance or the second appearance based on whether the fourth user input corresponds to the first hardware input device or the first hardware input device and the second hardware input device allows a user to confirm that the fourth user input caused the computer system to perform the first operation, thereby providing improved visual feedback to the user.

In some embodiments, after the computer system (e.g., 100, 300, 500, 600, 646, and/or 1300) displays the graphical user interface object (e.g., 618, 618*b*, 620*a*, 626, 626*a*, 630, and/or 638) indicating that the first hardware input device (e.g., 606*a*, 606*b*, and/or 606*c*) can perform the first operation (e.g., before detecting user input corresponding to the first hardware input device that causes the computer system to perform the first operation) and in accordance with a determination that the first hardware input device (e.g., 606*a*, 606*b*, and/or 606*c*) is configured with a third configuration (e.g., the first hardware input device has been configured (e.g., via user input and/or user selection) to perform the third operation via a third type of user input (e.g., a press input on both the first hardware input device and the second hardware input device (e.g., concurrent press inputs and/or sequential press inputs))) that enables the first hardware input device (e.g., 606*a*, 606*b*, and/or 606*c*) and a second hardware input device (e.g., 606*a*, 606*b*, and/or 606*c*) to perform a third operation (e.g., an operation (e.g., a user selected operation) associated with an application of the computer system (and, optionally, an application associated with the first user interface) that is performed in response to user input corresponding to both the first hardware input device and the second hardware input device), the computer system (e.g., 100, 300, 500, 600, 646, and/or 1300) displays, via the display generation component (e.g., 602, 646*a*, and/or 1300*a*), a third graphical user interface object (e.g., 630 and/or 638) (e.g., text, a user interface object, a user interface object including a first color that is the same as the first color as the first hardware input device, and/or one or more user interface objects indicative of the third operation, indicative of the application, and/or indicative of the user input that causes the computer system to perform the third operation) indicating that the first hardware input device (e.g., 606*a*, 606*b*, and/or 606*c*) and the second hardware input device (e.g., 606*a*, 606*b*, and/or 606*c*) can perform the third operation (e.g., the third graphical user interface object provides visual guidance and/or an indication to a user of the computer system that a user input corresponding to both the first hardware input device and the second hardware input device will perform the third operation).

In some embodiments, after the computer system (e.g., 100, 300, 500, 600, 646, and/or 1300) displays the graphical user interface object (e.g., 618, 618*b*, 620*a*, 626, 626*a*, 630, and/or 638) indicating that the first hardware input device (e.g., 606*a*, 606*b*, and/or 606*c*) can perform the first operation (e.g., before detecting user input corresponding to the first hardware input device that causes the computer system to perform the first operation) and in accordance with a determination that the first hardware input device (e.g., 606*a*, 606*b*, and/or 606*c*) is not configured with the third configuration (e.g., the first hardware input device has not been configured (e.g., via user input and/or user selection) to perform the third operation via a third type of user input) that enables the first hardware input device (e.g., 606*a*, 606*b*, and/or 606*c*) and the second hardware input device (e.g., 606*a*, 606*b*, and/or 606*c*) to perform the third operation (e.g., an operation (e.g., a user selected operation) associated with an application of the computer system (and, optionally, an application that is associated with the first user interface)), the computer system (e.g., 100, 300, 500, 600, 646, and/or 1300) forgoes displaying the third graphical user interface object (e.g., 630 and/or 638) indicating that the first hardware input device (e.g., 606a, 606b, and/or 606c) and the second hardware input device (e.g., 606a, 606b, and/or 606c) can perform the third operation (e.g., maintaining display of the first user interface without displaying the third graphical user interface object).

Displaying the third graphical user interface object in accordance with a determination that the first hardware input device is configured with the third configuration and forgoing displaying the third graphical user interface object in accordance with a determination that the first hardware input device is not configured with the third configuration provides a user of the computer system with an indication of whether or not the third operation can be performed at a particular time via user input selecting both the first hardware input device and the second hardware input device, thereby providing improved visual feedback to the user.

Note that details of the processes described above with respect to method 700 (e.g., FIG. 7) are also applicable in an analogous manner to the methods described below. For example, methods 900, 1000, 1200, and 1400 optionally includes one or more of the characteristics of the various methods described above with reference to method 700. For example, a computer system that is configured to perform method 700 is also configured to perform a first operation, adjust audio output of an emergency operation, display notifications, and/or perform an operation when in a low power mode of operation. For brevity, these details are not repeated below.

FIGS. 8A-8W illustrate exemplary user interfaces for performing a first operation and/or an emergency operation, in accordance with some embodiments. The user interfaces in these figures are used to illustrate the processes described below, including the processes in FIGS. 9 and 10.

In some embodiments, any of the inputs described herein (e.g., input 850a, 850b, 850c, 850d, 850c, 850f, and/or 850g) is or includes a touch input (e.g., a tap gesture and/or a swipe gesture). In some embodiments, any of the inputs described herein (e.g., input 850a, 850b, 850c, 850d, 850c, 850f, and/or 850g) is or includes a voice input (e.g., a voice command to select a user interface element or to activate a feature or perform a function, such as a feature or function associated with a user interface element). In some embodiments, any of the inputs described herein (e.g., input 850a, 850b, 850c, 850d, 850c, 850f, and/or 850g) is or includes an air gesture (e.g., an air gesture to select a user interface element or to activate a feature or perform a function, such as a feature or function associated with a user interface element). In some embodiments, any of the inputs described herein (e.g., input 850a, 850b, 850c, 850d, 850c, 850f, and/or 850g) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

FIG. 8A illustrates computer system 600 displaying, via display device 602, watch face user interface 604. At FIG. 8A, computer system 600 includes first hardware input device 606a, second hardware input device 606b, and third hardware input device 606c in addition to display device 602. As set forth above with reference to FIGS. 6A-6O, first hardware input device 606a is user-configurable, such that user input corresponding to first hardware input device 606a causes computer system 600 to perform a user-selected operation. As set forth below, first hardware input device 606a is also configured to cause computer system 600 to perform a predetermined operation (e.g., a non-user selected and/or non-user configured operation) in response to a predetermined type of input (e.g., a press and hold gesture or other selection/navigation input).

At FIG. 8A, watch face user interface 604 includes user interface objects 608a-608h as well as time indicator 610 (e.g., an analog indication of time). In response to detecting user input corresponding to a respective user interface object of user interface objects 608a-608h, computer system 600 is configured to display a user interface associated with a respective application that corresponds to the selected user interface object. In some embodiments, watch face user interface 604 is a home and/or default user interface that is displayed by computer system 600 absent user input requesting to navigate to a particular application of computer system 600.

At FIG. 8A, computer system 600 detects user input 850a (e.g., a single press gesture or other selection/navigation input) corresponding to first hardware input device 606a. As set forth above with references to FIGS. 6A-6O, first hardware input device 606a is user-configurable, such that a user of computer system 600 can select and/or otherwise configure first hardware input device 606a to cause computer system 600 to perform a predetermined operation in response to user input. At FIG. 8A, the predetermined operation in which user input 850a corresponding to first hardware input device 606a causes computer system 600 to perform is initiation of a workout routine, such as an outdoor run.

In response to detecting user input 850a, computer system 600 initiates a process for starting the workout routine, as shown at FIG. 8B. At FIG. 8B, computer system 600 displays, via display device 602, indication 612 overlaid on watch face user interface 604. For example, computer system 600 displays indication 612 to appear as if indication 612 is on top of watch face user interface 604 and at least a portion of watch face user interface 604 is displayed and/or otherwise visible (e.g., indication 612 includes an amount of transparency enabling computer system 600 to display both indication 612 and at least a portion of watch face user interface 604). In addition, computer system 600 obscures, deemphasizes, blurs, and/or reduces a size of watch face user interface 604 to better focus an attention of a user of computer system 600 to indication 612 (e.g., instead of watch face user interface 604). In some embodiments, computer system 600 replaces display of watch face user interface 604 with display of indication 612, such that watch face user interface 604 is not displayed and/or visible when computer system 600 displays indication 612.

At FIG. 8B, indication 612 includes operation indicator 612a and input indicator 612b. Operation indicator 612a provides a visual indication of the predetermined operation configured to be initiated and/or performed by computer system 600 in response to detecting user input 850a. At FIG. 8B, indication includes a symbol and/or icon associated with the predetermined operation (e.g., an outdoor run workout routine), as well as text indicating the predetermined operation (e.g., "OUTDOOR RUN"). Input indicator 612b provides visual confirmation that user input 850a was detected by computer system 600 and that indication 612 corresponds to the predetermined operation that computer system 600 is configured to initiate in response to detecting user input 850a. For instance, input indicator 612b is displayed at location 614 on display device 602 that is next to, near, close to, and/or proximate to a position of first hardware input device 606a (e.g., with respect to display device 602). Input indicator 612b also includes a size (e.g., a length and/or height) that is approximate to a size (e.g., a length and/or height) of first hardware input device 606a to further provide confirmation of detection of user input 850a.

At FIG. 8B, indication 612 includes background 612c that has a first color (e.g., as indicated by first shading at FIG. 8B) that is associated with the predetermined operation. For example, in some embodiments, the first color is based on an application that is associated with the predetermined operation and/or an application that enables computer system 600 to perform the predetermined operation. In some embodiments, the first color is based on a color of first hardware input device 606a (e.g., includes a first shade of a color of first hardware input device 606a). Input indicator 612b includes a second color (e.g., as indicated by second shading at FIG. 8B) that is associated with the predetermined operation and/or associated with first hardware input device 606a (e.g., corresponding to and/or based on a color of first hardware input device 606a). In some embodiments, background 612c includes a first shade of a color of first hardware input device 606a and input indicator 612b includes a second shade of the color of first hardware input device 606a.

At FIG. 8B, computer system 600 displays indication 612 in response to detecting user input 850a. In response to detecting user input 850a and in response to detecting an end of user input 850a (e.g., release of a press on first hardware input device 606a) while displaying indication 612, computer system 600 displays workout user interface 616, as shown at FIG. 8C. In some embodiments, computer system 600 is configured to continue displaying indication 612 for a predetermined period of time (e.g., 2 seconds, 3 seconds, or 5 seconds) after detecting the end of user input 850a before transitioning to displaying workout user interface 616.

When computer system 600 continues to detect user input 850a while displaying indication 612 and does not detect the end of user input 850a for a predetermined period of time (e.g., 2 seconds, 3 seconds, or 5 seconds) after displaying indication 612, computer system 600 displays emergency indication 800, as shown at FIG. 8D. In other words, when computer system 600 continues to detect user input 850a for the predetermined period of time while displaying indication 612, computer system 600 displays emergency indication 800 indicating to a user that maintaining user input 850a causes computer system 600 to perform an emergency operation. In some embodiments, computer system 600 displays a transition animation between displaying indication 612 and displaying emergency indication 800. For instance, in some embodiments, in response to continuing to detect user input 850a, computer system 600 displays indication 612 moving and/or sliding off display device 602 of computer system 600 and displays emergency indication moving and/or sliding onto display device 602 of computer system 600. In some such embodiments, computer system 600 concurrently displays a first portion of indication 612 (e.g., as indication 612 slides off of display device 602) and a second portion of emergency indication 800 (e.g., as emergency indication 800 slides onto display device 602).

At FIG. 8D, emergency indication 800 replaces display of indication 612 (and, optionally, watch user interface 604).

Emergency indication 800 includes operation indicator 802, continue holding indicator 804, input indicator 806, and emergency user interface objects 808a-808c. Operation indicator 802 includes symbol 802a and text 802b (e.g., "EMERGENCY SIREN") indicative of an operation (e.g., an emergency siren) configured to be performed by computer system 600 in response to continued user input 850a corresponding to first hardware input device 606a. Continue holding indicator 804 (e.g., "CONTINUE HOLDING") provides visual guidance to a user of computer system 600 that computer system 600 performs the operation when user input 850a is maintained on first hardware input device 606a. Input indicator 806 provides visual confirmation that computer system 600 detects (e.g., continues to detect) user input 850a corresponding to first hardware input device 606a. For instance, input indicator 806 is displayed at location 614 on display device 602 that is next to, near, close to, and/or proximate to a position of first hardware input device 606a (e.g., with respect to display device 602). Input indicator 806 also includes a size (e.g., a length and/or height) that is approximate to a size (e.g., a length and/or height) of first hardware input device 606a. Input indicator 806 includes a color (e.g., red) associated with the operation configured to be performed by computer system 600 in response to detecting continued user input 850a on first hardware input device 606a. In some embodiments, the color of input indicator 806 is not associated with and/or based on a color of first hardware input device 606a.

Emergency user interface objects 808a-808c are configured to, when selected and/or otherwise interacted with, cause computer system 600 to perform respective emergency operations, such as display medical identification information of a user, initiate an emergency siren, and/or initiate an emergency phone call. In some embodiments, while displaying emergency indication 800, computer system 600 maintains display of emergency indication 800 (e.g., without continue holding indicator 804 and/or input indicator 806) in response to detecting an end (e.g., a release of) user input 850a corresponding to first hardware input device 606a, as shown at FIG. 8H. In some embodiments, computer system 600 is configured to detect user inputs (e.g., tap gestures, swipe gestures, or other selection/navigation inputs) corresponding to emergency user interface objects 808a-808c while user input 850a is maintained (and computer system 600 displays emergency indication 800).

At FIG. 8E, computer system 600 displays emergency indication 800 with background 800a. In some embodiments, computer system 600 displays emergency indication 800 with background 800a when first displaying emergency indication 800 (e.g., when computer system 600 transitions from displaying indication 612 to emergency indication 800). In some embodiments, computer system 600 displays emergency indication 800 with background 800a after displaying emergency indication 800 for a predetermined amount of time (e.g., 1 second or 2 seconds). In some embodiments, background 800a that has a fourth color (e.g., as indicated by third shading at FIG. 8E) that is associated with the emergency operation. For example, in some embodiments, the fourth color is based on an emergency application that is associated with the emergency operation and/or an application that enables computer system 600 to perform the emergency operation. In some embodiments, the fourth color is not based on a color of first hardware input device 606a. In some embodiments, background 800a includes a first shade of a color of associated with the emergency operation (e.g., a first shade of red) and input indicator 806 includes a second shade of the color of associated with the emergency operation (e.g., a second shade of red).

At FIG. 8F, computer system 600 continues to detect user input 850a corresponding to first hardware input device 606a. In response to continuing to detect user input 850a while displaying emergency indication 800, computer system displays countdown user interface object 810 on emergency indication 800. Countdown user interface object 810 provides a visual indication of a duration for maintaining user input 850a that causes computer system 600 to perform the emergency operation. In some embodiments, in response to continuing to detect user input 850a while displaying emergency indication, 800, computer system 600 is configured to begin outputting audio (e.g., audio 820, audio 830, audio 834, and/or audio 838) while displaying countdown user interface object 810. In some embodiments, when computer system 600 outputs audio while displaying countdown user interface object 810, computer system 600 gradually increases a volume level of the audio as countdown user interface object 810 expires, progresses, and/or elapses.

At FIG. 8F, computer system 600 displays a portion 812 of second emergency user interface object 808b at location 814 within second emergency user interface object 808b to further indicate the duration for maintaining user input 850a to cause computer system 600 to perform the emergency operation. At FIG. 8F, portion 812 includes countdown user interface object 810. In addition, displaying (e.g., moving) portion 812 at location 814 provides an indication of the emergency operation (e.g., an emergency siren operation associated with second emergency user interface object 808b) in which computer system 600 is configured to perform in response to continuing to detect user input 850a. In some embodiments, computer system 600 displays an animation of portion 812 of second emergency user interface object 808b, such that portion 812 moves (e.g., over time) from inactive position 816a to active position 816b within second emergency user interface object 808b. When portion 812 of second emergency user interface object 808b is displayed at active position 816b, computer system 600 is configured to initiate the emergency operation. In some embodiments, computer system 600 displays the animation of portion 812 (e.g., displays portion 812 moving from inactive position 816a to active position 816b) in response to continuing to detect user input 850a corresponding to first hardware input device 606a. In some embodiments, computer system 600 displays the animation of portion 812 (e.g., displays portion 812 moving from inactive position 816a to active position 816b) in response to detecting a swipe and/or slide gesture on portion 812 of second emergency user interface object 808b.

At FIG. 8F, the emergency operation includes an emergency siren operation and computer system 600 is configured to output audio (e.g., via speaker 817) above a threshold volume level (e.g., above 60 decibels, above 70 decibels, above 80 decibels, and/or above 85 decibels) when the emergency siren operation is activated. In some embodiments, computer system 600 is configured to the output audio and/or activate the emergency siren while computer system 600 is not being worn by a user (e.g., computer system 600 is a wearable device, such as a smart watch, and computer system 600 is not being worn on a wrist of user). In some embodiments, computer system 600 is configured to output the audio and/or activate the emergency siren while computer system 600 operates in a restricted mode of operation and/or while displaying a lock screen (e.g., a mode of operation in which computer system 600 requires one or more authentication user inputs before performing one or more operations based on detected user inputs). As such, computer system 600 is configured to initiate the emergency siren operation in order to help a user of computer system 600 obtain assistance in an emergency situation.

At FIG. 8G, computer system 600 initiates the emergency siren operation in response to continuing to detect user input 850a for a predetermined amount of time (e.g., a predetermined amount of time after displaying emergency indication 800 and/or a predetermined amount of time from beginning to detect user input 850a) and/or in response to not detecting an end of user input 850a throughout a period of time corresponding to countdown user interface object 810 (e.g., the end of user input 850a is not detected while countdown user interface object 810 counts down from a predetermined amount of time (e.g., 5 seconds)). In some embodiments, in response to detecting the end of user input 850a before the period of time corresponding to countdown user interface object 810 has elapsed, computer system 600 does not perform the emergency siren (e.g., forgoes output of audio 820) and displays emergency indication 800, as shown at FIG. 8H.

Initiation of the emergency siren operation includes computer system 600 displaying emergency siren user interface 818 and outputting audio 820 corresponding to the emergency siren. As set forth above, audio 820 includes a volume that is above the threshold volume level (e.g., above 60 decibels, above 70 decibels, above 80 decibels, and/or above 85 decibels) to allow a user to request assistance in an emergency situation. In some embodiments, audio 820 is output at a waveform (e.g., volume, frequency, wavelength, tone, and/or pitch) that enables audio 820 to be heard by other people located a predefined distance from computer system (e.g., more than 100 feet, more than 200 feet, more than 300 feet, and/or more than 400 feet). In some embodiments, computer system 600 outputs audio 820 continuously. In some embodiments, computer system 600 outputs audio 820 as audio bursts that occur at intervals of time (e.g., uniform intervals of time and/or dynamic intervals of time that change based on a context of computer system 600 (e.g., a battery charge of computer system 600)). In some embodiments, computer system 600 outputs audio 820 at a volume level, frequency, pitch, and/or tone that is selected to maximize a distance from computer system 600 at which audio 820 is configured to be heard, while minimizing battery usage of computer system 600 (e.g., computer system 600 selects audio properties of audio 820 by determining a maximum distance from computer system 600 that minimizes battery usage of computer system 600).

At FIG. 8G, emergency siren user interface 818 includes time indicator 818a, operation indicator 818b, duration indicator 818c, stop user interface object 818d, and emergency phone call user interface object 818c. Time indicator 818a provides a visual indication (e.g., a digital indication) of a current time of day (e.g., "10:09"). Operation indicator 818b provides a visual indication of the current operation being performed by computer system 600, which is the emergency siren operation. Duration indicator 818c provides a visual indication of an amount of time (e.g., from the current time indicated by time indicator 818a) that computer system 600 is configured to continue performing the emergency siren operation (e.g., before computer system 600 runs out of power and/or battery charge). For instance, at FIG. 8G, duration indicator 818c includes a percentage of battery power and/or charge of computer system 600 remaining (e.g., 75%). Therefore, a user of computer system 600 can estimate and/or otherwise determine an amount of time that computer system 600 can continue to perform the emergency siren operation based on the percentage of battery power and/or charge of computer system 600.

Stop user interface object 818*d* is configured to, when selected, cause computer system 600 to stop and/or pause performance of the emergency siren operation. In some embodiments, in response to detecting user input corresponding to stop user interface object 818*d*, computer system 600 ceases to output audio 820 and displays emergency indication 800, as shown at FIG. 8H. Further, emergency phone call user interface object 818*e* is configured to, when selected and/or otherwise interacted with, cause computer system 600 to initiate an emergency phone call. In some embodiments, computer system 600 pauses output of audio 820 in response to initiation of the emergency phone call and resumes (e.g., automatically without additional user input) output of audio 820 in response to the emergency phone call ending. In some embodiments, the emergency phone call is initiated by computer system 600 as an outgoing phone call to a phone number associated with an emergency service (e.g., 911, a local emergency service center, and/or a hospital). In some embodiments, computer system 600 initiates the emergency phone call in response to detecting a swipe and/or slide gesture on portion 818*f* of emergency phone call user interface object 818*e*.

In addition, emergency siren user interface 818 includes background 819 indicating that the emergency siren operation is being performed by computer system 600 (e.g., computer system 600 is outputting audio 820). In some embodiments, background 819 includes a color (e.g., red) indicative of the emergency siren operation. In some embodiments, computer system 600 displays background 819 with an animation, such that background 819 appears to pulse (e.g., fade in and fade out) over time. At FIG. 8G, background 819 includes border portion 819*a* that is displayed proximate, adjacent, and/or next to edges of display device 602. In some embodiments, border portion 819*a* includes a darker shade of the color than interior portion 819*b* of background 819.

Figures 8I, 8J, 8K, 8L:
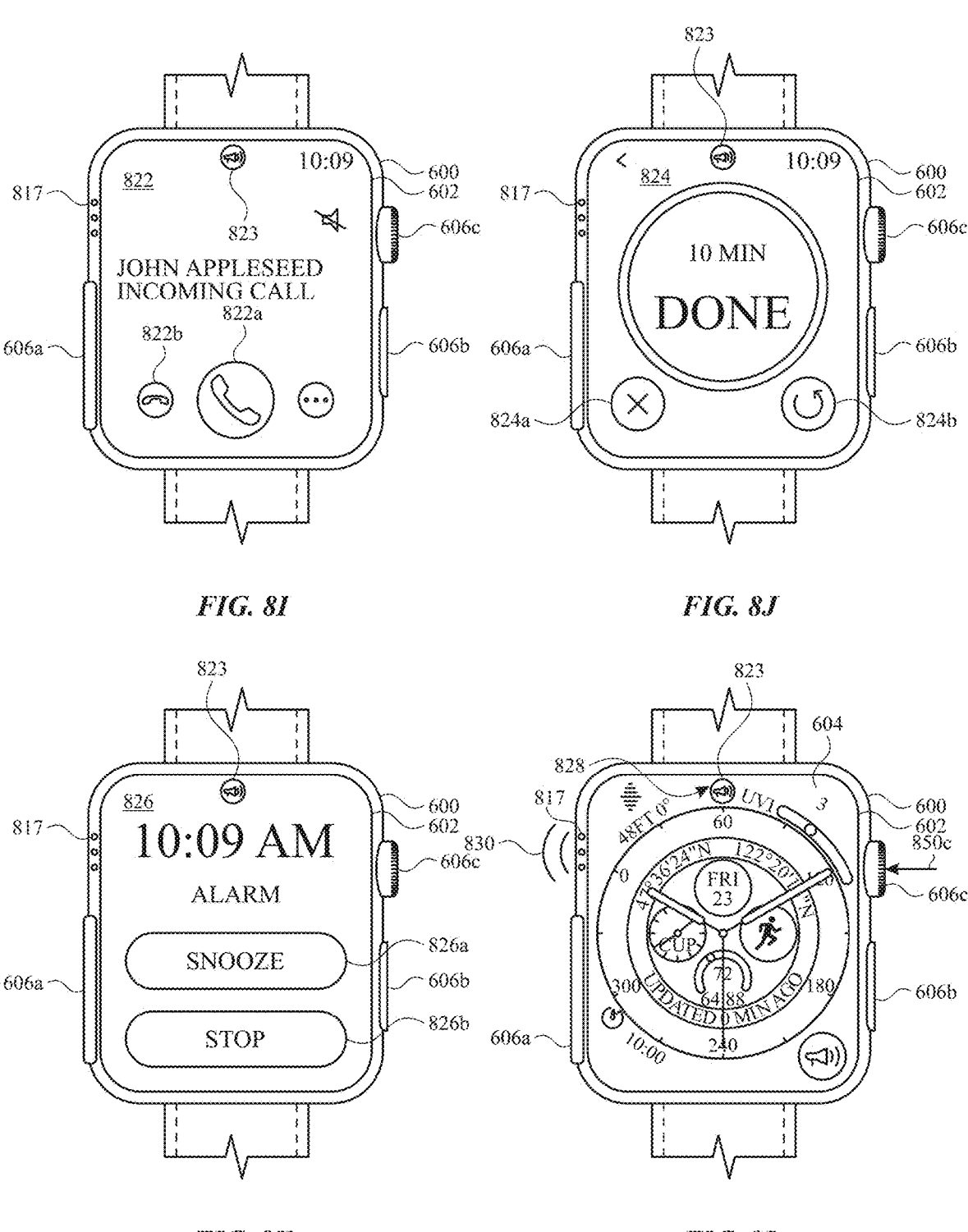
FIGS. 8A-8W illustrate exemplary user interfaces for performing a first operation and/or an emergency operation, in accordance with some embodiments.

At FIG. 8G, computer system 600 detects user input 850*b* (e.g., a press gesture or other selection/navigation input) corresponding to third hardware input device 606*c*. In response to detecting user input 850*b*, computer system 600 displays watch face user interface 604, as shown at FIG. 8L.

In response to detecting the occurrence of one or more predetermined events, computer system 600 is configured to adjust the output of audio 820 (e.g., adjust a property of emergency siren operation). In some embodiments, computer system 600 pauses (e.g., temporarily ceases) output of audio 820 in response to detecting the occurrence of one or more predetermined events of a first type and resumes (e.g., automatically outputs) output of audio 820 in response to detecting an end of the one or more predetermined events of the first type. In some embodiments, computer system 600 adjusts one or more properties of audio 820, such as volume, pitch, tone, frequency, and/or wavelength, in response to detecting the occurrence of one or more predetermined events of a second type. Accordingly, a user of computer system 600 can still use computer system 600 to perform various operations and/or be alerted to time-sensitive events when computer system 600 is performing the emergency siren operation (e.g., outputting audio 820).

For instance, at FIG. 8I, computer system 600 detects the occurrence of an incoming phone call. In some embodiments, computer system 600 detects the occurrence of the incoming phone call based on information received from an external computer system (e.g., external computer system

646). In some embodiments, computer system 600 detects the occurrence of the incoming phone call based on information received from a cellular antenna in communication with computer system 600. At FIG. 8I, computer system 600 ceases to output audio 820 in response to detecting the occurrence of the incoming phone call and displays communication user interface 822. Accordingly, the user of computer system 600 can accept and/or answer the incoming phone call without audio 820 interrupting the communication between the user and another user (e.g., John Appleseed). At FIG. 8I, communication user interface 822 includes emergency siren indicator 823, which provides a visual indication to a user of computer system 600 that the emergency siren operation is paused based on the incoming phone call (and is configured to resume in response to the incoming phone call ending). In some embodiments, in response to detecting user input corresponding emergency siren indicator 823 while displaying communication user interface 822, computer system 600 forgoes initiating the phone, displays emergency siren user interface 818, and/or resumes output of audio 820.

In some embodiments, at FIG. 8I, in response to detecting user input corresponding to accept user interface object 822*a*, computer system 600 initiates the phone call so that user can communicate with the other user. In some embodiments, in response to detecting an end of the phone call, computer system 600 displays emergency siren user interface 818 (e.g., replaces display of communication user interface 822 with emergency siren user interface 818) and resumes output of audio 820. In some embodiments, in response to detecting user input corresponding to ignore user interface object 822*b*, computer system 600 forgoes initiating the phone call and resumes output of audio 820.

At FIG. 8J, computer system 600 detects the occurrence of a timer operation ending and/or expiring. At FIG. 8J, computer system 600 ceases to output audio 820 in response to detecting the occurrence of the timer operation ending and/or expiring and displays timer user interface 824. In some embodiments, computer system 600 outputs audio that is different from audio 820 in response to the timer operation ending and/or expiring. Accordingly, the user of computer system 600 can be alerted and/or informed that the timer operation has ended, which may be of importance to the user. For example, the user of computer system 600 may set and/or initiate the timer operation to prompt the user to perform a particular operation that may assist the user during an emergency situation. At FIG. 8J, timer user interface 824 includes emergency siren indicator 823, which provides a visual indication to a user of computer system 600 that the emergency siren operation is paused based on the expiration of the timer operation (and is configured to resume in response to canceling, silencing, restarting, and/or stopping the timer operation). In some embodiments, in response to detecting user input corresponding to emergency siren indicator 823 while displaying timer user interface 824, computer system 600 silences the timer operation, displays emergency siren user interface 818, and/or resumes output of audio 820.

In some embodiments, in response to detecting user input corresponding to cancel user interface object 824*a*, computer system 600 displays emergency siren user interface 818 (e.g., replaces display of timer user interface 824 with emergency siren user interface 818) and resumes output of audio 820. In some embodiments, in response to detecting user input corresponding to repeat user interface object 824*b*, computer system 600 initiates and/or restarts a timer operation (e.g., sets a ten minute timer) (and, optionally, resumes output of audio 820 and displays emergency siren user interface 818).

At FIG. 8K, computer system 600 detects the occurrence of a triggered alarm operation. In other words, computer system 600 triggers an alarm (e.g., set and/or initiated via user input) when a current time of day reaches a predetermined time corresponding to the alarm. At FIG. 8K, computer system 600 ceases to output audio 820 in response to detecting the occurrence of the alarm operation triggering and displays alarm user interface 826. In some embodiments, computer system 600 outputs audio that is different from audio 820 in response to the alarm operation triggering. Accordingly, the user of computer system 600 can be alerted and/or informed that the alarm operation has triggered, which may be of importance to the user. For example, the user of computer system 600 may set and/or initiate the alarm operation to prompt the user to perform a particular task (e.g., take medication) that may assist the user during an emergency situation. At FIG. 8K, alarm user interface 826 includes emergency siren indicator 823, which provides a visual indication to a user of computer system 600 that the emergency siren operation is paused based on the alarm operation triggering (and is configured to resume in response to canceling, silencing, restarting, and/or stopping the alarm). In some embodiments, in response to detecting user input corresponding emergency siren indicator 823 while displaying alarm user interface 826, computer system 600 silences the alarm, displays emergency siren user interface 818, and/or resumes output of audio 820.

In some embodiments, in response to detecting user input corresponding to snooze user interface object 826a, computer system 600 initiates an alarm operation for a predetermined time from a current time (e.g., nine minutes from a current time and/or a time at which user input corresponding to snooze user interface object 826a is detected) and resumes output of audio 820 (and, optionally, replaces display of alarm user interface 826 with emergency siren user interface 818). In some embodiments, in response to detecting user input corresponding to stop user interface object 826b, computer system 600 silences the alarm operation, displays emergency siren user interface 818 (e.g., replaces display of alarm user interface 826 with emergency siren user interface 818), and/or resumes output of audio 820.

As set forth above, computer system 600 displays watch face user interface 604 in response to detecting user input 850b while displaying emergency siren user interface 818. At FIG. 8L, computer system 600 displays watch face user interface 604 and adjusts output of audio 820 to output audio 830. User input 850b indicates that a user of computer system 600 is interacting with and/or requesting to interact with computer system 600. In addition, in some embodiments, user input 850b is performed while a wrist of the user of computer system 600 is raised and/or otherwise in a position that is closer to an car of the user. Accordingly, to reduce interruptions to the user interaction with computer system 600 and to reduce the amount of noise exposure to the user, computer system 600 adjusts the output of audio 820 to outputting audio 830 in response to detecting user input 850b. In some embodiments, audio 830 includes a reduced volume level as compared to audio 820. In some embodiments, computer system 600 adjusts one or more properties of audio 820, such as volume level, frequency, pitch, tone, and/or wavelength, to output audio 830.

At FIG. 8L, watch face user interface 604 includes emergency siren indicator 823 indicating that computer system 600 is performing (e.g., continuing to perform) emergency siren operation. Computer system 600 displays emergency siren indicator 823 at position 828 on display device 602 and/or watch user interface 604. In some embodiments, computer system 600 displays emergency siren indicator 823 at position 828 instead of displaying a notification indicator at position 828. In other words, computer system 600 replaces display of the notification indicator with emergency siren indicator 823. In some embodiments, in response to user input corresponding to emergency siren indicator 823, computer system 600 displays emergency siren user interface 818 and adjusts output of audio 830 to outputting of audio 820. In other words, in response to detecting user input corresponding to emergency siren indicator 823, computer system 600 outputs audio 820 having previous and/or default properties (e.g., resumes outputting audio 820 at a higher volume level and/or at its original and/or predetermined properties).

At FIG. 8L, computer system 600 detects user input 850c (e.g., a press gesture or other selection/navigation input) corresponding to third hardware input device 606c. In response to detecting user input 850c, computer system 600 displays application user interface 832, as shown at FIG. 8M.

At FIG. 8M, computer system 600 displays application user interface 832 and outputs audio 834 by adjusting one or more properties of audio 820 and/or audio 830. Accordingly, computer system 600 reduces interruptions to user interaction with computer system 600 and reduces the amount of noise exposure to the user by outputting audio 834 (e.g., instead of outputting audio 820 and/or audio 830) in response to detecting user input 850c. In some embodiments, audio 834 includes a reduced volume level when compared audio 820 and/or audio 830. In some embodiments, computer system 600 adjusts one or more properties of audio 820 and/or audio 830, such as volume level, frequency, pitch, tone, and/or wavelength, to output audio 834.

At FIG. 8M, application user interface 832 includes emergency siren indicator 823 indicating that computer system 600 is performing (e.g., continuing to perform) emergency siren operation. Computer system 600 displays emergency siren indicator 823 at position 833 (e.g., an upper right corner) on application user interface 832. In some embodiments, computer system 600 displays emergency siren indicator 823 at another position on application user interface 832, such as bottom right corner, an upper left corner, and/or a lower left corner. In some embodiments, in response to user input corresponding to the emergency siren indicator, computer system 600 displays emergency siren user interface 818 and adjusts output of audio 834 to outputting audio 820.

At FIG. 8M, computer system 600 detects user input 850d (e.g., a tap gesture or other selection/navigation input) corresponding to music application user interface object 832a. In response to detecting user input 850d, computer system 600 displays music user interface 836, as shown at FIG. 8N.

At FIG. 8N, computer system 600 displays music user interface 836 and adjusts output of audio 820, audio 830, and/or audio 834 to output audio 838. Accordingly, to reduce interruptions to the user interaction with computer system 600 and to reduce the amount of noise exposure to the user, computer system 600 adjusts the output of audio 820, audio 830, and/or audio 834 to outputting audio 838 in response to detecting user input 850d. In some embodiments, audio 838 includes a reduced volume level as compared to audio 820, audio 830, and/or audio 834. In some embodiments, computer system 600 adjusts one or more properties of audio 820, audio 830, and/or audio 834, such as volume level, frequency, pitch, tone, and/or wavelength, to output audio 838.

At FIG. 8N, music user interface 836 includes emergency siren indicator 823 indicating that computer system 600 is performing (e.g., continuing to perform) emergency siren operation. Computer system 600 displays emergency siren indicator 823 at position 828 on display device 602 and/or music user interface 836. In some embodiments, computer system 600 displays emergency siren indicator 823 at another location and/or position on music user interface 836. In some embodiments, computer system 600 displays emergency siren indicator 823 in a status region of music user interface 836, where the status region is positioned proximate to, near, adjacent to, and/or next to time indicator 839 of music user interface 836. In some embodiments, in response to user input corresponding to emergency siren indicator 823, computer system 600 displays emergency siren user interface 818 and adjusts output of audio 838 to outputting of audio 820. In other words, in response to detecting user input corresponding to emergency siren indicator 823, computer system 600 outputs audio 820 having previous and/or default properties (e.g., resumes outputting audio 820 at a higher volume level and/or at its original and/or predetermined properties).

Computer system 600 includes an emergency application that enables a user of computer system 600 to initiate the emergency siren operation (and, optionally, other emergency operations) without providing user input (e.g., user input 850a) corresponding to first hardware input device 606a. For instance, at FIG. 8O, computer system 600 displays application user interface 832 while computer system 600 is not performing the emergency siren operation (e.g., computer system 600 is not outputting audio 820, audio 830, audio 834, and/or audio 838). At FIG. 8O, computer system 600 detects user input 850e (e.g., a tap gesture or other selection/navigation input) corresponding to emergency application user interface object 832b. In response to detecting user input 850e, computer system 600 displays emergency siren user interface 818, as shown at FIG. 8P.

At FIG. 8P, emergency siren user interface 818 includes time indicator 818a, operation indicator 818b, duration indicator 818c, start user interface object 818h, and emergency phone call user interface object 818c. Time indicator 818a provides a visual indication (e.g., a digital indication) of a current time of day (e.g., "10:09"). Operation indicator 818b provides a visual indication of the operation that is configured to be performed by computer system 600, which is the emergency siren operation. Duration indicator 818c provides a visual indication of an amount of time (e.g., from the current time indicated by time indicator 818a) that computer system 600 is configured to perform the emergency siren operation (e.g., before computer system 600 runs out of power and/or battery charge). For instance, at FIG. 8P, duration indicator 818c includes a percentage of battery power and/or charge of computer system 600 remaining (e.g., 75%). Therefore, a user of computer system 600 can estimate and/or otherwise determine an amount of time that computer system 600 can perform the emergency siren operation based on the percentage of battery power and/or charge of computer system 600.

At FIG. 8P, computer system 600 is not performing the emergency siren operation, and thus, emergency siren user interface 818 does not include stop user interface object 818d and/or background. At FIG. 8P, because computer system 600 is not performing the emergency siren operation, emergency siren user interface 818 includes start user interface object 818h. Start user interface object 818h is configured to, when selected, cause computer system 600 to initiate performance of the emergency siren operation. In some embodiments, in response to detecting user input corresponding to start user interface object 818h, computer system 600 outputs audio 820 and displays emergency siren user interface 818 having stop user interface object 818d and background 819, as shown at FIG. 8G. Further, emergency phone call user interface object 818e is configured to, when selected and/or otherwise interacted with, cause computer system 600 to initiate an emergency phone call. In some embodiments, when computer system 600 is performing the emergency siren operation, computer system 600 pauses output of audio 820 in response to initiation of the emergency phone call and resumes (e.g., automatically without additional user input) output of audio 820 in response to the emergency phone call ending. In some embodiments, the emergency phone call is initiated by computer system 600 as an outgoing phone call to a phone number associated with an emergency service (e.g., 911, a local emergency service center, and/or a hospital). In some embodiments, computer system 600 initiates the emergency phone call in response to detecting a swipe and/or slide gesture on portion 818f of emergency phone call user interface object 818c.

In addition to initiating the emergency siren operation (e.g., outputting audio 820) in response to user input (e.g., user input 850a) corresponding to first hardware input device 606a and/or in response to user input corresponding to start user interface object 818h, computer system 600 is also configured to initiate the emergency siren operation in response to detecting a user of computer system 600 falling. For instance, at FIG. 8Q, computer system 600 displays fall detection user interface 840 in response to detecting an event indicative of a user of computer system 600 falling and in accordance with a determination that the event indicative of the user falling meets a set of criteria.

In some embodiments, computer system 600 includes one or more sensors, such as motion sensors and/or accelerometers, that provide information to computer system 600 about physical movement of computer system 600, and thus, about physical movement of a user of computer system 600. In some embodiments, computer system 600 detects an event indicative of the user falling when information received from the one or more sensors includes data (e.g., data indicative a speed, force of impact, and/or acceleration of computer system 600) that exceeds a first threshold (e.g., a first threshold indicative of a person falling down). In some embodiments, after computer system 600 detects the event indicative of the user falling, computer system 600 determines whether the information received from the one or more sensors includes data (e.g., data indicative of a speed, force of impact, and/or acceleration of computer system 600) that exceeds a second threshold (e.g., a second threshold indicative of a person incurring a fall that is likely to injure the person) to determine whether the event indicative of the user falling meets the set of criteria. In some embodiments, when the data exceeds the second threshold, computer system 600 determines that the event indicative of the user falling meets the set of criteria and computer system 600 displays fall detection user interface 840.

Figures 8Q, 8R, 8S, 8T:
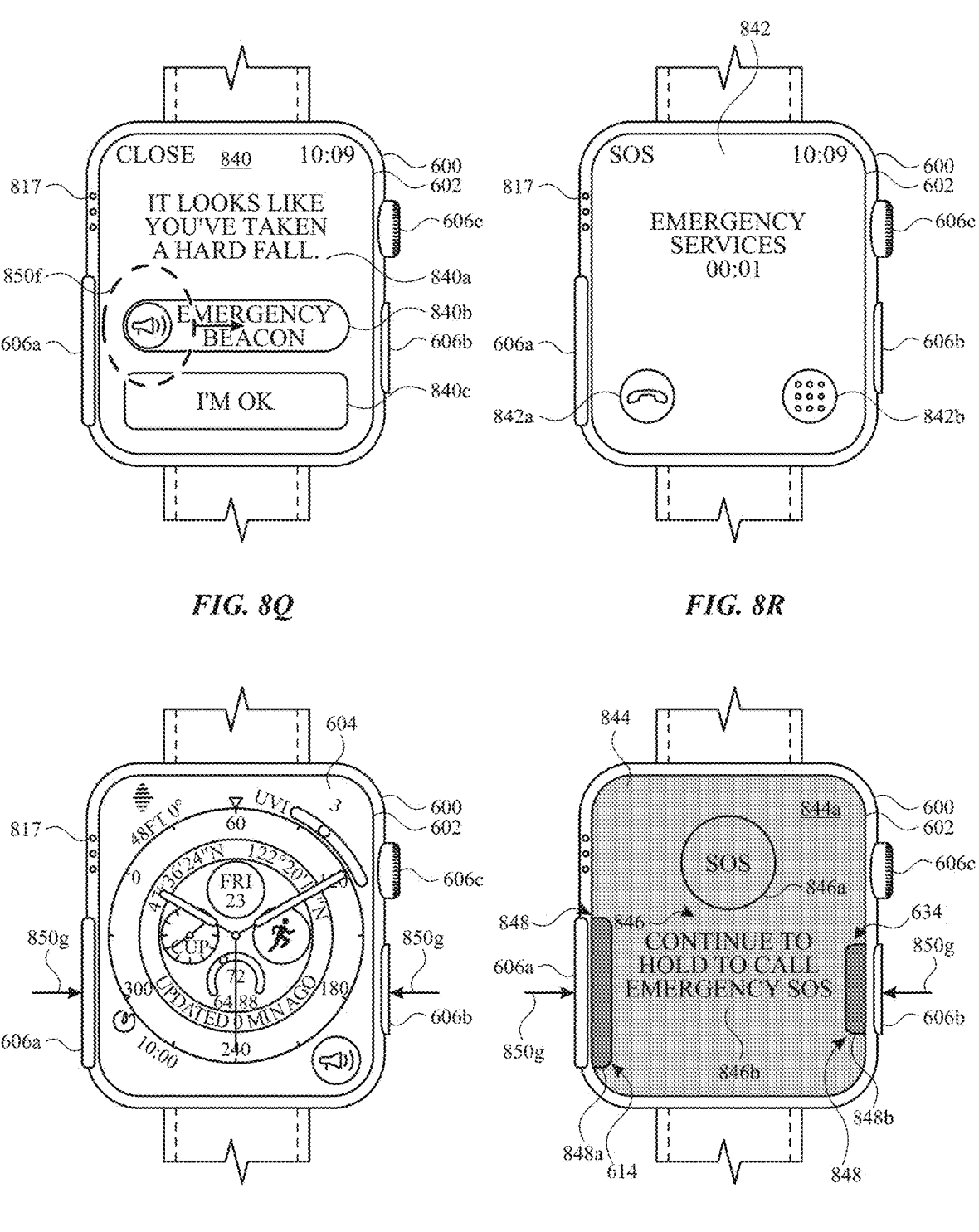

At FIG. 8Q, fall detection user interface 840 includes information indicator 840a, emergency siren user interface object 840b, and dismiss user interface object 840c. Information indicator 840a provides a visual indication and/or information that computer system 600 has detected that the user of computer system 600 has potentially fallen in a way that could have injured the user. Emergency siren user interface object 840*b* is configured to, when selected and/or interacted with, initiate the emergency siren operation (e.g., computer system 600 outputs audio 820). In some embodiments, in response to detecting user input 850*f* (e.g., a swipe gesture, a slide gesture, or other selection/navigation input) corresponding to emergency siren user interface object 840*b*, computer system 600 displays emergency siren user interface 818 and outputs audio 820, as shown at FIG. 8G. In some embodiments, in response to detecting user input 850*f* (e.g., a swipe gesture, a slide gesture, or other selection/navigation input) corresponding to emergency siren user interface object 840*b*, computer system 600 initiates an emergency phone call, and, in response to detecting an end of the emergency phone call, initiates the emergency siren operation (e.g., outputs audio 820). Dismiss user interface object 840*c* is configured to, when selected, cause computer system 600 to cease displaying fall detection user interface 840 (and, optionally, display a previously displayed user interface).

In some embodiments, computer system 600 displays fall detection user interface 840 for a predetermined amount of time (e.g., 5 seconds or 10 seconds) and, in response to detecting an absence of user input and/or user interaction, computer system 600 initiates an emergency phone call. For instance, at FIG. 8R, computer system 600 displays phone call user interface 842 after initiating the emergency phone call (e.g., calling a phone number associated with an emergency service (e.g., 911 and/or a local emergency service)). At FIG. 8R, phone call user interface 842 includes end user interface object 842*a* and settings user interface object 842*b*. In response to detecting user input (e.g., a tap gesture or other selection/navigation input) selecting end user interface object 842*a*, computer system 600 ends the emergency phone call (e.g., hangs up). In some embodiments, in response to detecting an end of the emergency phone call, computer system 600 initiates the emergency siren operation (e.g., outputs audio 820). As such, when a user potentially falls, computer system 600 can initiate the emergency phone call and/or initiate the emergency siren operation so that the user of computer system 600 can attempt to obtain assistance.

Computer system 600 is configured to perform a second emergency operation, such as initiate an emergency phone call, in response to detecting a different type of user input corresponding to first hardware input device 606*a* as compared to user input 850*a*. For instance, at FIG. 8S, computer system 600 displays watch face user interface 604 and detects user input 850*g* (e.g., a long press gesture or other selection/navigation input) corresponding to first hardware input device 606*a* and second hardware input device 606*b*. At FIG. 8S, user input 850*g* includes concurrent press gestures on both first hardware input device 606*a* and second hardware input device 606*b*. In some embodiments, user input 850*g* includes sequential press gestures on first hardware input device 606*a* and second hardware input device 606*b*.

When computer system 600 continues to detect user input 850*g* and/or computer system 600 does not detect the end of user input 850*a* for a predetermined period of time (e.g., 2 seconds, 3 seconds, or 5 seconds), computer system 600 displays second emergency indication 844, as shown at FIG. 8T. In other words, when computer system 600 continues to detect user input 850*g* for the predetermined period of time, computer system 600 displays second emergency indication 844, which provides a visual indication to a user that maintaining user input 850*g* causes computer system 600 to perform an emergency operation (e.g., initiate an emergency phone call).

At FIG. 8T, second emergency indication 844 replaces display of watch user interface 604. In some embodiments, second emergency indication 844 is overlaid on watch face user interface 604. Second emergency indication 844 includes operation indicator 846 and input indicator 848. Operation indicator 846 includes symbol 846*a* and text 846*b* (e.g., "CONTINUE TO HOLD TO CALL EMERGENCY SOS") indicative of an operation (e.g., an emergency phone call) configured to be performed by computer system 600 in response to continuing to detect user input 850*g* corresponding to first hardware input device 606*a* and second hardware input device 606*b*. Input indicator 848 provides visual confirmation that computer system 600 detects (e.g., continues to detect) user input 850*g* corresponding to first hardware input device 606*a* and second hardware input device 606*b*. For instance, input indicator 848 includes first portion 848*a* displayed at location 614 on display device 602 that is next to, near, close to, and/or proximate to a position of first hardware input device 606*a* (e.g., with respect to display device 602). First portion 848*a* also includes a size (e.g., a length and/or height) that is approximate to a size (e.g., a length and/or height) of first hardware input device 606*a*. Further, first portion 848*a* includes a color (e.g., red) associated with the operation configured to be performed by computer system 600 in response to detecting continued user input 850*g*. In addition, input indicator 848 includes second portion 848*b* displayed at location 634 on display device 602 that is next to, near, close to, and/or proximate to a position of second hardware input device 606*b* (e.g., with respect to display device 602). Second portion 848*b* also includes a size (e.g., a length and/or height) that is approximate to a size (e.g., a length and/or height) of second hardware input device 606*b*. In addition, second portion 848*b* includes a color (e.g., red) associated with the operation configured to be performed by computer system 600 in response to detecting user input 850*g*. In some embodiments, the color of first portion 848*a* and second portion 848*b* of input indicator 848 is not associated with and/or based on a color of first hardware input device 606*a* and/or second hardware input device 606*b*.

At FIG. 8T, computer system 600 displays second emergency indication 844 with background 844*a*. In some embodiments, background 844*a* has a fifth color (e.g., as indicated by fourth shading at FIG. 8T) that is associated with the emergency operation. For example, in some embodiments, the fifth color is based on an emergency application that is associated with the emergency operation and/or an application that enables computer system 600 to perform the emergency operation. In some embodiments, the fifth color is not based on a color of first hardware input device 606*a* and/or second hardware input device 606*b*. In some embodiments, background 844*a* includes a first shade of a color of associated with the emergency operation (e.g., a first shade of red) and input indicator 848 includes a second shade of the color of associated with the emergency operation (e.g., a second shade of red).

At FIG. 8T, computer system 600 continues to detect user input 850*g* corresponding to first hardware input device 606*a* and second hardware input device 606*b*. In response to continuing to detect user input 850*g* while displaying second emergency indication 844, computer system 600 displays countdown user interface object 852 on second emergency indication 844, as shown at FIG. 8U. Countdown user interface object 852 provides a visual indication of a duration for which user input 850g is to be maintained to cause computer system 600 to perform the emergency operation. At FIG. 8U, countdown user interface object 852 replaces display of symbol 846a of operation indicator 846. In some embodiments, computer system 600 maintains display of symbol 846a of operation indicator 846 and displays countdown user interface object 852 concurrently with symbol 846a.

At FIG. 8U, computer system 600 also displays emergency phone call user interface object 854 indicating that maintaining user input 850g causes computer system 600 to initiate an emergency phone call operation. In addition, at FIG. 8U, computer system 600 displays a portion 854a of emergency phone call user interface object 854 at inactive position 856a within emergency phone call user interface object 854. In some embodiments, computer system 600 displays an animation of portion 854a of emergency phone call user interface object 854, such that portion 854a moves (e.g., over time) from inactive position 856a to active position 856b within emergency phone call user interface object 854. When portion 854a of emergency phone call user interface object 854 is displayed at active position 856b, computer system 600 is configured to initiate the emergency operation and initiate an emergency phone call. In some embodiments, computer system 600 displays the animation of portion 854a (e.g., displays portion 854a moving from inactive position 856a to active position 856b) in response to continuing to detect user input 850g corresponding to first hardware input device 606a and second hardware input device 606b.

At FIG. 8V, computer system 600 continues to detect user input 850g corresponding to first hardware input device 606a and second hardware input device 606b. In response to continuing to detect user input 850g, computer system 600 displays portion 854a at position 858 (e.g., a position closer to active position 856b than inactive position 856a) within emergency phone call user interface object 854. In addition, computer system 600 displays (e.g., updates display of) countdown user interface object 852 indicating that computer system 600 will initiate the emergency phone call in response to continuing to detect user input 850g for one second (e.g., one more second and/or one additional second). As set forth above, portion 854a is configured to move from inactive position 856a to active position 856b as computer system 600 continues to detect user input 850g. For instance, at FIG. 8V, portion 854a is at position 858 which is closer to active position 856b than inactive position 856a, thereby providing a visual indication that computer system will initiate the emergency phone call if user input 850g is maintained for one second (e.g., one more second and/or one additional second).

At FIG. 8V, the emergency operation includes an emergency phone call and computer system 600 is configured to initiate an outgoing phone call to a phone number associated with an emergency service (e.g., 911, another local emergency service, and/or a hospital). As such, computer system 600 is configured to initiate the emergency phone call in order to help a user of computer system 600 obtain assistance in an emergency situation.

At FIG. 8W, computer system 600 initiates the emergency phone call in response to continuing to detect user input 850g for a predetermined amount of time (e.g., a predetermined amount of time after displaying second emergency indication 844 and/or a predetermined amount of time from beginning to detect user input 850g) and/or in response to not detecting an end of user input 850g throughout a period of time corresponding to countdown user interface object

852 (e.g., the end of user input 850g is not detected while countdown user interface object 852 counts down from a predetermined amount of time (e.g., 5 seconds)). In some embodiments, in response to detecting the end of user input 850g before the period of time corresponding to countdown user interface object 852 has elapsed, computer system 600 does not perform the emergency phone call (e.g., forgoes initiating an outgoing phone call to a phone number associated with an emergency service).

At FIG. 8W, computer system 600 displays phone call user interface 842 after initiating the emergency phone call (e.g., calling a phone number associated with an emergency service (e.g., 911, a local emergency service, and/or a hospital)). At FIG. 8S, phone call user interface 842 includes end user interface object 842a and settings user interface object 842b. In response to detecting user input (e.g., a tap gesture or other selection/navigation input) selecting end user interface object 842a, computer system 600 ends the emergency phone call (e.g., hangs up).

FIG. 9 is a flow diagram illustrating a method for performing a first operation using a computer system in accordance with some embodiments. Method 900 is performed at a computer system (e.g., 100, 300, 500, 600, 646, and/or 1300) (e.g., an electronic device; a smart device, such as a smartphone or a smartwatch; a mobile device; a wearable device) that is in communication with a display generation component (e.g., 602, 646a, and/or 1300a) (e.g., a display controller, a touch-sensitive display system, a projector, a display screen, a display monitor, and/or a holographic display) and one or more hardware input devices (e.g., 606a, 606b, and/or 606c) (e.g., one or more physical buttons (e.g., buttons included in and/or on a housing of the computer system), rotatable input devices, depressible input devices, and/or solid state buttons having a pressure sensor that are configured to cause the computer system to perform a function in response to an activation event (e.g., a user input, a user-defined and/or user-selected user input, and/or a particular input)). In some embodiments, a hardware input device of the one or more hardware input devices is configurable (e.g., user selected, user defined, and/or user customized) so that the computer system performs a predefined function in response to a user input (e.g., a predefined input of a particular type). In some embodiments, the one or more hardware input devices include a tactile output generator that provides tactile feedback (e.g., haptic feedback) in response to detecting user input corresponding to a respective hardware input device of the one or more hardware input devices. Some operations in method 900 are, optionally, combined, the orders of some operations are, optionally, changed, and some operations are, optionally, omitted.

As described below, method 900 provides an intuitive way for performing a first operation. The method reduces the cognitive burden on a user for performing a first operation, thereby creating a more efficient human-machine interface. For battery-operated computing devices, enabling a user to performing a first operation faster and more efficiently conserves power and increases the time between battery charges.

Computer system (e.g., 100, 300, 500, 600, 646, and/or 1300) detects (902) user input (e.g., 650b, 850a, and/or 650g) (e.g., a press and hold input, a press input, a tap and hold input, and/or a tap input) corresponding to a first hardware input device (e.g., 606a, 606b, and/or 606c) (e.g., a depressible button that is positioned on and/or in (e.g., partially within) a side of a housing of the computer system) (in some embodiments, the first hardware control device includes a first color that is different from a second color of the housing of the computer system) of the one or more hardware input devices (e.g., 606a, 606b, and/or 606c)

In response to the computer system (e.g., 100, 300, 500, 600, 646, and/or 1300) detecting the user input (e.g., 650b, 850a, and/or 650g) (e.g., while the user continues to provide the user input), the computer system (e.g., 100, 300, 500, 600, 646, and/or 1300) displays (904), via the display generation component (e.g., 602, 646a, and/or 1300a), a first indication (e.g., 612) (e.g., a first user interface, a first set of one or more user interface objects overlaid on a currently displayed user interface, and/or a notification user interface) of a first operation (e.g., a user selected and/or user configured operation that corresponds to the user input and/or the first hardware input device) which the first hardware input device (e.g., 606a, 606b, and/or 606c) is configured to perform (e.g., in response to the user input (e.g., when the user input is of a first type specified by the user)).

After the computer system (e.g., 100, 300, 500, 600, 646, and/or 1300) displays the first indication (e.g., 612) of the first operation, the computer system (e.g., 100, 300, 500, 600, 646, and/or 1300) detects (906) an end of the user input (e.g., release of user input 650b, 850a, and/or 650g) (e.g., release of the press and hold gesture, completion of a press input, release of the tap and hold input, and/or completion of a tap input).

In response to the computer system (e.g., 100, 300, 500, 600, 646, and/or 1300) detecting the end of the user input (908) (e.g., release of user input 650b, 850a, and/or 650g) and in accordance with a determination that the end of the user input (e.g., release of user input 650b, 850a, and/or 650g) was detected while displaying the first indication (e.g., 612) (e.g., the first indication is currently displayed via the display generation component of the computer system at the time the end of the user input is detected), the computer system (e.g., 100, 300, 500, 600, 646, and/or 1300) performs (910) the first operation (e.g., initiating the first operation (e.g., a user selected operation and/or a user configured operation) that corresponds to the user input and/or the first hardware input device).

In response to the computer system (e.g., 100, 300, 500, 600, 646, and/or 1300) detecting the end of the user input (908) (e.g., release of user input 650b, 850a, and/or 650g) and in accordance with a determination that the end of the user input (e.g., release of user input 650b, 850a, and/or 650g) was detected (e.g., maintained, not released while displaying the first indication, and/or continuing to be input) after displaying the first indication (e.g., 612) and then ceasing display of the first indication (e.g., 612) (e.g., the first indication is not currently displayed via the display generation component of the computer system at the time that the end of the user input is detected) (in some embodiments, the computer system replaces display of the first indication with a second indication after detecting the user input for a predetermined amount of time and when the first indication is replaced with the second indication, the computer system ceases displaying the first indication), the computer system (e.g., 100, 300, 500, 600, 646, and/or 1300) forgoes performing (912) the first operation (e.g., the computer system does not initiate the first operation (e.g., a user selected operation and/or a user configured operation) that corresponds to the user input and/or the first hardware input device). In some embodiments, the computer system performs a second operation when the user input satisfies a set of one or more criteria (e.g., the user input is maintained for a predetermined period of time after the computer system ceases to display the first indication and/or the user input is maintained for a predetermined period of time after the computer system begins displaying the second indication)).

Performing the first operation when the end of the user input is detected while displaying the first indication and forgoing performing the first operation when the end of the user input is detected after displaying the first indication and then ceasing display of the first indication enables the computer system to perform different operations via user input corresponding to the first hardware input device without requiring the user to navigate to particular user interfaces, thereby reducing the number of user inputs needed to perform an operation.

In some embodiments, the first operation is an operation selected by a user from a plurality of available operations (e.g., the first operation is associated with the first hardware input device via one or more user inputs detected by the computer system). The first operation being user selected allows a user to customize an operation that the user frequently performs by providing user input corresponding to the first hardware input device without requiring the user to navigate to a particular user interface, thereby reducing the number of user inputs needed to perform an operation.

In some embodiments, the first operation includes adding a new waypoint (e.g., adding a new waypoint (e.g., a location that includes a latitude, longitude, and/or elevation) to a location tracking and/or compass application). In some embodiments, a new waypoint includes information about a physical location (e.g., latitude, longitude, and/or elevation) in which the computer system is located when the user input and/or the end of the user input is detected. In some embodiments, the new waypoint is configured to, when selected via user input, cause the computer system to determine and/or provide (e.g., display and/or output) a route, directions, and/or orienteering guidance from a current physical location of the computer system to a location associated with the new waypoint. In some embodiments, the computer system stores the new waypoint when adding the new waypoint, such that the new waypoint can be viewed and/or selected in an application (e.g., a location tracking an application and/or a compass application) associated with the new waypoint.

The first operation including adding a new waypoint allows the user to add a new waypoint via user input corresponding to the first hardware input device without requiring the user to navigate to a particular user interface, thereby reducing the number of user inputs needed to perform an operation.

In some embodiments, the first operation includes initiating a shortcut operation of the computer system (e.g., 100, 300, 500, 600, 646, and/or 1300) (e.g., performing one or more predefined and/or user selected operations that are associated with a voice assistant application and/or a shortcut application of the computer system). In some embodiments, the shortcut operation of the computer system includes performing one or more operations, launching one or more applications, and/or initiating one or more tasks that are associated with a respective time of day (e.g., waking up, commuting to work, taking a break, commuting home, and/or going to sleep) and/or associated with a respective routine of a user of the computer system (e.g., in response to receiving a voice command and/or other user input requesting to initiate the shortcut operation). For example, in some embodiments, the shortcut operation includes providing directions from a first location to a second location via a map application of computer system, sending a message to a respective contact stored in computer system via a messaging application of computer system, initiating output of a media item via an audio device (e.g., a speaker and/or headphones) in communication with computer system, and/or setting an alarm via a clock and/or alarm application of computer system.

The first operation including initiating a shortcut operation allows the user to initiate the shortcut operation via user input corresponding to the first hardware input device without requiring the user to navigate to a particular user interface, thereby reducing the number of user inputs needed to perform an operation.

In some embodiments, the first operation includes an operation selected from the group consisting of: initiating a routing operation to a waypoint (e.g., displaying an orienteering user interface that includes navigational indications directing a user to a waypoint) and pausing an ongoing routing operation to a waypoint (e.g., pausing displaying the orienteering user interfaces and/or providing the navigational indications directing the user to the waypoint). The first operation including initiating a routing operation to a waypoint and/or pausing an ongoing routing operation to a waypoint allows the user to initiate the routing operation and/or pause the ongoing routing operation via user input corresponding to the first hardware input device without requiring the user to navigate to a particular user interface, thereby reducing the number of user inputs needed to perform an operation.

In some embodiments, the first operation includes initiating a flashlight operation of the computer system (e.g., 100, 300, 500, 600, 646, and/or 1300) (e.g., turning on a flashlight of the computer system (e.g., displaying a bright white user interface)). The first operation including initiating a flashlight operation allows the user to initiate the flashlight operation via user input corresponding to the first hardware input device without requiring the user to navigate to a particular user interface, thereby reducing the number of user inputs needed to perform an operation.

In some embodiments, the first operation includes an operation selected from the group consisting of: starting a workout (e.g., initiating an operation that monitors, measures, and/or tracks one or more biometric features (e.g., heart rate), movement, and/or location of a user of the computer system), starting a new lap and/or leg of an ongoing workout (e.g., separating the ongoing workout into different portions so that a user can track and/or monitor progress over respective portions of the ongoing workout), and pausing the ongoing workout (e.g., pausing an operation that monitors, measures, and/or tracks one or more biometric features (e.g., heart rate), movement, and/or location of a user of the computer system).

The first operation including initiating a workout, starting a new lap and/or leg of an ongoing workout, and/or pausing the ongoing workout allows the user to initiate the workout, start a new lap and/or leg of the ongoing workout, and/or pause the ongoing workout via user input corresponding to the first hardware input device without requiring the user to navigate to a particular user interface, thereby reducing the number of user inputs needed to perform an operation.

In some embodiments, the first operation includes an operation selected from the group consisting of: initiating a stopwatch (e.g., initiating a timer that tracks an amount of time that has elapsed since initiating the stopwatch function), starting a new lap and/or leg of an ongoing stopwatch (e.g., separating an ongoing timer into different portions and/or intervals), and pausing the ongoing stopwatch (e.g., pausing a timer that tracks an amount of time that has elapsed since initiating the stopwatch function). The first operation including initiating a stopwatch, starting a new lap and/or leg of an ongoing stopwatch, and/or pausing the ongoing stopwatch allows the user to initiate the stopwatch, start a new lap and/or leg of the ongoing stopwatch, and/or pause the ongoing stopwatch via user input corresponding to the first hardware input device without requiring the user to navigate to a particular user interface, thereby reducing the number of user inputs needed to perform an operation.

In some embodiments, the first operation includes an operation selected from the group consisting of: starting a dive (e.g., starting a timer that tracks an amount of time at which a user of the computer system has been scuba diving and/or tracking, monitoring, and/or sensing a depth and/or other characteristics of the scuba dive) and performing a dynamic action for an ongoing dive (e.g., decompression timer). The first operation including starting a dive and/or performing a dynamic action for an ongoing dive allows the user to start the dive and/or perform the dynamic action for the ongoing dive via user input corresponding to the first hardware input device without requiring the user to navigate to a particular user interface, thereby reducing the number of user inputs needed to perform an operation.

In some embodiments, the computer system (e.g., 100, 300, 500, 600, 646, and/or 1300) displaying the first indication (e.g., 612) of the first operation which the first hardware input device (e.g., 606a, 606b, and/or 606c) is configured to perform includes the computer system (e.g., 100, 300, 500, 600, 646, and/or 1300) overlaying (e.g., displaying the first indication over a currently displayed user interface so that the first indication at least partially obscures, blocks, and/or otherwise covers the currently displayed user interface) the first indication (e.g., 612) on a currently displayed user interface (e.g., 604). Overlaying the first indication on a currently displayed user interface allows the user to receive confirmation that the user input is configured to perform the first operation, thereby providing improved visual feedback to the user.

In some embodiments, after the computer system (e.g., 100, 300, 500, 600, 646, and/or 1300) displays the first indication (e.g., 612) of the first operation which the first hardware input device (e.g., 606a, 606b, and/or 606c) is configured to perform for a predetermined amount of time (e.g., two seconds, three seconds, and/or five seconds) and while continuing to detect the user input (e.g., 650b, 850a, and/or 650g) (e.g., the user input corresponding to the first hardware input device is maintained while the first indication is displayed for the predetermined amount of time), the computer system (e.g., 100, 300, 500, 600, 646, and/or 1300) ceases displaying of the first indication (e.g., 612) (e.g., the computer system no longer displays the first indication and/or the computer system replaces display of the first indication with a second indication) and the computer system (e.g., 100, 300, 500, 600, 646, and/or 1300) displays, via the display generation component (e.g., 602, 646a, and/or 1300a), a second indication (e.g., 800 and/or 844) (e.g., a second user interface, a second set of one or more user interface objects overlaid on a currently displayed user interface, and/or a notification user interface) of a second operation (e.g., a user selected and/or user configured operation that corresponds to the user input and/or the first hardware input device) which the first hardware input device (e.g., 606a, 606b, and/or 606c) is configured to perform. Ceasing display of the first indication and displaying the second indication after displaying the first indication for a predetermined amount of time and while continuing to detect the user input allows the user of the computer system to receive confirmation that maintaining the user input enables the computer system to perform a second operation, thereby providing improved visual feedback to the user.

In some embodiments, the first operation is user selected (e.g., the first operation is associated with the first hardware input device via one or more user inputs detected by the computer system) and the second operation is a predetermined operation (e.g., the second operation cannot be associated with the first hardware input device via one or more user inputs, the second operation cannot be user selected, and/or the computer system is configured to perform the second operation regardless of whether the user has configured one or more settings of the computer system associated with the first hardware input device). The first operation being user selected allows a user to customize an operation that the user frequently performs by providing user input corresponding to the first hardware input device without requiring the user to navigate to a particular user interface, thereby reducing the number of user inputs needed to perform an operation. In addition, the second operation being a predetermined operation allows a user to perform the predetermined operation without configuring the first hardware input device, which provides the computer system with enhanced safety features and reduces the number of inputs needed to perform an operation.

In some embodiments, the second operation is a first emergency operation (e.g., activating an emergency siren (e.g., beacon and/or audio tone), initiating an emergency phone call, displaying a medical identification user interface, and/or another operation that can be performed to provide assistance to the user of the computer system in an emergency situation) of the computer system (e.g., 100, 300, 500, 600, 646, and/or 1300). The second operation being a first emergency operation allows a user of the computer system to initiate an operation that can provide assistance in an emergency situation via user input corresponding to the first hardware input device without additional user input, thereby reducing the number of user inputs needed to perform an operation.

In some embodiments, the first emergency operation of the computer system includes the computer system (e.g., 100, 300, 500, 600, 646, and/or 1300) outputting an emergency siren (e.g., outputting audio 820, 830, 834, and/or 838) (e.g., a sequence of audio output bursts and/or continuous audio output above a predetermined volume level (e.g., above 60 decibels, above 70 decibels, above 80 decibels, and/or above 85 decibels) that is, optionally, designed to provide an audible indication of a location of a user in need of assistance) that is configured to continue after detecting the end of the user input (e.g., 650*b*, 850*a*, and/or 650*g*) (e.g., the computer system continues to output the emergency siren after detecting the end of the user input when the user input has been maintained for a predetermined amount of time (e.g., maintained throughout a countdown timer associated with the emergency siren)). Outputting an emergency siren that continues after detecting the end of the user input facilitates an ability of the user to signal for help in an emergency situation, which provides the computer system with enhanced safety features.

In some embodiments, the computer system (e.g., 100, 300, 500, 600, 646, and/or 1300) outputting the emergency siren (e.g., outputting audio 820, 830, 834, and/or 838) includes the computer system (e.g., 100, 300, 500, 600, 646, and/or 1300) outputting audio bursts (e.g., sequential and/or interrupted audio output and/or tones that occur at predefined intervals (e.g., a uniform interval, such as every five seconds, or a variable interval, such as every five seconds for the first five minutes and every 10 seconds thereafter)) that occur at a frequency (e.g., variable intervals of time that increase in duration as an amount of battery charge of the computer system decreases) that decreases as battery life of the computer system (e.g., 100, 300, 500, 600, 646, and/or 1300) decreases (e.g., consecutive audio bursts are separated by greater lengths of time as a battery charge of the computer system decreases). Outputting the emergency siren as audio bursts that occur at a frequency that decreases as battery life decreases enables a user to signal for help in an emergency situation longer by prolonging an amount of battery life of the computer system, thereby providing the computer system with enhanced safety features and reducing an amount of battery usage of the computer system.

In some embodiments, the first emergency operation includes displaying an option (e.g., 808*b* and/or 818*c*) (e.g., a selectable user interface object and/or affordance) to initiate an emergency phone call (e.g., selection of the option causes the computer system to initiate a phone call (e.g., via a cellular network) to an emergency services phone number (e.g., 911 and/or another local emergency phone number)). Displaying the option to initiate an emergency phone call provides a user of the computer system with another option (e.g., in addition to the emergency siren) for requesting help in an emergency situation, thereby providing the computer system with enhanced safety features.

In some embodiments, the first emergency operation includes displaying an indication (e.g., 818*c*) of a duration (e.g., an amount of time from a current time (e.g., based on an amount of battery charge of the computer system) and/or an amount of battery charge of the computer system remaining) for which the first emergency operation will continue (e.g., the computer system is configured to continue performing the first emergency operation (e.g., absent user input requesting to stop the first emergency operation and/or absent user input that reduces the duration) for a time that is associated with (e.g., approximate to (e.g., within 1 minute, within 2 minutes, and/or within 5 minutes)) and/or consistent with the duration). Displaying the indication of the duration for which the first emergency operation will continue allows a user to estimate and/or otherwise understand how long the first emergency operation can be performed to facilitate the user's ability to obtain assistance in an emergency operation, thereby providing improved visual feedback and providing the computer system with enhanced safety features.

In some embodiments, in response to the computer system (e.g., 100, 300, 500, 600, 646, and/or 1300) detecting a second user input (e.g., 850*g*) (e.g., a first press input on the first hardware input device and a second press input on a second hardware input device, where the first press and the second press are concurrent and/or sequential (e.g., received within a predetermined amount of time from one another)) corresponding to the first hardware input device (e.g., 606*a*, 606*b*, and/or 606*c*) and a second hardware input device (e.g., 606*a*, 606*b*, and/or 606*c*) (e.g., a depressible button that is positioned on and/or in (e.g., partially within) a side of a housing of the computer system), the computer system (e.g., 100, 300, 500, 600, 646, and/or 1300) initiates a second emergency operation (e.g., initiating an outgoing emergency phone call and/or displaying a medical identification user interface), different from the first emergency operation.

Initiating the second emergency operation in response to detecting the second user input enables the computer system to perform different emergency operations based on different types of user inputs corresponding to the first hardware input device, thereby reducing the number of user inputs needed to perform an operation and providing the computer system with enhanced safety features.

In some embodiments, after the computer system (e.g., 100, 300, 500, 600, 646, and/or 1300) displays the second indication (e.g., 800 and/or 844) of the second operation which the first hardware input device (e.g., 606*a*, 606*b*, and/or 606*c*) is configured to perform for a predetermined amount of time (e.g., 2 seconds, 3 seconds, 5 seconds, 6 seconds, and/or 10 seconds) and while the computer system (e.g., 100 300, 500, 600, 646, and/or 1300) continues to detect the user input (e.g., 650*b*, 850*a*, and/or 850*g*) (e.g., the user input is maintained while the second indication is being displayed for the predetermined amount of time and/or the end of the user input is not detected before the second indication has been displayed for the predetermined amount of time), the computer system (e.g., 100, 300, 500, 600, 646, and/or 1300) performs the second operation (e.g., an emergency operation, such as activating an emergency siren (e.g., outputting audio corresponding to an emergency beacon and/or an emergency tone), initiating an outgoing emergency phone call, and/or displaying a medical identification user interface).

Performing the second operation after displaying the second indication for a predetermined amount of time and while continuing to detect the user input increases the likelihood that the user intends to cause performance of the second operation, thereby reducing the possibility of the computer system inadvertently performing the second operation.

In some embodiments, the first indication (e.g., 612) includes a first color (e.g., yellow, orange, green, and/or a color that is based on a color of the first hardware input device) and the second indication (e.g., 800 and/or 844) includes a second color (e.g., red), different from the first color. Displaying the first indication with the first color and the second indication with the second color allows a user to easily notice and/or understand that maintaining the user input causes the computer system to transition from being configured to perform the first operation to being configured to perform the second operation, thereby providing improved visual feedback.

In some embodiments, the computer system (e.g., 100, 300, 500, 600, 646, and/or 1300) is configured to perform the second operation without regard to whether the first hardware input device (e.g., 606*a*, 606*b*, and/or 606*c*) is configured to perform the first operation (e.g., the computer system can perform the second operation even if the computer system has not received and/or detected user inputs that associate the first operation with the first hardware input device, which enables a user to activate the second operation when the user has not completed configuring the computer system). Enabling the computer system to perform second operation without regard to whether the first hardware input device is configured to perform the first operation allows a user to perform the second operation without configuring the first hardware input device, which provides the computer system with enhanced safety features and reduces the number of inputs needed to perform an operation.

In some embodiments, the computer system (e.g., 100, 300, 500, 600, 646, and/or 1300) displaying the second indication (e.g., 800 and/or 844) of the second operation which the first hardware input device (e.g., 606*a*, 606*b*, and/or 606*c*) is configured to perform includes the computer system (e.g., 100, 300, 500, 600, 646, and/or 1300) concurrently displaying (e.g., displaying at the same time), via the display generation component (e.g., 602, 646*a*, and/or 1300*a*), at least two of: a medical identification selectable option (e.g., 808*a*) (e.g., a first user interface object and/or affordance that, when selected, causes display of information about a user of the computer system, such as age, height, weight, blood type, organ donor status (e.g., organ donor or non-organ donor), and/or emergency contact information (e.g., name, phone number, address, and/or other contact information (e.g., email address)); an emergency siren selectable option (e.g., 808*b*) (e.g., a second user interface object and/or affordance that, when selected, causes the computer system to output audio that is configured to signal and/or alert another person that a user of the computer system is need of assistance); and an emergency phone call selectable option (e.g., 808*c*) (e.g., a third user interface object and/or affordance that, when selected, causes the computer system to initiate an outgoing phone call to an emergency services phone number (e.g., 911 and/or another local emergency services phone number)).

Displaying at least two of a medical identification selectable option, an emergency siren selectable option, and an emergency phone call selectable option provides a user of the computer system with multiple options for requesting help in an emergency situation, thereby providing the computer system with enhanced safety features.

In some embodiments, the computer system (e.g., 100, 300, 500, 600, 646, and/or 1300) displaying the second indication (e.g., 800 and/or 844) of the second operation which the first hardware input device (e.g., 606*a*, 606*b*, and/or 606*c*) is configured to perform includes the computer system (e.g., 100, 300, 500, 600, 646, and/or 1300) displaying an animation of the first indication (e.g., 612) (e.g., displaying movement of the first indication and/or otherwise displaying the first indication changing in appearance over time) sliding off a display area of the display generation component (e.g., 602, 646*a*, and/or 1300) (e.g., the first indication is fully displayed on the display generation component, then the first indication is partially displayed on the display generation component, and then ceases to be displayed on the display generation component, such that the first indication appears to move off of the display area from left to right or from right to left) and an animation of the second indication (e.g., 800 and/or 844) (e.g., displaying movement of the first indication and/or otherwise displaying the first indication changing in appearance over time) sliding onto the display area the display generation component (e.g., 602, 646*a*, and/or 1300*a*) (e.g., the second indication is not displayed on the display generation component, then the second indication is partially displayed on the display generation component, and then the second indication is fully displayed on the display generation component, such that the second indication appears to move onto the display area from left to right or from right to left), and where the second indication (e.g., 800 and/or 844) includes a countdown (e.g., 810 and/or 852) (e.g., a timer that counts down from a predetermined amount of time (e.g., 2 seconds or 5 seconds)) indicative of a time (e.g., a time of day that occurs when the countdown ends and/or expires) at which the computer system (e.g., 100, 300, 500, 600, 646, and/or 1300) will perform the second operation (e.g., the computer system performs the second operation after the countdown ends and/or expires).

Animating the first indication and the second indication, as well as including the countdown on the second indication, allows a user to easily notice and/or understand that maintaining the user input causes the computer system to transition from being configured to perform the first operation to being configured to perform the second operation, thereby providing improved visual feedback.

In some embodiments, in response to the computer system (e.g., 100, 300, 500, 600, 646, and/or 1300) detecting the end of the user input (e.g., release of user input 650*b*, 850*a*, and/or 850*g*) (e.g., release of the press and hold gesture, completion of a press input, release of the tap and hold input, and/or completion of a tap input) and in accordance with a determination that the end of the user input (e.g., release of user input 650*b*, 850*a*, and/or 850*g*) was detected before the countdown (e.g., 810 and/or 852) is complete (e.g., before a timer that counts down from a predetermined time expires and/or ends (e.g., reaches zero seconds and/or time remaining)), the computer system (e.g., 100, 300, 500, 600, 646, and/or 1300) maintains display of the second indication (e.g., 800 and/or 844) (e.g., without performing the second operation). Maintaining display of the second indication when the end of the user input is detected before the countdown is complete allows a user to still select one of the selectable options of the second indication without having to navigate to another user interface, thereby reducing the number of user inputs needed to perform an operation.

In some embodiments, after the computer system (e.g., 100, 300, 500, 600, 646, and/or 1300) detects the end of the user input (e.g., release of user input 650*b*, 850*a*, and/or 850*g*) (e.g., release of the press and hold gesture, completion of a press input, release of the tap and hold input, and/or completion of a tap input) and in accordance with a determination that the end of the user input (e.g., release of user input 650*b*, 850*a*, and/or 850*g*) was detected (e.g., maintained) after the countdown (e.g., 810 and/or 852) is complete (e.g., after a timer that counts down from a predetermined time expires and/or ends (e.g., reaches zero seconds and/or time remaining)), the computer system (e.g., 100, 300, 500, 600, 646, and/or 1300) initiates an emergency siren operation of the computer system (e.g., 100, 300, 500, 600, 646, and/or 1300) (e.g., outputs audio 820, 830, 834, and/or 838) (e.g., the second operation and/or an operation that includes outputting audio that is configured to signal and/or alert another person that a user of the computer system is need of assistance) and the computer system (e.g., 100, 300, 500, 600, 646, and/or 1300) displays, via the display generation component (e.g., 602, 646*a*, and/or 1300*a*), an emergency siren user interface (e.g., 818) (e.g., a user interface indicating that the emergency siren operation of the computer system is being performed) including the emergency phone call selectable option (e.g., 818*e* and/or 818*f*) (e.g., a user interface object and/or affordance that, when selected, causes the computer system to initiate an outgoing phone call to an emergency services phone number (e.g., 911 and/or another local emergency services phone number)).

Initiating the emergency siren operation and displaying the emergency siren user interface when the end of the user input is detected after the countdown is complete allows a user to perform the emergency siren operation via selection of the first hardware input device without having to navigate to another user interface, thereby reducing the number of user inputs needed to perform an operation.

In some embodiments, while the computer system (e.g., 100, 300, 500, 600, 646, and/or 1300) performs the second operation (e.g., the emergency siren operation that includes outputting audio that is configured to signal and/or alert another person that a user of the computer system is need of assistance), the computer system (e.g., 100, 300, 500, 600, 646, and/or 1300) detects user input (e.g., 850*b*, 850*c*, and/or 850*d*) requesting to navigate away from the second indication (e.g., 800, 818, and/or 844) (e.g., a swipe gesture, one or more tap gestures, and/or one or more press gestures on a hardware input device of the one or more hardware input devices). In response to the computer system (e.g., 100, 300, 500, 600, 646, and/or 1300) detecting the user input (e.g., 850*b*, 850*c*, and/or 850*d*) requesting to navigate away from the second indication (e.g., 800, 818, and/or 844), the computer system (e.g., 100, 300, 500, 600, 646, and/or 1300) displays, via the display generation component (e.g., 602, 646*a*, and/or 1300*a*), a user interface (e.g., 604, 832, and/or 836) (e.g., a user interface that is different from the first indication and the second indication; a user interface associated with an application of the computer; an application selection user interface, and/or watch face user interface) that includes a selectable indicator (e.g., 823) (e.g., an image, an icon, a glyph, and/or a symbol indicative of the second operation), where selection of the selectable indicator (e.g., 823) causes the second indication (e.g., 800, 818, and/or 844) to be displayed (e.g., while displaying the user interface and in response to user input selecting the selectable indicator, the computer system displays the second indication (e.g., replaces display of the user interface with the second indication and/or overlays the second indication onto at least a portion of the user interface)).

Displaying the selectable indicator on the user interface enables a user to quickly return to the second indication without having to navigate to another user interface, thereby reducing the number of user inputs needed to perform an operation, and also allows the user to confirm that the second operation is being performed, thereby providing improved visual feedback.

In some embodiments, the user interface (e.g., 604, 832, and/or 836) is a watch face user interface (e.g., 605) (e.g., a default user interface of the computer system that includes an indication of a current time of day and/or other information associated with applications of the computer system) including an indication of time (e.g., 610) (e.g., an indication of a current time of day), and where the selectable indicator (e.g., 823) replaces display (e.g., is displayed in lieu of) of a notification indicator (e.g., an image, an icon, a glyph, and/or a symbol indicating that the computer system has received, output, and/or otherwise generated a notification) on the watch face user interface (e.g., 604). Displaying the selectable indicator on the user interface enables a user to quickly return to the second indication without having to navigate to another user interface, thereby reducing the number of user inputs needed to perform an operation, and also allows the user to confirm that the second operation is being performed, thereby providing improved visual feedback.

In some embodiments, the user interface (e.g., 604, 832, and/or 836) is associated with an application of the computer system (e.g., 836) (e.g., the user interface is a user interface that is displayed when a respective application of the computer system is launched and/or otherwise being interacted with) and the selectable indicator (e.g., 823) is displayed in a status region of the user interface (e.g., near time indicator 839) (e.g., a region of the user interface that is positioned near, next to, adjacent to, proximate to, and/or otherwise near an indication of time that is included on the user interface). Displaying the selectable indicator on the user interface enables a user to quickly return to the second indication without having to navigate to another user interface, thereby reducing the number of user inputs needed to perform an operation, and also allows the user to confirm that the second operation is being performed, thereby providing improved visual feedback.

In some embodiments, the user interface (e.g., 604, 832, and/or 836) includes a plurality of application user interface objects (e.g., 832a and/or 832b) (e.g., the user interface enables a user to view and/or otherwise select between different applications of the computer system to launch and/or otherwise interact with) and the selectable indicator (e.g., 823) is displayed in a corner (e.g., an upper right corner, a lower right corner, an upper left corner, and/or a lower left corner) of a display area of the display generation component (e.g., 602, 646a, and/or 1300a) (e.g., the upper right corner with respect to a perspective of the user viewing the user interface being displayed on the display generation component). In some embodiments, the selectable indicator is displayed in an area of the user interface that is not occupied by an application user interface object of the plurality of application user interface objects. In some embodiments, the selectable indicator is displayed overlaid on an application user interface object of the plurality of application user interface objects. Displaying the selectable indicator on the user interface enables a user to quickly return to the second indication without having to navigate to another user interface, thereby reducing the number of user inputs needed to perform an operation, and also allows the user to confirm that the second operation is being performed, thereby providing improved visual feedback.

In some embodiments, in accordance with the determination that the end of the user input (e.g., release of user input 650b, 850a, and/or 850g) was detected by the computer system (e.g., 100, 300, 500, 600, 646, and/or 1300) while the computer system (e.g., 100, 300, 500, 600, 646, and/or 1300) displays the first indication (e.g., 612), the computer system (e.g., 100, 300, 500, 600, 646, and/or 1300) maintains display of the first indication (e.g., 612 and/or 616) (e.g., maintaining display of the first indication for a predetermined amount of time after detecting the end of the user input, maintaining display of the first indication prior to initiating and/or performing the first operation, and/or maintaining display of the first indication while performing the first operation). Maintaining display of the first indication in response to detecting the end of the user input allows a user to confirm that ending the user input (e.g., releasing the user input) caused the computer system to perform the first operation, thereby providing improved visual feedback.

In some embodiments, after the computer system (e.g., 100, 300, 500, 600, 646, and/or 1300) maintains display of the first indication (e.g., 612) for a predetermined period of time (e.g., one second, two seconds, three seconds, and/or five seconds), the computer system (e.g., 100, 300, 500, 600, 646, and/or 1300) displays a fading animation of the first indication (e.g., 612) (e.g., the computer system causes the first indication to fade on the display generation component over time after the predetermined period of time has expired, such that the computer system eventually (e.g., after the first indication completely fades) displays another user interface (e.g., a user interface associated with an application corresponding to the first operation) instead of the first indication). Displaying the fading animation of the first indication enables the computer system to transition from displaying the first indication to displaying a user interface associated with the first operation with requiring additional user input, thereby reducing the amount of inputs needed to perform an operation.

In some embodiments, the computer system (e.g., 100, 300, 500, 600, 646, and/or 1300) detects third user input (e.g., 850g) (e.g., a first press input on the first hardware input device and a second press input on a second hardware input device, where the first press and the second press are concurrent and/or sequential (e.g., received within a predetermined amount of time from one another)) corresponding to the first hardware input device (e.g., 606a, 606b, and/or 606c) and a third hardware input device (e.g., 606a, 606b, and/or 606c) (e.g., a depressible button that is positioned on and/or in (e.g., partially within) a side of a housing of the computer system) of the one or more hardware input devices (e.g., 606a, 606b, and/or 606c). In response to the computer system (e.g., 100, 300, 500, 600, 646, and/or 1300) detecting the third user input (e.g., 850g), the computer system (e.g., 100, 300, 500, 600, 646, and/or 1300) displays a third indication (e.g., 844) (e.g., a third user interface, a third set of one or more user interface objects overlaid on a currently displayed user interface, and/or a notification user interface) of a third operation (e.g., a predetermined operation that corresponds to the user input and/or the first hardware input device) which the first hardware input device (e.g., 606a, 606b, and/or 606c) and the second hardware input device (e.g., 606a, 606b, and/or 606c) are configured to perform. The third indication (e.g., 844) includes an emergency phone call selectable option (e.g., 854) (e.g., a third user interface object and/or affordance that, when selected, causes the computer system to initiate an outgoing phone call to an emergency services phone number (e.g., 911 and/or another local emergency services phone number)), where the emergency phone call selectable option (e.g., 854) is configured to move (e.g., slide) from an inactive position (e.g., 856a) (e.g., a first position and/or a leftmost position within a slider user interface object of the emergency phone call selectable option) toward an active position (e.g., 856b) (e.g., a second position and/or a rightmost position within a slider user interface object of the emergency phone call selectable option) while the second user input (e.g., 850g) is maintained (e.g., the emergency phone call selectable option moves from the inactive position toward the active position over tie as the second user input is maintained on the first hardware input device and the second hardware input device); and a countdown (e.g., 852) (e.g., a timer that counts down from a predetermined amount of time (e.g., 2 seconds or 5 seconds)) indicative of a time (e.g., a time of day that occurs when the countdown ends and/or expires) at which an emergency phone call operation will be initiated (e.g., a time at which the computer system initiates an outgoing phone call to an emergency services phone number). In some embodiments, in response to detecting an end of the third user input before the emergency phone call selectable option moves to the active position (e.g., before the computer system initiates an emergency phone call), the computer system maintains display of the third indication and, in response to user input (e.g., a swipe gesture and/or slide gesture) corresponding to the emergency phone call selectable option, the computer system initiates an emergency phone call.

Initiating the third operation in response to detecting the third user input enables the computer system to perform different operations based on different types of user inputs corresponding to the first hardware input device, thereby reducing the number of user inputs needed to perform an operation and providing the computer system with enhanced safety features.

In some embodiments, in response to the computer system (e.g., 100, 300, 500, 600, 646, and/or 1300) detecting the third user input (e.g., 850g), the computer system (e.g., 100, 300, 500, 600, 646, and/or 1300) displays one or more graphical user interface objects (e.g., 848, 848a, and/or 848b) (e.g., text, one or more user interface objects, one or more user interface objects including a first color that is the same as the first color as the first hardware input device, and/or one or more user interface objects indicative of the third operation, indicative of the application, and/or indicative of the user input that causes the computer system to perform the third operation) indicating that the first hardware input device (e.g., 606a, 606b, and/or 606c) and the second hardware input device (e.g., 606a, 606b, and/or 606c) have been activated (e.g., the one or more graphical user interface objects provide visual confirmation to a user of the computer system that a user input corresponding to both the first hardware input device and the second hardware input device has been detected). Displaying the one or more graphical user interface objects in response to detecting the third user input provides visual confirmation to a user of the computer system that the third user input is received, thereby providing improved visual feedback.

Note that details of the processes described above with respect to method 900 (e.g., FIG. 9) are also applicable in an analogous manner to the methods described below/above. For example, method 700, 1000, 1200, and/or 1400 optionally includes one or more of the characteristics of the various methods described above with reference to method 900. For example, a computer system that is configured to perform method 900 is also configured to provide guidance about initiating an operation, adjust audio output of an emergency operation, display notifications, and/or perform an operation when in a low power mode of operation. For brevity, these details are not repeated below.

FIG. 10 is a flow diagram illustrating a method for adjusting audio output of an emergency operation using a computer system in accordance with some embodiments. Method 1000 is performed at a computer system (e.g., 100, 300, 500, 600, 646, and/or 1300) (e.g., an electronic device; a smart device, such as a smartphone or a smartwatch; a mobile device; a wearable device) that is in communication with an audio output device (e.g., 817) (e.g., a speaker configured to output audio above a predetermined volume level (e.g., audio output above 60 decibels, above 70 decibels, above 80 decibels, and/or above 85 decibels)). Some operations in method 1000 are, optionally, combined, the orders of some operations are, optionally, changed, and some operations are, optionally, omitted.

As described below, method 1000 provides an intuitive way for adjusting audio output of an emergency operation. The method reduces the cognitive burden on a user for adjusting audio output of an emergency operation, thereby creating a more efficient human-machine interface. For battery-operated computing devices, enabling a user to adjust audio output of an emergency operation faster and more efficiently conserves power and increases the time between battery charges.

While the computer system (e.g., 100, 300, 500, 600, 646, and/or 1300) outputs, via the audio output device (e.g., 817), audio (e.g., 820, 830, 834, and/or 838) corresponding to an emergency siren (e.g., a sequence of audio output bursts and/or continuous audio output above a predetermined volume level (e.g., above 60 decibels, above 70 decibels, above 80 decibels, and/or above 85 decibels) that is, optionally, designed to provide an audible indication of a location of a user in need of assistance), the computer system (e.g., 100, 300, 500, 600, 646, and/or 1300) detects (1002) an event (e.g., user input, such as a request to display a user interface associated with an application of the computer system (e.g., a user interface that is not associated with the audio output corresponding to the emergency siren), a wrist raise gesture (e.g., the computer system is a wearable computer system being worn on the wrist of a user), and/or user input corresponding to a physical button (e.g., a hardware device) of the computer system; a notification (e.g., a time-sensitive notification, such as an alarm and/or a timer); an incoming communication (e.g., received at the computer system and/or received at an external computer system in communication with the computer system), such as an incoming phone call and/or an incoming message; an outgoing communication (e.g., caused by user input received at the computer system and/or caused by user input received at an external computer system that is in communication with the computer system); and/or a received notification (e.g., a time-sensitive notification related to a calendar)).

In response to detecting the event (1004) and in accordance with a determination that the event is of a first type (e.g., an event that includes receiving user input and/or requesting user input (e.g., user input directed to a physical hardware component of the computer system, a wrist raise user input (e.g., when the computer system is a wearable computer system worn on a wrist of the user), and/or another user input (e.g., user input received at a touch-sensitive display of the computer system)), an event that it is time-sensitive (e.g., a calendar notification, an alarm, and/or a timer), and/or an event that includes a communication (e.g., an incoming phone call and/or a message and/or an outgoing phone call and/or message)), the computer system (e.g., 100, 300, 500, 600, 646, and/or 1300) adjusts (1006) output of the audio (e.g., 820, 830, 834, and/or 838) corresponding to the emergency siren (e.g., adjusting an audio property of the output of the audio (e.g., a volume level, a frequency, an interval at which audio bursts are output, a wavelength, and/or an amplitude) and/or pausing and/or ceasing output of the audio) while performing, at the computer system, a first operation (e.g., displaying a user interface associated with the user input and/or initiating a function of the computer system) associated with the event (e.g., the output of the audio corresponding to the emergency siren is adjusted concurrently with performing the first operation and/or before performing the first operation).

In response to detecting the event (1004) and in accordance with a determination that the event is of a second type (e.g., an event that does not include receiving user input and/or requesting user input, an event that it not time-sensitive, and/or an event that does not include a communication), different from the first type, the computer system (e.g., 100, 300, 500, 600, 646, and/or 1300) maintains (1008) output of the audio (e.g., 820, 830, 834, and/or 838) corresponding to the emergency siren (e.g., forgoing adjusting output of the audio corresponding to the emergency siren) while performing, at the computer system (e.g., 100, 300, 500, 600, 646, and/or 1300), a second operation (e.g., displaying a user interface and/or maintaining display of a user interface) associated with the event (e.g., audio corresponding to the emergency siren is maintained and output concurrently with the computer system performing the second operation).

Adjusting output of the audio corresponding to the emergency siren when the event is of a first type and maintaining output of the audio corresponding to the emergency siren when the event is of a second type enables a user that is in need of assistance to perform operations other than the emergency siren to obtain the assistance without requiring the user to stop the emergency siren and/or without the emergency siren otherwise interrupting the user, thereby improving safety features of the computer system and reducing the number of user inputs needed to perform an operation.

In some embodiments, prior to the computer system (e.g., 100, 300, 500, 600, 646, and/or 1300) outputting the audio (e.g., 820, 830, 834, and/or 838) corresponding to the emergency siren (e.g., before the computer system detects one or more user inputs requesting to output the audio corresponding to the emergency siren), the computer system (e.g., 100, 300, 500, 600, 646, and/or 1300) detects user input (e.g., 850a) (e.g., a press gesture, a multi-press gesture, and/or a long press gesture) corresponding to a hardware input device (e.g., 606a, 606b, and/or 606c) (e.g., a depressible button that is positioned on and/or in (e.g., partially within) a side of a housing of the computer system) (in some embodiments, the first hardware control device includes a first color that is different from a second color of the housing of the computer system) in communication with the computer system (e.g., 100, 300, 500, 600, 646, and/or 1300). In response to detecting the user input (e.g., 850a) corresponding to the hardware input device (e.g., 606a, 606b, and/or 606c), the computer system (e.g., 100, 300, 500, 600, 646, and/or 1300) outputs the audio (e.g., 820, 830, 834, and/or 838) corresponding to the emergency siren (e.g., causing the audio output device to output the audio corresponding to the emergency siren).

Outputting the audio corresponding to the emergency siren in response to detecting the user input corresponding to the hardware input device allows a user to initiate the emergency siren without requiring the user to provide additional user input to navigate to a particular user interface, thereby reducing the number of user inputs needed to perform an operation.

In some embodiments, prior to the computer system (e.g., 100, 300, 500, 600, 646, and/or 1300) outputting the audio (e.g., 820, 830, 834, and/or 838) corresponding to the emergency siren (e.g., before the computer system detects one or more user inputs requesting to output the audio corresponding to the emergency siren), the computer system (e.g., 100, 300, 500, 600, 646, and/or 1300) detects user input (e.g., 850c) (e.g., a tap gesture) corresponding to an alert user interface object (e.g., 808b, 818h, and/or 832b) (e.g., a selectable user interface object and/or affordance that, when selected via user input, is configured to cause the computer system to output the audio corresponding to the emergency siren) displayed via a display generation component (e.g., 602, 646a, and/or 1300a) in communication with the computer system (e.g., 100, 300, 500, 600, 646, and/or 1300) (e.g., a display controller, a touch-sensitive display system, a projector, a display screen, a display monitor, and/or a holographic display). In response to detecting the user input (e.g., 850e) corresponding to the alert user interface object (e.g., 808b, 818h, and/or 832b), the computer system (e.g., 100, 300, 500, 600, 646, and/or 1300) outputs the audio (e.g., 820, 830, 834, and/or 838) corresponding to the emergency siren (e.g., causing the audio output device to output the audio corresponding to the emergency siren).

Outputting the audio corresponding to the emergency siren in response to detecting the user input corresponding to the alert user interface object allows a user to initiate the emergency siren via different user inputs, thereby improving safety features of the computer system.

In some embodiments, the alert user interface object (e.g., 808b, 818h, and/or 832b) is displayed on a user interface (e.g., 818) of an alert application (e.g., an application corresponding to user interface object 832b) of the computer system (e.g., 100, 300, 500, 600, 646, and/or 1300) (e.g., the computer system includes an alert application that enables the computer system to perform various emergency services and the alert user interface object is displayed on a user interface of the alert application). Including the alert user interface object on a user interface of an alert application enables a user to be able to navigate to a particular application that enables the user to initiate multiple emergency services, thereby improving safety features of the computer system.

In some embodiments, the alert user interface object (e.g., 808b, 818h, and/or 832b) is displayed on an emergency contact user interface (e.g., 800) (e.g., a user interface that is displayed in response to user input (e.g., a long press) corresponding to a hardware input device of the computer system). In some embodiments, the emergency contact user interface includes an emergency phone call selectable option that, when selected, initiates an outgoing phone call to a phone number associated with an emergency service (e.g., 911 and/or a local emergency service) and/or a medical identification selectable option that, when selected, causes the computer system to display a user interface including information about a user of the computer system (e.g., name, date of birth, age, height, weight, blood type, organ donor status, and/or emergency contact information). Including the alert user interface object on an emergency contact user interface enables a user to be able to navigate to multiple different user interfaces that each enable the user to initiate emergency services, thereby improving safety features of the computer system.

In some embodiments, the alert user interface object (e.g., 808b, 818h, and/or 832b) is displayed on a user interface that includes a selectable option (e.g., 1310) for activating a low power mode of the computer system (e.g., 100, 300, 500, 600, 646, and/or 1300) (e.g., a user interface that is displayed in response to user input (e.g., a long press) corresponding to a hardware input device of the computer system and/or displayed in response to one or more user inputs navigating to a power down user interface that includes the selectable option for activating the low power mode of the computer system). Including the alert user interface object on a user interface that includes a selectable option for activating a low power mode of the computer system enables a user to be able to navigate to multiple different user interfaces that each enable the user to initiate emergency services, thereby improving safety features of the computer system.

In some embodiments, prior to outputting the audio (e.g., 820, 830, 834, and/or 838) corresponding to the emergency siren (e.g., before the computer system detects one or more user inputs requesting to output the audio corresponding to the emergency siren), the computer system (e.g., 100, 300, 500, 600, 646, and/or 1300) detects an occurrence of a detected fall event (e.g., an event causing computer system to display user interface 840) (e.g., the computer system receives information from one or more sensors (e.g., an accelerometer, a gyroscope, a motion sensor, a direction sensor, an inertial measurement unit, and/or a global positioning sensor ("GPS")) in communication with the computer system about movement of the computer system, where the information received from the one or more sensors indicates that movement of the computer system is indicative of a user of the computer system falling down (e.g., the information received from the one or more sensors indicates that the computer system exceeded a first threshold speed, force of impact, and/or acceleration)). In response to detecting the occurrence of the fall event and in accordance with a determination that the fall event meets respective criteria (e.g., the fall event is detected based on information from one or more sensors (e.g., an accelerometer, a gyroscope, a motion sensor, a direction sensor, an inertial measurement unit, and/or a global positioning sensor ("GPS")) in communication with the computer system, and the information indicates that the computer system exceeded a second threshold speed, force of impact, and/or acceleration), the computer system (e.g., 100, 300, 500, 600, 646, and/or 1300) outputs the audio (e.g., 820, 830, 834, and/or 838) corresponding to the emergency siren (e.g., causing the audio output device to output the audio corresponding to the emergency siren). In some embodiments, in response to detecting the occurrence of the fall event and in accordance with a determination that the fall event does not meet the respective criteria, forgoing outputting the audio corresponding to the emergency siren (and, optionally, forgoing outputting and/or displaying a notification corresponding to the occurrent of the fall event).

Outputting the audio corresponding to the emergency siren after detecting the occurrence of the hard fall event provides a user with an ability to obtain emergency assistance without requiring the user to provide user input navigating to a particular user interface when the user may be unable to provide the user inputs (e.g., when the user is unconscious), thereby reducing the number of inputs needed to perform an operation and improving safety features of the computer system.

In some embodiments, in response to detecting the occurrence of the fall event that meets the respective criteria, the computer system (e.g., 100, 300, 500, 600, 646, and/or 1300) initiates an emergency phone call operation (e.g., displays user interface 842) of the computer system (e.g., 100, 300, 500, 600, 646, and/or 1300) (e.g., before outputting the audio corresponding to the emergency siren, initiating an outgoing phone call to a phone number associated with an emergency service (e.g., 911 and/or another local emergency service phone number)). In response to detecting an end of the emergency phone call operation of the computer system (e.g., detecting that the emergency phone call has ended (e.g., via user input requesting to hang up and/or end the phone call, via a recipient hanging up and/or ending the phone call, the phone call disconnecting, and/or the phone call not going through to the intended recipient)), the computer system (e.g., 100, 300, 500, 600, 646, and/or 1300) outputs the audio (e.g., 820, 830, 834, and/or 838) corresponding to the emergency siren (e.g., causing the audio output device to output the audio corresponding to the emergency siren).

Initiating the emergency phone call operation in response to detecting the hard fall event and then outputting the audio corresponding to the emergency siren in response to detecting an end of the emergency phone call operation provides a user with an ability to obtain multiple different types of emergency assistance without requiring the user to provide user input navigating to a particular user interface when the user may be unable to provide the user inputs (e.g., when the user is unconscious), thereby reducing the number of inputs needed to perform an operation and improving safety features of the computer system.

In some embodiments, prior to outputting the audio (e.g., 820, 830, 834, and/or 838) corresponding to the emergency siren (e.g., before the computer system detects one or more user inputs requesting to output the audio corresponding to the emergency siren), the computer system (e.g., 100, 300, 500, 600, 646, and/or 1300) detects an occurrence of a triggering event for the emergency siren (e.g., one or more user inputs requesting to output the audio corresponding to the emergency siren and/or detection of a hard fall event). In response to detecting the occurrence of the triggering event for the emergency siren, the computer system (e.g., 100, 300, 500, 600, 646, and/or 1300) displays, via a display generation component (e.g., 602, 646a, and/or 1300a) in communication with the computer system (e.g., 100, 300, 500, 600, 646, and/or 1300), a countdown (e.g., 810) (e.g., a timer that counts down from a predetermined amount of time (e.g., 2 seconds or 5 seconds)) and outputs the audio (e.g., 820, 830, 834, and/or 838) corresponding to the emergency siren (e.g., outputting the audio corresponding to the emergency siren at a dynamic volume level, where the dynamic volume level causes the computer system to increase the volume of the audio corresponding to the emergency siren as a timer associated with the countdown progresses and/or gets closer to an end (e.g., zero time remaining on the countdown)), where the audio (e.g., 820, 830, 834, and/or 838) corresponding to the emergency siren gradually increases in volume (e.g., becomes louder over time) as the countdown (e.g., 810) progresses (e.g., a timer associated with the countdown progresses and/or gets closer to an end (e.g., zero time remaining on the countdown)).

Displaying the countdown and gradually increasing the volume of the audio corresponding to the emergency siren in response to detecting the occurrence of the triggering event for the emergency siren allows the user to cancel the emergency siren when the user inadvertently initiated the emergency siren and/or does not need the emergency siren, thereby reducing the battery usage of the computer system.

In some embodiments, while displaying the countdown (e.g., 810) (e.g., the countdown continues to elapse and has not reached an end (e.g., time remains on the countdown)), the computer system (e.g., 100, 300, 500, 600, 646, and/or 1300) detects user input (e.g., release of user input 850a) (e.g., a tap gesture, a slide gesture, and/or a press gesture on a hardware input device) requesting to cancel outputting the audio (e.g., 820, 830, 834, and/or 838) corresponding to the emergency siren (e.g., cause the computer system to cease and/or forgo outputting the audio corresponding to the emergency system). In response to detecting the user input (e.g., release of user input 850a) requesting to cancel outputting the audio (e.g., 820, 830, 834, and/or 838) corresponding to the emergency siren, the computer system (e.g., 100, 300, 500, 600, 646, and/or 1300) forgoes (and, in some embodiments, ceasing) outputting the audio (e.g., 820, 830, 834, and/or 838) corresponding to the emergency siren (e.g., ceasing and/or not outputting the audio corresponding to the emergency siren). Forgoing outputting the audio corresponding to the emergency siren in response to detecting the user input requesting to cancel outputting the audio corresponding to the emergency siren allows the user to cancel the emergency siren when the user inadvertently initiated the emergency siren and/or does not need the emergency siren, thereby reducing the battery usage of the computer system.

In some embodiments, the computer system (e.g., 100, 300, 500, 600, 646, and/or 1300) is configured to output the audio (e.g., 820, 830, 834, and/or 838) corresponding to the emergency siren while the computer system (e.g., 100, 300, 500, 600, 646, and/or 1300) is in a restricted mode of operation (e.g., a mode of operation in which the computer system is prevented from performing one or more operations that are available to be performed when the computer system is not in the restricted mode of operation. In some embodiments, the computer system requires an authentication user input before enabling the computer system to leave the restricted mode of operation). Enabling the computer system to output the audio corresponding to the emergency siren when the computer system is in the restricted mode of operation allows a user to initiate the emergency siren without having to provide authentication information to unlock the computer system, thereby improving safety features of the computer system.

In some embodiments, the computer system (e.g., 100, 300, 500, 600, 646, and/or 1300) is a wearable device (e.g., a watch, such as a smartwatch) and the computer system (e.g., 100, 300, 500, 600, 646, and/or 1300) is configured to output the audio (e.g., 820, 830, 834, and/or 838) corresponding to the emergency siren while the computer system (e.g., 100, 300, 500, 600, 646, and/or 1300) is not being worn by a user (e.g., the computer system receives information (e.g., via one or more sensors in communication with the computer system) indicating that the computer system is not being worn by a user of the computer system and/or that the computer system is not positioned on a wrist of the user of the computer system). Enabling the computer system to output the audio corresponding to the emergency siren when the computer system is not being worn by a user allows a user to initiate the emergency siren without having to put on the computer system and/or otherwise provide authentication information to the computer system, thereby improving safety features of the computer system.

In some embodiments, the computer system (e.g., 100, 300, 500, 600, 646, and/or 1300) adjusting output of the audio (e.g., 820, 830, 834, and/or 838) corresponding to the emergency siren while performing, at the computer system (e.g., 100, 300, 500, 600, 646, and/or 1300), the first operation associated with the event includes the computer system (e.g., 100, 300, 500, 600, 646, and/or 1300) ceasing outputting the audio (e.g., 820, 830, 834, and/or 838) corresponding to the emergency siren (e.g., pausing and/or stopping outputting of the audio corresponding to the emergency siren). Ceasing outputting the audio corresponding to the emergency siren in accordance with a determination that the event is of a first type allows a user to perform another operation that may provide emergency assistance to the user without requiring additional user input to cease outputting the audio, thereby reducing the number of inputs needed to perform an operation.

In some embodiments, the event includes an incoming phone call (e.g., causing computer system (e.g., 100, 300, 500, 600, 646, and/or 1300) to display user interface 822) (e.g., an incoming phone call received by the computer system (e.g., via a cellular network) and/or an incoming phone call received by an external computer system that is in communication with the computer system). Ceasing outputting audio when the event is an incoming phone call allows the user to potentially obtain emergency assistance by answering the phone call and providing important information to emergency services without interrupting the phone call and without requiring additional user input to cease outputting the audio, thereby reducing the number of inputs needed to perform an operation.

In some embodiments, the event includes expiration of a timer operation of the computer system (e.g., causing computer system (e.g., 100, 300, 500, 600, 646, and/or 1300) to display user interface 824) (e.g., an ongoing timer that was previously initiated has expired (e.g., zero time is remaining on the timer)). Ceasing outputting the audio corresponding to the emergency siren when the event is expiration of a timer allows a user to be alerted to the expiration of the timer that may be of importance to the health the user, thereby improving safety features of the computer system.

In some embodiments, the event includes an alarm triggering (e.g., causing computer system (e.g., 100, 300, 500, 600, 646, and/or 1300) to display user interface 826) (e.g., a current time of day reaches a time of day associated with an alarm that was previously set (e.g., via user input)). Ceasing outputting the audio corresponding to the emergency siren when the event is an alarm triggering allows a user to be alerted to the alarm that may be of importance to the health the user, thereby improving safety features of the computer system.

In some embodiments, in response to detecting that the first operation associated with the event has ended (e.g., a phone call has ended, an expired timer has been silenced and/or dismissed, and/or a triggered alarm has been silenced and/or dismissed), the computer system (e.g., 100, 300, 500, 600, 646, and/or 1300) resumes outputting the audio (e.g., 820, 830, 834, and/or 838) corresponding to the emergency siren (e.g., unpausing and/or re-initiating the audio corresponding to the emergency siren). Resuming outputting the audio corresponding to the emergency siren in response to detecting that the first operation associated with the event has ended allows a user to continue to try and obtain emergency assistance without requiring additional user input to reinitiate output of the audio, thereby reducing the number of inputs needed to perform an operation.

In some embodiments, the computer system (e.g., 100, 300, 500, 600, 646, and/or 1300) adjusting output of the audio (e.g., 820, 830, 834, and/or 838) corresponding to the emergency siren while performing, at the computer system (e.g., 100, 300, 500, 600, 646, and/or 1300), the first operation associated with the event includes the computer system (e.g., 100, 300, 500, 600, 646, and/or 1300) adjusting a characteristic of the audio (e.g., 820, 830, 834, and/or 838) corresponding to the emergency siren (e.g., adjusting a volume level, a frequency, an interval at which audio bursts are output, a wavelength, and/or an amplitude of the audio) based on user interaction (e.g., 850b, 850c, and/or 850d) with the computer system (e.g., 100, 300, 500, 600, 646, and/or 1300) (e.g., user input, such as a touch gesture (e.g., a tap gesture, a tap and hold gesture, a swipe gesture, and/or a tap gesture with a movement component) received and/or detected by a touch-sensitive display device in communication with the computer system (e.g., the display generation component), a press input, a press and hold input, and/or a rotational input received and/or detected by one or more hardware input devices in communication with the computer system, and/or an air gesture, such as a wrist raise gesture). Adjusting the characteristics of the audio corresponding to the emergency siren based on user interaction with the computer system allows a user to move about and/or otherwise cause the computer system to perform operations without the audio corresponding to the emergency siren to significantly affecting the hearing of the user, thereby improving safety features of the computer system.

In some embodiments, the user interaction (e.g., 850b, 850c, and/or 850d) includes user input (e.g., 850b, 850c, and/or 850d) (e.g., user input, such as a touch gesture (e.g., a tap gesture, a tap and hold gesture, a swipe gesture, and/or a tap gesture with a movement component) received and/or detected by a touch-sensitive display device in communication with the computer system (e.g., the display generation component)) corresponding to a user interface (e.g., 604, 832, and/or 836) (e.g., a watch face user interface and/or a user interface associated with an application of the computer system) displayed via a display generation component (e.g., 602, 646a, and/or 1300a) in communication with the computer system (e.g., 100, 300, 500, 600, 646, and/or 1300) (e.g., a display controller, a touch-sensitive display system, a projector, a display screen, a display monitor, and/or a holographic display), where the user input (e.g., 850b, 850c, and/or 850d) is detected within a predetermined amount of time (e.g., within one second, within two seconds, within three seconds, within five seconds, within ten seconds, and/or within thirty seconds) from a current time (e.g., a current time of day). Adjusting the characteristics of the audio corresponding to the emergency siren based on user input corresponding to a user interface that is detected with a predetermined amount of time from a current time allows a user to move about and/or otherwise cause the computer system to perform operations without the audio corresponding to the emergency siren to significantly affecting the hearing of the user, thereby improving safety features of the computer system.

In some embodiments, the user interaction (e.g., 850*b*, 850*c*, and/or 850*d*) includes a wrist raise gesture (e.g., the computer system receives information (e.g., via one or more sensors in communication with the computer system) indicating that a position and/or orientation of the computer system is at a predetermined position and/or orientation associated with the user raising a wrist to view a display generation component of the computer system and/or otherwise interact with the computer system). Adjusting the characteristics of the audio corresponding to the emergency siren based on a wrist raise gesture allows a user to move about and/or otherwise cause the computer system to perform operations without the audio corresponding to the emergency siren to significantly affecting the hearing of the user, thereby improving safety features of the computer system.

In some embodiments, the audio (e.g., 820, 830, 834, and/or 838) corresponding to the emergency siren has a waveform that is selected so as to enable the audio (e.g., 820, 830, 834, and/or 838) to travel a predefined distance (e.g., more than 100 feet, more than 200 feet, more than 300 feet, and/or more than 400 feet in a predetermined set of conditions) from the computer system (e.g., 100, 300, 500, 600, 646, and/or 1300) (e.g., from a position at which computer system is located) while reducing battery usage of the computer system (e.g., 100, 300, 500, 600, 646, and/or 1300) (e.g., adjusting a volume level, a frequency, an interval at which audio bursts are output, a wavelength, and/or an amplitude of the audio, so that the audio will travel the predefined distance without requiring additional power usage by the computer system). Outputting the audio corresponding to the emergency siren so that it will travel a predefined distance while reducing battery usage of the computer system allows a user to obtain emergency assistance via the emergency siren without requiring excess battery usage, thereby increasing a battery life of the computer system.

Note that details of the processes described above with respect to method 1000 (e.g., FIG. 10) are also applicable in an analogous manner to the methods described below/above. For example, methods 700, 900, 1200, and/or 1400 optionally includes one or more of the characteristics of the various methods described above with reference to method 1000. For example, a computer system that is configured to perform method 1000 is also configured to provide guidance about initiating an operation, perform a first operation, display notifications, and/or perform an operation when in a low power mode of operation. For brevity, these details are not repeated below.

FIGS. 11A-11K illustrate exemplary user interfaces for displaying notifications, in accordance with some embodiments. The user interfaces in these figures are used to illustrate the processes described below, including the processes in FIG. 12.

In some embodiments, any of the inputs described herein (e.g., input 1150*a*, 1150*b*, 1150*c*, 1150*d*, and/or 1150*e*) is or includes a touch input (e.g., a tap gesture and/or a swipe gesture). In some embodiments, any of the inputs described herein (e.g., input 1150*a*, 1150*b*, 1150*c*, 1150*d*, and/or 1150*c*) is or includes a voice input (e.g., a voice command to select a user interface element or to activate a feature or perform a function, such as a feature or function associated with a user interface element). In some embodiments, any of the inputs described herein (e.g., input 1150*a*, 1150*b*, 1150*c*, 1150*d*, and/or 1150*c*) is or includes an air gesture (e.g., an air gesture to select a user interface element or to activate a feature or perform a function, such as a feature or function associated with a user interface element). In some embodiments, any of the inputs described herein (e.g., input 1150*a*, 1150*b*, 1150*c*, 1150*d*, and/or 1150*c*) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

Figures 11A, 11B, 11C, 11D:
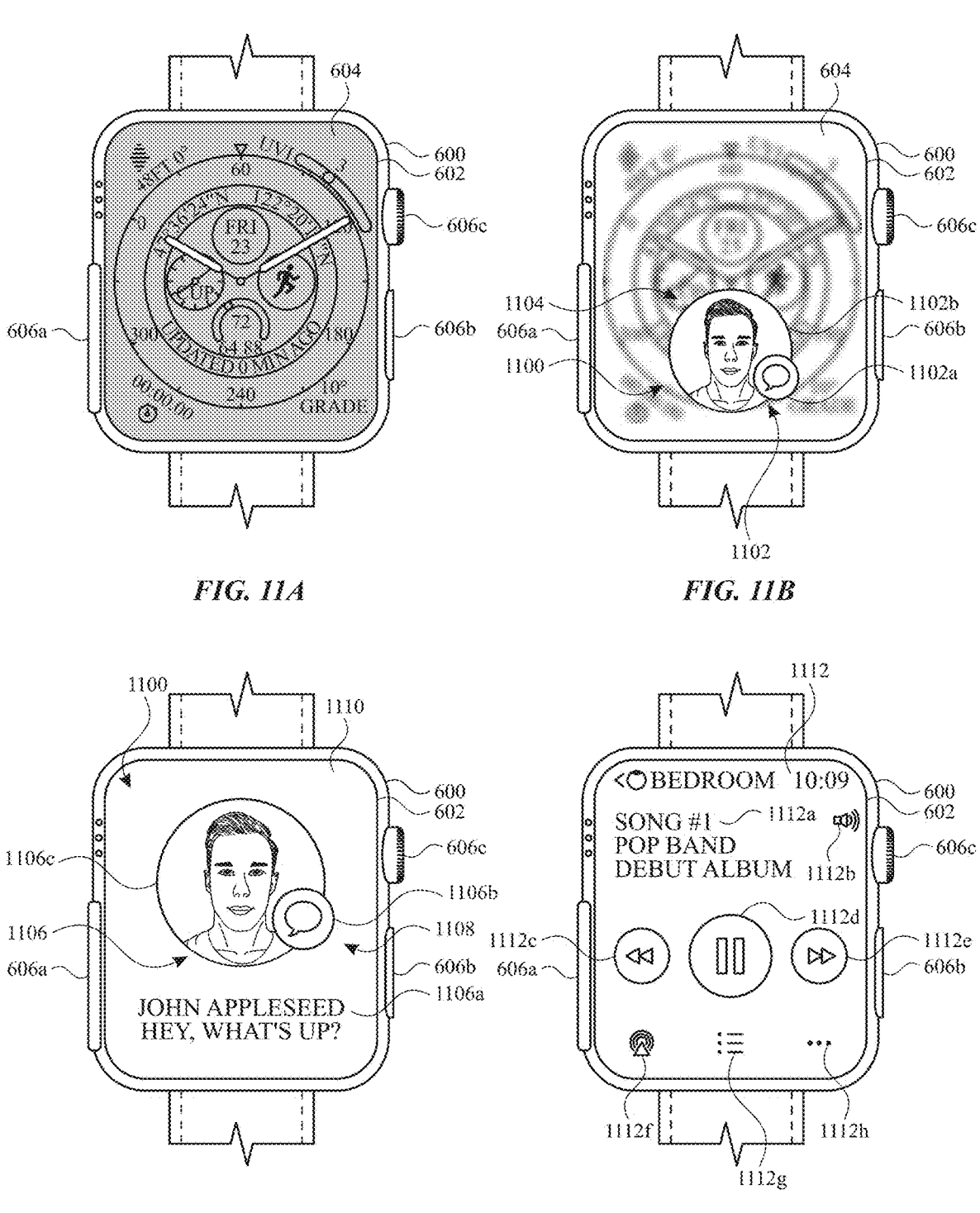

FIG. 11A illustrates computer system 600 displaying, via display device 602, watch face user interface 604 while computer system is in an inactive mode. In some embodiments, computer system 600 operates in the inactive mode in response to detecting an absence of one or more user inputs of a first type for a predetermined amount of time (e.g., 5 seconds or 10 seconds), detecting a wrist down gesture (e.g., movement and/or an orientation of the computer system 600 indicates that a wrist of the user of computer system 600 has been placed on a surface and/or at a waist of a user), and/or detecting a user input of a second type, such as a hand covering gesture on display device 602. In some embodiments, the inactive mode is a lower power mode that reduces a brightness of display device 602 and/or otherwise causes computer system 600 to display a reduced amount of content, thereby reducing battery usage of computer system 600. At FIG. 11A, computer system 600 displays watch face user interface 604 having a reduced brightness (e.g., as indicated by shading at FIG. 11A) as compared to displaying watch face user interface 604 in an active mode (e.g., watch face user interface 604 at FIGS. 6A and/or 8A). While computer system 600 displays watch face user interface 604 in the inactive mode at FIG. 11A, in some embodiments, computer system 600 displays another user interface while operating in the inactive mode.

While computer system 600 operates in the inactive mode, computer system 600 detects an occurrence of an event, such as a notification event. In some embodiments, the event includes computer system 600 receiving information associated with an application of computer system 600 that satisfies a set of one or more criteria (e.g., notifications are enabled for a respective application, the information received includes time-sensitive content, and/or the information received includes data that exceeds a threshold for outputting a notification) for outputting and/or displaying a notification. For instance, at FIG. 11B, computer system 600 detects an occurrence of an event corresponding to an incoming message that satisfies the set of one or more criteria. In some embodiments, computer system 600 receives the information from an external computer system (e.g., external computer system 646). In some embodiments, computer system 600 receives information via a wireless communication technique, such as Bluetooth, Wi-Fi, a cellular connection, and/or an Internet connection.

At FIG. 11B, in response to detecting the occurrence of the event corresponding to the incoming message and in accordance with a determination that computer system 600 is in the inactive mode, computer system 600 initiates output (e.g., displays) of first notification 1100 at a first time by displaying first portion 1102 of first notification 1100. Computer system 600 is configured to animate display of first notification 1100, such that first portion 1102 of first notification 1100 is displayed at the first time with first size 1104 and second portion 1106 of first notification 1100 is displayed at a second time, after the first time, with second size 1108, as shown at FIG. 11C. In some embodiments, computer system 600 increases an amount of content displayed and/or otherwise included in first notification 1100 over time. Accordingly, computer system 600 changes a size, moves, changes an amount of content, and/or changes an appearance of first notification 1100 over time in response to detecting the occurrence of the event corresponding the incoming message.

At FIG. 11B, first portion 1102 of first notification includes application indicator 1102a and notification indicator 1102b. Application indicator 1102a includes an icon, symbol, and/or image associated with an application of computer system 600 that is associated with first notification 1100, such as a messaging application. Notification indicator 1102b includes an icon, symbol, image, and/or avatar of a user of an external computer system associated with first notification 1100. At FIG. 11B, notification indicator 1102b includes an image and/or avatar of a contact and/or user that sent a message to a user of computer system 600.

At FIG. 11B, first portion 1102 of first notification 1100 is displayed as being overlaid on watch face user interface 604. In addition, computer system 600 deemphasizes watch face user interface 604 with respect to first portion 1102 of first notification 1100 to draw the attention of the user of computer system 600 to first notification 1100. For instance, at FIG. 11B, watch face user interface 604 is blurred to deemphasize an appearance of watch face user interface 604 as compared to first portion 1102 of first notification 1100. In some embodiments, computer system 600 deemphasizes watch face user interface 604 by reducing a brightness of watch face user interface 604, reducing a size of watch face user interface 604, increasing a transparency of watch face user interface 604, and/or increasing an amount of blur of watch face user interface 604 as compared to first portion 1102 of first notification 1100.

At FIG. 11C, computer system 600 displays second portion 1106 of first notification 1100 at second size 1108 at the second time after the first time. At FIG. 11C, second portion 1106 of first notification 1100 includes additional content as compared to first portion 1102 of first notification 1100. For instance, second portion 1106 of first notification 1100 includes information indicator 1106a that provides a visual indication of information about first notification 1100. At FIG. 11C, information indicator 1106a includes at least a portion of a message (e.g., "HEY, WHAT'S UP?") associated with first notification 1100 and a contact identifier (e.g., "JOHN APPLESEED") of the user that sent the message to the user of computer system 600. In addition to including information indicator 1106a, second portion 1106 of first notification 1100 includes application indicator 1106b and notification indicator 1106c. Similar to first portion 1102 of first notification, application indicator 1106b includes an icon, symbol, and/or image associated with an application of computer system 600 that is associated with first notification 1100, such as a messaging application. Notification indicator 1106c includes an icon, symbol, image, and/or avatar of a user of an external computer system associated with first notification 1100. At FIG. 11C, notification indicator 1102b includes an image and/or avatar of a contact and/or user that sent a message to a user of computer system 600. At FIG. 11C, application indicator 1106b and notification indicator 1106c are displayed at a size that is larger than application indicator 1102a and notification indicator 1102b of first portion 1102 of first notification 1100.

At FIG. 11C, second portion 1106 of first notification 1100 is displayed on an entire display area 1110 of display device 602, whereas first portion 1102 of first notification 1100 is overlaid on a portion of watch face user interface 604. Accordingly, first notification 1100 is configured to fully cover a previously displayed user interface of computer system 600 (e.g., first notification 1100 entirely covers watch face user interface 604 so that watch face user interface 604 is no longer visible and/or being displayed).

In some embodiments, in response to detecting user input corresponding to first notification 1100, computer system 600 launches a messaging application associated with first notification 1100 and displays message user interface 1120, as shown at FIG. 11F.

Computer system 600 is configured to display different types and/or sizes of notifications based on whether computer system 600 is operating in the inactive mode and/or an active mode when computer system 600 detects the occurrence of the event. For instance, at FIG. 11D, computer system 600 displays music user interface 1112 (e.g., a now playing user interface associated with output of media configured to be controlled via computer system 600) while computer system 600 operates in the active mode. In some embodiments, the active mode of computer system 600 includes computer system 600 operating in a normal mode of operation, where computer system 600 is configured to receive user inputs and perform operations based on the received user inputs. In some embodiments, the active mode of computer system 600 includes a mode in which computer system 600 is receiving and/or is likely to receive user inputs, such as when computer system 600 detects and/or has detected user input within a predetermined amount of time, when computer system 600 detects a wrist raise gesture, and/or when computer system 600 is actively displaying a user interface that is not a watch face user interface (e.g., watch face user interface 604). In some embodiments, the active mode of computer system 600 includes computer system displaying an editing user interface (e.g., a user interface for editing text), a selection user interface (e.g., a user interface including one or more selectable user interface objects), and/or a drafting user interface (e.g., a user interface for drafting a message, a document, and/or other text). In some embodiments, the active mode of computer system 600 does not include computer system 600 displaying an information display user interface (e.g., a watch face user interface, such as watch face user interface 604).

At FIG. 11D, computer system 600 displays music user interface 1112 that includes media indicator 1112a, volume indicator 1112b, control user interface objects 1112c-1112e, device user interface object 1112f, contents user interface object 1112g, and settings user interface object 1112h. Music user interface 1112 is associated with a media item (e.g., a song) that is configured to be output and/or controlled by computer system 600. At FIG. 11D, while computer system 600 displays music user interface 1112, computer system 600 detects an occurrence of an event, such as a notification event. In some embodiments, the event includes computer system 600 receiving information associated with an application of computer system 600 that satisfies a set of one or more criteria (e.g., notifications are enabled for a respective application, the information received includes time-sensitive content, and/or the information received includes data that exceeds a threshold for outputting a notification) for outputting and/or displaying a notification. For instance, at FIG. 11D, computer system 600 detects an occurrence of an event corresponding to an incoming message that satisfies the set of one or more criteria. In some embodiments, computer system 600 receives the information from an external computer system (e.g., external computer system 646). In some embodiments, computer system 600 receives information via a wireless communication technique, such as Bluetooth, Wi-Fi, a cellular connection, and/or an Internet connection.

In response to detecting the occurrence of the event and in accordance with a determination that computer system 600 is operating in the active mode, computer system 600 displays second notification 1114, as shown at FIG. 11E. As set forth above, when computer system 600 detects the occurrence of the event and in accordance with a determination that computer system 600 is operating in the inactive mode, computer system 600 displays first notification 1100, as shown at FIGS. 11B and 11C. Accordingly, computer system 600 is configured to display different types and/or sizes of notifications based on whether computer system 600 operates in the active mode or the inactive mode. In some embodiments, displaying the different types and/or sizes of notifications based on whether computer system 600 operates in the active mode or the inactive mode reduces interruptions to a user that is interacting with computer system 600 and allows the user to perform tasks more quickly and/or efficiently.

For instance, at FIG. 11E, computer system 600 displays second notification 1114 in response to detecting the occurrence of the event and in accordance with a determination that computer system 600 is in the active mode. At FIG. 11E, second notification 1114 includes third size 1116, which occupies portion 1110a of display area 1110 of display device 602 and does not occupy portion 1110b of display area 1110 of display device 602. Accordingly, second notification 1114 does not occupy the entire display area 1110, which enables a user of computer system 600 to be alerted to the occurrence of the event while still enabling the user to interact with computer system 600. At FIG. 11E, second notification 1114 is overlaid on portion 1110a of display area 1110, such that second notification 1114 covers, blocks, and/or obscures portion 1118a of music user interface 1112 and second notification 1114 does not cover, block, and/or obscure portion 1118b of music user interface 1112. As shown at FIG. 11E, computer system 600 does not deemphasize music user interface 1112 when displaying second notification 1114 so that the user of computer system 600 can still clearly view and/or interact with music user interface 1112. In some embodiments, computer system 600 deemphasizes music user interface 1112 (e.g., portion 1118b of music user interface 1112) while displaying second notification 1114 by blurring, reducing a brightness, increasing a transparency, and/or reducing a size of music user interface 1112.

At FIG. 11E, second notification 1114 includes application indicator 1114a, notification indicator 1114b, and information indicator 1114c. Application indicator 1114a includes an icon, symbol, and/or image associated with an application of computer system 600 that is associated with second notification 1114, such as a messaging application. Notification indicator 1114b includes an icon, symbol, image, and/or avatar of a user of an external computer system associated with second notification 1114. At FIG. 11E, notification indicator 1114b includes an image and/or avatar of a contact and/or user that sent a message to a user of computer system 600. Information indicator 1114c includes at least a portion of a message (e.g., "HEY, WHAT'S UP?") associated with second notification 1114 and a contact identifier (e.g., "JOHN APPLESEED") of the user that sent the message to the user of computer system 600. At FIG. 11E, application indicator 1114a, notification indicator 1114b, and information indicator 1114c are displayed at a smaller size than information indicator 1106a, application indicator 1106b, and notification indicator 1106c of second portion 1106 of first notification 1100 because second notification 1114 is displayed at third size 1116, which is smaller than second size 1108.

In some embodiments, computer system 600 is configured to display second notification 1114 with less content than first notification 1100. For instance, in some embodiments, information indicator 1114c of second notification 1114 includes less text and/or less information than information indicator 1106a of first notification 1100 (e.g., second portion 1106 of first notification 1100). In some embodiments, second notification 1114 includes the same amount of content and/or information as first notification 1100, but the content and/or information of second notification 1114 is displayed at a smaller size than the content and/or information of first notification 1100.

At FIG. 11E, while computer system 600 displays second notification 1114 overlaid on portion 1118a of music user interface 1112, computer system 600 detects user input 1150a (e.g., a tap gesture or other selection/navigation input) corresponding to pause control user interface object 1112d. In some embodiments, in response to detecting user input 1150a, computer system 600 causes a device (e.g., computer system 600 and/or an external computer system (e.g., a speaker and/or headphones) in communication with computer system 600) outputting content (e.g., audio) associated with a media item (e.g., a song) to pause output of the content. In some embodiments, in response to detecting user input 1150a, computer system 600 ceases displaying second notification 1114.

At FIG. 11E, while computer system 600 displays second notification 1114 overlaid on portion 1118a of music user interface 1112, computer system 600 detects user input 1150b (e.g., a tap gesture or other selection/navigation input) corresponding to device user interface object 1112f. In some embodiments, in response to detecting user input 1150b, computer system 600 displays a list of devices configured to output content associated with the media item. In some embodiments, in response to selecting a respective device of the list of devices computer system 600 enables and/or controls the respective device to output the content associated with the media item. In some embodiments, in response to detecting user input 1150b, computer system 600 displays the list of devices and ceases displaying second notification 1114 (and, optionally, ceases displaying music user interface 1112).

At FIG. 11E, while computer system 600 displays second notification 1114 overlaid on portion 1118a of music user interface 1112, computer system 600 detects user input 1150c (e.g., a tap gesture or other selection/navigation input) corresponding to selection of second notification 1114. In response to detecting user input 1150c, computer system 600 displays message user interface 1120, as shown at FIG. 11F.

Additionally or alternatively, while computer system 600 displays second notification 1114 overlaid on portion 1118*a* of music user interface 1112, computer system 600 detects user input 1150*d* (e.g., a swipe gesture or other selection/ navigation input) corresponding to second notification 1114. In response to detecting user input 1150*d*, computer system 600 ceases displaying second notification 1114 overlaid on music user interface 1112, as shown at FIG. 11G. Further still, in addition to or in lieu of detecting user inputs 1150*c* and/or 1150*d*, while computer system 600 displays second notification 1114 overlaid on portion 1118*a* of music user interface 1112, computer system 600 detects the occurrence of a second event, such as a second notification. In response to detecting the occurrence of the second event while displaying second notification 1114, computer system 600 displays third notification 1124, as shown at FIG. 11H.

At FIG. 11F, message user interface 1120 includes message region 1122 including contact indicator 1122*a* and message indicator 1122*b*. In addition, message user interface 1120 includes reply user interface object 1120*a* and dismiss user interface object 1120*b*. As shown at FIG. 11F, computer system 600 displays message region 1122, which includes at least some of the same information as information indicator 1114*c* of second notification 1114. However, message user interface 1120 is displayed on the entire display area 1110 of display device 602, such that computer system 600 can display additional content associated with second notification 1114 and/or display content associated with second notification 1114 at a larger size. In other words, in response to detecting user input 1150*c*, computer system 600 expands second notification 1114 to display message user interface 1120, which corresponds to second notification 1114 (e.g., message user interface 1120 includes content and/or information that is based on the occurrence of the event that caused computer system 600 to display second notification 1114).

In some embodiments, in response to user input selecting reply user interface object 1120*a*, computer system 600 displays a message drafting user interface that enables a user of computer system 600 to draft and/or send a message via user input (e.g., user input directed to display device and/or voice input). In some embodiments, in response to detecting user input selecting dismiss user interface object 1120*b*, computer system 600 displays music user interface 1112 without second notification 1114, as shown at FIG. 11G.

At FIG. 11G, computer system 600 ceases to display second notification 1114, which enables a user to quickly return to interacting with music user interface 1112 when the user determines that they do not need to address (e.g., respond, expand, and/or read) the message associated with second notification 1114. In some embodiments, computer system 600 is configured to cease displaying second notification 1114 overlaid on portion 1118*a* of message user interface 1112 in response to detecting an absence of user input for a predetermined period of time while displaying second notification 1114. In other words, when computer system 600 has displayed second notification 1114 for the predetermined period of time and computer system 600 has not detected user input, computer system 600 ceases to display second notification 1114 so that portion 1118*a* of music user interface 1112 is no longer obstructed, blocked, and/or covered by second notification 1114, as shown at FIG. 11G.

As set forth above, while computer system 600 displays second notification 1114 and in response to detecting the occurrence of a second event, computer system 600 displays third notification 1124, as shown at FIG. 11H. At FIG. 11H, computer system 600 displays third notification 1124 at a first time after detecting the occurrence of the second event, such that third notification 1124 partially covers, blocks, and/or obscures second notification 1114. Computer system 600 is configured to display an animation of third notification 1124 so that third notification 1124 appears to move downward from edge 1126 of display device 602 toward second notification 1114 (e.g., computer system 600 maintains display of second notification 1114 at location 1128 of display device 602 and/or on music user interface 1112).

For instance, at FIG. 11I, computer system 600 displays third notification 1124 at a second time after the first time from detecting the occurrence of the second event. At FIG. 11I, computer system 600 displays third notification so that third notification 1124 completely covers, obstructs, and/or blocks second notification 1114. In some embodiments, computer system overlays third notification 1124 onto second notification 1114 so that second notification is not visible on display device 602. In other words, computer system 600 displays third notification 1124 as appearing to be stacked on top of second notification 1114.

At FIG. 11I, computer system 600 detects user input 1150*e* (e.g., a swipe gesture or other selection/navigation input) corresponding to third notification 1124. In response to detecting user input 1150*c*, computer system initiates a process for ceasing to display (e.g., dismissing) both third notification 1124 and second notification 1114, as shown at FIGS. 11J and 11K.

For instance, at FIG. 11J, at a first time since detecting user input 1150*e*, computer system 600 displays second notification 1114 at location 1130 on display device 602 and/or on music user interface 1112 and maintains a position of third notification 1124. Accordingly, computer system 600 is configured to provide a visual indication of a number of notifications that the user is dismissing by providing user input 1150*e* by displaying both second notification 1114 and third notification 1124 in response to detecting user input 1150*c*.

At FIG. 11K, at a second time after the first time since detecting user input 1150*e*, computer system 600 displays third notification 1124 at location 1132. Between the first time and the second time since detecting user input 1150*e*, computer system 600 displays movement of second notification 1114 and third notification 1124 toward edge 1126 of display device 602 so that both second notification 1114 and third notification 1124 appear to move off of display device 602. In some embodiments, at a third time after the second time since detecting user input 1150*e*, computer system 600 ceases displaying both second notification 1114 and third notification 1124 and displays music user interface 1112, as shown at FIG. 11G.

FIG. 12 is a flow diagram illustrating a method for displaying notifications using a computer system in accordance with some embodiments. Method 1200 is performed at a computer system (e.g., 100, 300, 500, 600, 646, and/or 1300) (e.g., an electronic device; a smart device, such as a smartphone or a smartwatch; a mobile device; a wearable device) that is in communication with a display generation component (e.g., 602, 646*a*, and/or 1300*a*) (e.g., a display controller, a touch-sensitive display system, a projector, a display screen, a display monitor, and/or a holographic display). Some operations in method 1200 are, optionally, combined, the orders of some operations are, optionally, changed, and some operations are, optionally, omitted.

As described below, method 1200 provides an intuitive way for displaying notifications. The method reduces the cognitive burden on a user for accessing notifications, thereby creating a more efficient human-machine interface. For battery-operated computing devices, enabling a user to access notifications faster and more efficiently conserves power and increases the time between battery charges.

Computer system (e.g., 100, 300, 500, 600, 646, and/or 1300) detects (1202) an occurrence of an event (e.g., an indication of a notification associated with an application of the computer system, an indication of a time-sensitive event (e.g., a timer, a meeting, and/or a scheduled event), and/or an indication of an incoming communication (e.g., phone call, text message, electronic mail, and/or video call)).

In response to detecting the occurrence of the event, the computer system (e.g., 100, 300, 500, 600, 646, and/or 1300) displays (1204) a notification (e.g., 1100 and/or 1114) corresponding to the event (e.g., a push notification, a user interface object, text, images, symbols, icons, and/or another indication indicative of the event).

Displaying the notification (e.g., 1100 and/or 1114) includes, in accordance with a determination that the computer system (e.g., 100, 300, 500, 600, 646, and/or 1300) satisfies a respective set of one or more criteria that indicate that the computer system (e.g., 100, 300, 500, 600, 646, and/or 1300) is in a state in which user input is occurring or is likely to occur (e.g., the computer system is currently receiving and/or detecting user input, such as a touch gesture (e.g., a tap gesture, a tap and hold gesture, a swipe gesture, and/or a tap gesture with a movement component) received and/or detected by a touch-sensitive display device in communication with the computer system (e.g., the display generation component), a press input, a press and hold input, and/or a rotational input received and/or detected by one or more hardware input devices in communication with the computer system, and/or an air gesture, such as a wrist raise gesture; the computer system is in a state in which user input is likely to occur when the computer system is displaying a user interface in a first state (e.g., an active state and not an inactive state) that is configured to receive user inputs and/or perform operations in response to receiving and/or detecting user inputs) (e.g., the computer system is in a state in which user input is occurring or is likely to occur when the computer system is oriented in a predetermined position (e.g., a position indicative of a user viewing the display generation component (e.g., the user is wearing the computer system on a wrist and the wrist is in a raised position)), the computer system is displaying a user interface that is not a watch face user interface and/or that is not otherwise associated with inactivity of the computer system, and/or the computer system has detected a user input within a predetermined amount of time from the time at which the occurrence of the event was received), the computer system (e.g., 100, 300, 500, 600, 646, and/or 1300) displaying (1206), via the display generation component (e.g., 602, 646a, and/or 1300a), a first notification (e.g., 1114) corresponding to the event (e.g., a notification partially overlaid on a currently displayed user interface that includes one or more user interface objects and/or text indicative of the content of the occurrence of the event), where the first notification (e.g., 1114) obscures a first amount (e.g., 1110a) of a display region (e.g., 1110) that was used to display a user interface (e.g., 1112) prior to displaying the first notification (e.g., 1114) (e.g., the first content includes a first amount of content, such as user interface objects, text, symbols, and/or icons indicative of the occurrence of the event, where the first amount of content is less than a second amount of content of the second content of the second notification). In some embodiments the first notification (e.g., 1114) includes a first size (e.g., 1116) that is less than a size of the display generation component (e.g., 602, 646a, and/or 1300a), such that the first notification (e.g., 1114) does not occupy an entire display area (e.g., 1110) of the display generation component (e.g., 602, 646a, and/or 1300a. In some embodiments, the first notification (e.g., 1114) is overlaid on a first portion (e.g., 1118a) of a currently displayed user interface (e.g., 1112) and a second portion (e.g., 1118b) of the currently displayed user interface (e.g., 1112) is not covered, obscured, and/or blocked by the first notification (e.g., 1114).

Displaying the notification (e.g., 1100 and/or 1114) includes, in accordance with a determination that the computer system (e.g., 100, 300, 500, 600, 646, and/or 1300) does not satisfy the respective set of one or more criteria that indicate that the computer system (e.g., 100, 300, 500, 600, 646, and/or 1300) is in a state in which user input is occurring or is likely to occur (e.g., the computer system is not currently receiving and/or detecting user input, such as a touch gesture (e.g., a tap gesture, a tap and hold gesture, a swipe gesture, and/or a tap gesture with a movement component) received and/or detected by a touch-sensitive display device in communication with the computer system (e.g., the display generation component), a press input, a press and hold input, and/or a rotational input received and/or detected by one or more hardware input devices in communication with the computer system, and/or an air gesture, such as a wrist raise gesture; the computer system is not in a state in which user input is likely to occur when the computer system is displaying a user interface in a second state (e.g., an inactive state and not an active state) that is not configured to receive user inputs and/or perform operations in response to receiving and/or detecting user inputs) (e.g., the computer system is not in a state in which user input is occurring or is likely to occur when the computer system is not oriented in the predetermined position (e.g., a position indicative of a user viewing the display generation component (e.g., the user is wearing the computer system on a wrist and the wrist is in a raised position)), the computer system is displaying a watch face user interface and/or a user interface that is otherwise associated with inactivity of the computer system, and/or the computer system has not detected a user input within the predetermined amount of time from the time at which the occurrence of the event was received), the computer system (e.g., 100, 300, 500, 600, 646, and/or 1300) displaying (1208), via the display generation component (e.g., 602, 646a, and/or 1300a), a second notification (e.g., 1100) corresponding to the event (e.g., a notification overlaid on a currently displayed user interface that includes one or more user interface objects and/or text indicative of the content of the occurrence of the event) (in some embodiments, the second notification includes the same one or more user interface objects and/or text indicative of the content of the occurrence of the event as the first notification and includes additional user interface objects and/or text indicative of the content of the occurrence of the event that the first notification does not include), where the second notification (e.g., 1100) obscures a second amount (e.g., 1110a and 1110b) of a display region (e.g., 1110) that was used to display a user interface (e.g., 604) prior to displaying the second notification (e.g., 1100), where the second amount (e.g., 1110a and 1110b) is larger than the first amount (e.g., 1110a) (e.g., the second notification includes a second amount of content, such as user interface objects, text, symbols, and/or icons indicative of the occurrence of the event, where the second amount of content is greater than the first amount of content of the first content of the first notification and/or where the second amount of content is the same as the first amount of content and is displayed at a size that is larger than the first amount of the first content of the first notification). In some embodiments, the second content includes the first content and includes additional content that is not included in the first content. In some embodiments, the second notification (e.g., 1100) includes a size (e.g., 1108) that is the same as a size of the display generation component (e.g., 602, 646*a*, and/or 1300), such that the second notification (e.g., 1100) occupies an entire display area (e.g., 1110) of the display generation component (e.g., 602, 646*a*, and/or 1300*a*) and is displayed more prominently when a user raises their wrist to view the display generation component (e.g., 602, 646*a*, and/or 1300*a*) of the computer system (e.g., 100, 300, 500, 600, 646, and/or 1300). In some embodiments, the second notification (e.g., 1100) is overlaid on a currently displayed user interface (e.g., 604), such that the second notification (e.g., 1100) covers, blocks, and/or obscures the entire currently displayed user interface (e.g., 604).

Displaying the first notification when the computer system satisfies the respective set of one or more criteria that indicate that the computer system is in a state in which user input is occurring or is likely to occur and displaying the second notification when the computer system does not satisfy the respective set of one or more criteria that indicate that the computer system is in the state in which user input is occurring or is likely to occur allows a user to receive an indication of the notification without interrupting a task and/or action that a user is currently performing, thereby reducing an amount of a time for performing a task.

In some embodiments, the state in which user input is occurring or is likely to occur includes the computer system (e.g., 100, 300, 500, 600, 646, and/or 1300) displaying, via the display generation component (e.g., 602, 646*a*, and/or 1300*a*), an editing user interface (e.g., 1112) (e.g., a user interface for editing a watch face user interface, a user interface for editing a message, a user interface for editing a note and/or document, and/or a user interface for editing text), a selection user interface (e.g., 1112) (e.g., a user interface for selecting an application, a playlist, a song, an artist, a workout, a location, a route, another user for initiating a communication with, an accessory of a home, a photo, and/or a news article), or a drafting user interface (e.g., a user interface for drafting a message, a user interface for drafting a note and/or document, and/or a user interface for drafting other text). The state in which user input is occurring or is likely to occur does not include the computer system displaying an information display user interface (e.g., 604) (e.g., a watch face user interface and/or another user interface that is displayed when the computer system detects an absence of user input and/or other user interaction with the computer system). Displaying the first notification when the computer system displays an editing user interface, a selection user interface, and/or a drafting user interface and displaying the second notification when the computer system displays an information display user interface allows a user to receive an indication of the notification without interrupting a task and/or action that a user is currently performing, thereby providing improved visual feedback.

In some embodiments, the state in which user input is occurring or is likely to occur includes the computer system being in an orientation that is indicative of a user's wrist being raised (e.g., the computer system includes one or more sensors (e.g., one or more accelerometers, gyroscopes, and/or inertial measurement units) that are configured to provide information about a position of the computer system, including a position indicative of a user's wrist being in a raised position where the user can interact with (e.g., view and/or otherwise provide user inputs to) the computer system) and the computer system displaying a user interface that is not a watch face user interface (e.g., 604) (e.g., a user interface that is displayed when the computer system detects an absence of user input and/or other user interaction with the computer system). The state in which user input is occurring or is likely to occur does not include the computer system being in an orientation that is indicative of a user's wrist being down (e.g., the computer system includes one or more sensors (e.g., one or more accelerometers, gyroscopes, and/or inertial measurement units) that are configured to provide information about a position of the computer system, including a position indicative of a user's wrist resting on a surface and/or at a side of a user (e.g., a user's waist and/or hip)) and/or the computer system displaying a watch face user interface (e.g., 604) (e.g., a user interface that is displayed when the computer system detects an absence of user input and/or other user interaction with the computer system).

Displaying the first notification when the computer system is not displaying a watch face user interface and/or when the computer system is in an orientation indicative of a user's wrist being raised and displaying the second notification when the computer system displays the watch face user interface and/or is in an orientation indicative of a user's wrist being down allows a user to receive an indication of the notification without interrupting a task and/or action that a user is currently performing, thereby providing improved visual feedback.

In some embodiments, the first notification (e.g., 1114) includes a first amount of content (e.g., 1114*a*, 1114*b*, and/or 1114*c*) (e.g., a first amount of text, icons, images, symbols, user interface objects, and/or information about the event) and the second notification includes a second amount of content (1106*a*, 1106*b*, and/or 1106*c*) (e.g., a second amount of text, icons, images, symbols, user interface objects, and/or information about the event), greater than the first amount of content (e.g., 1114*a*, 1114*b*, and/or 1114*c*) (e.g., the second notification includes more content about the event because the second notification occupies more of the display region of the display generation component). Displaying the first notification with the first amount of content and the second notification with the second amount of content, greater than the first amount of content, allows a user to receive an indication of the notification without interrupting a task and/or action that a user is currently performing, thereby providing improved visual feedback.

In some embodiments, the first notification (e.g., 1114) includes a first size (e.g., 1116) (e.g., a first size with respect to the display area) and the second notification (e.g., 1100) includes a second size (e.g., 1108) (e.g., a second, larger size with respect to the display area), greater than the first size (e.g., 1116). Displaying the first notification with the first size and the second notification with the size, greater than the first size, allows a user to receive an indication of the notification without interrupting a task and/or action that a user is currently performing, thereby providing improved visual feedback.

In some embodiments, displaying the second notification (e.g., 1100) corresponding to the event includes the computer system (e.g., 100, 300, 500, 600, 646, and/or 1300) expanding the second notification (e.g., 1100) (e.g., enlarging and/or increasing a size of the second notification over time) (in some embodiments, expanding the second notification includes animating the second notification to appear as if the second notification is moving from a bottom portion of the display generation component toward a top portion of the display generation component) from obscuring a third amount (e.g., 1104) of the display region (e.g., 1110) to the second amount (e.g., 1108 and/or 1110*a* and 1110*b*) of the display region (e.g., 1110), where the third amount (e.g., 1104) is less than the second amount (e.g., 1108 and/or 1110*a* and 1110*b*) (e.g., expanding the second notification includes displaying the second notification at a first size at a first time and subsequently displaying the second notification at a second size, larger than the first size, at a second time that is after the first time). Displaying the first notification (e.g., 1114) corresponding to the event does not include the computer system (e.g., 100, 300, 500, 600, 646, and/or 1300) expanding the first notification (e.g., 1114) (e.g., displaying the first notification does not include enlarging and/or increasing a size of the first notification over time (e.g., absent user input requesting expansion of the first notification)).

Expanding the second notification increases the chances that a user of the computer system will notice the second notification and not expanding the first notification reduces interruptions to the user of the computer system that is likely interacting with the computer system, thereby providing improved visual feedback.

In some embodiments, while displaying the first notification (e.g., 1114) corresponding to the event, the computer system (e.g., 100, 300, 500, 600, 646, and/or 1300) detects user input (e.g., 1150*c*) (e.g., a tap gesture) corresponding to selection of the first notification (e.g., 1114). In response to detecting the user input (e.g., 1150*c*), the computer system (e.g., 100, 300, 500, 600, 646, and/or 1300) expands the first notification (e.g., 1114) (e.g., enlarging and/or increasing a size of the first notification over time) from obscuring the first amount (e.g., 1110*a*) of the display region (e.g., 1110) to obscuring a fourth amount (e.g., 1110*a* and 1110*b*) of the display region (e.g., 1110), greater than the first amount (e.g., 1110*a*) (e.g., expanding the first notification includes displaying the first notification at a first size at a first time and subsequently displaying the first notification at a second size, larger than the first size, at a second time that is after the first time). Expanding the first notification in response to detecting the user input enables a user to decide whether to obtain additional information corresponding to the event even when the user is likely interacting with the computer system and/or performing another task, thereby providing improved visual feedback.

In some embodiments, the computer system (e.g., 100, 300, 500, 600, 646, and/or 1300) displaying the first notification (e.g., 1114) corresponding to the event includes the computer system (e.g., 100, 300, 500, 600, 646, and/or 1300) deemphasizing (e.g., dimming, fading, hiding, obscuring, and/or blocking at least a portion of a previously displayed user interface) the user interface (e.g., 604 and/or 1112) that was displayed prior to displaying the first notification (e.g., 1114). Deemphasizing the user interface that was displayed prior to displaying the first notification when displaying the first notification signals to a user that the occurrence of the event has been detected, thereby providing improved visual feedback.

In some embodiments, the computer system (e.g., 100, 300, 500, 600, 646, and/or 1300) deemphasizing the user interface (e.g., 604 and/or 1112) that was displayed prior to displaying the first notification (e.g., 1114) includes the computer system (e.g., 100, 300, 500, 600, 646, and/or 1300) darkening and/or blurring (e.g., as compared to a darkness and/or an amount of blur of the second notification) the user interface (e.g., 604 and/or 1112) that was displayed prior to displaying the first notification (e.g., 1114). Darkening or blurring the user interface that was displayed prior to displaying the first notification when displaying the first notification signals to a user that the occurrence of the event has been detected, thereby providing improved visual feedback.

In some embodiments, the computer system (e.g., 100, 300, 500, 600, 646, and/or 1300) deemphasizing the user interface (e.g., 604 and/or 1112) that was displayed prior to displaying the first notification (e.g., 1114) includes reducing a size of the user interface (e.g., 604 and/or 1112) that was displayed prior to displaying the first notification (e.g., 1114) (e.g., displaying the user interface at a first size prior to displaying the first notification and displaying the user interface at a second size, smaller than the first size, after and/or while displaying the first notification). Reducing the size of the user interface that was displayed prior to displaying the first notification when displaying the first notification signals to a user that the occurrence of the event has been detected, thereby providing improved visual feedback.

In some embodiments, while displaying the first notification (e.g., 1114) corresponding to the event, the computer system (e.g., 100, 300, 500, 600, 646, and/or 1300) detects a swipe gesture (e.g., 1150*d*) (e.g., an upward swipe gesture on the display generation component) corresponding to the first notification (e.g., 1114). In response to detecting the swipe gesture (e.g., 1150*d*) corresponding to the first notification (e.g., 1114), the computer system (e.g., 100, 300, 500, 600, 646, and/or 1300) ceases display of the first notification (e.g., 1114) (e.g., dismissing the first notification, and, optionally, including the first notification in a notification center user interface that includes a list of notifications). Ceasing to display the first notification in response to detecting the swipe gesture allows a user to quickly dismiss the first notification and minimize interruptions to a task and/or action that a user is currently performing, thereby providing improved visual feedback.

In some embodiments, while displaying the first notification (e.g., 1114) corresponding to the event, the computer system (e.g., 100, 300, 500, 600, 646, and/or 1300) detects that a predetermined amount of time has passed since first displaying the first notification (e.g., 1114) without detecting user input (e.g., two seconds, three seconds, five seconds, and/or ten seconds have passed since a time when the first notification was first displayed and the computer system has not detected user input (e.g., any user input) within the predetermined amount of time). In response to detecting that the predetermined amount of time has passed since first displaying the first notification (e.g., 1114), the computer system (e.g., 100, 300, 500, 600, 646, and/or 1300) ceases display of the first notification (e.g., 1114) (e.g., dismissing the first notification, and, optionally, including the first notification in a notification center user interface that includes a list of notifications).

Ceasing to display the first notification in response to detecting that the predetermined amount of time has passed since first displaying the first notification without detecting user input allows a user to dismiss the first notification without user input and minimize interruptions to a task and/or action that a user is currently performing, thereby providing improved visual feedback and reducing the number of inputs needed to perform an operation.

In some embodiments, while displaying the first notification (e.g., 1114) corresponding to the event (e.g., and while the respective set of one or more criteria that indicate that the computer system is in a state in which user input is occurring or is likely to occur is met), the computer system (e.g., 100, 300, 500, 600, 646, and/or 1300) detects an occurrence of a second event (e.g., an indication of a notification associated with an application of the computer system, an indication of a time-sensitive event (e.g., a timer, a meeting, and/or a scheduled event), and/or an indication of an incoming communication (e.g., phone call, text message, electronic mail, and/or video call)). In response to receiving the occurrence of the second event, the computer system (e.g., 100, 300, 500, 600, 646, and/or 1300) replaces display of the first notification (e.g., 1114) with display of a third notification (e.g., 1124) corresponding to the second event (e.g., the computer system ceases display of the first notification and displays the third notification that obscures the first amount of the display region that was used to display the user interface prior to displaying the first notification).

Replacing display of the first notification with display of the third notification in response to detecting the occurrence of the second event provides the user with information about a most recent event, thereby providing improved visual feedback to the user.

In some embodiments, while displaying the third notification (e.g., 1124) corresponding to the second event, the computer system (e.g., 100, 300, 500, 600, 646, and/or 1300) detects user input (e.g., 1150e) (e.g., a swipe gesture (e.g., upward swipe gesture) on the display generation component and/or on a portion of the display generation component displaying the third notification) requesting to dismiss the third notification (e.g., 1124) (e.g., requesting to cease displaying the third notification and, optionally, include the third notification in a notification center user interface that includes a list of notifications). In response to detecting the user input (e.g., 1150e) requesting to dismiss the third notification (e.g., 1124), the computer system (e.g., 100, 300, 500, 600, 646, and/or 1300) displays an expansion (e.g., unstacking or sliding apart) animation of the third notification (e.g., 1124) and the first notification (e.g., 1114) (e.g., the computer system displays movement of the third notification so that the computer system displays, via the display generation component, a stack of notifications including the first notification and the third notification (e.g., with the third notification is in a first position of the stack) and then displays the notifications within the stack of notifications moving in a direction that is off of a display area of the display generation component (e.g., moving in an upward direction and off of the display area of the display generation component)). After displaying the expansion animation of the third notification (e.g., 1124) and the first notification (e.g., 1114), the computer system (e.g., 100, 300, 500, 600, 646, and/or 1300) ceases displaying the first notification (e.g., 1114) and the third notification (e.g., 1124) (e.g., the computer system does not display the first notification and the third notification and, optionally, the computer system includes the first notification and the third notification in a notifications center user interface that includes a list of notifications).

Displaying the unstacking animation in response to detecting the user input requesting to dismiss the third notification allows a user to see a number of notifications that the user has not yet addressed and/or otherwise interacted with, thereby providing improved visual feedback to the user.

In some embodiments, the computer system (e.g., 100, 300, 500, 600, 646, and/or 1300) displaying the second notification (e.g., 1100) includes the computer system (e.g., 100, 300, 500, 600, 646, and/or 1300) displaying, at a first time (e.g., a first time corresponding to a time when the first notification is first being displayed), a first portion (e.g., 1102) (e.g., a first image, symbol, icon, and/or text indicative of the event that is displayed at a first time) of the second notification (e.g., 1100) that obscures a fifth amount (e.g., 1104) of the display region (e.g., 1110) (e.g., the second amount of the display region and/or an amount of the display region that is smaller than the second amount of the display region, such that the second notification appears to enlarge and/or expand over time), where the first portion (e.g., 1102) of the second notification (e.g., 1100) includes an icon (e.g., 1102a and/or 1102b) indicative of the event (e.g., a graphical user interface object, a symbol, and/or an image that is representative of and/or associated with the event and/or an application that generated the event). After displaying the first portion (e.g., 1102) of the second notification (e.g., 1100), the computer system (e.g., 100, 300, 500, 600, 646, and/or 1300) displays, at a second time (e.g., a time after the first time), a second portion (e.g., 1106) (e.g., a second image, symbol, icon, and/or text indicative of the event that is displayed at a first time) of the second notification (e.g., 1100) that obscures the second amount (e.g., 1110a and 1110b) of the display region (e.g., 1110), where the second portion (e.g., 1106) of the second notification (e.g., 1100) includes the icon (e.g., 1106b and/or 1106c) indicative of the event and text (e.g., 1106a) associated with the event (e.g., the second notification is initially displayed with an icon indicative and/or representative of the event and, over time, the second notification is displayed with additional information (e.g., text) about the event).

Displaying the first portion of the second notification with the icon indicative of the event and then displaying the second portion of the second notification with the icon indicative of the event and the text associated with the event allows a user to have time to cover and/or block the second notification from view of people that can see the display generation component of the computer system, thereby providing the computer system with increased security and/or privacy features.

In some embodiments, in response to detecting the occurrence of the event and in accordance with a determination that the event is of a first type (e.g., the event is of a type that is considered to be time sensitive and/or important to a user of the computer system, such as an alarm, detecting that the user is physically performing a fitness workout, heart rate monitoring, an incoming phone call, a timer, and/or another urgent and/or time sensitive event), the computer system (e.g., 100, 300, 500, 600, 646, and/or 1300) displays the second notification (e.g., 1100) corresponding to the event without regard to whether the computer system (e.g., 100, 300, 500, 600, 646, and/or 1300) satisfies the respective set of one or more criteria that indicate that the computer system (e.g., 100, 300, 500, 600, 646, and/or 1300) is in a state in which user input is occurring or is likely to occur (e.g., the computer system displays the second notification that obscures the second amount of the display region even when it is likely that user input is occurring or is likely to occur because the event is determined to be of a certain level of importance that warrants interruption of a task and/or activity that a user of the computer system is performing).

Displaying the second notification corresponding to an event of the first type without regard to whether the computer system satisfies the respective set of one or more criteria that indicate that the computer system is in a state in which user input is occurring or is likely to occur allows a user to be alerted of notifications that are determined to be of a certain level of importance that warrants interruption of a task and/or activity that a user of the computer system is performing, thereby providing improved visual feedback to the user.

Note that details of the processes described above with respect to method 1200 (e.g., FIG. 12) are also applicable in an analogous manner to the methods described below/above. For example, methods 700, 900, 1000, and/or 1400 optionally includes one or more of the characteristics of the various methods described above with reference to method 1200. For example, a computer system that is configured to perform method 1200 is also configured to provide guidance about initiating an operation, perform a first operation, adjust audio output of an emergency operation, and/or perform an operation when in a low power mode of operation. For brevity, these details are not repeated below.

FIGS. 13A-13U illustrate exemplary user interfaces for a low power mode of operation, in accordance with some embodiments. The user interfaces in these figures are used to illustrate the processes described below, including the processes in FIG. 14.

In some embodiments, any of the inputs described herein (e.g., input 1350a, 1350b, 1350c, 1350d, 1350e, 1350f, 1350g, 1350h, 1350i, 1350j, 1350k, 1350l, 1350m, 1350n, 1350o, 1350p, 1350q, 1350r, 1350s, 1350t, and/or 1350u) is or includes a touch input (e.g., a tap gesture and/or a swipe gesture). In some embodiments, any of the inputs described herein (e.g., input 1350a, 1350b, 1350c, 1350d, 1350c, 1350f, 1350g, 1350h, 1350i, 1350j, 1350k, 1350l, 1350m, 1350n, 1350o, 1350p, 1350q, 1350r, 1350s, 1350t, and/or 1350u) is or includes a voice input (e.g., a voice command to select a user interface element or to activate a feature or perform a function, such as a feature or function associated with a user interface element). In some embodiments, any of the inputs described herein (e.g., input 1350a, 1350b, 1350c, 1350d, 1350c, 1350f, 1350g, 1350h, 1350i, 1350j, 1350k, 1350l, 1350m, 1350n, 1350o, 1350p, 1350q, 1350r, 1350s, 1350t, and/or 1350u) is or includes an air gesture (e.g., an air gesture to select a user interface element or to activate a feature or perform a function, such as a feature or function associated with a user interface element). In some embodiments, any of the inputs described herein (e.g., input 1350a, 1350b, 1350c, 1350d, 1350e, 1350f, 1350g, 1350h, 1350i, 1350j, 1350k, 1350l, 1350m, 1350n, 1350o, 1350p, 1350q, 1350r, 1350s, 1350t, and/or 1350u) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

FIGS. 13A-13Q illustrate computer system 600 and second computer system 1300 to describe differences and/or similarities between a normal mode of operation and a low power mode of operation. At FIGS. 13A-13Q, while second computer system 1300 is shown activating and/or operating in the low power mode of operation, both computer system 600 and second computer system 1300 are configured to operate in both the normal mode of operation and the low power mode of operation.

At FIG. 13A, computer system 600 displays, via display device 602, watch face user interface 1302 and second computer system 1300 displays, via display device 1300a, watch face user interface 1302. At FIG. 13A, watch face user interface 1302 includes user interface objects 1302a-1302h as well as time indicator 1302i (e.g., an analog indication of time). In response to detecting user input corresponding to a respective user interface object of user interface objects 1302a-1302h, computer system 600 and/or second computer system 1300 is configured to display a user interface associated with a respective application that corresponds to the selected user interface object. In some embodiments, watch face user interface 1302 is a home and/or default user interface that is displayed by computer system 600 and/or second computer system 1300 absent user input requesting to navigate to a particular application of computer system 600 and/or second computer system 1300.

At FIG. 13A, watch face user interface 1302 includes battery user interface object 1302b. Battery user interface object 1302b provides a visual indication of an amount of battery charge and/or life remaining for computer system 600 and/or second computer system 1300. For instance, at FIG. 13A, battery user interface object 1302b indicates that computer system 600 and second computer system 1300 both have 45% battery charge and/or life remaining. In addition, at FIG. 13A, battery user interface object 1302b includes first appearance 1303 indicating that both computer system 600 and second computer system 1300 are operating in a normal mode of operation. In some situations, a user of computer system 600 and/or second computer system 1300 wants to extend an amount of time that computer system 600 and/or second computer system 1300 can operate despite having a relatively low amount of battery charge and/or life remaining. As set forth below, the user of computer system 600 and/or second computer system 1300 can provide one or more user inputs to activate a low power mode of computer system 600 and/or second computer system 1300, which reduces an amount of battery usage of computer system 600 and/or second computer system 1300 and enables computer system 600 and/or second computer system 1300 to operate for a longer period of time (e.g., as compared to operating in the normal mode of operation).

Figure 13B:
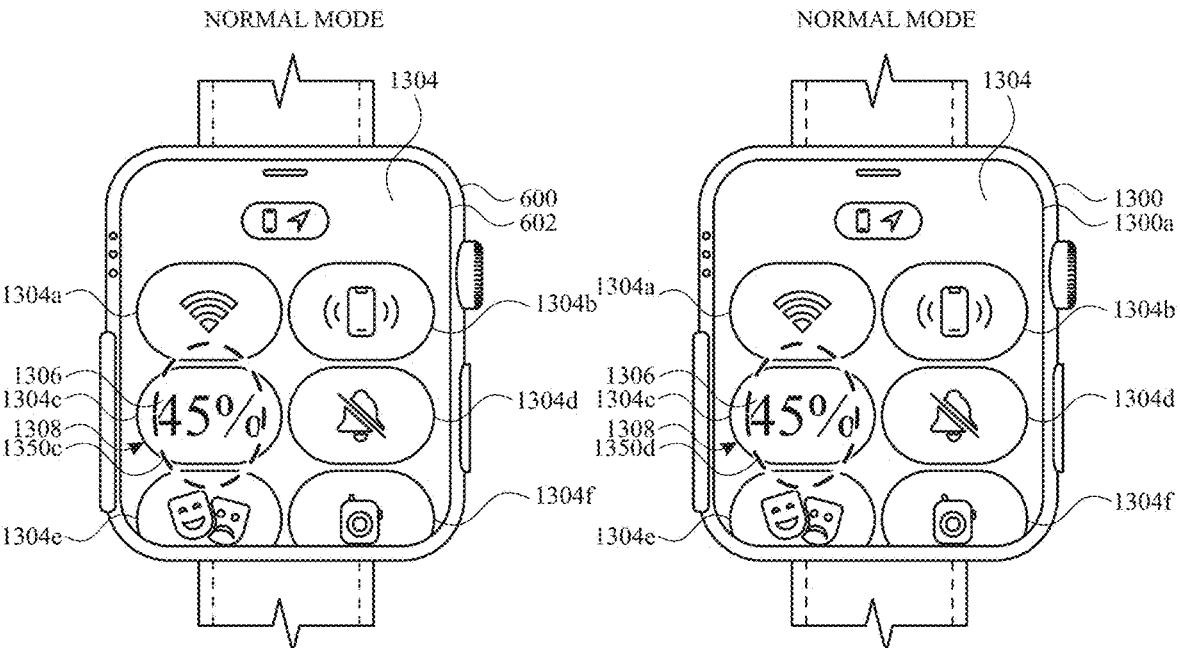

For instance, at FIG. 13A, computer system 600 detects user input 1350a (e.g., a swipe gesture or other selection/navigation input) on watch face user interface 1302 and second computer system 1300 detects user input 1350b (e.g., a swipe gesture or other selection/navigation input) on watch face user interface 1302. In response to detecting user input 1350a, computer system 600 displays settings user interface 1304, as shown at FIG. 13B. In response to detecting user input 1350b, second computer system 1300 displays settings user interface 1304, as shown at FIG. 13B.

At FIG. 13B, settings user interface includes user interface objects 1304a-1304g. At FIG. 13B, user interface objects 1304a-1304g include indications, such as icons, symbols, text, and/or information, associated with an application and/or operation corresponding to the respective user interface object 1304a-1304g. At FIG. 13A, battery user interface object 1304c includes indicator 1306 (e.g., "45%") indicative of the battery charge and/or life remaining for computer system 600 and/or second computer system 1300. In some embodiments, one or more of user interface objects 1304a-1304g include an appearance that indicates whether an operation corresponding to the respective user interface object is active (e.g., enabled) and/or inactive (e.g., disabled). At FIG. 13B, battery user interface object 1304c includes first appearance 1308 indicating that a low power mode of computer system 600 and second computer system 1300 is inactive (e.g., disabled).

Figure 13C:
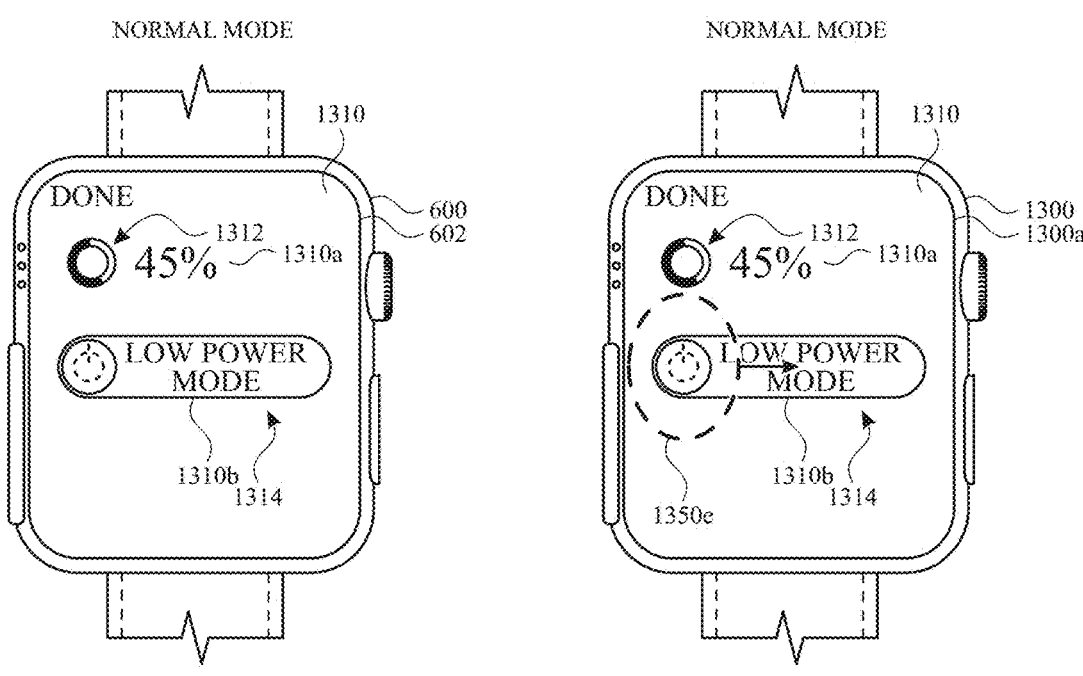

In some embodiments, in response to detecting user input corresponding to one of user interface objects 1304a-1304g computer system 600 and/or second computer system 1300 display a different user interface associated with the respective user interface object and/or performs an operation associated with the respective user interface object. For instance, at FIG. 13B, computer system 600 detects user input 1350c (e.g., a tap gesture or other selection/navigation input) corresponding to battery user interface object 1304c and second computer system 1300 detects user input 1350d (e.g., a tap gesture or other selection/navigation input) corresponding to battery user interface object 1304c. In response to detecting user input 1350c, computer system 600 displays battery user interface 1310, as shown at FIG. 13C. In response to detecting user input 1350d, second computer system 1300 displays battery user interface 1310, as shown at FIG. 13C.

At FIG. 13C, battery user interface 1310 includes charge indicator 1310a and low power mode user interface object 1310b. At FIG. 13C, charge indicator 1310a provides a visual indication of the remaining batter charge and/or life of computer system 600 and/or second computer system 1300. In addition, charge indicator 1310a includes first appearance 1312 to indicate that computer system 600 and second computer system 1300 are not in the low power mode (e.g., low power mode is inactive and/or disabled for computer system 600 and second computer system 1300 and/or computer system 600 and second computer system 1300 are operating in the normal mode of operation). Low power mode user interface object 1310b is configured to, when selected and/or otherwise interacted with, cause computer system 600 and/or second computer system 1300 to initiate the low power mode and operate in the low power mode. At FIG. 13C, low power mode user interface object 1310b includes first appearance 1314 indicating that computer system 600 and second computer system 1300 have not initiated the low power mode and that computer system 600 and second computer system 1300 are operating in a normal mode of operation.

Figure 13D:
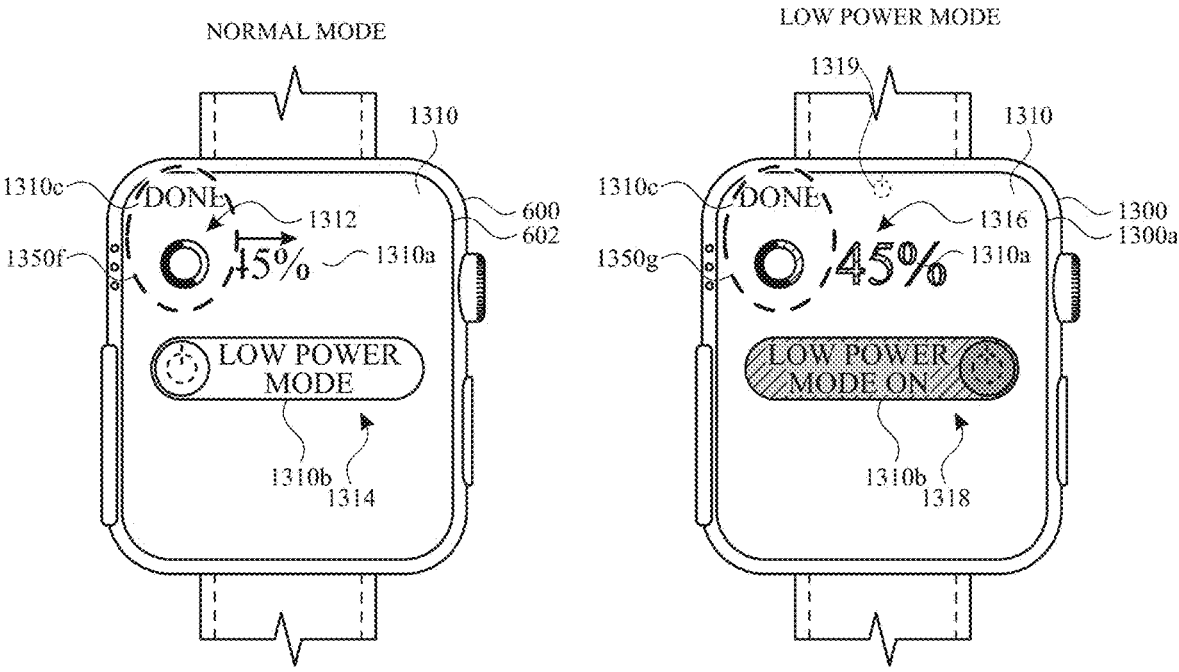

At FIG. 13C, second computer system 1300 detects user input 1350e (e.g., a swipe gesture or other selection/navigation input) corresponding to low power mode user interface object 1310b. In response to detecting user input 1350e, second computer system 1300 initiates the low power mode, as shown at FIG. 13D. At FIG. 13C, computer system 600 does not detect user input corresponding to low power mode user interface object 1310b, and thus, computer system 600 continues to operate in the normal mode of operation (e.g., computer system 600 does not initiate the low power mode).

At FIG. 13D, second computer system 1300 displays charge indicator 1310a with second appearance 1316, as indicated by hatching of charge indicator 1310a at FIG. 13D. In addition, second computer system 1300 displays low power mode user interface object 1310b with second appearance 1318, as indicated by shading and hatching of low power mode user interface object 1310b at FIG. 13D. Further, second computer system 1300 displays low power mode indicator 1319. Displaying charge indicator 1310a with second appearance 1316, displaying low power mode user interface object 1310b with second appearance, and/or displaying low power mode indicator 1319 provides a visual indication confirming that second computer system 1300 is operating in the low power mode. At FIG. 13D, computer system 600 continues to display charge indicator 1310a with first appearance 1312 and low power mode user interface object 1310b with first appearance 1314, thereby indicating that computer system 600 continues to operate in the normal mode of operation and that computer system 600 has not initiated the low power mode.

In some embodiments, when second computer system 1300 initiates the low power mode, second computer system 1300 operates to reduce power consumption and extend battery life by limiting and/or restricting performance of one or more operations of second computer system 1300. Second computer system 1300 (and computer system 600) includes one or more sensors, such as biometric sensors, motion sensors, and/or microphones, as well as antennae (e.g., cellular antennae, Bluetooth antennae, Wi-Fi antennae, and/or another wireless communication antennae). When second computer system 1300 (and computer system 600) operates in the low power mode, second computer system 1300 reduces a frequency of activation of one or more of the sensors and/or antennae when compared to the normal mode of operation. For instance, second computer system 1300 activates the one or more of the sensors and/or antennae for shorter intervals, turns off the one or more of the sensors and/or antennae for longer durations, and/or otherwise causes the one or more of the sensors and/or antennae to operate less frequently when operating in the low power mode as compared to the normal mode of operation. In some embodiments, second computer system 1300 does not perform background operations using the one or more sensors and/or antennae when operating in the low power mode, but second computer system 1300 does perform background operations using the one or more sensors and/or antennae when operating in the normal mode of operation. In some embodiments, second computer system 1300 does not perform a first operation automatically and/or when user input is not detected when operating in the low power mode, but second computer system 1300 is configured to perform the first operation in response to detecting user input and/or a user request to perform the first operation when operating in the low power mode.

Figure 13E:
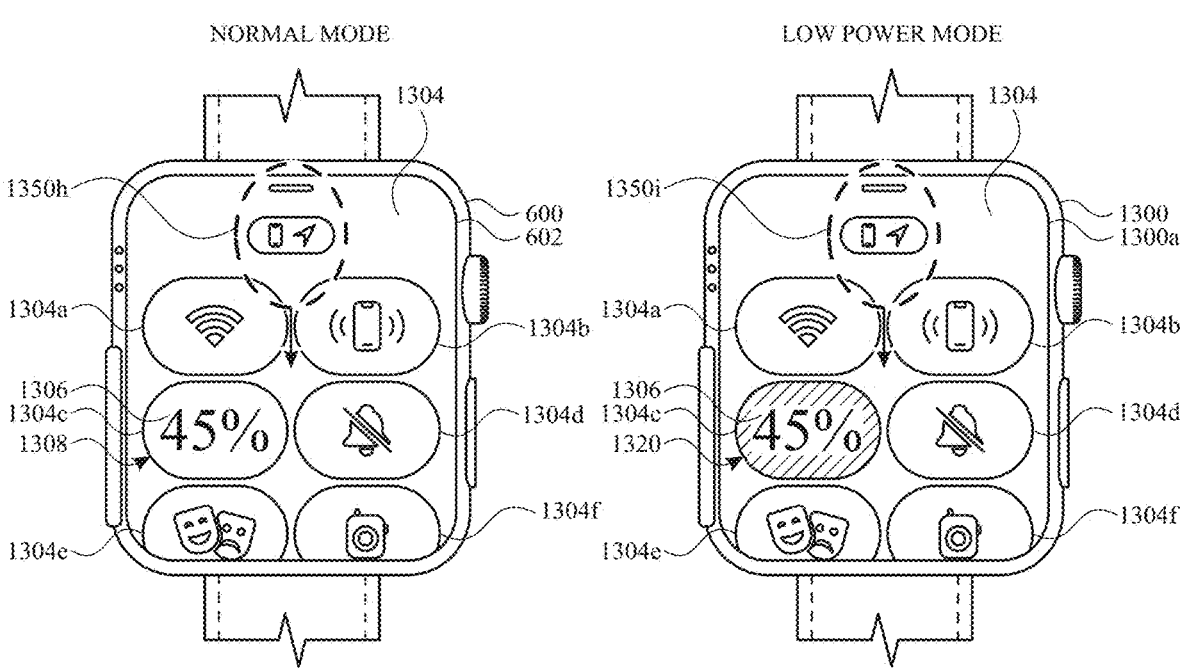

At FIG. 13D, computer system 600 detects user input 1350f (e.g., a tap gesture or other selection/navigation input) corresponding to done user interface object 1310c of battery user interface 1310 and second computer system 1300 detects user input 1350g (e.g., a tap gesture or other selection/navigation input) corresponding to done user interface object 1310c of battery user interface 1310. In response to detecting user input 1350f, computer system 600 displays settings user interface 1304, as shown at FIG. 13E. In response to detecting user input 1350g, second computer system 1300 displays settings user interface 1304, as shown at FIG. 13E.

At FIG. 13E, second computer system 1300 displays battery user interface object 1304c having second appearance 1320, as indicated by hatching at FIG. 13E. Second appearance 1320 of battery user interface object 1304c provides a visual indication confirming that second computer system 1300 is operating in the low power mode. At FIG. 13E, computer system 600 continues to operate in the normal mode of operation and displays battery user interface object having first appearance 1308, which provides a visual indication confirming that computer system 600 continues to operate in the normal mode of operation.

Figure 13F:
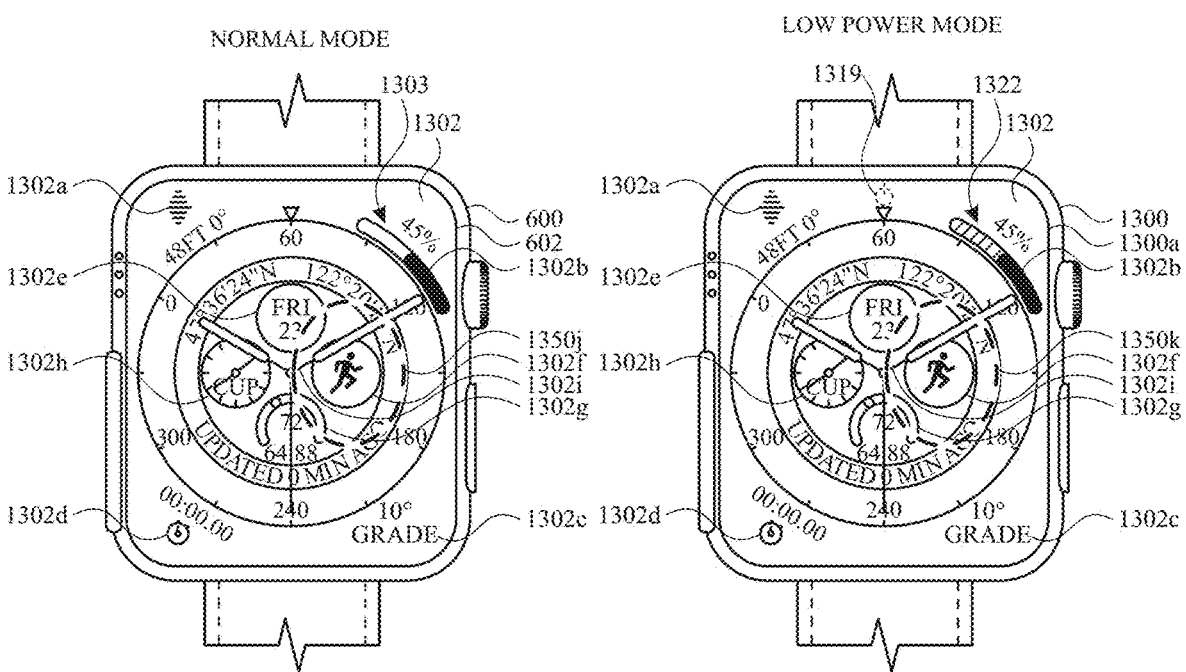

At FIG. 13E, computer system 600 detects user input 1350h (e.g., a swipe gesture or other selection/navigation input) corresponding to settings user interface 1304 and second computer system 600 detects user input 1350i (e.g., a swipe gesture or other selection/navigation input) corresponding to settings user interface 1304. In response to detecting user input 1350h, computer system 600 displays watch face user interface 1302, as shown at FIG. 13F. In response to detecting user input 1350i, second computer system 1300 displays watch face user interface 1302, as shown at FIG. 13F.

At FIG. 13F, second computer system 1300 displays low power mode indicator 1319 and displays battery user interface object 1302b with second appearance 1322 (e.g., as indicated by hatching at FIG. 13F) to further provide a visual indication confirming that second computer system 1300 operates in the low power mode. Computer system 600 continues to operate in the normal mode of operation, and thus, maintains display of battery user interface object 1302b with first appearance 1303 (and does not display low power mode indicator 1319).

Figure 13G:
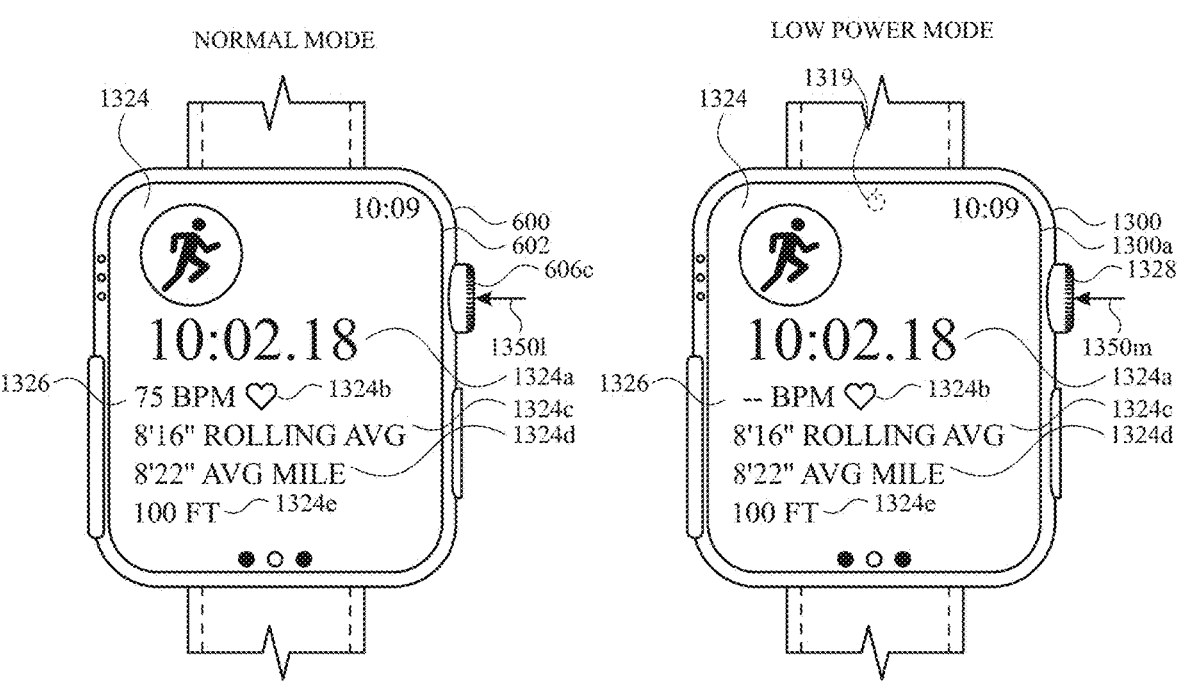

As set forth above, when second computer system 1300 operates in the low power mode, second computer system 1300 is configured to disable, deactivate, and/or reduce a frequency of operation of one or more sensors and/or antennae of second computer system 1300. For instance, at FIG. 13F, computer system 600 detects user input 1350j (e.g., a tap gesture or other selection/navigation input) corresponding to selection of workout user interface object 1302f of watch user interface 1302 and second computer system 1300 detects user input 1350k (e.g., a tap gesture or other selection/navigation input) corresponding to selection of workout user interface object 1302f of watch user interface 1302. After (e.g., in response to) detecting user input 1350j, computer system 600 initiates a workout operation and displays workout user interface 1324, as shown at FIG. 13G. After (e.g., in response to) detecting user input 1350k, second computer system 1300 initiates a workout operation and displays workout user interface 1324, as shown at FIG. 13G.

At FIG. 13G, workout user interface 1324 includes information related to the workout operation initiated by computer system 600 and second computer system 1300. For instance, workout user interface 1324 includes activity metric indicators 1324a-1324e that provide information and/or data indicative of physical activity performed by a user of computer system 600 and/or second computer system 1300 during the workout operation. At FIG. 13G, computer system 600 displays heart rate indicator 1324b with information and/or data 1326, such that computer system 600 is using (e.g., activating) a heart rate sensor to monitor a heart rate of a user of computer system 600 during the workout operation. Second computer system 1300 displays heart rate indicator 1324b without information and/or data 1326 because second computer system 1300 is not using (e.g., activating) a heart rate sensor to monitor a heart rate of a user of second computer system 1300 during the workout operation. Accordingly, second computer system 1300 conserves battery usage by deactivating and/or otherwise not using the heart rate sensor during the workout operation.

Figure 13H:
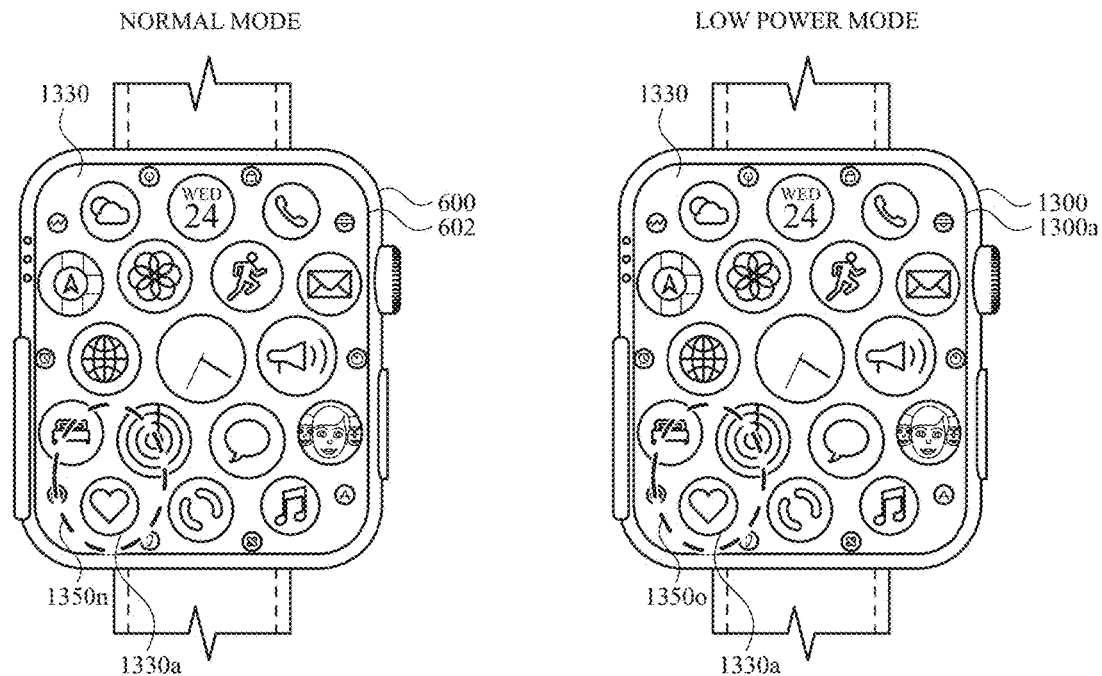

While second computer system 1300 operates in the low power mode, second computer system 1300 can still activate the heart rate sensor and provide an indication of the user's heart rate in response to user input and/or a user request. For instance, at FIG. 13G, computer system 600 detects user input 1350l (e.g., a press gesture or other selection/navigation input) corresponding to third hardware input device 606c and second computer system 1300 detects user input 1350m (e.g., a press gesture or other selection/navigation input) corresponding to third hardware input device 1328. In response to detecting user input 1350l, computer system 600 displays application user interface 1330, as shown at FIG. 13H. In response to detecting user input 1350m, second computer system 1300 displays application user interface 1330, as shown at FIG. 13H.

Figure 13I:
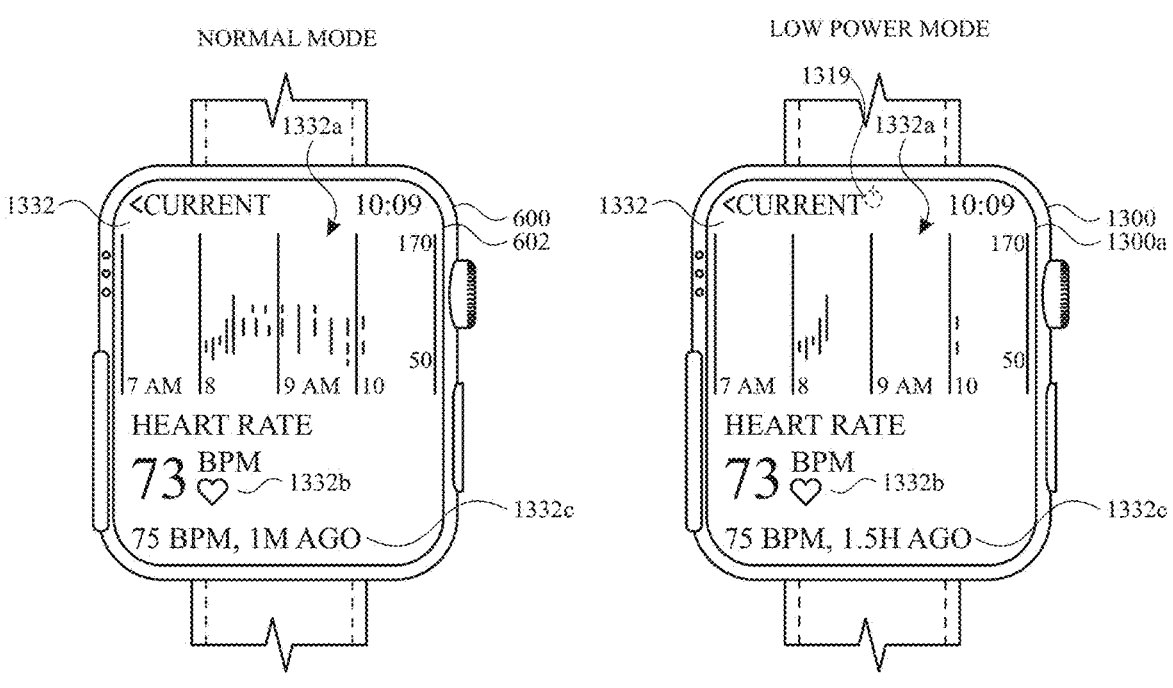

At FIG. 13H, application user interface 1330 includes user interface objects corresponding to applications on computer system 600 and second computer system 1300. Application user interface 1330 includes heart rate application user interface object 1330a corresponding to a heart rate application of computer system 600 and second computer system 1300. At FIG. 13H, computer system 1300 detects user input 1350n (e.g., a tap gesture or other selection/navigation input) selecting heart rate application user interface object 1330a and second computer system 1300 detects user input 1350o (e.g., a tap gesture or other selection/navigation input) selecting heart rate application user interface object 1330a. In response to detecting user input 1350n, computer system 600 displays heart rate user interface 1332, as shown at FIG. 13I. In response to detecting user input 1350o, second computer system 1300 displays heart rate user interface 1332, as shown at FIG. 13I.

At FIG. 13I, heart rate user interface 1332 includes graphical representation 1332a, current heart rate indicator 1332b, and previous heart rate indicator 1332c. Graphical representation 1332a includes information about a history of prior heart rate measurements of a user of computer system 600 and/or second computer system 1300. Both computer system 600 and second computer system 1300 include various data points about prior heart rate measurements of the user of computer system 600 and second computer system 1300, respectively. However, second computer system 1300 includes a gap and/or period where heart rate measurements were not taken and/or otherwise received by second computer system 1300 because second computer system 1300 was operating in the low power mode (e.g., and did not receive user input requesting to measure a heart rate of the user of second computer system 1300).

At FIG. 13I, computer system 600 includes more recent heart rate information in previous heart rate indicator 1332c when compared to second computer system 1300 because second computer system 1300 initiated the low power mode, and thus, second computer system 1300 did not activate the heart rate sensor as recently as computer system 600 (e.g., computer system 600 activated the heart rate sensor to measure a heart rate during the workout operation and/or as a background operation while operating in the normal mode of operation). Both computer system 600 and second computer system 1300 include data and/or information about a current heart rate in current heart rate indicator 1332b. Accordingly, even though second computer system 1300 operates in the low power mode, second computer system 1300 can activate and/or initiate a heart rate measurement (e.g., via the heart rate sensor) in response to user input (e.g., user input 1350o).

Figure 13J:
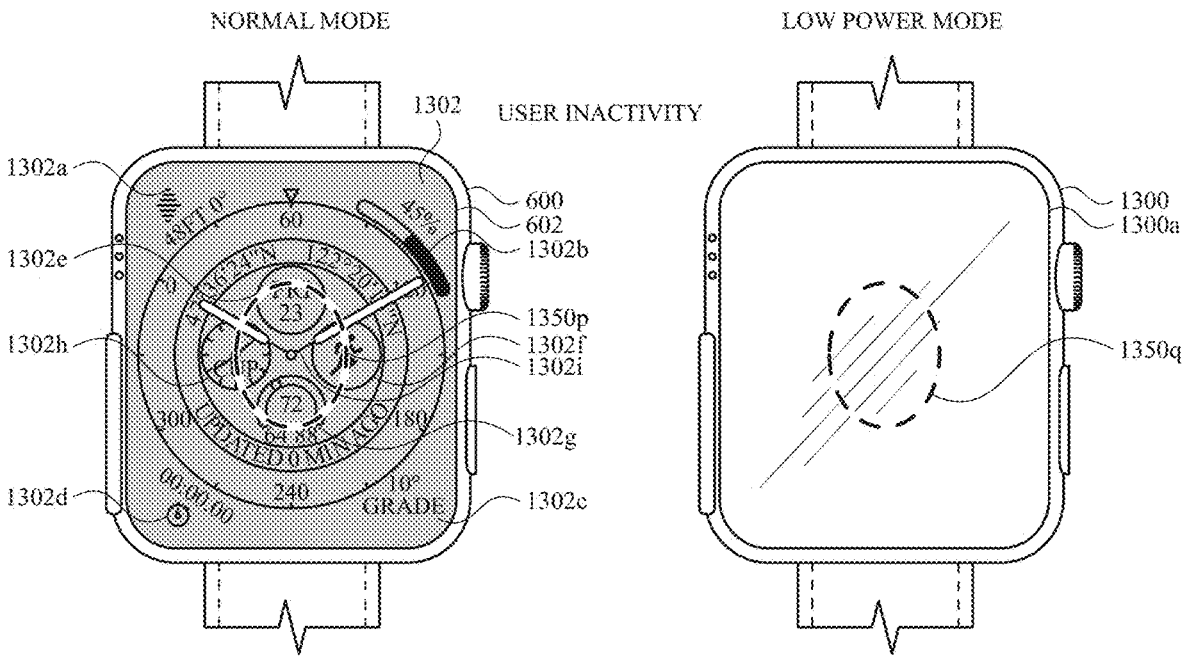

At FIG. 13I, computer system 600 detects an occurrence of a first event (e.g., an absence of user input for a predetermined period of time, a wrist lowering gesture, and/or a hand gesture covering display device 602) indicative of inactivity of computer system 600. Second computer system 1300 detects an occurrence of a second event (e.g., an absence of user input for a predetermined period of time, a wrist lowering gesture, and/or a hand gesture covering display device 1300a of second computer system 1300) indicative of inactivity of second computer system 1300. In response to detecting the occurrence of the first event, computer system 600 transitions between an active mode and an inactive mode and displays watch face user interface 1302, as shown at FIG. 13J. In response to detecting the occurrence of the second event, second computer system 1300 deactivates display device 1300a and/or otherwise ceases to display a user interface, as shown at FIG. 13J.

At FIG. 13J, computer system 600 operates in an inactive mode of the normal mode of operation and displays watch face user interface 1302. In some embodiments, when computer system 600 operates in the normal mode of operation, computer system 600 displays watch face user interface 1302 in the inactive mode as an always on display user interface. For instance, when computer system 600 operates in the inactive mode, computer system 600 displays watch face user interface 1302 with a reduced brightness, a reduced size, and/or with less content and/or information as compared to the active mode (e.g., watch face user interface 1302 at FIG. 13A). Accordingly, computer system 600 is configured to conserve a first amount of battery charge by adjusting the display of watch face user interface 1302 while operating in the inactive mode. At FIG. 13J, second computer system 1300 does not display a user interface, and, optionally, deactivates and/or turns off display device 1300*a*. Second computer system 1300 conserves a second amount of battery charge, greater than the first amount of battery charge, by forgoing and/or not displaying a user interface in response to detecting the occurrence of the second event. While computer system 600 conserves the first amount of battery power when in the inactive mode, second computer system 1300 conserves a larger amount of battery (e.g., the second amount of battery power) when in the low power mode by forgoing display of a user interface.

At FIG. 13J, computer system 600 detects user input 1350*p* (e.g., a tap gesture or other selection/navigation input) corresponding to watch face user interface 1302 and second computer system 1300 detects user input 1350*q* (e.g., a tap gesture or other selection/navigation input) on display device 1300*a*. In some embodiments, in response to detecting user input 1350*p*, computer system 600 displays watch face user interface 1302 in the active mode, as shown at FIG. 13A (e.g., watch face user interface 1302 with an increased brightness, an increased size, and/or with more content and/or information when compared to watch face user interface 1302 at FIG. 13J). In some embodiments, in response to detecting user input 1350*q*, second computer system 1300 displays watch face user interface 1302, as shown at FIG. 13A. Therefore, while second computer system 1300 is in the low power mode, second computer system 1300 displays watch face user interface 1302 in response to user input.

Figure 13K:
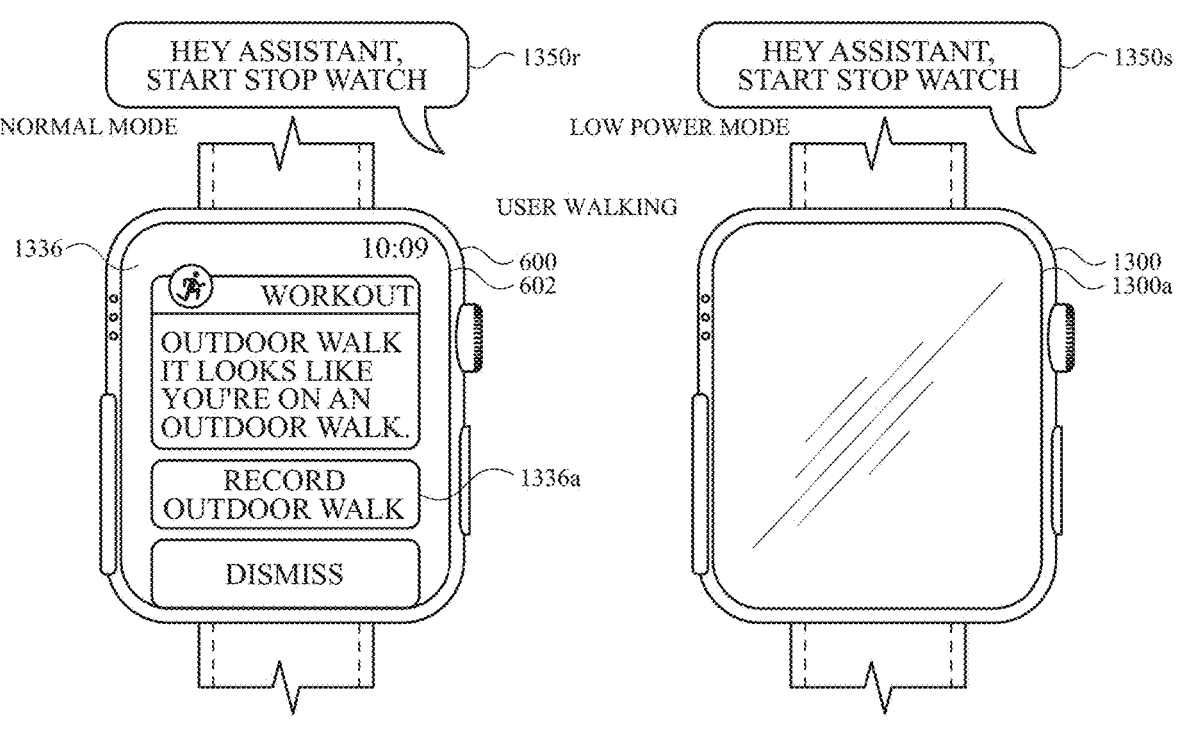

In addition to or in lieu of detecting user input 1350*p*, at FIG. 13J, computer system 600 detects an occurrence of an event indicative of physical activity of a user of computer system 600 (e.g., one or more sensors of computer system 600 provide information about movement of computer system indicating that a user of computer system 600 is performing physical activity). In response to detecting the occurrence of the event indicative of physical activity of the user, computer system 600 displays workout suggestion user interface 1336, as shown at FIG. 13K. At FIG. 13J, second computer system 1300 is in the low power mode, and thus, does not activate one or more sensors of second computer system 1300 that are configured to provide information associated with an occurrence of the event indicative of physical activity of a user of second computer system 1300. In other words, second computer system 1300 is not configured to monitor and/or measure physical activity of a user as a background operation when second computer system 1300 operates in the low power mode. Accordingly, second computer system forgoes displaying workout suggestion user interface 1336 and continues to not display a user interface (e.g., second computer system 1300 deactivates and/or turns off display device 1300*a*), as shown at FIG. 13K.

At FIG. 13K, workout suggestion user interface 1336 alerts a user of computer system 600 that computer system

600 detected the occurrence of the event indicative of physical activity of the user. Workout suggestion user interface 1336 includes workout activation user interface object 1336 that, when selected, causes computer system 600 to initiate a workout operation and track movement and/or physical activity of user of computer system 600 (e.g., display workout user interface 1324). As set forth above, second computer system 1300 disables one or more sensors that are configured to detect whether movement of second computer system 1300 indicates that the user of second computer system 1300 is performing physical activity. As such, second computer system 600 forgoes displaying workout suggestion user interface 1336. However, in some embodiments, second computer system 1300 is configured to initiate a workout operation in response to detecting one or more user inputs requesting to initiate the workout operation (e.g., user input 1350*k*).

Figure 13L:
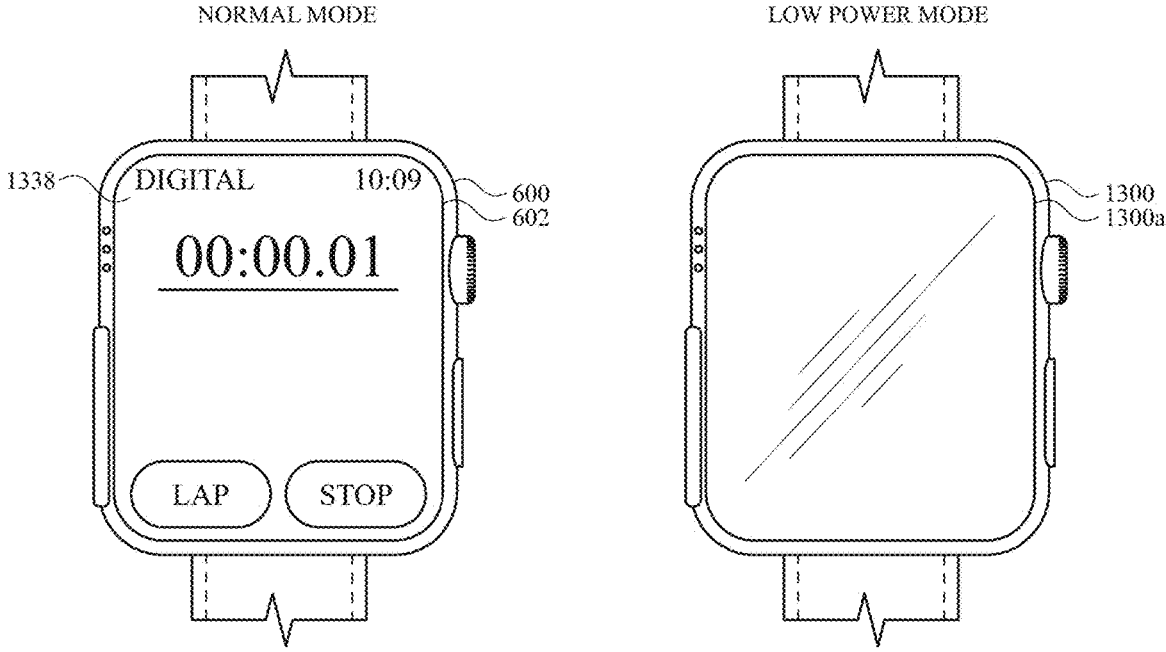

At FIG. 13K, a first user of computer system 600 provides user input 1350*r* (e.g., a voice input including "Hey Assistant, start stop watch" or other selection/navigation input) and a second user of second computer system 1300 provides user input 1350*s* (e.g., a voice input including "Hey Assistant, start stop watch" or other selection/navigation input). At FIG. 13K, computer system 600 detects user input 1350*r* (e.g., via a microphone of computer system 600) because computer system 600 is in the normal mode of operation and not in the low power mode. In some embodiments, computer system 600 detects one or more keywords of user input 1350*r* (e.g., "Hey Assistant") and performs an operation (e.g., starts a stop watch operation) associated with user input 1350*r* in response to detecting the keywords of user input 1350*r*. In response to detecting user input 1350*r*, computer system 600 displays stop watch user interface 1338, as shown at FIG. 13L. At FIG. 13K, second computer system 1300 operates in the low power mode and disables and/or deactivates a microphone of second computer system 1300 that is configured to detect one or more keywords of user input 1350*s*. Second computer system 1300 thus does not detect user input 1350*s* and/or otherwise perform an operation based on user input 1350*s*. Accordingly, second computer system 1300 continues to not display a user interface (e.g., second computer system 1300 deactivates and/or turns off display device 1300*a*), as shown at FIG. 13L. In some embodiments, second computer system 1300 is configured to display stop watch user interface 1338 and/or perform a stop watch operation in response to detecting one or more user inputs requesting that second computer system 1300 perform the stop watch operation.

In addition to forgoing and/or not performing background operations while operating in the low power mode, second computer system 1300 is configured to delay outputting, displaying, and/or providing notifications when operating in the low power mode (e.g., when a set of one or more criteria are met). For instance, at FIG. 13M, computer system 600 receives an indication of a first notification and displays first notification 1340 at a first time (e.g., "10:09"). Computer system 600 is configured to display first notification 1340 at the first time regardless of whether computer system 600 operates in the active mode or the inactive mode of the normal mode of operation. At FIG. 13M, second computer system 1300 forgoes displaying first notification 1340 at the first time (e.g., "10:09"). In some embodiments, second computer system 1300 still receives an indication of first notification 1340 at the first time, but second computer system 1300 forgoes outputting and/or displaying first notification 1340 at the first time to conserve battery usage of second computer system 1300. In some embodiments, second computer system 1300 is configured to provide, output, and/or display a notification bundle at predetermined times and/or at predetermined time intervals. For instance, in some embodiments, second computer system 1300 outputs and/or displays a notification bundle at the top of every hour, such that all notifications received within the last hour are included in a respective notification bundle. In some embodiments, second computer system 1300 is configured to display first notification 1340 in response to detecting one or more user inputs (e.g., user input 1350*q*).

Figures 13M, 13N:
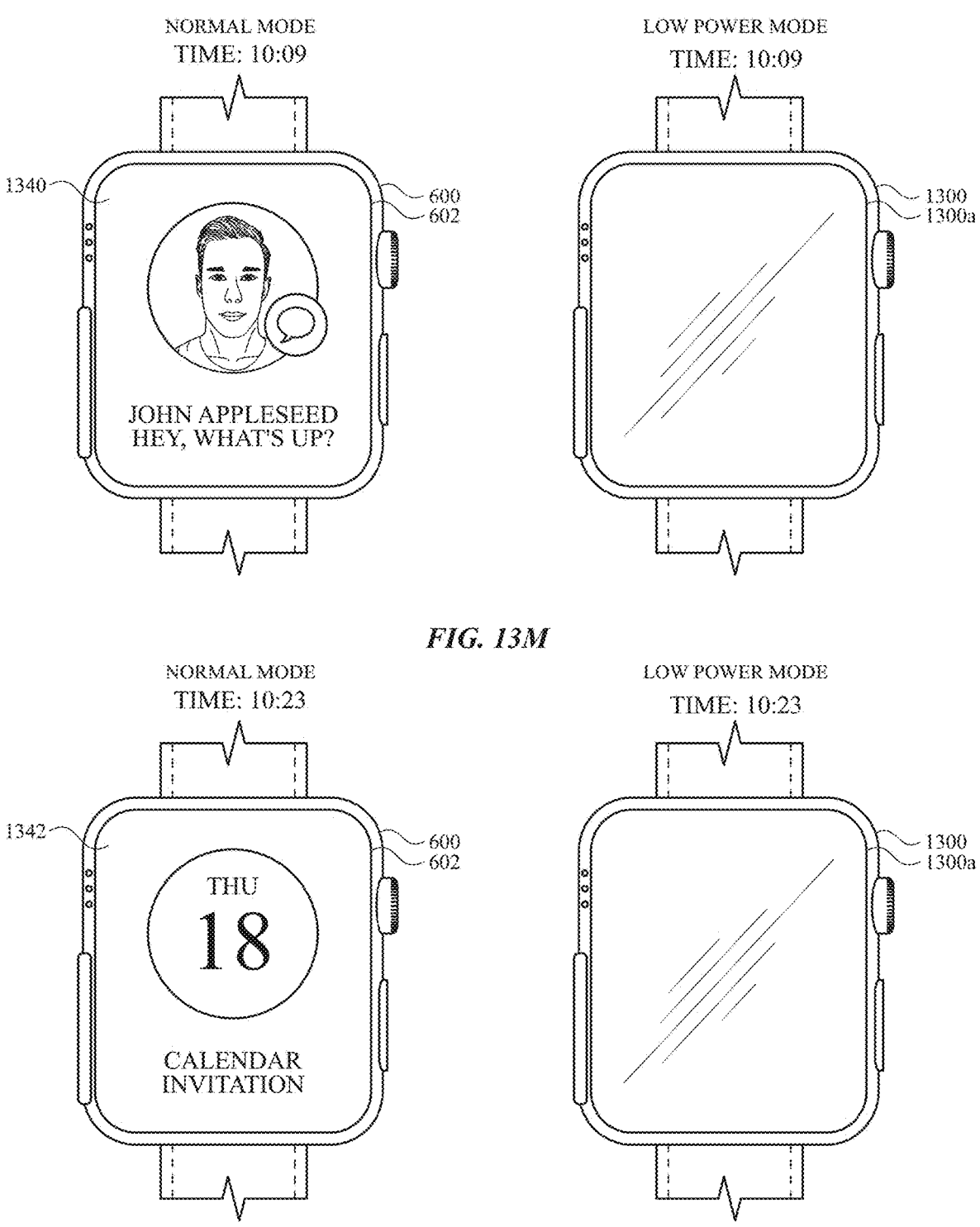

At FIG. 13N, computer system 600 receives an indication of a second notification and displays second notification 1342 at a second time (e.g., "10:23") after the first time. Computer system 600 does not detect an indication of another notification between the first time and the second time. Computer system 600 is configured to display second notification 1342 at the second time regardless of whether computer system 600 operates in the active mode or the inactive mode of the normal mode of operation. At FIG. 13N, second computer system 1300 forgoes displaying second notification 1342 at the second time (e.g., "10:23"). In some embodiments, second computer system 1300 still receives an indication of second notification 1342 at the second time, but second computer system 1300 forgoes outputting and/or displaying second notification 1342 at the second time to conserve battery usage of second computer system 1300. In addition, at FIG. 13N, second computer system 1300 does not receive an indication of another notification between the first time and the second time.

Figures 13O, 13P:
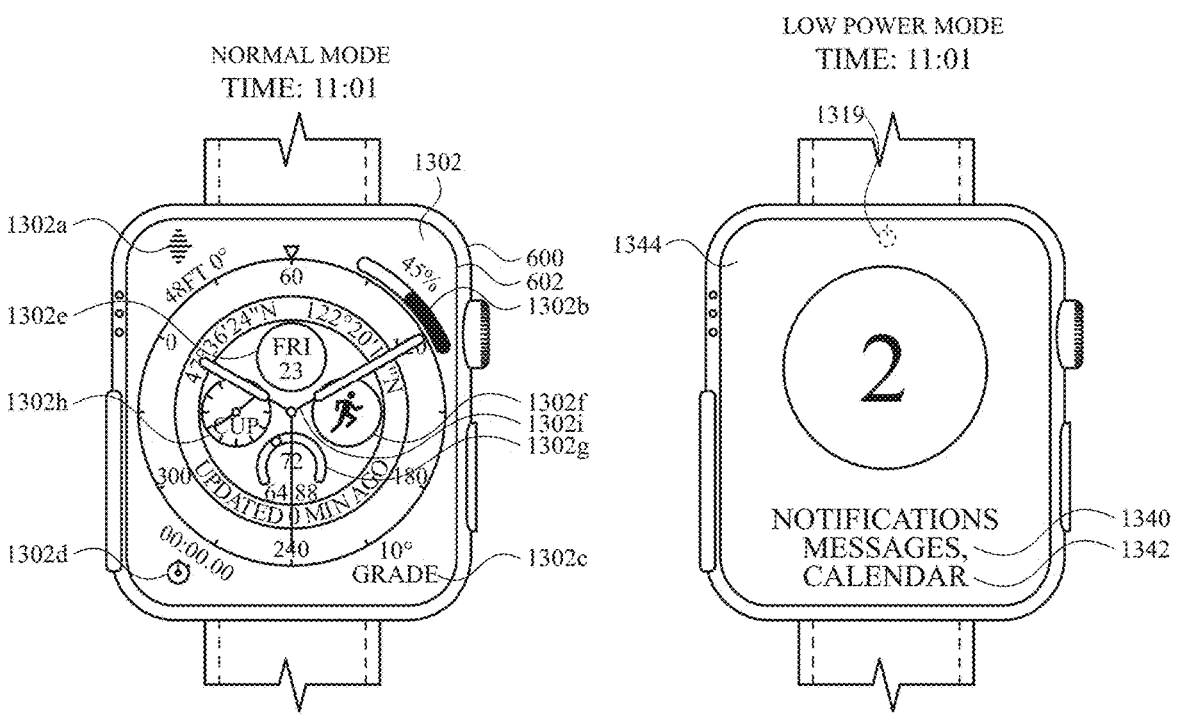

At FIG. 13O, computer system 600 displays watch face user interface 1302 and does not detect an indication of a new notification (e.g., computer system 600 does not display first notification 1340 and/or second notification 1342) at a third time (e.g., "11:01") after the first time and the second time. Computer system 600 does not receive an indication of another notification between the second time and the third time. At FIG. 13O, second computer system 1300 displays notification bundle 1344 at the third time after the first time and the second time. Second computer system 1300 does not receive an indication of another notification between the second time and the third time. Notification bundle 1344 includes first notification 1340 and second notification 1342, such that second computer system 1300 outputs and/or displays first notification 1340 and second notification 1342 together at the third time. As set forth above, in some embodiments, second computer system 1300 provides, outputs, and/or displays notification bundle 1344 at predetermined intervals of time (e.g., every 10 minutes, 30 minutes, or hour). Therefore, second computer system 1300 conserves battery usage by providing, outputting, and/or displaying all notifications received within the prior interval of time (e.g., within the last 10 minutes, 30 minutes, or hour) instead of displaying notifications as they are received. In some embodiments, the predetermined intervals of time are uniform intervals of time (e.g., the top of every hour). In some embodiments, the predetermined intervals of time are based on user input, such that the predetermined intervals of time are non-uniform and/or vary based on a last detected user input. As set forth above, in some embodiments, second computer system 1300 is configured to provide, output, and/or display first notification 1340 and/or second notification 1342 before the third time in response to detecting one or more user inputs.

Even when second computer system 1300 operates in the low power mode, second computer system 1300 is configured to perform one or more predetermined operations (e.g., without receiving user input and/or a user request). In some embodiments, the one or more predetermined operations are associated with a safety of a user of second computer system 1300 and/or with features that have been enabled by the user of computer system 1300.

For instance, at FIG. 13P, computer system 600 displays fall detection user interface 840 in response to detecting an event indicative of a user of computer system 600 falling. In some embodiments, computer system 600 includes one or more sensors, such as motion sensors and/or accelerometers, that provide information to computer system 600 about physical movement of a user of computer system 600. When computer system 600 determines that information received from the one or more sensors indicates that the user of computer system 600 has fallen (and/or that the information includes data exceeding a threshold), computer system 600 displays fall detection user interface 840. In addition, at FIG. 13P, second computer system 1300 displays fall detection user interface 840 in response to detecting an event indicative of a user of second computer system 1300 falling. In some embodiments, second computer system 1300 includes one or more sensors, such as motion sensors and/or accelerometers, that provide information to second computer system 1300 about physical movement of a user of second computer system 1300 even when second computer system 1300 operates in the low power mode. When second computer system 1300 determines that information received from the one or more sensors indicates that the user of second computer system 1300 has fallen (and/or that the information includes data exceeding a threshold), second computer system 1300 displays fall detection user interface 840 even when second computer system 1300 operates in the low power mode.

At FIG. 13P, fall detection user interface 840 includes information indicator 840*a*, emergency siren user interface object 840*b*, and dismiss user interface object 840*c*. Information indicator 840*a* provides a visual indication and/or information that computer system 600 and/or second computer system 1300 has detected that the user of computer system 600 has potentially fallen. Emergency siren user interface object 840*b* is configured to, when selected and/or interacted with, initiate an emergency siren operation (e.g., computer system 600 and/or second computer system 1300 outputs audio 820). Dismiss user interface object 840*c* is configured to, when selected, cause computer system 600 and/or second computer system 1300 to cease displaying fall detection user interface 840 and display a previously displayed user interface (e.g., in the normal mode of operation) and/or forgo displaying a user interface (e.g., in the low power mode).

At FIG. 13Q, computer system 600 displays account user interface 1346 in response to detecting terminal 1348. In some embodiments, computer system 600 includes one or more sensors, such as proximity sensors, near-field communication sensors, and/or Bluetooth sensors, that provide information to computer system 600 when computer system 600 is positioned within a predetermined distance from terminal 1348. When computer system 600 determines that information received from the one or more sensors indicates that computer system 600 is within the predetermined distance from terminal 1348, computer system 600 displays account user interface 1346. At FIG. 13Q, account user interface 1346 is associated with a respective account (e.g., a transaction account, a bank account, an access account, and/or a transportation account) authorized for use with computer system 600. Because computer system 600 operates in the normal mode of operation, computer system 600 is configured to authorize, access, and/or use the respective account when computer system 600 detects terminal 1348. In some embodiments, computer system 600 is configured to authorize, access, and/or use the respective account when computer system 600 detects terminal 1348, regardless of whether an express mode setting for the respective account is enabled, while computer system 600 operates in the normal mode of operation.

In addition, at FIG. 13P, second computer system 1300 displays account user interface 1346 in response to detecting terminal 1348. In some embodiments, second computer system 1300 includes one or more sensors, such as proximity sensors, near-field communication sensors, and/or Bluetooth sensors, that provide information to second computer system 1300 when second computer system 1300 is positioned within the predetermined distance from terminal 1348. At FIG. 13P, an express mode setting for the respective account associated with account user interface 1346 is enabled for second computer system 1300. Therefore, when second computer system 1300 determines that information received from the one or more sensors indicates that second computer system 1300 is positioned within the predetermined distance from terminal 1348, second computer system 1300 displays account user interface 1346 even when second computer system 1300 operates in the low power mode.

In some embodiments, the express mode setting for the respective account associated with account user interface 1346 allows second computer system 1300 to authorize, access, and/or use the respective account without requiring further authorization from the user of second computer system 1300. In other words, a user of second computer system 1300 does not have to provide biometric authorization and/or a password in order to enable second computer system 1300 to authorize, access, and/or use the respective account. In some embodiments, when the express mode setting for the respective account is disabled and/or not active, and while second computer system 1300 operates in the low power mode, second computer system 1300 is not configured to authorize, access, and/or use the respective account (and, optionally, display account user interface 1346) in response to detecting terminal 1348. However, even when the express mode setting is disabled and while second computer system 1300 operates in the low power mode, second computer system 1300 can still authorize, access, and/or use the respective account in response to detecting one or more user inputs requesting to authorize, access, and/or use the respective account (e.g., second computer system 1300 is not configured to automatically authorize, access, and/or use the respective account without detecting additional user input).

In addition to operating in the low power mode, computer system 600 and/or second computer system 1300 are also configured to operate in a second low power mode, that further reduces battery usage of computer system 600 and/or second computer system 1300 as compared to the low power mode. For instance, at FIG. 13R, computer system 600 displays mode selection user interface 1352. While FIG. 13R illustrates computer system 600 displaying mode selection user interface 1352, second computer system 1300 is also configured to display mode selection user interface 1352 and/or operate in the second low power mode.

At FIG. 13R, computer system 600 displays mode selection user interface 1352 including first mode user interface object 1352a, second mode user interface object 1352b, and third mode user interface object 1352c. In some embodiments, computer system 600 displays mode selection user interface 1352 in response to detecting one or more user inputs navigating to a settings user interface of a workout application. For instance, at FIG. 13R, mode selection user interface 1352 is configured to enable a user to select a mode for which computer system 600 operates in response to initiating a workout operation. In other words, computer system 600 automatically transitions to (or continues to operate in) a particular mode of operation in response to initiating the workout operation. At FIG. 13R, first mode user interface object 1352a corresponds to the low power mode set forth above with respect to FIGS. 13A-13Q. In addition, third mode user interface object 1352c corresponds to the normal mode of operation set forth above with respect to FIGS. 13A-13Q.

Second mode user interface object 1352b corresponds to the second low power mode, which further reduces battery usage of computer system 600 as compared to the low power mode. In some embodiments, the second low power mode further limits and/or restricts performance of one or more operations of computer system 600 as compared to the low power mode and/or the normal mode of operation. Computer system 600 includes one or more sensors, such as biometric sensors, motion sensors, and/or microphones, as well as antennae (e.g., cellular antennae, Bluetooth antennae, Wi-Fi antennae, and/or another wireless communication antennae). When computer system 600 operates in the second low power mode, computer system 600 reduces a frequency of activation of one or more of the sensors and/or antennae when compared to the low power mode (and the normal mode of operation). For instance, computer system 600 activates the one or more of the sensors and/or antennae at shorter intervals, turns off the one or more of the sensors and/or antennae for longer durations, and/or otherwise causes the one or more of the sensors and/or antennae to operate less frequently when operating in the second low power mode as compared to the low power mode (and the normal mode of operation). In some embodiments, computer system 600 does not perform background operations using the one or more sensors and/or antennae when operating in the second low power mode, but computer system 600 does perform background operations using the one or more sensors and/or antennae when operating in the low power mode and/or the normal mode.

Computer system 600 and/or second computer system 1300 are configured to display an indication of time even when powered off and/or shut down. For instance, FIGS. 13S-13U illustrate computer system 600 being powered off and/or shut down and still displaying an indication of time in response to user input. While FIGS. 13S-13U illustrate the ability of computer system 600 to display the indication of time when computer system 600 is powered off and/or shut down, second computer system 1300 is also configured to display the indication of time when second computer system 1300 is powered off and/or shut down.

At FIG. 13S, computer system 600 detects user input 1350t (e.g., a long press gesture or other selection/navigation input) corresponding to second hardware input device 606b. In response to detecting user input 1350t, computer system 600 displays power off user interface 1354, as shown at FIG. 13S. In some embodiments, computer system 600 powers off and/or shuts down in response to detecting user input 1350t for a predetermined amount of time. In some embodiments, computer system 600 powers off and/or shuts down in response to detecting user input corresponding to power off user interface object 1354a of power off user interface 1354.

In response to detecting user input 1350t for the predetermined amount of time and/or in response to detecting user input corresponding to power off user interface object 1354a, computer system 600 shuts down and/or powers off, as shown at FIG. 13T.

At FIG. 13T, computer system 600 powers off and/or shuts down so that display device 602 does not display a user interface. At FIG. 13T, computer system 600 detects user input 1350u (e.g., a press gesture or other selection/navigation input) corresponding to second hardware input device 606b. In response to detecting user input 1350u, computer system 600 displays time indicator 1356, as shown at FIG. 13U.

At FIG. 13U, computer system 600 remains in a powered off and/or shut down state, but still displays time indicator 1356 (e.g., a digital indication of time) in response to detecting user input 1350u. In some embodiments, computer system 600 detects user input 1350u and causes display device 602 to be powered on to display time indicator 1356, but does not cause other components (e.g., sensors and/or antennae) to be powered on. Accordingly, computer system 600 (and second computer system 1300) is configured to display time indicator 1356 despite being in the powered off and/or shut down state.

FIG. 14 is a flow diagram illustrating a method for performing an operation when in a low power mode of operation using a computer system in accordance with some embodiments. Method 1400 is performed at a computer system (e.g., 100, 300, 500, 600, 646, and/or 1300) (e.g., an electronic device; a smart device, such as a smartphone or a smartwatch; a mobile device; a wearable device) that is in communication with a display generation component (e.g., 602, 646a, and/or 1300a) (e.g., a display controller, a touch-sensitive display system, a projector, a display screen, a display monitor, and/or a holographic display) and one or more sensors (e.g., 602) (e.g., one or more antennas, radios, motion sensors, accelerometers, heart rate sensors, blood oxygen sensors, electrocardiogram sensors, microphones, and/or near-field communication ("NFC") sensors). Some operations in method 1400 are, optionally, combined, the orders of some operations are, optionally, changed, and some operations are, optionally, omitted.

As described below, method 1400 provides an intuitive way for performing an operation when in a low power mode of operation. The method reduces the cognitive burden on a user for conserving battery power, thereby creating a more efficient human-machine interface. For battery-operated computing devices, enabling a user to conserve battery power faster and more efficiently conserves power and increases the time between battery charges.

Computer system (e.g., 100, 300, 500, 600, 646, and/or 1300) detects (1402) a user input (e.g., 1350j, 1350k, 1350n, and/or 1350o) (e.g., user input, such as a touch gesture (e.g., a tap gesture, a tap and hold gesture, a swipe gesture, and/or a tap gesture with a movement component) received and/or detected by a touch-sensitive display device in communication with the computer system (e.g., the display generation component), a press input, a press and hold input, and/or a rotational input received and/or detected by one or more hardware input devices in communication with the computer system, and/or an air gesture, such as a wrist raise gesture) corresponding to a request to perform a first operation (e.g., an operation that the computer system is configured to perform regardless of whether the computer system is operating in a normal mode of operation or a low power mode of operation, such as fall detection, activity tracking, detection of a contactless payment terminal, and/or a clock/time function (e.g., displaying a user interface including an indication of time)) associated with the one or more sensors (e.g., the one or more sensors are configured to receive and/or collect data and the computer system performs the first operation (e.g., displays and/or updates display of a respective user interface, displays and/or outputs a notification, and/or changing a state of a computer system) based on the received and/or collected data).

In response to detecting the user input (e.g., 1350j, 1350k, 1350n, and/or 1350o), the computer system (e.g., 100, 300, 500, 600, 646, and/or 1300) performs (1404) the first operation based on a first set of one or more sensor measurements from the one or more sensors (e.g., performing the first operation (e.g., displaying and/or updating display of a user interface, displaying and/or outputting a notification, and/or changing a state of the computer system based on data and/or information collected, sensed, detected, and/or received by the one or more sensors) without regard to whether the computer system (e.g., 100, 300, 500, 600, 646, and/or 1300) is in a first mode of operation or a second mode of operation (e.g., the first operation is performed when the computer system is operating in a first mode of operation (e.g., a normal mode of operation) and when the computer system is operating in a second mode of operation (e.g., a low power mode of operation)), where the second mode of operation is a lower power mode of operation than the first mode of operation (e.g., the second mode of operation is a low-power mode of operation that includes the computer system operating to reduce power consumption and extend battery life by limiting and/or restricting performance of one or more operations of the computer system (e.g., an always on display and/or activation of one or more sensors (e.g., heart rate sensor and/or a microphone), reducing a frequency of activation of one or more antennas, radios, and/or sensors of the computer system (e.g., activating at a longer time interval than during a normal power mode), and/or ceasing and/or pausing communication between the computer system and a server, a router, an Internet connection, and/or a cellular connection)).

While the computer system (e.g., 100, 300, 500, 600, 646, and/or 1300) is operating in the first mode of operation (e.g., a normal mode of operation that includes the computer system operating without limiting and/or restricting performance of one or more operations of the computer system (e.g., an always on display and/or activation of one or more sensors (e.g., heart rate sensor and/or a microphone), without reducing a frequency of activation of one or more antennas, radios, and/or sensors of the computer system (e.g., activating at a longer time interval than during a normal power mode), and/or without ceasing and/or pausing communication between the computer system and a server, a router, an Internet connection, and/or a cellular connection)), the computer system (e.g., 100, 300, 500, 600, 646, and/or 1300) monitors (1406) a second set of one or more sensor measurements (e.g., periodically evaluating sensor measurements against one or more criteria for detecting events determined based on the sensor measurements) (in some embodiments, the computer system monitors the second set of one or more sensor measurements without receiving and/or detecting user input) from the one or more sensors, and in accordance with a determination that a respective condition occurred (e.g., the second set of one or more sensor measurements satisfy a set of criteria (e.g., meets a threshold, includes an indication of an event, and/or includes time sensitive data and/or information), which causes the computer system to perform a second operation, including recording data and/or information, displaying and/or or updating display of a user interface, displaying and/or outputting a notification, and/or changing between states of the device) (in some embodiments, the respective condition occurs when the computer system is oriented in a predetermined position (e.g., a position indicative of a user viewing the display generation component (e.g., the user is wearing the computer system on a wrist and the wrist is in a raised position)); the computer system is displaying a user interface that is not a watch face user interface and/or that is not otherwise associated with inactivity of the computer system; and/or the computer system has detected a user input within a predetermined amount of time from the time of detecting and/or determining that the computer system is operating in the first mode of operation), the computer system (e.g., 100, 300, 500, 600, 646, and/or 1300) performs (1406) a second operation (e.g., displays user interface 1302, 1336, and/or 1338) based on the second set of one or more sensor measurements from the one or more sensors (e.g., recording data, providing a notification to a user, and/or changing a state of the device).

The computer system (e.g., 100, 300, 500, 600, 646, and/or 1300) detects (1408) the occurrence of an event corresponding to a transition of the computer system (e.g., 100, 300, 500, 600, 646, and/or 1300) from the first mode of operation to the second mode of operation (e.g., a user request to enter a low power mode and/or the device reaches a battery level that is below a threshold battery level).

In response to detecting the occurrence of the event (e.g., and after performing the second operation based on the second set of one or more sensor measurements from the one or more sensors), the computer system (e.g., 100, 300, 500, 600, 646, and/or 1300) ceases (1410) to monitor sensor measurements from the one or more sensors (e.g., ceasing to receive sensor measurements (e.g., the second set of one or more sensor measurements) by disabling, turning off, pausing, and/or suspending sensing functions of the one or more sensors) and disables (1410) the ability of the computer system (e.g., 100, 300, 500, 600, 646, and/or 1300) to perform the second operation (e.g., display user interface 1302, 1336, and/or 1338) based on the sensor measurements from the one or more sensors if the respective condition occurs (e.g., so that even if the respective condition occurs while the device is in the second mode of operation, the device does not perform the second operation based on sensor measurements from the one or more sensors while the device is in the second mode of operation).

Performing the first operation without regard to whether the computer system is in a first mode of operation or a second mode of operation and ceasing to monitor sensor measurements from the one or more sensors and disabling the ability of the computer system to perform the second operation in response to detecting the occurrence of the event transitioning the computer system from the first mode of operation to the second mode of operation allows a user to cause the computer system to perform operations via user input while preventing background operations and conserving battery power in the absence of user input when the computer system operates in the second mode of operation, thereby increasing battery life of the computer system.

In some embodiments, while the computer system (e.g., 100, 300, 500, 600, 646, and/or 1300) is operating in the second mode of operation, the computer system (e.g., 100, 300, 500, 600, 646, and/or 1300) detects second user input (e.g., 1350*j*, 1350*k*, 1350*n*, and/or 1350*o*) (e.g., one or more tap gestures and/or press gestures) requesting to perform the third operation (e.g., an operation that the computer system is configured to perform in response to detected user input). In response to detecting the second user input (e.g., 1350*j*, 1350*k*, 1350*n*, and/or 1350*o*) requesting to perform the third operation, the computer system (e.g., 100, 300, 500, 600, 646, and/or 1300) performs the third operation based on the second set of one or more sensor measurements from the one or more sensors (e.g., performing the third operation in response to detecting the second user input even though the computer system is in the second mode of operation). Performing the third operation in response to detecting the second user input allows a user to cause the computer system to perform operations via user input while preventing background operations and conserving battery power in the absence of user input when the computer system operates in the second mode of operation, thereby increasing battery life of the computer system.

In some embodiments, the respective condition includes detection of an orientation of the computer system (e.g., 100, 300, 500, 600, 646, and/or 1300) indicating that a wrist of a user of the computer system is in a down position (e.g., the computer system includes one or more sensors (e.g., one or more accelerometers, gyroscopes, and/or inertial measurement units) that are configured to provide information about a position and/or orientation of the computer system, including a position indicative of a user's wrist resting on a surface and/or at a side of a user (e.g., a user's waist and/or hip)). Disabling the ability of the computer system to perform the second operation based on the sensor measurements from the one or more sensors when the wrist of the user is in a down position prevents certain background operations of the computer system from being performed and conserves battery power when the user is not interacting with and/or is unlikely to interact with computer system, thereby increasing battery life of the computer system.

In some embodiments, the respective condition includes detection of a hand gesture covering the display generation component (e.g., 602, 646*a* and/or 1300*a*) (e.g., a hand of a user of the computer system covers the display generation component and/or a sensor that is positioned proximate to and/or within the display generation component, where the hand gesture covering the display generation component causes the computer system to dim the display generation component and/or otherwise operate in an inactive or passive mode). Disabling the ability of the computer system to perform the second operation based on the sensor measurements from the one or more sensors when the hand gesture covering the display generation component is detected prevents certain background operations of the computer system from being performed and conserves battery power when the user is not interacting with and/or is unlikely to interact with computer system, thereby increasing battery life of the computer system.

In some embodiments, the second operation includes displaying a wake screen user interface (e.g., 1302) (e.g., a watch face user interface and/or another user interface that is displayed in response to the computer system transitioning from an active state and/or mode to an inactive state and/or mode (e.g., a sleep mode and/or an always on display mode)). In some embodiments, the respective condition occurs in response to detecting movement (or an absence of movement) of the computer system that causes the computer system to transition from an active state and/or mode to an inactive state and/or mode (e.g., a sleep mode and/or an always on display mode), where detecting the movement of the computer system includes receiving information (e.g., information that is collected and/or monitored as part of a background operation of the computer system) from the one or more sensors (e.g., one or more capacitive sensors, resistive sensors, infrared sensors, surface acoustic wave sensors, proximity sensors, accelerometers, gyroscopes, motion sensors, inertial measurement units, and/or direction sensors) indicative of a wrist lowering gesture (e.g., movement of the computer system indicative of a user lowering their wrist to onto a surface and/or by their hip and/or waist, such that the user is not likely viewing and/or interacting with the computer system, and/or an absence of movement of the computer system). In some embodiments, the wake screen user interface is a user interface associated with an always-on display feature of the computer system, and when the computer system detects the user input corresponding to the request to perform the first operation while in the second mode of operation, the computer system displays a second wake screen user interface, different from the wake screen user interface.

Disabling the automatic display of the wake screen user interface based on the sensor measurements from the one or more sensors when the computer system is in the second mode of operation conserves battery power when the user is not interacting with and/or is unlikely to interact with computer system, thereby increasing battery life of the computer system.

In some embodiments, wake screen user interface (e.g., 1302) includes an indication of time (e.g., 1302*i*) (e.g., the wake screen user interface is a watch face user interface that includes an indication (e.g., a digital indication and/or an analog indication) of a current time of day) and one or more complications (e.g., 1302*a*-1302*h*) (e.g., one or more user interface objects that are associated with applications of the computer system, and, optionally, include information associated with the application and/or cause the computer system to perform an operation (e.g., display a user interface associated with a respective application) when selected via user input). Disabling the automatic display of the wake screen user interface based on the sensor measurements from the one or more sensors when the computer system is in the second mode of operation conserves battery power when the user is not interacting with and/or is unlikely to interact with computer system, thereby increasing battery life of the computer system.

In some embodiments, the wake screen user interface (e.g., 1302) is a lock user interface of the computer system (e.g., 100, 300, 500, 600, 646, and/or 1300) (e.g., a watch face user interface and/or another user interface that is displayed in response to the computer system transitioning from an unlocked state and/or mode (e.g., a state and/or mode in which the computer system is configured to perform one or more operations in response to detecting user input) to a locked state and/or mode (e.g., a state and/or mode that disables, prevents, and/or blocks the computer system from performing one or more operations in response to detecting user input and, optionally, displays an authentication user interface in lieu of performing the one or more operations in response to detecting user input)). Disabling the automatic display of the lock user interface based on the sensor measurements from the one or more sensors when the computer system is in the second mode of operation conserves battery power when the user is not interacting with and/or is unlikely to interact with computer system, thereby increasing battery life of the computer system.

In some embodiments, the second operation includes monitoring a biometric feature (e.g., 1324*b* and/or 1326) of a user of the computer system (e.g., 100, 300, 500, 600, 646, and/or 1300) (e.g., the computer receives information about a biometric feature (e.g., a heart rate, a blood oxygenation level, an electrocardiogram reading, and/or an amount of noise in a physical environment in which the computer system is located) of the user from the one or more sensors (e.g., a biometric sensor, such as a heart rate sensor, a blood oxygenation sensor, an electrocardiogram sensor, and/or a microphone). In some embodiments, when the information about the biometric feature meets a set of one or more criteria for outputting a notification (e.g., the information about the biometric feature indicates that a measurement of the biometric feature exceeds a threshold measurement), the computer system outputs the notification while the computer system is in the first mode of operation and forgoes outputting the notification while the computer system is in the second mode of operation (e.g., and the respective condition occurs (e.g., the computer system is in a passive and/or inactive state)). In some embodiments, the one or more sensors of the computer system monitor the biometric feature of the user in the background while the computer system operates in the first mode of operation, but does not monitor the biometric feature of the user in the background while the computer system operates in the second mode of operation. In some embodiments, the user input corresponding to request to perform the first operation includes user input requesting to provide a measurement of the biometric feature of the user (e.g., user input requesting to navigate to a biometric feature application and/or selection of a user interface object that causes the computer system to activate the one or more sensors to monitor and/or measure the biometric feature), such that the computer system provides the measurement of the biometric feature of the user regardless of whether the computer system operates in the first mode of operation or the second mode of operation.

Disabling the automatic monitoring of the biometric feature of the user based on the sensor measurements from the one or more sensors when the computer system is in the second mode of operation conserves battery power when the user is not likely to request information about the biometric feature, thereby increasing battery life of the computer system.

In some embodiments, the biometric feature includes a heart rate (e.g., 1324*b* and/or 1326) (e.g., the one or more sensors include a heart rate sensor (e.g., electrical heart rate sensor, optical heart rate sensor, an electrocardiography sensor, a photoplethysmography sensor) that is configured provide information indicative of a heart rate of the user of the computer system to the computer system, such that the computer system can output alerts and/or display information associated with the heart rate of the user). Disabling the automatic monitoring of a heart rate of the user based on the sensor measurements from the one or more sensors when the computer system is in the second mode of operation conserves battery power when the user is not likely to request information about their heart rate, thereby increasing battery life of the computer system.

In some embodiments, the biometric feature includes blood oxygenation (e.g., the one or more sensors include a blood oxygenation sensor (e.g., a pulse oximeter, an electrochemical oxygen sensor, a zirconia oxygen sensor, an optical oxygen sensor, an infrared oxygen sensor, and/or an ultrasonic oxygen sensor) that is configured provide information indicative of blood oxygenation of the user of the computer system to the computer system, such that the computer system can output alerts and/or display information associated with the blood oxygenation of the user). Disabling the automatic monitoring of blood oxygenation of the user based on the sensor measurements from the one or more sensors when the computer system is in the second mode of operation conserves battery power when the user is not likely to request information about their blood oxygenation, thereby increasing battery life of the computer system.

In some embodiments, the second operation includes detection of activity (e.g., displaying user interface 1336) of a user of the computer system (e.g., 100, 300, 500, 600, 646, and/or 1300) (e.g., the computer receives information about a physical movement and/or activity of a user (e.g., the information indicates that the user is walking, running, and/or exercising) from the one or more sensors (e.g., a biometric sensor, such as a heart rate sensor, a blood oxygenation sensor, and/or an electrocardiogram sensor, an accelerometer, a gyroscope, a motion sensor, a direction sensor, an inertial measurement unit, and/or a global positioning sensor ("GPS")). In some embodiments, when the information about the physical movement and/or activity of the user meets a set of one or more criteria for outputting a notification prompting the user to initiate a workout operation (e.g., the information about the biometric feature indicates that the user is walking, running, and/or exercising), the computer system outputs the notification while the computer system is in the first mode of operation and forgoes outputting the notification while the computer system is in the second mode of operation (e.g., and the respective condition occurs (e.g., the computer system is in a passive and/or inactive state)). In some embodiments, the one or more sensors of the computer system monitor the physical movement and/or activity of the user in the background while the computer system operates in the first mode of operation, but does not monitor the physical movement and/or activity of the user in the background while the computer system operates in the second mode of operation. In some embodiments, the user input corresponding to request to perform the first operation includes user input requesting to initiate a workout operation (e.g., user input requesting to navigate to a workout application and/or selection of a user interface object that causes the computer system to track and/or monitor physical movement and/or activity of the user), such that the computer system initiates the workout operation regardless of whether the computer system operates in the first mode of operation or the second mode of operation.

Disabling the automatic detection of activity of the user based on the sensor measurements from the one or more sensors when the computer system is in the second mode of operation conserves battery power when the user is not likely to request the computer system to monitor and/or track activity of the user, thereby increasing battery life of the computer system.

In some embodiments, detection of the activity of the user of the computer system (e.g., 100, 300, 500, 600, 646, and/or 1300) includes detection of exercise of the user (e.g., displaying user interface 1336) (e.g., based on information received from one or more sensors (e.g., a biometric sensor, such as a heart rate sensor, a blood oxygenation sensor, and/or an electrocardiogram sensor, an accelerometer, a gyroscope, a motion sensor, a direction sensor, an inertial measurement unit, and/or a global positioning sensor ("GPS"))) and the computer system (e.g., 100, 300, 500, 600, 646, and/or 1300) is configured to initiate an exercise tracking operation (e.g., displaying user interface 1324) after detection of exercise of the user (e.g., the computer system receives information from the one or more sensors indicating that the user is walking, running, and/or exercising, and in response to receiving the information displays a notification prompting a user to initiate the exercise tracking operation, which, when selected, initiates the exercise tracking operation). Disabling the automatic initiation of the exercise tracking operation after detection of exercise of the user based on the sensor measurements from the one or more sensors when the computer system is in the second mode of operation conserves battery power when the user is not likely to request the computer system to monitor and/or track activity of the user, thereby increasing battery life of the computer system.

In some embodiments, detection of the activity of the user of the computer system (e.g., 100, 300, 500, 600, 646, and/or 1300) includes detection of audio in a physical environment in which the computer system (e.g., 100, 300, 500, 600, 646, and/or 1300) is located (e.g., the computer system receives information from the one or more sensors (e.g., a microphone) indicating that the audio in the physical environment in which the computer system is located is above a threshold volume level, and in response to receiving the information, displays a notification and/or alert associated with audio in the physical environment in which the computer system is located). Disabling the automatic detection of audio in a physical environment in which the computer system is located based on the sensor measurements from the one or more sensors when the computer system is in the second mode of operation conserves battery power when the user is not likely to request the computer system to monitor and/or track audio in the physical environment, thereby increasing battery life of the computer system.

In some embodiments, detection of the activity of the user of the computer system (e.g., 100, 300, 500, 600, 646, and/or 1300) includes detection of the user washing their hands (e.g., the computer system receives information from the one or more sensors (e.g., an accelerometer, a gyroscope, a motion sensor, an inertial measurement unit, and/or a direction sensor) indicating that the user is washing their hands (e.g., detected movement of the computer system is indicative of movement of the user washing their hands), and in response to receiving the information, displays a notification and/or alert that, when selected, allows the computer system to initiate a handwashing operation). Disabling the automatic detection of the user washing their hands based on the sensor measurements from the one or more sensors when the computer system is in the second mode of operation conserves battery power when the user is not likely to request the computer system to monitor and/or track hand washing, thereby increasing battery life of the computer system.

In some embodiments, detection of the activity of the user of the computer system (e.g., 100, 300, 500, 600, 646, and/or 1300) includes detection of movement of the computer system (e.g., 100, 300, 500, 600, 646, and/or 1300) (e.g., via information received from the one or more sensors (e.g., an accelerometer, a gyroscope, a motion sensor, an inertial measurement unit, and/or a direction sensor)) to a location within a predetermined distance of a contactless payment terminal (e.g., 13483) (e.g., the computer system receives information from the one or more sensors (e.g., a near field communication sensor and/or a proximity sensor) indicating that the computer system is located within the predetermined distance of the contactless payment terminal (e.g., a contactless payment terminal associated with an account of the user that is not an express account of the user), and in response to receiving the information, initiates a transaction operation and/or displays a notification and/or alert associated with detection of the contactless payment terminal). Disabling the automatic detection of the computer system being in a location within a predetermined distance of a contactless payment terminal based on the sensor measurements from the one or more sensors when the computer system is in the second mode of operation conserves battery power when the user is not likely to request a contactless payment transaction, thereby increasing battery life of the computer system.

In some embodiments, the second operation includes initiating a voice assistant in response to detecting audio indicative of a keyword spoken by a user of the computer system (e.g., displaying user interface 1338 in response to detecting user input 1350r) (e.g., the computer receives audio information that includes speech of a user of the computer system, where the speech includes a keyword spoken by the user, from the one or more sensors (e.g., a microphone). In some embodiments, when the audio information includes speech having the keyword, the computer system initiates a voice assistant operation (e.g., performs an operation that is based on the audio information) while the computer system is in the first mode of operation and forgoes initiating the voice assistant operation while the computer system is in the second mode of operation (e.g., and the respective condition occurs (e.g., the computer system is in a passive and/or inactive state)). In some embodiments, the one or more sensors of the computer system monitor the audio information in the background while the computer system operates in the first mode of operation, but does not monitor the audio information in the background while the computer system operates in the second mode of operation. In some embodiments, the user input corresponding to request to perform the first operation includes user input requesting to initiate the voice assistant operation (e.g., user input requesting to navigate to a voice assistant application and/or selection of a user interface object that causes the computer system to initiate the voice assistant operation), such that the computer system initiates the voice assistant operation regardless of whether the computer system operates in the first mode of operation or the second mode of operation.

Disabling the automatic detection of audio indicative of a keyword spoken by a user based on the sensor measurements from the one or more sensors when the computer system is in the second mode of operation conserves battery power when the user is not likely to request that the computer system perform a voice assistant operation, thereby increasing battery life of the computer system.

In some embodiments, while the computer system (e.g., 100, 300, 500, 600, 646, and/or 1300) is operating in the second mode of operation, the computer system (e.g., 100, 300, 500, 600, 646, and/or 1300) reduces a frequency of operation (e.g., reducing an amount of time that a wireless antenna operates, increasing a length between periods and/or bursts when a wireless antenna operates, and/or increasing an amount of time that a wireless antenna is not active and/or otherwise not in operation) of one or more wireless antennae (e.g., Bluetooth antenna, Wifi antenna, and/or cellular network antenna) in communication with the computer system (e.g., 100, 300, 500, 600, 646, and/or 1300) (e.g., when the computer system operates in the second mode of operation, activity of the wireless antenna is reduced as compared to when the computer system operates in the first mode of operation). Reducing the frequency of operation of the one or more wireless antennae conserves battery power when the user is while the computer system operates in the second mode of operation, thereby increasing battery life of the computer system.

In some embodiments, while the computer system (e.g., 100, 300, 500, 600, 646, and/or 1300) is operating in the second mode of operation, the computer system (e.g., 100, 300, 500, 600, 646, and/or 1300) monitors a third set of one or more sensor measurements (e.g., periodically evaluating sensor measurements against one or more criteria for detecting events determined based on the sensor measurements) (in some embodiments, the computer system monitors the second set of one or more sensor measurements without receiving and/or detecting user input) from the sensors and performs a third operation (e.g., recording data, providing a notification to a user, and/or changing a state of the device) based on the third set of one or more sensor measurements from the one or more sensors (e.g., the computer system is configured to monitor the third set of one or more sensor measurements and perform the third operation even when the computer system is in the second mode of operation (e.g., a low power mode of operation)). Performing the third operation based on the third set of one or more sensor measurements while the computer system operates in the second mode of operation allows the computer system to perform predetermined operations that are considered time sensitive and/or urgent even when the computer system operates in the second mode of operation, thereby improving safety features of the computer system.

In some embodiments, the third set of one or more sensor measurements from the sensors (e.g., a biometric sensor, such as a heart rate sensor, a blood oxygenation sensor, and/or an electrocardiogram sensor, an accelerometer, a gyroscope, a motion sensor, a direction sensor, an inertial measurement unit, and/or a global positioning sensor ("GPS")) includes information about movement of a user of the computer system that indicates that the user has fallen (e.g., displaying user interface 840) (e.g., the third set of one or more sensor measurements include information about movement of the computer system, where the information received from the one or more sensors indicates that movement of the computer system is indicative of a user of the computer system falling down and that the information meets respective criteria (e.g., the information indicates that the computer system exceeded a threshold speed, force of impact, and/or acceleration, thereby indicating that the user has fallen and may be in need of assistance). In some embodiments, the third operation includes displaying an alert and/or notification in response to receiving the third set of one or more sensor measurements from the sensors that includes information about movement of the user of the computer that indicates that the user has fallen, where the alert and/or notification includes one or more selectable options that allow a user to request assistance (e.g., activate an emergency siren, initiate an emergency phone call, and/or display a medical identification user interface).

Detecting information about movement of a user of the computer system that indicates that the user has fallen while the computer system operates in the second mode of operation allows the user to potentially request and/or receive emergency assistance even when the computer system operates in the second mode of operation, thereby improving safety features of the computer system.

In some embodiments, the third set of one or more sensor measurements from the sensors (e.g., a biometric sensor, such as a heart rate sensor, a blood oxygenation sensor, and/or an electrocardiogram sensor, an accelerometer, a gyroscope, a motion sensor, a direction sensor, an inertial measurement unit, and/or a global positioning sensor ("GPS")) includes information about movement of a user of the computer system (e.g., 100, 300, 500, 600, 646, and/or 1300) that indicates that the user is performing physical activity (e.g., the computer system continues to monitor and/or measure physical activity of the user even when the computer system operates in the second mode of operation). In some embodiments, the computer system monitors and/or measures physical activity of the user when the computer system operates in the second mode of operation, but updates display of an activity user interface with information based on the monitored and/or measured physical activity less frequently when compared to the first mode of operation.

Detecting information about movement of a user of the computer system that indicates that the user is performing physical activity while the computer system operates in the second mode of operation allows the user to continue tracking physical activity when the computer system operates in the second mode of operation without providing additional user input, thereby reducing the number of inputs needed to perform an operation.

In some embodiments, the third set of one or more sensor measurements from the sensors (e.g., a near field communication sensor and/or a proximity sensor) includes information about movement of the computer system (e.g., 100, 300, 500, 600, 646, and/or 1300) to a location that is within a predetermined distance from a payment terminal (e.g., 1348) that broadcasts a predetermined signal (e.g., the payment terminal broadcasts a signal that is associated with an express transaction and/or account, such as a payment account, a transit account, and/or an access account (e.g., a mobile key)). In some embodiments, the predetermined signal is compared to one or more express transactions and/or accounts that have been designated (e.g., via user input) on the computer system. Detecting information about movement of a user of the computer system to a location that within a predetermined distance from a payment terminal that broadcasts a predetermined signal while the computer system operates in the second mode of operation allows the user to continue initiating transactions when the computer system is in the second mode of operation without requiring additional user input, thereby reducing the number of inputs needed to perform an operation.

In some embodiments, while the computer system (e.g., 100, 300, 500, 600, 646, and/or 1300) is operating in the second mode of operation, the computer system (e.g., 100, 300, 500, 600, 646, and/or 1300) detects an occurrence of an event associated with generating a notification (e.g., an incoming call, a low battery of the first computer system, an expiration of a timer, and/or receipt of a message)). In response to detecting the occurrence of the event associated with generating a notification and in accordance with a determination that a set of one or more criteria are met (e.g., the computer system is displaying a user interface that is not a watch face user interface and/or that is not otherwise associated with inactivity of the computer system, the computer system has detected a user input within a predetermined amount of time from detecting the occurrence of the event associated with generating a notification, and/or a predetermined amount of time has passed since the computer system last displayed a notification and/or a batch of notifications), the computer system (e.g., 100, 300, 500, 600, 646, and/or 1300) provides an alert (e.g., 1340, 1342, and/or 1344) (e.g., displaying and/or outputting a notification) corresponding to the event. In response to detecting the occurrence of the event associated with generating a notification and in accordance with a determination that the set of one or more criteria are not met (e.g., the computer system is displaying a user interface that is a watch face user interface and/or a user interface that is otherwise associated with inactivity of the computer system, the computer system has not detected a user input within a predetermined amount of time from detecting the occurrence of the event associated with generating a notification, and/or a predetermined amount of time has not passed since the computer system last displayed a notification and/or a batch of notifications), forgoing providing an alert (e.g., 1340, 1342, and/or 1344) (e.g., displaying a notification) associated with the event until the set of one or more criteria is met (e.g., the computer system detects user input requesting to display and/or output one or more notifications and/or a current time of day reaches a predetermined time of day (e.g., the current time of day is at the top of an hour of the day (e.g., 3:00 pm))).

Forgoing providing the alert associated with the notification event until the set of one or more criteria is met while the computer system operates in the second mode of operation delays outputting notifications, thereby increasing the battery life of the computer system.

In some embodiments, the set of one or more criteria includes detection of a current time of day being a predetermined time of day (e.g., the current time of day reaches and/or matches a predetermined time of day (e.g., the top of an hour of the day (e.g., 3:00 pm))) and/or detection of user input (e.g., 1350$p$ and/or 1350$q$) (e.g., user input (e.g., a tap gesture and/or a press gesture) requesting to display one or more notifications). Forgoing providing the alert associated with the notification event until the current time of day is a predetermined time of day and/or in response to detection of user input while the computer system operates in the second mode of operation delays outputting notifications, thereby increasing the battery life of the computer system.

In some embodiments, the computer system (e.g., 100, 300, 500, 600, 646, and/or 1300) detects third user input (e.g., 1350$t$) requesting to shut down the computer system (e.g., 100, 300, 500, 600, 646, and/or 1300) (e.g., user input (e.g., a long press on a hardware input device in communication with the computer system) requesting to turn off and/or power down the computer system). In response to detecting the third user input (e.g., 1350$t$) requesting to shut down the computer system (e.g., 100, 300, 500, 600, 646, and/or 1300), the computer system (e.g., 100, 300, 500, 600, 646, and/or 1300) shuts down the computer system (e.g., 100, 300, 500, 600, 646, and/or 1300) (e.g., turning off the computer system and/or powering down the computer system). While the computer system (e.g., 100, 300, 500, 600, 646, and/or 1300) is shut down, the computer system (e.g., 100, 300, 500, 600, 646, and/or 1300) detects fourth user input (e.g., 1350$u$) (e.g., a press on a hardware input device in communication with the computer system). In response to detecting the fourth user input (e.g., 1350$u$), the computer system (e.g., 100, 300, 500, 600, 646, and/or 1300) displays, via the display generation component (e.g., 602, 646$a$, and/or 1300), an indication of time (e.g., 1356) (e.g., a digital and/or analog indication of a current time of day) without displaying a watch face user interface (e.g., 1302) (e.g., the computer system displays the indication of time without additional user interface objects, complications, and/or affordances).

Displaying the indication of time in response to detecting the fourth user input and while the computer system is shut down allows a user to still obtain information about a current time of day even when the computer system is shut down, thereby providing improved visual feedback.

In some embodiments, while the computer system (e.g., 100, 300, 500, 600, 646, and/or 1300) is operating in the second mode of operation, the computer system (e.g., 100, 300, 500, 600, 646, and/or 1300) displays a system user interface (e.g., 1302, 1304, and/or 1310) (e.g., a watch face user interface, a settings user interface, and/or a control center user interface) of the computer system (e.g., 100, 300, 500, 600, 646, and/or 1300) that includes a status indicator (e.g., 1302*b*, 1304*c*, 1310*a*, 1310*b*, and/or 1319) (e.g., a user interface object, a symbol, a glyph, an icon, and/or an image) indicative of the computer system (e.g., 100, 300, 500, 600, 646, and/or 1300) operating in the second mode of operation (e.g., the status indicator includes an appearance that is representative of the computer system operating in the second mode of operation). Displaying the status indicator on the system user interface allows a user of the computer system to confirm that the computer system is operating in the second mode of operation, thereby providing improved visual feedback.

In some embodiments, the status indicator (e.g., 1302*b*, 1304*c*, 1310*a*, 1310*b*, and/or 1319) includes a predetermined color (e.g., yellow) indicating that the computer system (e.g., 100, 300, 500, 600, 646, and/or 1300) is operating in the second mode of operation (e.g., the predetermined color is representative of the second mode of operation) and the system user interface (e.g., 1302, 1304, and/or 1310) includes a second status indicator (e.g., 1302*b*, 1304*c*, 1310*a*, 1310*b*, and/or 1319) (e.g., a charging indicator, a battery indicator, a battery complication (e.g., a user interface object associated with a battery application and/or user interface of the computer system), a nightstand indicator, and/or another indicator that is associated with a battery of the computer system) that includes the predetermined color (e.g., yellow). The status indicator and the second status indicator both including the predetermined color allows a user to confirm that the computer system is operating in the second mode of operation, thereby providing improved visual feedback.

In some embodiments, the occurrence of the event includes initiation of a workout tracking operation (e.g., displaying user interface 1324) (e.g., the computer system initiates a workout tracking operation in response to detecting user input requesting to track and/or monitor physical movement of the user) and in response to detecting that the workout tracking operation has ended (e.g., the computer system detects user input requesting to cease the workout tracking operation), the computer system (e.g., 100, 300, 500, 600, 646, and/or 1300) transitions the computer system (e.g., 100, 300, 500, 600, 646, and/or 1300) from the second mode of operation to the first mode of operation (e.g., the computer system automatically transitions from the first mode of operation to the second mode of operation when the workout tracking operation is initiated and automatically transitions from the second mode of operation to the first mode of operation when the workout tracking operation is ended and/or ceased). Transitioning the computer system from the first mode of operation to the second mode of operation when a workout tracking operation is initiated allows the computer system to track and/or monitor physical activity of a user without utilizing excess power, thereby increasing battery life of the computer system. In addition, transitioning the computer system from the second mode of operation to the first mode of operation in response to the workout tracking operation ending allows the computer system to return to a normal mode of operation when the user is no longer exercising, thereby reducing the number of inputs needed to perform an operation.

In some embodiments, in accordance with a determination that a third mode of operation (e.g., a mode of operation associated with user interface object 1352*c*) (e.g., a low power mode of operation that further reduces activity of the computer system as compared to the second mode of operation) of the computer system (e.g., 100, 300, 500, 600, 646, and/or 1300) is enabled and in response to detecting the occurrence of the event (e.g., initiating the workout tracking operation), the computer system (e.g., 100, 300, 500, 600, 646, and/or 1300) transitions operation of the computer system (e.g., 100, 300, 500, 600, 646, and/or 1300) from the first mode of operation or the second mode of operation (e.g., a current mode of operation of the computer system) to the third mode of operation, wherein the third mode of operation reduces a frequency (e.g., reducing an amount of time that a fourth operation is performed, increasing a length between periods and/or bursts when a fourth operation is performed, and/or increasing an amount of time that a fourth operation is not active and/or otherwise not in operation) of a fourth operation (e.g., activation of a Bluetooth antenna, activation of a WiFi antenna, activation of a cellular network antenna, activation of an accelerometer, motion sensor, gyroscope, proximity sensor, an inertial measurement unit, and/or global positioning sensor ("GPS"), activation of a heart rate sensor, and/or activation of another sensor of the one or more sensors) of the computer system (e.g., 100, 300, 500, 600, 646, and/or 1300) as compared to the second mode of operation (e.g., the computer system does not perform the fourth operation as often and/or as frequently while operating in the third mode of operation as compared to the second mode of operation (and the first mode of operation)).

Transitioning the computer system from the first mode of operation or the second mode of operation to the third mode of operation when the third mode of operation is enabled and in response to detecting the occurrence of the event further reduces an amount of power usage of the computer system, thereby improving battery life of the computer system.

Note that details of the processes described above with respect to method 1400 (e.g., FIG. 14) are also applicable in an analogous manner to the methods described below. For example, methods 700, 900, 1000, and 1200 optionally includes one or more of the characteristics of the various methods described above with reference to method 1400. For example, a computer system that is configured to perform method 1400 is also configured to provide guidance about initiating an operation, perform a first operation, adjust audio output of an emergency operation, and/or display notifications. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to provide content that may be of interest and/or significant to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver provide notifications related to safety of the user. Accordingly, use of such personal information data enables the devices to provide improved safety features. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of safety features, the present technology can be configured to allow users to select to "opt in" or "opt out" of participation in the collection of personal information data during registration for services or anytime thereafter. In another example, users can select not to provide data for determining whether to activate a safety feature. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, safety features and/or configuration preferences can be based on non-personal information data or a bare minimum amount of personal information, such as the content being requested by the device associated with a user, other non-personal information available, or publicly available information.

What is claimed is:

1. A computer system configured to communicate with a display generation component, comprising:
   one or more processors; and
   memory storing one or more programs configured to be executed by the one or more processors, the one or more programs including instructions for:
   detecting an occurrence of an event; and
   in response to detecting the occurrence of the event, displaying a notification corresponding to the event, including:
       in accordance with a determination that the computer system satisfies a respective set of one or more criteria that indicate that the computer system is in a state in which user input is occurring or is likely to occur, displaying, via the display generation component, a first notification corresponding to the event, wherein the first notification obscures a first amount of a display region that was used to display a user interface prior to displaying the first notification; and
       in accordance with a determination that the computer system does not satisfy the respective set of one or more criteria that indicate that the computer system is in a state in which user input is occurring or is likely to occur, displaying, via the display generation component, a second notification corresponding to the event, wherein the second notification obscures a second amount of a display region that was used to display a user interface prior to displaying the second notification, wherein the second amount is larger than the first amount.

2. The computer system of claim 1, wherein:
   the state in which user input is occurring or is likely to occur includes the computer system displaying, via the display generation component, an editing user interface, a selection user interface, or a drafting user interface; and the state in which user input is occurring or is likely to occur does not include the computer system displaying an information display user interface.

3. The computer system of claim 1, wherein:

the state in which user input is occurring or is likely to occur includes the computer system being in an orientation that is indicative of a user's wrist being raised and the computer system displaying a user interface that is not a watch face user interface; and the state in which user input is occurring or is likely to occur does not include the computer system being in an orientation that is indicative of a user's wrist being down and/or the computer system displaying a watch face user interface.

4. The computer system of claim 1, wherein the first notification includes a first amount of content and the second notification includes a second amount of content, greater than the first amount of content.

5. The computer system of claim 1, wherein the first notification includes a first size and the second notification includes a second size, greater than the first size.

6. The computer system of claim 1, wherein:

displaying the second notification corresponding to the event includes expanding the second notification from obscuring a third amount of the display region to the second amount of the display region, wherein the third amount is less than the second amount; and displaying the first notification corresponding to the event does not include expanding the first notification.

7. The computer system of claim 6, wherein the one or more programs further include instructions for:

while displaying the first notification corresponding to the event, detecting user input corresponding to selection of the first notification; and in response to detecting the user input, expanding the first notification from obscuring the first amount of the display region to obscuring a fourth amount of the display region, greater than the first amount.

8. The computer system of claim 1, wherein displaying the first notification corresponding to the event includes deemphasizing the user interface that was displayed prior to displaying the first notification.

9. The computer system of claim 8, wherein deemphasizing the user interface that was displayed prior to displaying the first notification includes darkening and/or blurring the user interface that was displayed prior to displaying the first notification.

10. The computer system of claim 8, wherein deemphasizing the user interface that was displayed prior to displaying the first notification includes reducing a size of the user interface that was displayed prior to displaying the first notification.

11. The computer system of claim 1, wherein the one or more programs further include instructions for:

while displaying the first notification corresponding to the event, detecting a swipe gesture corresponding to the first notification; and in response to detecting the swipe gesture corresponding to the first notification, ceasing display of the first notification.

12. The computer system of claim 1, wherein the one or more programs further include instructions for:

while displaying the first notification corresponding to the event, detecting that a predetermined amount of time has passed since first displaying the first notification without detecting user input; and in response to detecting that the predetermined amount of time has passed since first displaying the first notification, ceasing display of the first notification.

13. The computer system of claim 1, wherein the one or more programs further include instructions for:

while displaying the first notification corresponding to the event, detecting an occurrence of a second event; and in response to receiving the occurrence of the second event, replacing display of the first notification with display of a third notification corresponding to the second event.

14. The computer system of claim 13, wherein the one or more programs further include instructions for:

while displaying the third notification corresponding to the second event, detecting user input requesting to dismiss the third notification; and in response to detecting the user input requesting to dismiss the third notification:

displaying an expansion animation of the third notification and the first notification; and after displaying the expansion animation of the third notification and the first notification, ceasing displaying the first notification and the third notification.

15. The computer system of claim 1, wherein displaying the second notification includes:

displaying, at a first time, a first portion of the second notification that obscures a fifth amount of the display region, wherein the first portion of the second notification includes an icon indicative of the event; and after displaying the first portion of the second notification, displaying, at a second time, a second portion of the second notification that obscures the second amount of the display region, wherein the second portion of the second notification includes the icon indicative of the event and text associated with the event.

16. The computer system of claim 1, wherein the one or more programs further include instructions for:

in response to detecting the occurrence of the event and in accordance with a determination that the event is of a first type, displaying the second notification corresponding to the event without regard to whether the computer system satisfies the respective set of one or more criteria that indicate that the computer system is in a state in which user input is occurring or is likely to occur.

17. A non-transitory computer-readable storage medium storing one or more programs configured to be executed by one or more processors of a computer system that is in communication with a display generation component, the one or more programs including instructions for:

detecting an occurrence of an event; and in response to detecting the occurrence of the event, displaying a notification corresponding to the event, including:

in accordance with a determination that the computer system satisfies a respective set of one or more criteria that indicate that the computer system is in a state in which user input is occurring or is likely to occur, displaying, via the display generation component, a first notification corresponding to the event, wherein the first notification obscures a first amount of a display region that was used to display a user interface prior to displaying the first notification; and in accordance with a determination that the computer system does not satisfy the respective set of one or more criteria that indicate that the computer system is in a state in which user input is occurring or is likely to occur, displaying, via the display generation component, a second notification corresponding to the event, wherein the second notification obscures a second amount of a display region that was used to display a user interface prior to displaying the second notification, wherein the second amount is larger than the first amount.

18. A method, comprising:

at a computer system that is in communication with a display generation component:

detecting an occurrence of an event; and in response to detecting the occurrence of the event, displaying a notification corresponding to the event, including:

in accordance with a determination that the computer system satisfies a respective set of one or more criteria that indicate that the computer system is in a state in which user input is occurring or is likely to occur, displaying, via the display generation component, a first notification corresponding to the event, wherein the first notification obscures a first amount of a display region that was used to display a user interface prior to displaying the first notification; and in accordance with a determination that the computer system does not satisfy the respective set of one or more criteria that indicate that the computer system is in a state in which user input is occurring or is likely to occur, displaying, via the display generation component, a second notification corresponding to the event, wherein the second notification obscures a second amount of a display region that was used to display a user interface prior to displaying the second notification, wherein the second amount is larger than the first amount.

19. The non-transitory computer-readable storage medium of claim 17, wherein:

the state in which user input is occurring or is likely to occur includes the computer system displaying, via the display generation component, an editing user interface, a selection user interface, or a drafting user interface; and the state in which user input is occurring or is likely to occur does not include the computer system displaying an information display user interface.

20. The non-transitory computer-readable storage medium of claim 17, wherein:

the state in which user input is occurring or is likely to occur includes the computer system being in an orientation that is indicative of a user's wrist being raised and the computer system displaying a user interface that is not a watch face user interface; and the state in which user input is occurring or is likely to occur does not include the computer system being in an orientation that is indicative of a user's wrist being down and/or the computer system displaying a watch face user interface.

21. The non-transitory computer-readable storage medium of claim 17, wherein the first notification includes a first amount of content and the second notification includes a second amount of content, greater than the first amount of content.

22. The non-transitory computer-readable storage medium of claim 17, wherein the first notification includes a first size and the second notification includes a second size, greater than the first size.

23. The non-transitory computer-readable storage medium of claim 17, wherein:

displaying the second notification corresponding to the event includes expanding the second notification from obscuring a third amount of the display region to the second amount of the display region, wherein the third amount is less than the second amount; and displaying the first notification corresponding to the event does not include expanding the first notification.

24. The non-transitory computer-readable storage medium of claim 17, wherein displaying the first notification corresponding to the event includes deemphasizing the user interface that was displayed prior to displaying the first notification.

25. The non-transitory computer-readable storage medium of claim 17, wherein the one or more programs further include instructions for:

while displaying the first notification corresponding to the event, detecting a swipe gesture corresponding to the first notification; and in response to detecting the swipe gesture corresponding to the first notification, ceasing display of the first notification.

26. The non-transitory computer-readable storage medium of claim 17, wherein the one or more programs further include instructions for:

while displaying the first notification corresponding to the event, detecting that a predetermined amount of time has passed since first displaying the first notification without detecting user input; and in response to detecting that the predetermined amount of time has passed since first displaying the first notification, ceasing display of the first notification.

27. The non-transitory computer-readable storage medium of claim 17, wherein the one or more programs further include instructions for:

while displaying the first notification corresponding to the event, detecting an occurrence of a second event; and in response to receiving the occurrence of the second event, replacing display of the first notification with display of a third notification corresponding to the second event.

28. The non-transitory computer-readable storage medium of claim 17, wherein displaying the second notification includes:

displaying, at a first time, a first portion of the second notification that obscures a fifth amount of the display region, wherein the first portion of the second notification includes an icon indicative of the event; and after displaying the first portion of the second notification, displaying, at a second time, a second portion of the second notification that obscures the second amount of the display region, wherein the second portion of the second notification includes the icon indicative of the event and text associated with the event.

29. The non-transitory computer-readable storage medium of claim 17, wherein the one or more programs further include instructions for:

in response to detecting the occurrence of the event and in accordance with a determination that the event is of a first type, displaying the second notification corresponding to the event without regard to whether the computer system satisfies the respective set of one or more criteria that indicate that the computer system is in a state in which user input is occurring or is likely to occur.

30. The method of claim 18, wherein:

the state in which user input is occurring or is likely to occur includes the computer system displaying, via the display generation component, an editing user interface, a selection user interface, or a drafting user interface; and the state in which user input is occurring or is likely to occur does not include the computer system displaying an information display user interface.

31. The method of claim 18, wherein:

the state in which user input is occurring or is likely to occur includes the computer system being in an orientation that is indicative of a user's wrist being raised and the computer system displaying a user interface that is not a watch face user interface; and the state in which user input is occurring or is likely to occur does not include the computer system being in an orientation that is indicative of a user's wrist being down and/or the computer system displaying a watch face user interface.

32. The method of claim 18, wherein the first notification includes a first amount of content and the second notification includes a second amount of content, greater than the first amount of content.

33. The method of claim 18, wherein the first notification includes a first size and the second notification includes a second size, greater than the first size.

34. The method of claim 18, wherein:

displaying the second notification corresponding to the event includes expanding the second notification from obscuring a third amount of the display region to the second amount of the display region, wherein the third amount is less than the second amount; and displaying the first notification corresponding to the event does not include expanding the first notification.

35. The method of claim 18, wherein displaying the first notification corresponding to the event includes deemphasizing the user interface that was displayed prior to displaying the first notification.

36. The method of claim 18, further comprising:

while displaying the first notification corresponding to the event, detecting a swipe gesture corresponding to the first notification; and in response to detecting the swipe gesture corresponding to the first notification, ceasing display of the first notification.

37. The method of claim 18, further comprising:

while displaying the first notification corresponding to the event, detecting that a predetermined amount of time has passed since first displaying the first notification without detecting user input; and in response to detecting that the predetermined amount of time has passed since first displaying the first notification, ceasing display of the first notification.

38. The method of claim 18, further comprising:

while displaying the first notification corresponding to the event, detecting an occurrence of a second event; and in response to receiving the occurrence of the second event, replacing display of the first notification with display of a third notification corresponding to the second event.

39. The method of claim 18, wherein displaying the second notification includes:

displaying, at a first time, a first portion of the second notification that obscures a fifth amount of the display region, wherein the first portion of the second notification includes an icon indicative of the event; and after displaying the first portion of the second notification, displaying, at a second time, a second portion of the second notification that obscures the second amount of the display region, wherein the second portion of the second notification includes the icon indicative of the event and text associated with the event.

40. The method of claim 18, further comprising:

in response to detecting the occurrence of the event and in accordance with a determination that the event is of a first type, displaying the second notification corresponding to the event without regard to whether the computer system satisfies the respective set of one or more criteria that indicate that the computer system is in a state in which user input is occurring or is likely to occur.

\* \* \* \* \*